US011329850B2

(12) United States Patent
Qu et al.

(10) Patent No.: US 11,329,850 B2
(45) Date of Patent: May 10, 2022

(54) SIGNAL PROCESSING METHOD AND APPARATUS

(71) Applicant: HUAWEI TECHNOLOGIES CO., LTD., Guangdong (CN)

(72) Inventors: Bingyu Qu, Beijing (CN); Xianda Liu, Beijing (CN); Mingxin Gong, Beijing (CN); Kunpeng Liu, Beijing (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 17/362,065

(22) Filed: Jun. 29, 2021

(65) Prior Publication Data

US 2021/0344534 A1 Nov. 4, 2021

Related U.S. Application Data

(63) Continuation of application No. PCT/CN2020/071476, filed on Jan. 10, 2020.

(30) Foreign Application Priority Data

Jan. 10, 2019 (CN) ......................... 201910024591.9
Feb. 14, 2019 (CN) ......................... 201910114674.7

(51) Int. Cl.
*H04W 4/00* (2018.01)
*H04L 27/26* (2006.01)
(Continued)

(52) U.S. Cl.
CPC .......... *H04L 27/261* (2013.01); *H04L 5/0048* (2013.01); *H04L 27/20* (2013.01); *H04L 27/26025* (2021.01)

(58) Field of Classification Search
CPC ............. H04L 27/361; H04L 27/26025; H04L 5/0048; H04L 27/20
(Continued)

(56) References Cited

U.S. PATENT DOCUMENTS 9,426,595 B2 8/2016 Nakano
2018/0324005 A1 11/2018 Kim et al.
2020/0145266 A1 * 5/2020 Yang .................. H04L 27/2672

FOREIGN PATENT DOCUMENTS

CN 101626620 A 1/2010
CN 101635980 A 1/2010
(Continued)

OTHER PUBLICATIONS

MediaTek Inc. (R1-1810437, Title: Low PAPR RS, Chengdu, China, Oct. 8-12, 2018). [pp. 1-3] (Year: 2018).*
LG Electronics, "Discussion on NR PRACH Preamble," 3GPP TSG RAN WG1 Meeting #88bis, R1-1704868, Spokane, USA Apr. 3-7, 2017, 13 pages.
(Continued)

*Primary Examiner* — Maharishi V Khirodhar
(74) *Attorney, Agent, or Firm* — Fish & Richardson P.C.

(57) ABSTRACT

The present disclosure relates to signal processing methods and apparatus. One example method includes determining a first sequence {x(n)} based on a preset condition and a sequence {s(n)}, generating a reference signal of a first signal by using the first sequence, and sending the reference signal on a first frequency-domain resource. The preset condition is $x_n = y_{(n+M) mod K}$, where $$y_n = A \cdot e^{\frac{j \times \pi \times s_n}{8}},$$

M∈{0, 1, 2, . . . , 5}, a length of the first sequence is K=6, n=0, 1, . . . , K−1, A is a non-zero complex number, and $j=\sqrt{-1}$. The first signal is a signal modulated by using π/2 binary phase shift keying (BPSK). The first frequency-domain resource comprises K subcarriers each having a subcarrier number of k, k=u+L*n+delta, L is an integer greater than or equal to 2, delta∈{0, 1, . . . , L−1}, u is an
(Continued)

integer, and subcarrier numbers of the K subcarriers are numbered in ascending or descending order of frequencies.

26 Claims, 12 Drawing Sheets

(51) Int. Cl.
*H04L 5/00* (2006.01)
*H04L 27/20* (2006.01)

(58) Field of Classification Search
USPC ........................................................ 370/329
See application file for complete search history.

(56) References Cited

FOREIGN PATENT DOCUMENTS

| | | | |
|---|---|---|---|
| CN | 101662443 | A | 3/2010 |
| CN | 101741793 | A | 6/2010 |
| CN | 104639281 | A | 5/2015 |
| CN | 104683280 | A | 6/2015 |
| CN | 107888352 | A | 4/2018 |
| CN | 108282305 | A | 7/2018 |
| CN | 108282309 | A | 7/2018 |
| CN | 108282435 | A | 7/2018 |
| CN | 108633014 | A | 10/2018 |
| WO | 2017167304 | A1 | 10/2017 |
| WO | 2018024127 | A1 | 2/2018 |
| WO | 2018127137 | A1 | 7/2018 |
| WO | 2019001543 | A1 | 1/2019 |

OTHER PUBLICATIONS

Office Action issued in Chinese Application No. 202011564231.7 dated Jun. 18, 2021, 7 pages.
3GPP TS 38.211 V15.3.0 (Sep. 2018), “3rd Generation Partnership Project; Technical Specification Group Radio Access Network; NR; Physical channels and modulation(Release 15),” Sep. 2018, 96 pages.
NTT Docomo, Inc., “Work plan for Rel-15 NR WI,” 3GPP TSG RAN WG1 Meeting #90bis, R1-1718177, Prague, CZ, Oct. 9-13, 2017, 175 pages.
PCT International Search Report and Written Opinion issued in International Application No. PCT/CN2020/071476 dated Mar. 27, 2020, 12 pages (partial English translation).
Rodenbeck et al., “Delta Modulation Technique for Improving the Sensitivity of Monobit Subsamplers in Radar and Coherent Receiver Applications,” IEEE Transactions on Microwave Theory and Techniques, vol. 62, No. 8, Jul. 2014, 13 pages.
Extended European Search Report issued in European Application No. 20738188.0 dated Dec. 6, 2021, 13 pages.
Office Action issued in Chinese Application No. 202011564231.7 dated Dec. 3, 2021, 4 pages.
Qualcomm Incorporated, “Low PAPR Modulation,” 3GPP TSG RAN WG1 Meeting 90bis, R1-1718594, Prague, CZ, Oct. 9-13, 2017, 9 pages.
Qualcomm Incorporated, “Lower PAPR reference signals,” 3GPP TSG RAN WG1 Meeting #95, R1-1813445, Spokane, WA, USA, Nov. 12-16, 2018, 24 pages.
Office Action issued in Indian Application No. 202137025060 dated Mar. 14, 2022, 5 pages.

* cited by examiner

SIGNAL PROCESSING METHOD AND APPARATUS

CROSS-REFERENCE TO RELATED APPLICATIONS

This application is a continuation of International Application No. PCT/CN2020/071476, filed on Jan. 10, 2020, which claims priority to Chinese Patent Application No. 201910114674.7, filed on Feb. 14, 2019, which claims priority to Chinese Patent Application No. 201910024591.9, filed on Jan. 10, 2019. All of the aforementioned patent applications are hereby incorporated by reference in their entireties.

TECHNICAL FIELD

This application relates to the communications filed and, more specifically, to a signal processing method and apparatus.

BACKGROUND

In a long term evolution (LTE) system, for a physical uplink shared channel (PUSCH) and a PUCCH, a demodulation reference signal (DMRS) is used for channel estimation, and then a signal is demodulated. In the LTE system, a base sequence of an uplink DMRS may be directly mapped to a resource element, and no encoding processing is needed. In LTE, a reference sequence of the uplink DMRS is defined as a cyclic shift of a basic sequence. The base sequence of the uplink DMRS is obtained from a Zadoff-Chu sequence (ZC sequence) through cyclic extension. The ZC sequence is a sequence that satisfies a constant envelope zero auto-correlation (CAZAC) sequence property.

In a new radio access technology (NR), an uplink transmission signal is supported to use a discrete Fourier transform-spread-orthogonal frequency division multiplexing (discrete Fourier Transform spread OFDM, DFT-s-OFDM) waveform. The uplink transmission signal is modulated by using π/2 Binary Phase Shift Keying (BPSK). In addition, a frequency-domain filtering operation may be on an uplink transmission signal obtained after DFT transform. When the uplink transmission signal is modulated by using π/2 BPSK, a Gold sequence-based sequence may be used, or a computer generated sequence (CGS) may be used. Currently, it is planned to support, in NR, a DMRS using the DFT-s-OFDM waveform to use the ZC sequence. In addition, it is planned to support, in NR, a DMRS of the uplink transmission signal modulated by using π/2 BPSK to use the ZC sequence.

However, if the uplink DMRS uses the ZC sequence, a peak-to-average power ratio (PAPR) of the DMRS is higher than a PAPR of a corresponding uplink transmission signal, resulting in out-of-band spurious emission and in-band signal loss of the DMRS and affecting channel estimation performance, or limiting uplink coverage. In addition, when the uplink DMRS using the DFT-s-OFDM waveform is modulated by using the π/2 BPSK modulation scheme, and a filter is used, if the uplink DMRS using the DFT-s-OFDM waveform uses the Gold sequence-based sequence or the CGS and proper screening cannot be performed, frequency flatness of the sequence is relatively poor. This is adverse to channel estimation. If the uplink DMRS using the DFT-s-OFDM waveform uses the ZC sequence, a peak-to-average power ratio (PAPR) of the DMRS is higher than a PAPR of transmitted data, resulting in out-of-band spurious emission and in-band signal loss of a pilot signal and affecting channel estimation performance, or limiting uplink coverage.

That is, an existing DMRS sequence cannot satisfy a current communications application environment. In addition, an existing sequence used by a reference signal (for example, a DMRS) used for a PDSCH cannot satisfy the current communications application environment in which a signal is sent through a PUSCH.

SUMMARY

This application provides a signal processing method and apparatus, to improve communication efficiency.

According to a first aspect, a signal processing method is provided. The method includes:

generating a reference signal of a first signal, where the first signal is a signal modulated by using π/2 binary phase shift keying BPSK, the reference signal is generated by using a first sequence, and a length of the first sequence is K; and sending the reference signal on a first frequency-domain resource, where the first frequency-domain resource includes K subcarriers each having a subcarrier number of k, k=u+L*n+delta, n=0, 1, . . . , K−1, L is an integer greater than or equal to 2, delta∈{0, 1, . . . , L−1}, u is an integer, and the subcarrier numbers are numbered in ascending or descending order of frequencies, where before the reference signal is generated, the method further includes:

determining the first sequence, where the first sequence varies as a delta value varies.

In some possible implementations, a modulation scheme of the first sequence is neither BPSK modulation nor pi/2 BPSK modulation.

In some possible implementations, the first sequence is a sequence modulated by using any one of 8PSK, 16PSK, or 32PSK.

In some possible implementations, the method further includes:

determining the first sequence in a first sequence group, where the first sequence group is one of a plurality of sequence groups, and the first sequence is determined, based on the delta value, in a plurality of sequences that are in the first sequence group and whose length is K.

In some possible implementations, the method further includes:

determining the first sequence group based on a cell identifier or a sequence group identifier.

In some possible implementations, the method further includes:

receiving indication information, where the indication information is used to indicate a sequence that is in each of at least two sequence groups and used to generate the reference signal.

With reference to the first aspect, in some implementations of the first aspect, optionally, when delta=0, the generating a reference signal of a first signal includes:

performing discrete Fourier transform on elements in a sequence {z(t)} to obtain a sequence {f(t)} with t=0, . . . , L*K−1, where when t=0, 1, . . . , L*K−1, z(t)=x(t mod K), and x(t) represents the first sequence; and mapping elements numbered L*p+delta in the sequence {f(t)} to the subcarriers each having the subcarrier number of u+L*p+delta respectively, to generate the reference signal, where p=0, . . . , K−1.

Optionally, when L=2 and delta=1, the generating a reference signal of a first signal includes:

performing discrete Fourier transform on elements in a sequence {z(t)} to obtain a sequence {f(t)} with t=0, . . . , L*K−1, where when t=0, . . . , K−1, z(t)=x(t), when t=K, . . . , L*K−1, z(t)=−x(t mod K), and x(t) represents the first sequence; and mapping elements numbered L*p+delta in the sequence {f(t)} to the subcarriers each having the subcarrier number of u+L*p+delta respectively, to generate the reference signal, where p=0, . . . , K−1.

In an embodiment, L may alternatively be another integer greater than 2. In other words, when delta=1, the generating a reference signal of a first signal includes: performing discrete Fourier transform on elements in a sequence {z(t)} to obtain a sequence {f(t)} with t=0, . . . , L*K−1, where when t=0, . . . , K−1, z(t)=x(t), when t=K, . . . , L*K−1, z(t)=−x(t mod K), and x(t) represents the first sequence; and mapping elements numbered L*p+delta in the sequence {f(t)} to subcarriers each having the subcarrier number of u+L*p+delta respectively, to generate the reference signal, where p=0, . . . , K−1.

Optionally, when L=4, the generating a reference signal of a first signal includes:

performing discrete Fourier transform on elements in a sequence {z(t)} to obtain a sequence {f(t)} with t=0, . . . , 4K−1, where when t=0, 1, . . . , 4K−1, $$z(t) = w_{delta}\left(\left\lfloor \frac{t}{K} \right\rfloor\right)x(t \bmod K),$$

where $w_0$=(1, 1, 1, 1), $w_1$=(1, j, −1, −j), $w_2$=(1, −1, 1, −1), $w_3$=(1, −j, −1, j), $\lfloor c \rfloor$ represents rounding down of c, and x(t) represents the first sequence; and mapping elements numbered 4p+delta in the sequence {f(t)} to the subcarriers each having the subcarrier number of u+L*p+delta respectively, to generate the reference signal, where p=0, . . . , K−1. In another embodiment, $w_0$=(1, 1, 1, 1), $w_1$=(1, j, −1, −j), $w_2$=(1, −1, 1, −1), and $w_3$=(1, −j, −1, j).

Optionally, the generating a reference signal of a first signal includes:

performing discrete Fourier transform on elements in a sequence {x(t)} to obtain a sequence {f(t)} with t=0, . . . , K−1, where x(t) represents the first sequence; and mapping elements numbered p in the sequence {f(t)} to the subcarriers each having the subcarrier number of u+L*p+delta respectively, to generate the reference signal, where p=0, . . . , K−1.

Optionally, when delta=0, the method further includes:

determining the first sequence {x(n)} based on a preset condition and a sequence {s(n)}, where the preset condition is $x_n = y_{(n+M) \bmod K}$, where $$y_n = A \cdot e^{\frac{j \times \pi \times s_n}{16}},$$

M∈{0, 1, 2, . . . , 5}, K=6, A is a non-zero complex number, and $j=\sqrt{-1}$; and the sequence {s(n)} includes at least one of the following sequences:

{1, −5, 5, 11, −13, 11}, {1, −5, 3, 13, 3, −5}, {1, −5, 5, 13, 5, 11}, {1, −9, −5, 5, 15, 11}, {1, 9, −15, 11, −13, 11}, {1, 9, −15, 11, 3, 11}, {1, 11, −11, −9, 13, 3}, {1, −7, 7, 15, 11, 15}, {1, −9, −1, −5, −15, −7}, {1, −13, −9, −15, −5, 7}, {1, −1, 7, 15, 3, 11}, {1, 9, −15, 15, −9, 11}, {1, 15, 7, −5, −11, −9}, {1, 11, 15, −3, −13, 5}, {1, 9, −15, 15, 7, 15}, {1, 9, −15, 9, 7, 15}, {1, −11, −3, 11, −15, 13}, {1, 11, 1, 5, −9, −9}, {1, −3, 9, −1, −15, −11}, {1, 15, −13, 7, −5, −9}, {1, 11, −3, 3, 1, −9}, {1, −11, −13, 9, −13, −3}, {1, −11, −7, 3, 13, 3}, {1, −11, 11, −11, −7, 3}, {1, −11, −15, −9, 3, 11}, {1, 15, 5, −9, −7, −9}, {1, 11, 15, 9, −1, −11}, {1, −11, −1, −5, 5, 11}, {1, 7, −5, 5, 15, 11}, or {1, 11, 3, 13, −13, 15}; or

{1, −11, 11, −1, 7, 13}, {1, −3, −13, 15, −5, 5}, {1, −11, 11, −1, 3, 13}, {1, 13, −9, 3, −3, −13}, {1, −11, 11, −1, 7, 13}, {1, −3, 9, −13, −1, −9}, {1, 11, 13, 1, −9, 11}, {1, 11, −9, 13, 7, 5}, {1, 3, −9, 13, 1, 11}, {1, 11, −9, 15, 7, 5}, {1, −11, −3, 5, 7, −5}, {1, 7, −15, 5, −5, 15}, {1, −5, −15, −3, 7, −13}, {1, 9, 13, 1, −9, 11}, {1, −7, −11, 1, 11, −9}, {1, 9, −3, −13, 7, 11}, {1, 11, −9, −13, 13, 5}, {1, −9, −15, −3, 7, −13}, {1, −11, −9, 1, 7, −5}, {1, 9, −3, −13, 7, 9}, {1, 13, 11, 3, −5, 7}, {1, 13, 9, 1, −5, 7}, {1, 9, 15, 3, −7, 13}, {1, −7, 5, 13, −7, −15}, {1, 1, 9, −3, −11, 9}, {1, −11, −5, 1, 7, −5}, {1, −5, −11, 1, 11, −9}, {1, −9, 1, 11, −9, −15}, {1, 13, −9, 1, −5, −15}, {1, −5, 7, −15, −5, −15}, {1, −9, 11, −15, −15, −5}, {1, −9, −15, −5, 5, −15}, {1, −9, 13, −13, −3, −3}, {1, −9, 13, 1, 1, 11}, {1, −9, 1, 1, 7, −5}, {1, −11, −15, −3, 7, −13}, {1, −11, −13, −1, 9, −11}, {1, 3, 15, −13, 7, −3}, {1, −11, −7, 5, 7, −5}, {1, 11, 11, 1, −9, 9}, {1, 15, 7, −3, −3, 7}, {1, −9, 13, 13, −9, −1}, {1, 11, 11, 1, −7, 7}, {1, −11, −3, 3, −9, −5}, {1, 7, 15, 3, −7, −3}, {1, 11, 7, −13, 13, 5}, {1, 13, 5, −1, 11, 7}, {1, −11, −3, 1, 7, −5}, {1, −11, −5, −1, 7, −5}, {1, −3, −11, 1, 11, −9}, {1, 13, −9, 3, −5, −9}, {1, 11, −1, −11, 9, 15}, {1, 11, 13, −13, 7, −3}, {1, 11, −9, −15, 15, 5}, {1, 11, −9, 13, 11, 5}, {1, −11, −3, 5, −7, −5}, {1, −7, −15, −3, 7, 5}, {1, −7, −15, −3, −5, 5}, {1, −9, −7, 13, −11, −3}, {1, −7, −15, −15, −5, 5}, {1, 11, 11, 3, −5, 7}, {1, 13, −9, 1, −7, −15}, {1, 9, 9, −1, −11, 9}, {1, −9, −9, −1, 7, −5}, {1, −9, −1, 7, 7, −5}, {1, −9, 13, 1, 1, 9}, {1, 13, 13, 5, −3, 7}, {1, 15, 7, −1, −3, 7}, {1, 11, 9, 1, −7, 7}, {1, −9, −7, 1, 9, −5}, {1, 3, −7, 15, 1, 9}, {1, −9, −15, −3, 5, −15}, {1, −5, −15, −15, −3, 5}, {1, 1, 11, −15, 5, −3}, {1, −7, 13, −13, −3, −3}, {1, −7, 3, 13, −7, −15}, {1, −7, 5, 15, −7, −15}, {1, −9, 13, −11, −11, −3}, {1, −11, −3, −3, 5, −5}, {1, −11, −3, 3, −9, 13}, {1, −11, −7, 1, −11, −5}, {1, −7, −11, 1, 11, 5}, {1, −3, −11, 1, 11, 5}, {1, −11, −3, 1, −11, −5}, {1, 11, 15, −13, 7, −3}, {1, 7, 15, 3, 7, −3}, {1, −9, −3, −15, −11, −3}, {1, 5, 15, 3, −7, 13}, {1, 11, 7, −13, 11, 5}, {1, −9, −3, −15, −7, −3}, {1, −3, −11, 1, −5, 5}, {1, −7, −11, 1, −5, 5}, {1, −3, 9, −13, −1, −11}, {1, −9, 3, 13, −7, −11}, {1, 13, 7, −1, 11, 7}, {1, −5, −11, 1, 11, 5}, {1, −11, −5, 1, −11, −5}, {1, −9, −3, −15, −9, −3}, {1, −5, −11, 1, −5, 5}, {1, 11, −11, 1, −5, −15}, {1, −9, −15, −3, 7, −15}, {1, 11, 11, 1, −9, 11}, {1, 1, 11, −15, 5, −5}, {1, 9, 11, −1, −11, −3}, {1, 11, 3, 15, 7, 5}, {1, 3, 11, −1, 7, −3}, {1, −7, 5, −3, 7, −13}, {1, −9, −11, 1, 11, 5}, {1, −1, −11, 1, 11, 5}, {1, −11, −9, 1, −11, −5}, {1, 11, −1, −11, −5, 15}, {1, −11, −1, 1, −11, −5}, {1, −9, −3, −15, −5, −3}, {1, −1, −11, 1, −5, 5}, {1, −9, −11, 1, −5, 5}.

It should be understood that {x(n)} represents $\{x_n\}$.

Optionally, when delta=1, the method further includes:

determining the first sequence based on a preset condition and a sequence {s(n)}, where the preset condition is $x_n = y_{(n+M) \bmod K}$, where $$y_n = A \cdot e^{\frac{j \times \pi \times s_n}{16}},$$

M∈{0, 1, 2, . . . , 5}, K=6, A is a non-zero complex number, and $j=\sqrt{-1}$; and the sequence {s(n)} includes at least one of the following sequences:

{1, −7, 13, −13, −11, −3}, {1, −7, −9, −15, −3, 5}, {1, 5, 15, −15, 5, −3}, {1, 13, 11, 1, −3, 9}, {1, 11, 3, 15, 11, 5}, {1, −11, −3, 3, −9, −5}, {1, −11, −3, 3, −9, 13}, {1, −7, 3, 15, 11, 5}, {1, −3, 7, −13, 9, 5}, {1, 11, 7, −13, 9, 5}, {1, 13, −9, 1, −9, −15}, {1, −9, 13, 1, 1, 7}, {1, 3, 11, −1, −11, −3}, {1, 3, 11, −1, 7, −3}, {1, 9, −1, 7, 9, −3}, {1, 11, −11, 13, 15, −7}, {1, −7, 3, −5, −3, 7}, {1, 9, 7, −3, 5, −5}, {1, 13, 15, 7, −3, 5}, {1, −7, 3, 11, 9, −3}, {1, 13, −7, −5, −15, −7}, {1, −7, 13, 15, −3, 3}, {1, −13, −15, −3, 5, −9}, {1, 15, 11, −1, 11, 7}, {1, −3, 11, 7, −5, 5}, {1, −13, −9, 3, −7, −3}, {1, 7, 7, −5, −15, −3}, {1, 11, 1, 11, −11, −9}, {1, −5, 5, −7, −11, 9}, or {1, −9, 1, 3, −3, 7}; or

{1, 9, −15, −7, −15, 9}, {1, −5, 3, 13, −13, 11}, {1, 11, −13, 13, 3, −5}, {1, −5, 1, 9, −13, 11}, {1, −5, 5, 11, −13, 9}, {1, −7, −13, 9, 15, −9}, {1, −7, 3, 11, −15, 11}, {1, −9, −3, −9, −1, 9}, {1, 9, 3, 9, −1, −9}, {1, −5, −13, 9, −15, −9}, {1, −5, −13, 9, 15, −9}, {1, −5, −15, 9, 15, −9}, {1, −9, 15, 9, −13, −5}, {1, −9, −15, 9, −13, −5}, {1, −7, 15, 9, −13, −5}, {1, −9, −5, 5, 15, 11}, {1, 11, 15, 5, −5, −9}, {1, −7, −15, 9, −13, −5}, {1, −7, 1, 9, −15, 11}, {1, 9, −15, −7, −15, 11}, {1, 9, −15, −7, −13, 11}, {1, −7, −15, 9, 15, −9}, {1, −5, −13, −5, 3, 11}, {1, −7, −13, −5, 3, 11}, {1, 9, −15, 9, −1, −7}, {1, −5, 1, −11, 15, −7}, {1, −5, 5, 15, −13, 11}, {1, 9, −13, 15, 5, −5}, {1, 9, 5, −5, −15, −9}, {1, 9, −1, −11, −15, −9}, {1, 9, 15, 5, −5, −9}, {1, −9, −1, 9, 15, 11}, {1, −5, 3, 13, 7, −5}, {1, −9, 15, −13, −3, 7}, {1, 7, −3, −13, 15, −9}, {1, −7, −1, −13, 15, −7}, {1, 9, −13, 15, 3, 9}, {1, 9, 5, −5, −15, −7}, {1, 9, −1, −11, −15, −7}, {1, 5, −9, −15, −3, 7}, {1, −13, −9, −15, −5, 7}, {1, −5, 7, 15, 9, 15}, {1, −5, 3, 15, 9, −5}, {1, 9, 15, 9, −3, −11}, {1, 11, 7, 11, −3, −11}, {1, −11, −5, −11, −3, 9}, {1, −7, 3, 15, 11, −3}, {1, 9, 3, 9, −3, −11}, {1, 11, 3, 7, −7, −11}, {1, 7, 15, −5, −13, 7}, {1, −3, 7, −13, 11, −3}, {1, 11, 3, −9, −15, −9}, {1, −9, −15, −3, 3, 11}, {1, 11, 5, −7, −1, −9}, {1, 7, −5, −11, −1, 9}, {1, −7, 3, 13, −13, 13}, {1, −9, 13, −11, −5, 7}, {1, 9, 15, 7, −3, −11}, {1, 11, 15, 9, −3, −11}, {1, 11, 3, −7, −15, −7}, {1, 11, 1, −9, −15, −5}, {1, 11, 3, −9, −15, −7}, {1, 11, 5, 9, −3, −11}, {1, 7, 15, 7, −3, −11}, {1, 11, 5, −5, −15, −5}, {1, 11, 5, −7, −15, −7}, {1, −11, −7, −11, −1, 11}, {1, 11, 7, 11, −1, −11}, {1, 11, 15, 11, −1, −11}, {1, −11, −15, −11, −1, 11}, {1, 9, −15, 9, 5, −5}, {1, −7, −13, 11, −13, −5}, {1, 9, −15, 9, 3, −5}, {1, 5, 3, 11, −11, 13}, {1, −9, −13, 11, −13, −5}, {1, −7, 3, 11, −13, 13}, {1, −7, 3, 11, −13, 11}, {1, −7, −1, 7, −13, 11}, {1, −11, 13, −9, −1, −3}, {1, −7, 1, 7, −13, 11}, {1, 11, −13, 13, 1, −7}, {1, −7, 13, 7, −15, −7}, {1, −11, −7, −13, −3, 9}, {1, 11, −13, 11, −1, −7}, {1, 5, 15, −5, −13, 7}, {1, 11, 3, −7, −15, −5}, {1, 11, 1, −9, −15, −7}, {1, −9, 13, −9, −1, 7}, {1, −11, −15, −5, 1, 11}, {1, −11, −15, −9, 1, 11}, {1, 11, 7, −5, −15, −5}, {1, 11, 5, 9, −1, −11}, {1, −9, −5, −11, −1, 11}, {1, 9, −15, −9, 13, 11}, {1, 7, 3, −9, 13, −9}, {1, 9, 15, −9, 13, 11}, {1, 7, 15, −9, 13, 11}, {1, −9, −15, −5, 3, 11}, {1, 11, 5, −5, −15, −7}, {1, 11, 3, −7, −1, −9}, or {1, 7, −3, −11, −1, 9}.

Optionally, when delta=0, the method further includes:

determining the first sequence based on a preset condition and a sequence {s(n)}, where the preset condition is $x_n = y_{(n+M) \bmod K}$, where $$y_n = A \cdot e^{\frac{j \times \pi \times s_n}{16}},$$

M∈{0, 1, 2, . . . , 5}, K=6, A is a non-zero complex number, and $j=\sqrt{-1}$; and the sequence {s(n)} includes at least one of the following sequences:

{1, −5, 5, 11, −13, 11}, {1, −5, 3, 13, 3, −5}, {1, −5, 5, 13, 5, 11}, {1, −9, −5, 5, 15, 11}, {1, 9, −15, 11, −13, 11}, {1, 9, −15, 11, 3, 11}, {1, 11, −11, −9, 13, 3}, {1, −7, 7, 15, 11, 15}, {1, −9, −1, −5, −15, −7}, {1, −13, −9, −15, −5, 7}, {1, −1, 7, 15, 3, 11}, {1, 9, −15, 15, −9, 11}, {1, 15, 7, −5, −11, −9}, {1, 11, 15, −3, −13, 5}, {1, 9, −15, 15, 7, 15}, {1, 9, −15, 9, 7, 15}, {1, −11, −3, 11, −15, 13}, {1, 11, 1, 5, −9, −9}, {1, −3, 9, −1, −15, −11}, {1, 15, −13, 7, −5, −9}, {1, 11, −3, 3, 1, −9}, {1, −11, −13, 9, −13, −3}, {1, −11, −7, 3, 13, 3}, {1, −11, 11, −11, −7, 3}, {1, −11, −15, −9, 3, 11}, {1, 15, 5, −9, −7, −9}, {1, 11, 15, 9, −1, −11}, {1, −11, −1, −5, 5, 11}, {1, 7, −5, 5, 15, 11}, or {1, 11, 3, 13, −13, 15}; or

{1, 9, −15, −7, −15, 9}, {1, −5, 3, 13, −13, 11}, {1, 11, −13, 13, 3, −5}, {1, −5, 1, 9, −13, 11}, {1, −5, 5, 11, −13, 9}, {1, −7, −13, 9, 15, −9}, {1, −7, 3, 11, −15, 11}, {1, −9, −3, −9, −1, 9}, {1, 9, 3, 9, −1, −9}, {1, −5, −13, 9, −15, −9}, {1, −5, −13, 9, 15, −9}, {1, −5, −15, 9, 15, −9}, {1, −9, 15, 9, −13, −5}, {1, −9, −15, 9, −13, −5}, {1, −7, 15, 9, −13, −5}, {1, −9, −5, 5, 15, 11}, {1, 11, 15, 5, −5, −9}, {1, −7, −15, 9, −13, −5}, {1, −7, 1, 9, −15, 11}, {1, 9, −15, −7, −15, 11}, {1, 9, −15, −7, −13, 11}, {1, −7, −15, 9, 15, −9}, {1, −5, −13, −5, 3, 11}, {1, −7, −13, −5, 3, 11}, {1, 9, −15, 9, −1, −7}, {1, −5, 1, −11, 15, −7}, {1, −5, 5, 15, −13, 11}, {1, 9, −13, 15, 5, −5}, {1, 9, 5, −5, −15, −9}, {1, 9, −1, −11, −15, −9}, {1, 9, 15, 5, −5, −9}, {1, −9, −1, 9, 15, 11}, {1, −5, 3, 13, 7, −5}, {1, −9, 15, −13, −3, 7}, {1, 7, −3, −13, 15, −9}, {1, −7, −1, −13, 15, −7}, {1, 9, −13, 15, 3, 9}, {1, 9, 5, −5, −15, −7}, {1, 9, −1, −11, −15, −7}, {1, 5, −9, −15, −3, 7}, {1, −13, −9, −15, −5, 7}, {1, −5, 7, 15, 9, 15}, {1, −5, 3, 15, 9, −5}, {1, 9, 15, 9, −3, −11}, {1, 11, 7, 11, −3, −11}, {1, −11, −5, −11, −3, 9}, {1, −7, 3, 15, 11, −3}, {1, 9, 3, 9, −3, −11}, {1, 11, 3, 7, −7, −11}, {1, 7, 15, −5, −13, 7}, {1, −3, 7, −13, 11, −3}, {1, 11, 3, −9, −15, −9}, {1, −9, −15, −3, 3, 11}, {1, 11, 5, −7, −1, −9}, {1, 7, −5, −11, −1, 9}, {1, −7, 3, 13, −13, 13}, {1, −9, 13, −11, −5, 7}, {1, 9, 15, 7, −3, −11}, {1, 11, 15, 9, −3, −11}, {1, 11, 3, −7, −15, −7}, {1, 11, 1, −9, −15, −5}, {1, 11, 3, −9, −15, −7}, {1, 11, 5, 9, −3, −11}, {1, 7, 15, 7, −3, −11}, {1, 11, 5, −5, −15, −5}, {1, 11, 5, −7, −15, −7}, {1, −11, −7, −11, −1, 11}, {1, 11, 7, 11, −1, −11}, {1, 11, 15, 11, −1, −11}, {1, −11, −15, −11, −1, 11}, {1, 9, −15, 9, 5, −5}, {1, −7, −13, 11, −13, −5}, {1, 9, −15, 9, 3, −5}, {1, 5, 3, 11, −11, 13}, {1, −9, −13, 11, −13, −5}, {1, −7, 3, 11, −13, 13}, {1, −7, 3, 11, −13, 11}, {1, −7, −1, 7, −13, 11}, {1, −11, 13, −9, −1, −3}, {1, −7, 1, 7, −13, 11}, {1, 11, −13, 13, 1, −7}, {1, −7, 13, 7, −15, −7}, {1, −11, −7, −13, −3, 9}, {1, 11, −13, 11, −1, −7}, {1, 5, 15, −5, −13, 7}, {1, 11, 3, −7, −15, −5}, {1, 11, 1, −9, −15, −7}, {1, −9, 13, −9, −1, 7}, {1, −11, −15, −5, 1, 11}, {1, −11, −15, −9, 1, 11}, {1, 11, 7, −5, −15, −5}, {1, 11, 5, 9, −1, −11}, {1, −9, −5, −11, −1, 11}, {1, 9, −15, −9, 13, 11}, {1, 7, 3, −9, 13, −9}, {1, 9, 15, −9, 13, 11}, {1, 7, 15, −9, 13, 11}, {1, −9, −15, −5, 3, 11}, {1, 11, 5, −5, −15, −7}, {1, 11, 3, −7, −1, −9}, or {1, 7, −3, −11, −1, 9}.

Optionally, when delta=1, the method further includes:

determining the first sequence based on a preset condition and a sequence {s(n)}, where the preset condition is $x_n = y_{(n+M) \bmod K}$, where $$y_n = A \cdot e^{\frac{j \times \pi \times s_n}{16}},$$

M∈{0, 1, 2, . . . , 5}, K=6, A is a non-zero complex number, and $j=\sqrt{-1}$; and the sequence {s(n)} includes at least one of the following sequences:

{1, −7, 13, −13, −11, −3}, {1, −7, −9, −15, −3, 5}, {1, 5, 15, −15, 5, −3}, {1, 13, 11, 1, −3, 9}, {1, 11, 3, 15, 11, 5}, {1, −11, −3, 3, −9, −5}, {1, −11, −3, 3, −9, 13}, {1, −7, 3, 15, 11, 5}, {1, −3, 7, −13, 9, 5}, {1, 11, 7, −13, 9, 5}, {1, 13, −9, 1, −9, −15}, {1, −9, 13, 1, 1, 7}, {1, 3, 11, −1, −11, −3}, {1, 3, 11, −1, 7, −3}, {1, 9, −1, 7, 9, −3}, {1, 11, −11, 13, 15, −7}, {1, −7, 3, −5, −3, 7}, {1, 9, 7, −3, 5, −5}, {1, 13, 15, 7, −3, 5}, {1, −7, 3, 11, 9, −3}, {1, 13, −7, −5, −15, −7}, {1, −7, 13, 15, −3, 3}, {1, −13, −15, −3, 5, −9}, {1, 15, 11, −1, 11, 7}, {1, −3, 11, 7, −5, 5}, {1, −13, −9, 3, −7, −3}, {1, 7, 7, −5, −15, −3}, {1, 11, 1, 11, −11, −9}, {1, −5, 5, −7, −11, 9}, or {1, −9, 1, 3, −3, 7}; or

{1, −11, 11, −1, 7, 13}, {1, −3, −13, 15, −5, 5}, {1, −11, 11, −1, 3, 13}, {1, 13, −9, 3, −3, −13}, {1, −11, 11, −1, 7, 13}, {1, −3, 9, −13, −1, −9}, {1, 11, 13, 1, −9, 11}, {1, 11, −9, 13, 7, 5}, {1, 3, −9, 13, 1, 11}, {1, 11, −9, 15, 7, 5}, {1, −11, −3, 5, 7, −5}, {1, 7, −15, 5, −5, 15}, {1, −5, −15, −3, 7, −13}, {1, 9, 13, 1, −9, 11}, {1, −7, −11, 1, 11, −9}, {1, 9, −3, −13, 7, 11}, {1, 11, −9, −13, 13, 5}, {1, −9, −15, −3, 7, −13}, {1, −11, −9, 1, 7, −5}, {1, 9, −3, −13, 7, 9}, {1, 13, 11, 3, −5, 7}, {1, 13, 9, 1, −5, 7}, {1, 9, 15, 3, −7, 13}, {1, −7, 5, 13, −7, −15}, {1, 1, 9, −3, −11, 9}, {1, −11, −5, 1, 7, −5}, {1, −5, −11, 1, 11, −9}, {1, −9, 1, 11, −9, −15}, {1, 13, −9, 1, −5, −15}, {1, −5, 7, −15, −5, −15}, {1, −9, 11, −15, −15, −5}, {1, −9, −15, −5, 5, −15}, {1, −9, 13, −13, −3, −3}, {1, −9, 13, 1, 1, 11}, {1, −9, 1, 1, 7, −5}, {1, −11, −15, −3, 7, −13}, {1, −11, −13, −1, 9, −11}, {1, 3, 15, −13, 7, −3}, {1, −11, −7, 5, 7, −5}, {1, 11, 11, 1, −9, 9}, {1, 15, 7, −3, −3, 7}, {1, −9, 13, 13, −9, −1}, {1, 11, 11, 1, −7, 7}, {1, −11, −3, 3, −9, −5}, {1, 7, 15, 3, −7, −3}, {1, 11, 7, −13, 13, 5}, {1, 13, 5, −1, 11, 7}, {1, −11, −3, 1, 7, −5}, {1, −11, −5, −1, 7, −5}, {1, −3, −11, 1, 11, −9}, {1, 13, −9, 3, −5, −9}, {1, 11, −1, −11, 9, 15}, {1, 11, 13, −13, 7, −3}, {1, 11, −9, −15, 15, 5}, {1, 11, −9, 13, 11, 5}, {1, −11, −3, 5, −7, −5}, {1, −7, −15, −3, 7, 5}, {1, −7, −15, −3, −5, 5}, {1, −9, −7, 13, −11, −3}, {1, −7, −15, −15, −5, 5}, {1, 11, 11, 3, −5, 7}, {1, 13, −9, 1, −7, −15}, {1, 9, 9, −1, −11, 9}, {1, −9, −9, −1, 7, −5}, {1, −9, −1, 7, 7, −5}, {1, −9, 13, 1, 1, 9}, {1, 13, 13, 5, −3, 7}, {1, 15, 7, −1, −3, 7}, {1, 11, 9, 1, −7, 7}, {1, −9, −7, 1, 9, −5}, {1, 3, −7, 15, 1, 9}, {1, −9, −15, −3, 5, −15}, {1, −5, −15, −15, −3, 5}, {1, 1, 11, −15, 5, −3}, {1, −7, 13, −13, −3, −3}, {1, −7, 3, 13, −7, −15}, {1, −7, 5, 15, −7, −15}, {1, −9, 13, −11, −11, −3}, {1, −11, −3, −3, 5, −5}, {1, −11, −3, 3, −9, 13}, {1, −11, −7, 1, −11, −5}, {1, −7, −11, 1, 11, 5}, {1, −3, −11, 1, 11, 5}, {1, −11, −3, 1, −11, −5}, {1, 11, 15, −13, 7, −3}, {1, 7, 15, 3, 7, −3}, {1, −9, −3, −15, −11, −3}, {1, 5, 15, 3, −7, 13}, {1, 11, 7, −13, 11, 5}, {1, −9, −3, −15, −7, −3}, {1, −3, −11, 1, −5, 5}, {1, −7, −11, 1, −5, 5}, {1, −3, 9, −13, −1, −11}, {1, −9, 3, 13, −7, −11}, {1, 13, 7, −1, 11, 7}, {1, −5, −11, 1, 11, 5}, {1, −11, −5, 1, −11, −5}, {1, −9, −3, −15, −9, −3}, {1, −5, −11, 1, −5, 5}, {1, 11, −11, 1, −5, −15}, {1, −9, −15, −3, 7, −15}, {1, 11, 11, 1, −9, 11}, {1, 1, 11, −15, 5, −5}, {1, 9, 11, −1, −11, −3}, {1, 11, 3, 15, 7, 5}, {1, 3, 11, −1, 7, −3}, {1, −7, 5, −3, 7, −13}, {1, −9, −11, 1, 11, 5}, {1, −1, −11, 1, 11, 5}, {1, −11, −9, 1, −11, −5}, {1, 11, −1, −11, −5, 15}, {1, −11, −1, 1, −11, −5}, {1, −9, −3, −15, −5, −3}, {1, −1, −11, 1, −5, 5}, or {1, −9, −11, 1, −5, 5}.

Optionally, when delta=0, the method further includes:

determining the first sequence based on a preset condition and a sequence $\{s_n\}$, where the preset condition is $x_n = y_{(n+M) \bmod K}$, where $$y_n = A \cdot e^{\frac{j \times \pi \times s_n}{8}},$$

$M \in \{0, 1, 2, \ldots, 5\}$, K=6, A is a non-zero complex number, and $j = \sqrt{-1}$; and the sequence $\{s_n\}$ includes at least one of the following sequences:

{1, 3, 1, −5, 1, 7}, {1, −3, 3, 1, 7, −7}, {1, −5, 5, 5, −5, 1}, {1, 7, 1, −1, 1, −5}, {1, 7, 1, −1, −7, −1}, {1, 5, 1, −7, −3, −5}, {1, 7, 1, −5, −3, 3}, {1, 5, 1, −1, 3, −7}, {1, 5, 1, −5, 7, −1}, {1, 3, 1, 7, −3, −7}, {1, 5, 1, −1, 3, −3}, {1, −3, 1, 5, −1, 3}, {1, −5, 1, 3, −7, 7}, {1, −3, 1, −7, 7, −5}, {1, −3, 5, −7, −5, 5}, {1, 5, 1, −5, −1, −3}, {1, 7, 5, −1, −7, −5}, {1, −3, 1, 5, 3, −7}, {1, −5, 5, 3, −7, −1}, {1, 5, 1, 5, −5, −7}, {1, 3, 1, −5, 5, −7}, {1, 5, 1, −3, 1, 5}, {1, 7, 1, −5, −7, −1}, {1, 5, 1, 5, −5, 5}, {1, 5, 1, −5, −1, 3}, {1, −1, 1, −7, −3, 7}, {1, −3, 1, 5, −7, 7}, {1, 5, 1, 7, −1, −3}, {1, −3, 1, −5, −1, 5}, or {1, −7, 5, −1, −5, −3}; or

{1, 3, 1, −5, 1, 7}, {1, 3, 1, −5, 5, −7}, {1, 3, 1, 7, −3, −7}, {1, 3, 1, −5, 7, −3}, {1, 5, 1, −5, −1, 3}, {1, 5, 1, −5, 1, 5}, {1, 5, 1, −3, 1, 5}, {1, 5, 1, 5, −7, 5}, {1, 5, 1, 5, −5, 5}, {1, 5, 1, −3, 3, 7}, {1, 5, 1, −1, 3, 7}, {1, 5, 1, 5, −5, 7}, {1, 5, 1, −1, 3, −7}, {1, 5, 1, 5, −5, −7}, {1, 5, 1, −7, −3, −5}, {1, 5, 1, 5, −1, −5}, {1, 5, 1, 7, 1, −3}, {1, 5, 1, −5, 1, −3}, {1, 5, 1, −1, 3, −3}, {1, 5, 1, −5, 7, −3}, {1, 5, 1, −5, −7, −3}, {1, 5, 1, −3, −7, −3}, {1, 5, 1, 7, −1, −3}, {1, 5, 1, −7, −1, −3}, {1, 5, 1, −5, −1, −3}, {1, 5, 1, −5, 7, −1}, {1, 7, 1, −5, −3, 3}, {1, 7, 1, −1, 1, −5}, {1, 7, 1, −5, −7, −1}, {1, 7, 1, −1, −7, −1}, {1, −5, 1, −1, 5, 7}, {1, −5, 1, 3, −7, 7}, {1, −3, 1, 5, −1, 3}, {1, −3, 1, −7, −1, 3}, {1, −3, 1, −5, −1, 3}, {1, −3, 1, −5, −1, 5}, {1, −3, 1, 5, 3, 7}, {1, −3, 1, −1, 3, 7}, {1, −3, 1, 5, −7, 7}, {1, −3, 1, 3, −5, 7}, {1, −3, 1, 5, −5, 7}, {1, −3, 1, 5, 3, −7{ }, {1, −3, 1, 5, 3, −5}, {1, −3, 1, −7, 7, −5}, {1, −1, 1, 5, −5, 7}, {1, −1, 1, −7, −3, 7}, {1, 5, 3, 7, −3, −7}, {1, 5, 3, 7, −1, −5}, {1, 7, 3, −5, −3, 3}, {1, 7, 3, −1, −7, −3}, {1, −3, 3, 7, −5, 5}, {1, −3, 3, 1, 7, −7}, {1, 7, 5, −1, −7, −5}, {1, −7, 5, 1, −5, −3}, {1, −7, 5, −1, −5, −3}, {1, −7, 5, 1, −5, −1}, {1, −5, 5, 5, −5, 1}, {1, −5, 5, 3, −7, −1}, {1, −3, 5, 7, −5, 5}, {1, −3, 5, −7, −5, 5}, or {1, −3, 5, −7, −5, 7}.

Optionally, when delta=0, the method further includes:

determining the first sequence based on a preset condition and a sequence $\{s_n\}$, where the preset condition is $x_n = y_{(n+M) \bmod K}$, where $$y_n = A \cdot e^{\frac{j \times \pi \times s_n}{8}},$$

$M \in \{0, 1, 2, \ldots, 5\}$, K=6, A is a non-zero complex number, and $j = \sqrt{-1}$; and the sequence $\{s_n\}$ includes at least one of the following sequences:

{1, 1, 3, −7, 5, −3}, {1, 1, 5, −7, 3, 5}, {1, 1, 5, −5, −3, 7}, {1, 1, −7, −5, 5, −7}, {1, 1, −7, −3, 7, −7}, {1, 3, 1, 7, −1, −5}, {1, 3, 1, −7, −3, 7}, {1, 3, 1, −7, −1, −5}, {1, 3, 3, 7, −1, −5}, {1, 5, 1, 1, −5, −3}, {1, 5, 1, 3, −5, 5}, {1, 5, 1, 3, −5, −7}, {1, 5, 1, 3, −3, 1}, {1, 5, 1, 3, −1, −7}, {1, 5, 1, 5, 3, −7}, {1, 5, 1, 5, 3, −5}, {1, 5, 1, 5, 7, 7}, {1, 5, 1, 5, −5, 3}, {1, 5, 1, 5, −3, 3}, {1, 5, 1, 5, −1, 3}, {1, 5, 1, 5, −1, −1}, {1, 5, 1, 7, 3, −3}, {1, 5, 1, 7, −5, 5}, {1, 5, 1, −5, 3, 5}, {1, 5, 1, −5, −7, −1}, {1, 5, 1, −5, −5, −3}, {1, 5, 1, −5, −3, 1}, {1, 5, 1, −5, −1, 1}, {1, 5, 1, −5, −1, 5}, {1, 5, 1, −5, −1, −1}, {1, 5, 1, −3, 1, 7}, {1, 5, 1, −3, 1, −5}, {1, 5, 1, −3, 7, −7}, {1, 5, 1, −3, 7, −5}, {1, 5, 1, −3, −5, −1}, {1, 5, 1, −1, 3, −5}, {1, 5, 1, −1, 5, −7}, {1, 5, 1, −1, −7, −3}, {1, 5,

1, –1, –5, –3}, {1, 5, 3, –3, –7, –5}, {1, 5, 3, –3, –7, –1}, {1, 5, 3, –3, –1, –7}, {1, 5, 3, –1, 5, –7}, {1, 5, 3, –1, –5, –3}, {1, 5, 5, 1, 3, –3}, {1, 5, 5, –1, –7, –5}, {1, 7, 1, 1, 1, –5}, {1, 7, 1, 1, –7, –7}, {1, 7, 1, 1, –5, –5}, {1, 7, 1, 3, –7, 7}, {1, 7, 1, 3, –3, 3}, {1, 7, 1, –7, 1, 1}, {1, 7, 1, –7, –7, –7}, {1, 7, 1, –5, 1, 1}, {1, 7, 1, –5, –5, 1}, {1, 7, 1, –5, –3, 1}, {1, 7, 1, –5, –1, 1}, {1, 7, 1, –5, –1, –1}, {1, 7, 1, –1, 5, 7}, {1, 7, 3, 1, 5, –3}, {1, 7, 3, 1, –5, –5}, {1, 7, 3, 5, –5, –7}, {1, 7, 3, –7, 7, –1}, {1, 7, 3, –7, –5, 3}, {1, 7, 3, –5, –7, –1}, {1, 7, 3, –3, –5, 1}, {1, 7, 3, –3, –5, –1}, {1, 7, 3, –3, –3, –3}, {1, 7, 3, –1, –5, –3}, {1, 7, 5, 1, –5, –5}, {1, 7, 5, 1, –5, –3}, {1, 7, 5, –5, 3, –1}, {1, 7, 5, –5, –3, –7}, {1, 7, 5, –3, –7, 1}, {1, 7, 5, –1, –5, –5}, {1, 7, 5, –1, –5, –3}, {1, –7, 1, –5, 1, 1}, {1, –7, 3, 3, –5, –5}, {1, –7, 3, 5, –1, –3}, {1, –7, 3, –5, 1, 1}, {1, –7, 3, –5, –5, 1}, {1, –7, 3, –5, –5, –5}, {1, –7, 5, –3, –5, 1}, {1, –5, 1, 1, 3, 7}, {1, –5, 1, 1, 5, 7}, {1, –5, 1, 1, 7, 7}, {1, –5, 1, 3, 3, 7}, {1, –5, 1, 7, 5, –1}, {1, –5, 1, 7, 7, 1}, {1, –5, 1, –7, –7, 1}, {1, –5, 1, –7, –7, –7}, {1, –5, 3, –7, –7, 1}, {1, –5, 5, 3, –5, –3}, {1, –5, 5, 3, –5, –1}, {1, –5, 5, 5, –5, –3}, {1, –5, 5, 5, –5, –1}, {1, –5, 5, 7, –5, 1}, {1, –5, 5, 7, –5, 3}, {1, –5, 5, –7, –5, 1}, {1, –5, 5, –7, –5, 3}, {1, –5, 7, 3, 5, –3}, {1, –5, –7, 3, 5, –3}, {1, –5, –7, 3, 5, –1}, {1, –5, –7, 3, 7, –1}, {1, –3, 1, 1, 3, 7}, {1, –3, 1, 1, 5, 7}, {1, –3, 1, 1, 5, –1}, {1, –3, 1, 3, 3, 7}, {1, –3, 1, 3, –7, 7}, {1, –3, 1, 5, 7, 1}, {1, –3, 1, 5, 7, 3}, {1, –3, 1, 5, 7, 7}, {1, –3, 1, 5, –7, 3}, {1, –3, 1, 7, –5, 5}, {1, –3, 1, 7, –1, 3}, {1, –3, 1, –7, 3, –1}, {1, –3, 1, –7, 7, –1}, {1, –3, 1, –7, –5, 5}, {1, –3, 1, –7, –3, 3}, {1, –3, 1, –5, 7, –1}, {1, –3, 3, 3, –7, 7}, {1, –3, 3, 5, –5, –7}, {1, –3, 3, 7, 7, 7}, {1, –3, 3, 7, –7, 5}, {1, –3, 3, –7, –7, 3}, {1, –3, 3, –5, –7, –1}, {1, –3, 7, –5, 3, 5}, {1, –1, 1, 7, 3, –7}, {1, –1, 1, 7, 3, –5}, {1, –1, 1, –5, 5, –7}, {1, –1, 3, –7, –5, 7}, {1, –1, 5, –7, –5, 5}, {1, –1, 5, –7, –5, 7}, {1, –1, 5, –5, –5, 5}, or {1, –1, 5, –5, –5, 7}; or

{1, 1, 5, –7, 3, 7}, {1, 1, 5, –7, 3, –3}, {1, 1, 5, –1, 3, 7}, {1, 1, 5, –1, –7, –3}, {1, 3, 1, 7, –1, –7}, {1, 3, 1, –7, 1, –5}, {1, 3, 1, –7, 3, –5}, {1, 3, 1, –7, –1, –7}, {1, 3, 1, –5, 1, –7}, {1, 3, 1, –5, 3, –7}, {1, 3, 5, –7, 3, 7}, {1, 3, 5, –1, 3, 7}, {1, 3, 5, –1, 3, –3}, {1, 3, 5, –1, –5, 7}, {1, 3, 7, 1, 5, 7}, {1, 3, 7, –7, 3, 7}, {1, 3, 7, –5, 5, 7}, {1, 5, 1, 1, 5, –7}, {1, 5, 1, 1, 5, –3}, {1, 5, 1, 5, 5, –7}, {1, 5, 1, 5, 5, –3}, {1, 5, 1, 5, –7, 1}, {1, 5, 1, 5, –7, –7}, {1, 5, 1, 5, –3, 1}, {1, 5, 1, 5, –3, –3}, {1, 5, 1, 5, –1, 3}, {1, 5, 1, 7, –3, –5}, {1, 5, 1, –7, 1, –3}, {1, 5, 1, –7, –3, 5}, {1, 5, 1, –5, 5, 7}, {1, 5, 1, –5, –3, 7}, {1, 5, 1, –3, 1, –7}, {1, 5, 1, –3, 5, –7}, {1, 5, 1, –3, 7, –7}, {1, 5, 1, –3, 7, –5}, {1, 5, 1, –3, –5, –1}, {1, 5, 3, 1, 5, –7}, {1, 5, 3, 1, 5, –3}, {1, 5, 3, 7, –3, –5}, {1, 5, 3, 7, –1, 3}, {1, 5, 3, –7, –3, 7}, {1, 5, 3, –3, 7, –5}, {1, 5, 3, –1, –5, –3}, {1, 5, 5, –1, 3, 7}, {1, 5, 5, –1, 3, –3}, {1, 5, 7, 1, 3, –3}, {1, 5, –7, –3, 7, 7}, {1, 7, 1, 1, 3, –5}, {1, 7, 1, 1, –7, –5}, {1, 7, 1, 1, –1, –7}, {1, 7, 1, 3, –7, –7}, {1, 7, 1, 3, –5, –7}, {1, 7, 1, 3, –5, –5}, {1, 7, 1, 3, –1, –5}, {1, 7, 1, 5, –1, –3}, {1, 7, 1, 7, –7, –7}, {1, 7, 1, 7, –1, –1}, {1, 7, 1, –7, 1, –1}, {1, 7, 1, –7, –5, –5}, {1, 7, 1, –7, –1, 1}, {1, 7, 1, –7, –1, –1}, {1, 7, 1, –5, –7, 1}, {1, 7, 1, –5, –7, –3}, {1, 7, 1, –5, –5, 3}, {1, 7, 1, –5, –1, 3}, {1, 7, 1, –5, –1, –3}, {1, 7, 1, –3, –7, –5}, {1, 7, 1, –3, –7, –1}, {1, 7, 1, –3, –1, 5}, {1, 7, 1, –1, 1, –7}, {1, 7, 1, –1, 7, –7}, {1, 7, 1, –1, –7, –3}, {1, 7, 3, 1, 7, –5}, {1, 7, 3, 1, 7, –3}, {1, 7, 3, 5, –1, –5}, {1, 7, 3, –7, 7, –3}, {1, 7, 3, –7, –3, 3}, {1, 7, 3, –7, –1, –3}, {1, 7, 3, –3, –7, –5}, {1, 7, 3, –3, –7, –1}, {1, 7, 3, –3, –1, –5}, {1, 7, 3, –1, –7, –5}, {1, 7, 5, –1, 3, –3}, {1, 7, 5, –1, –7, –7}, {1, 7, 5, –1, –7, –3}, {1, –7, 1, 3, –3, 3}, {1, –7, 1, –7, 1, 1}, {1, –7, 3, 1, 7, –1}, {1, –7, 3, 1, –7, –5}, {1, –7, 3, 1, –7, –1}, {1, –7, 3, 3, –3, –5}, {1, –7, 3, 5, –3, –5}, {1, –7, 3, –5, –7, –1}, {1, –7, 3, –5, –3, 3}, {1, –7, 3, –3, –3, 3}, {1, –7, 5, 1, –7, –3}, {1, –5, 1, 1, 3, –7}, {1, –5, 1, 1, –7, 7}, {1, –5, 1, 3, 3, –7}, {1, –5, 1, 3, –7, 5}, {1, –5, 1, 5, 3, 7}, {1, –5, 1, 5, 3, –3}, {1, –5, 1, 5, –7, 3}, {1, –5, 1, 5, –7, 7}, {1, –5, 1, 7, 3, –1}, {1, –5, 1, 7, 5, –1}, {1, –5, 1, 7, 7, –7}, {1, –5, 1, 7, 7, –1}, {1, –5, 1, 7, –7, 1}, {1, –5, 1, 7, –7, 5}, {1, –5, 1, 7, –1, 1}, {1, –5, 1, –7, 3, 1}, {1, –5, 1, –7, 7, –7}, {1, –5, 1, –7, 7, –1}, {1, –5, 1, –7, –7, –1}, {1, –5, 1, –7, –5, 3}, {1, –5, 1, –3, 3, 5}, {1, –5, 1, –1, 3, 7}, {1, –5, 1, –1, 7, 7}, {1, –5, 3, 1, 7, 7}, {1, –5, 3, 5, –5, 3}, {1, –5, 3, 5, –3, 3}, {1, –5, 3, –7, 7, 1}, {1, –5, 3, –7, 7, –1}, {1, –5, 3, –7, –5, 3}, {1, –5, 5, 1, 3, 7}, {1, –5, 5, 1, –5, –3}, {1, –5, 5, 3, –7, 1}, {1, –5, 5, 3, –7, –3}, {1, –5, 5, 7, 3, –3}, {1, –5, 5, –7, –5, 5}, {1, –5, 5, –1, 3, 5}, {1, –5, 7, 1, 3, –3}, {1, –5, 7, 1, 3, –1}, {1, –5, 7, 1, 5, –1}, {1, –5, –7, 3, 3, –3}, {1, –5, –7, 3, 7, 1}, {1, –5, –7, 3, 7, –3}, {1, –3, 1, 5, –3, 1}, {1, –3, 1, 7, 5, –5}, {1, –3, 1, 7, –5, 5}, {1, –3, 1, –7, –5, 5}, {1, –3, 1, –7, –3, 1}, {1, –3, 1, –7, –3, 5}, {1, –3, 1, –5, –3, 7}, {1, –3, 3, 7, –3, 3}, {1, –3, 3, –7, –5, 5}, {1, –3, 3, –7, –5, 7}, {1, –3, 3, –7, –3, 3}, {1, –1, 1, 7, –1, –7}, {1, –1, 1, –7, 3, –5}, {1, –1, 1, –7, –1, 7}, {1, –1, 3, –7, –3, 7}, {1, –1, 3, –3, 7, –5}, or {1, –1, 5, –7, 3, 7}.

Optionally, when delta=1, the method further includes:

determining the first sequence based on a preset condition and a sequence $\{s_n\}$, where the preset condition is $x_n = y_{(n+M) mod\ K}$, where $$y_n = A \cdot e^{\frac{j \times \pi \times s_n}{8}},$$

$M \in \{0, 1, 2, \ldots, 5\}$, K=6, A is a non-zero complex number, and $j=\sqrt{-1}$; and the sequence $\{s_n\}$ includes at least one of the following sequences:

{1, 1, 5, –5, 3, –3}, {1, 1, 7, –5, 7, –1}, {1, 1, 7, –1, 3, –1}, {1, 1, –5, 3, –1, 3}, {1, 1, –5, 7, –5, 3}, {1, 1, –3, 7, –1, 5}, {1, 3, 7, –5, 3, –3}, {1, 3, –1, –7, 1, 5}, {1, 5, 1, –7, 3, 3}, {1, 5, 1, –5, –5, 1}, {1, 5, 3, –1, –5, 3}, {1, 5, 5, 1, –5, 3}, {1, 5, 7, 3, –3, 5}, {1, 5, –7, 1, –5, 7}, {1, 5, –7, –5, 7, 1}, {1, 5, –5, 3, –3, –7}, {1, 5, –5, 3, –1, –5}, {1, 5, –5, –5, 5, –3}, {1, 5, –3, 3, 3, –3}, {1, 5, –3, 7, 3, 5}, {1, 7, 7, 1, –7, 5}, {1, 7, 7, 1, –3, 1}, {1, 7, –5, 7, –1, –7}, {1, 7, –5, –7, 5, 1}, {1, 7, –5, –5, 7, 1}, {1, 7, –1, 3, –1, –7}, {1, 7, –1, –7, 5, 5}, {1, 7, –1, –5, 7, 5}, {1, –7, 3, 3, –7, –3}, {1, –7, 3, –1, 1, 5}, {1, –7, 5, 1, –1, 3}, {1, –7, 5, –7, –1, –1}, {1, –7, –3, 1, 3, –1}, {1, –7, –3, –7, 3, 3}, {1, –7, –1, 3, 3, –1}, {1, –7, –1, –1, –7, 5}, {1, –5, 3, 7, –5, –3}, {1, –5, 3, –1, 3, –7}, {1, –5, 7, 7, –5, 1}, {1, –5, 7, –7, –3, 1}, {1, –5, 7, –5, 3, –7}, {1, –5, –5, 1, 5, 1}, {1, –5, –5, 1, –7, –3}, {1, –3, 1, 7, 7, 1}, {1, –3, 1, –7, –1, –1}, {1, –3, 5, –5, –1, –3}, {1, –3, 5, –1, –1, 5}, {1, –3, 7, 7, –3, 5}, {1, –3, 7, –1, 3, 7}, {1, –3, 7, –1, 5, –7}, {1, –3, –7, 1, 7, –5}, {1, –3, –7, 7, –5, 1}, {1, –3, –3, 1, 7, –1}, {1, –3, –1, 3, 7, –1}, {1, –1, 3, –7, 1, –3}, or {1, –1, –5, 7, –1, 5};

{1, 3, 7, –5, 1, –3}, {1, 3, –7, 5, 1, 5}, {1, 3, –7, –3, 1, –3}, {1, 3, –1, –5, 1, 5}, {1, 5, 1, –3, 3, 5}, {1, 5, 1, –3, 7, 5}, {1, 5, 1, –3, –5, 5}, {1, 5, 1, –3, –1, 5}, {1, 5, 3, –3, –7, 5}, {1, 5, 7, 3, –1, 5}, {1, 5, 7, –3, –7, 5}, {1, 5, –7, 3, 1, –3}, {1, 5, –7, 5, 1, 7}, {1, 5, –7, 7, 3, –1}, {1, 5, –7, –5, 1, –3}, {1, 5, –7, –1, 1, –3}, {1, 5, –5, 7, 3, 5}, {1, 5, –5, –3, –7, 5}, {1, 5, –1, –5, 7, 5}, {1, 5, –1, –3, –7, 5}, {1, 7, 3, –1, 3, 7}, {1, 7, –7, 5, 1, 5}, {1, 7, –7, –3, 1, –3}, {1, 7, –5, –1, 1, –3}, {1, –5, 7, 3, 1, 5}, {1, –5, –7, 5, 1, 5}, {1, –3, 1, 5, 7, –3}, {1, –3, 1, 5, –5, –3}, {1, –3, 3, 5, –7, –3}, {1, –3, –7, 3, 1, 5}, {1, –3, –7, 7, 1, 5}, {1, –3, –7, –5, 1, 5}, {1, –3, –7, –3, 1, –1}, {1, –3, –7, –1, 1, 5}, {1, –3, –5,

5, −7, −3}, {1, −3, −1, 3, 7, −3}, {1, −3, −1, 5, −7, −3}, {1, −1, 3, 7, 3, −1}, {1, −1, −7, 5, 1, 5}, or {1, −1, −5, 7, 1, 5};

{1, 3, −3, 1, 3, −3}, {1, 3, −3, 1, −5, −1}, {1, 3, −3, −7, 3, 7}, {1, 3, −3, −7, −5, 5}, {1, 3, −3, −1, 3, −3}, {1, 5, −1, −7, 3, 7}, {1, 7, 3, 1, 5, −1}, {1, 7, 3, 1, 7, 5}, {1, 7, 3, 1, −5, −1}, {1, 7, 3, 1, −3, 3}, {1, 7, 3, 5, −7, 3}, {1, 7, 3, 5, −1, 3}, {1, 7, 3, 7, 1, 3}, {1, 7, 3, −7, 3, 7}, {1, 7, 3, −7, 5, −5}, {1, 7, 3, −7, 7, −3}, {1, 7, 3, −7, −3, 7}, {1, 7, 3, −7, −1, −3}, {1, 7, 3, −3, 1, −5}, {1, 7, 3, −3, 7, −5}, {1, 7, 3, −1, −7, −5}, {1, 7, 5, 1, 7, 5}, {1, 7, 5, −7, −1, −3}, {1, 7, 5, −1, −7, −3}, {1, −5, −3, 1, −5, −3}, {1, −5, −3, 7, −5, 5}, {1, −5, −3, −7, 3, 5}, {1, −5, −3, −7, 3, 7}, {1, −5, −3, −1, 3, −3}, {1, −3, 3, 1, 3, −3}, {1, −3, 3, 1, 5, −1}, {1, −3, 3, 1, −5, −1}, {1, −3, 3, 5, −7, 3}, {1, −3, 3, 5, −1, 3}, {1, −3, 3, 7, −3, −5}, {1, −3, 3, −7, 3, 7}, {1, −3, 3, −7, −5, 5}, {1, −3, 3, −7, −3, 7}, {1, −3, 3, −3, 7, −5}, {1, −3, 3, −1, 5, 3}, {1, −1, 5, 1, −1, 5}, {1, −1, 5, −7, 7, −3}, or {1, −1, 5, −7, −3, 7};

{1, 1, 3, 5, −3, 7}, {1, 1, 3, −7, −1, 7}, {1, 1, 3, −5, 5, −1}, {1, 1, 3, −3, 7, −1}, {1, 1, 5, 7, −5, 5}, {1, 3, 1, −7, 3, −5}, {1, 3, 1, −5, 3, −5}, {1, 3, 1, −5, 5, −3}, {1, 3, 1, −5, 5, −1}, {1, 3, 3, −3, 5, −5}, {1, 3, 3, −3, 7, −1}, {1, 3, 5, 1, −5, 5}, {1, 3, 5, 1, −5, 7}, {1, 3, 5, 7, 3, −3}, {1, 3, 5, −7, −3, 7}, {1, 3, 5, −1, −7, 7}, {1, 3, 5, −1, −7, −3}, {1, 3, 5, −1, −3, 7}, {1, 5, 1, 3, −5, −7}, {1, 5, 1, 5, 5, −3}, {1, 5, 1, 5, −7, 1}, {1, 5, 1, 5, −7, −7}, {1, 5, 1, 5, −3, −3}, {1, 5, 1, 7, 3, −3}, {1, 5, 1, 7, 5, −5}, {1, 5, 1, 7, 5, −3}, {1, 5, 1, −7, 5, −3}, {1, 5, 1, −7, 7, −5}, {1, 5, 1, −3, 3, −3}, {1, 5, 1, −3, 5, −3}, {1, 5, 3, −5, 5, 7}, {1, 5, 3, −3, 7, 7}, {1, 5, 3, −3, 7, −5}, {1, 5, 3, −3, −3, 7}, {1, 5, 3, −1, 7, −5}, {1, 5, 3, −1, −7, −3}, {1, 5, 5, 1, −5, −1}, {1, 7, 1, 3, −7, 7}, {1, 7, 1, 3, −7, −7}, {1, 7, 1, 3, −5, −7}, {1, 7, 1, 3, −3, 3}, {1, 7, 1, 5, −7, 7}, {1, 7, 1, 7, 7, −1}, {1, 7, 1, 7, −7, 1}, {1, 7, 1, −7, −7, −5}, {1, 7, 1, −7, −5, 3}, {1, 7, 1, −5, −7, −3}, {1, 7, 1, −3, 3, 5}, {1, 7, 1, −3, 3, −1}, {1, 7, 1, −1, 3, 7}, {1, 7, 1, −1, 5, 7}, {1, 7, 3, 5, −3, 3}, {1, −7, 1, 1, 5, 7}, {1, −7, 1, 1, 7, 7}, {1, −7, 1, 3, 7, 7}, {1, −7, 1, 3, −7, 7}, {1, −7, 1, 3, −3, −5}, {1, −7, 1, 5, 7, 7}, {1, −7, 1, 7, 5, −1}, {1, −7, 1, −5, −7, −5}, {1, −7, 1, −5, −7, −1}, {1, −7, 1, −5, −5, 1}, {1, −7, 1, −5, −5, −3}, {1, −7, 1, −5, −5, −1}, {1, −7, 1, −5, −3, 1}, {1, −7, 1, −5, −3, 3}, {1, −7, 1, −3, −7, −3}, {1, −7, 1, −1, 5, 7}, {1, −7, 3, 3, −7, −5}, {1, −7, 3, 3, −5, −5}, {1, −7, 3, 5, −5, −5}, {1, −7, 3, 5, −3, 3}, {1, −7, 3, 5, −3, −5}, {1, −7, 3, 5, −3, −1}, {1, −7, 3, 7, 7, −1}, {1, −7, 3, −5, −3, −1}, {1, −7, 3, −1, −5, −3}, {1, −5, 1, 3, 5, 7}, {1, −5, 1, 3, −1, 5}, {1, −5, 1, 5, −7, 7}, {1, −5, 1, 7, −7, −7}, {1, −5, 1, −7, 7, −1}, {1, −5, 1, −7, −7, −1}, {1, −5, 1, −3, −7, −3}, {1, −5, 1, −3, −1, 5}, {1, −5, 1, −1, 7, −7}, {1, −5, 3, 1, 5, −1}, {1, −5, 3, 1, 7, −1}, {1, −5, 3, 5, 7, −1}, {1, −5, 3, 5, −3, −3}, {1, −5, 3, 7, −7, 5}, {1, −5, 3, −7, 7, −1}, {1, −5, 3, −7, −7, 1}, {1, −5, 3, −7, −7, −1}, {1, −5, 3, −7, −5, 1}, {1, −5, 5, 1, 3, 7}, {1, −5, 5, 1, −5, −3}, {1, −5, 5, 7, −5, −3}, {1, −5, 5, −7, −5, 5}, {1, −5, 5, −7, −5, −1}, {1, −5, 5, −1, 3, 5}, {1, −3, 1, 5, −3, −7}, {1, −3, 1, 5, −3, −5}, {1, −3, 1, 7, −5, −7}, {1, −3, 1, 7, −3, −5}, {1, −3, 1, −7, 7, −1}, {1, −3, 3, 1, 7, −1}, {1, −1, 1, 3, −3, 7}, {1, −1, 1, 5, −3, 7}, {1, −1, 1, 7, −1, −7}, {1, −1, 3, 7, −5, 5}, {1, −1, 3, −7, −3, 5}, {1, −1, 3, −7, −3, 7}, {1, −1, 3, −3, 7, 7}, or {1, −1, 3, −3, −3, 7};

{1, 1, 3, 5, −3, 7}, {1, 1, 3, −7, −1, 7}, {1, 1, 3, −5, 5, −1}, {1, 1, 3, −3, 7, −1}, {1, 1, 5, 7, −5, 5}, {1, 3, 1, −7, 3, −5}, {1, 3, 1, −5, 3, −5}, {1, 3, 1, −5, 5, −3}, {1, 3, 1, −5, 5, −1}, {1, 3, 3, −3, 5, −5}, {1, 3, 3, −3, 7, −1}, {1, 3, 5, 1, −5, 5}, {1, 3, 5, 1, −5, 7}, {1, 3, 5, 7, 3, −3}, {1, 3, 5, −7, −3, 7}, {1, 3, 5, −1, −7, 7}, {1, 3, 5, −1, −7, −3}, {1, 3, 5, −1, −3, 7}, {1, 5, 1, 3, −5, −7}, {1, 5, 1, 5, 5, −3}, {1, 5, 1, 5, −7, 1}, {1, 5, 1, 5, −7, −7}, {1, 5, 1, 5, −3, −3}, {1, 5, 1, 7, 3, −3}, {1, 5, 1, 7, 5, −5}, {1, 5, 1, 7, 5, −3}, {1, 5, 1, −7, 5, −3}, {1, 5, 1, −7, 7, −5}, {1, 5, 1, −3, 3, −3}, {1, 5, 1, −3, 5, −3}, {1, 5, 3, −5, 5, 7}, {1, 5, 3, −3, 7, 7}, {1, 5, 3, −3, 7, −5}, {1, 5, 3, −3, −3, 7}, {1, 5, 3, −1, 7, −5}, {1, 5, 3, −1, −7, −3}, {1, 5, 5, 1, −5, −1}, {1, 7, 1, 3, −7, 7}, {1, 7, 1, 3, −7, −7}, {1, 7, 1, 3, −5, −7}, {1, 7, 1, 3, −3, 3}, {1, 7, 1, 5, −7, 7}, {1, 7, 1, 7, 7, −1}, {1, 7, 1, 7, −7, 1}, {1, 7, 1, −7, −7, −5}, {1, 7, 1, −7, −5, 3}, {1, 7, 1, −5, −7, −3}, {1, 7, 1, −3, 3, 5}, {1, 7, 1, −3, 3, −1}, {1, 7, 1, −1, 3, 7}, {1, 7, 1, −1, 5, 7}, {1, 7, 3, 5, −3, 3}, {1, −7, 1, 1, 5, 7}, {1, −7, 1, 1, 7, 7}, {1, −7, 1, 3, 7, 7}, {1, −7, 1, 3, −7, 7}, {1, −7, 1, 3, −3, −5}, {1, −7, 1, 5, 7, 7}, {1, −7, 1, 7, 5, −1}, {1, −7, 1, −5, −7, −5}, {1, −7, 1, −5, −7, −1}, {1, −7, 1, −5, −5, 1}, {1, −7, 1, −5, −5, −3}, {1, −7, 1, −5, −5, −1}, {1, −7, 1, −5, −3, 1}, {1, −7, 1, −5, −3, 3}, {1, −7, 1, −3, −7, −3}, {1, −7, 1, −1, 5, 7}, {1, −7, 3, 3, −7, −5}, {1, −7, 3, 3, −5, −5}, {1, −7, 3, 5, −5, −5}, {1, −7, 3, 5, −3, 3}, {1, −7, 3, 5, −3, −5}, {1, −7, 3, 5, −3, −1}, {1, −7, 3, 7, 7, −1}, {1, −7, 3, −5, −3, −1}, {1, −7, 3, −1, −5, −3}, {1, −5, 1, 3, 5, 7}, {1, −5, 1, 3, −1, 5}, {1, −5, 1, 5, −7, 7}, {1, −5, 1, 7, −7, −7}, {1, −5, 1, −7, 7, −1}, {1, −5, 1, −7, −7, −1}, {1, −5, 1, −3, −7, −3}, {1, −5, 1, −3, −1, 5}, {1, −5, 1, −1, 7, −7}, {1, −5, 3, 1, 5, −1}, {1, −5, 3, 1, 7, −1}, {1, −5, 3, 5, 7, −1}, {1, −5, 3, 5, −3, −3}, {1, −5, 3, 7, −7, 5}, {1, −5, 3, −7, 7, −1}, {1, −5, 3, −7, −7, 1}, {1, −5, 3, −7, −7, −1}, {1, −5, 3, −7, −5, 1}, {1, −5, 5, 1, 3, 7}, {1, −5, 5, 1, −5, −3}, {1, −5, 5, 7, −5, −3}, {1, −5, 5, −7, −5, 5}, {1, −5, 5, −7, −5, −1}, {1, −5, 5, −1, 3, 5}, {1, −3, 1, 5, −3, −7}, {1, −3, 1, 5, −3, −5}, {1, −3, 1, 7, −5, −7}, {1, −3, 1, 7, −3, −5}, {1, −3, 1, −7, 7, −1}, {1, −3, 3, 1, 7, −1}, {1, −1, 1, 3, −3, 7}, {1, −1, 1, 5, −3, 7}, {1, −1, 1, 7, −1, −7}, {1, −1, 3, 7, −5, 5}, {1, −1, 3, −7, −3, 5}, {1, −1, 3, −7, −3, 7}, {1, −1, 3, −3, 7, 7}, or {1, −1, 3, −3, −3, 7}; or

{1, 1, −7, 5, −1, 1}, {1, 1, −7, 7, −3, 1}, {1, 1, −7, −5, 5, 1}, {1, 1, −7, −3, 3, 1}, {1, 1, −7, −3, −5, 1}, {1, 1, −7, −1, −3, 1}, {1, 3, 7, 1, 5, 1}, {1, 3, −5, 3, 5, 1}, {1, 3, −5, 3, 5, −3}, {1, 3, −5, 7, −7, 1}, {1, 3, −5, 7, −5, 5}, {1, 3, −5, 7, −1, 1}, {1, 3, −5, −5, 3, −1}, {1, 3, −5, −3, 5, 1}, {1, 3, −3, 1, −5, −1}, {1, 3, −3, −7, 1, 1}, {1, 3, −1, 7, −7, 1}, {1, 5, 1, −7, −5, −1}, {1, 5, 3, −7, 1, 1}, {1, 5, 7, −1, −5, −1}, {1, 5, −5, −7, 1, 1}, {1, 5, −3, −5, 3, 1}, {1, 5, −1, 3, 5, −3}, {1, 5, −1, 3, −3, −1}, {1, 5, −1, 3, −1, 7}, {1, 7, 5, −7, 1, 1}, {1, 7, 5, −3, −3, 5}, {1, 7, −5, 3, 3, −5}, {1, −7, 1, 3, −5, 7}, {1, −7, 1, 3, −1, 7}, {1, −7, 5, 7, −1, 7}, {1, −7, 5, −7, 3, 7}, {1, −7, 5, −3, −1, 7}, {1, −7, 5, −1, 1, −7}, {1, −7, 7, −3, 1, −7}, {1, −7, 7, −1, 3, −5}, {1, −7, 7, −1, −3, 5}, {1, −7, −7, 1, 3, −3}, {1, −7, −7, 1, 5, −5}, {1, −7, −7, 1, 7, 5}, {1, −7, −7, 1, −3, 7}, {1, −7, −7, 1, −1, 5}, {1, −7, −5, 3, 5, −3}, {1, −7, −5, 3, −5, −3}, {1, −7, −5, 3, −1, 1}, {1, −7, −5, 3, −1, 7}, {1, −7, −5, 5, 1, −7}, {1, −7, −5, 7, −1, 1}, {1, −7, −5, −1, −7, −3}, {1, −7, −3, 3, 1, −7}, {1, −7, −3, 5, 3, −5}, {1, −7, −3, −5, 1, −7}, {1, −7, −1, −3, 1, −7}, {1, −5, 7, −1, −1, 7}, {1, −5, −3, 5, 5, −3}, {1, −5, −3, 7, −5, 5}, {1, −5, −1, −7, −5, 5}, {1, −5, −1, −7, −3, 7}, {1, −5, −1, −5, 3, 5}, {1, −3, 1, −5, −1, 1}, {1, −3, 5, 5, −3, −1}, {1, −3, 5, 7, −1, 1}, {1, −3, 5, 7, −1, 7}, {1, −3, 7, −7, 1, 1}, {1, −3, −1, 7, −1, 1}, {1, −1, 3, −5, −5, 3}, {1, −1, 5, −7, 1, 1}, {1, −1, 5, −3, −3, 5}, {1, −1, 7, 5, −3, 1}, {1, −1, 7, 7, −1, 3}, or {1, −1, 7, −5, 3, 1}.

Optionally, when delta=1, the method further includes:

determining the first sequence based on a preset condition and a sequence $\{s_n\}$, where the preset condition is $x_n = y_{(n+M) \bmod K}$, where $$y_n = A \cdot e^{\frac{j \times \pi \times s_n}{8}},$$

$M \in \{0, 1, 2, \ldots, 5\}$, K=6, A is a non-zero complex number, and $j=\sqrt{-1}$; and the sequence $\{s_n\}$ includes at least one of the following sequences:

{1, 5, 1, −5, 3, 3}, {1, −5, 1, 3, −3, 7}, {1, 7, 1, 7, −3, −5}, {1, 5, 5, −5, 3, −1}, {1, 7, 1, 1, −3, 5}, {1, 7, 1, −1, 5, −5}, {1, 7, 1, −5, −3, −1}, {1, −1, 5, −7, −1, −1}, {1, 7, 1, −5, −3, 7}, {1, −3, 1, 1, −5, 3}, {1, 1, 7, −7, 3, −1}, {1, 5, 1, 1, 7, −1}, {1, −5, 1, 7, 5, −5}, {1, −5, 1, 7, −3, −5}, {1, 7, 3, −1, 5, 5}, {1, 5, 1, 3, −1, 5}, {1, −3, 1, −5, 3, −7}, {1, −7, 5, −1, 3, −7}, {1, 5, 1, 7, −1, −7}, {1, 5, 1, −5, −5, 3}, {1, −5, 1, −1, 5, −5}, {1, −5, 1, 3, −3, −1}, {1, −3, 1, 5, −1, −5}, {1, −3, 1, −1, 3, −3}, {1, 7, 1, −5, 5, 7}, {1, 7, 1, 3, 5, −1}, {1, 7, 3, −1, −1, 5}, {1, 7, 1, 7, 5, 3}, {1, 5, 1, −3, 3, 7}, or {1, −5, 3, 7, −3, −3}; or

{1, −5, 1, 3, −3, −1}, {1, −5, 1, 3, 5, −1}, {1, −5, 3, 7, −3, −3}, {1, −5, 3, −7, −3, −3}, {1, −3, 1, 1, −5, 3}, {1, −3, 1, 7, −1, −1}, {1, −3, 1, 7, 7, −1}, {1, −3, 3, 7, −5, −3}, {1, −3, 3, 7, −3, −3}, {1, −3, 3, 7, −1, −1}, {1, −3, 5, 5, −5, −1}, {1, −3, 5, −7, −5, −1}, {1, −3, 5, −7, −3, −1}, {1, −3, 5, −7, −1, −1}, {1, −1, 5, −7, −1, −1}, {1, 1, 5, −5, 3, −1}, {1, 1, 5, −1, −5, 3}, {1, 1, 5, −1, −5, 5}, {1, 1, 5, −7, 3, −1}, {1, 1, 7, −7, 3, −1}, {1, 3, 5, −1, −5, 5}, {1, 3, 5, −7, 3, −1}, {1, 3, 7, −7, 3, −1}, {1, 5, 1, −5, −5, 3}, {1, 5, 1, −5, 3, 3}, {1, 5, 1, −1, −5, 5}, {1, 5, 1, 1, 7, −1}, {1, 5, 1, 3, −1, 5}, {1, 5, 3, −1, −5, 5}, {1, 5, 5, −5, 3, −1}, {1, 5, 5, −1, −5, 3}, {1, 5, 5, −1, −5, 5}, {1, 7, 1, −5, −3, −1}, {1, 7, 1, −1, −3, 3}, {1, 7, 1, −1, 5, 3}, {1, 7, 1, 1, −3, 5}, {1, 7, 1, 3, 5, −1}, {1, 7, 1, 7, 5, 3}, {1, 7, 3, −3, −3, 5}, {1, 7, 3, −1, −1, 5}, {1, 7, 3, −1, 1, 5}, {1, 7, 3, −1, 5, 5}, {1, 7, 3, 1, −3, 5}, {1, 7, 3, 1, −1, 5}, {1, 7, 3, 3, −3, 5}, {1, 7, 3, 3, −1, 5}, {1, 7, 5, −1, −3, 3}, {1, 7, 5, −1, −1, 5}, {1, 7, 5, 1, −3, 5}, {1, 7, 5, 1, −1, 5}, {1, −7, 3, −1, −1, 3}, {1, −7, 3, −1, −1, 5}, {1, −7, 3, 3, −1, 5}, {1, −7, 5, −1, 1, 5}, {1, −7, 5, −1, 3, 5}, or {1, −7, 5, 1, −1, 5}.

Optionally, when delta=0, the method further includes:

determining the first sequence based on a preset condition and a sequence $\{s_n\}$, where the preset condition is $x_n = y_{(n+M) \bmod K}$, where $$y_n = A \cdot e^{\frac{j \times \pi \times s_n}{32}},$$

$M \in \{0, 1, 2, \ldots, 5\}$, K=6, A is a non-zero complex number, and $j=\sqrt{-1}$; and the sequence $\{s_n\}$ includes at least one of the following sequences:

{1, 19, 1, −19, 29, −17}, {1, −17, −1, 17, 17, −9}, {1, 11, −29, 15, −15, 5}, {1, 15, −5, −5, 9, −13}, {1, −19, 19, 29, −13, −21}, {1, 7, 31, −9, −17, 25}, {1, −19, −7, −29, −29, −13}, {1, 19, 7, −25, −9, −21}, {1, −19, −5, 9, −13, 1}, {1, 21, −25, −19, 25, 5}, {1, 19, −11, −25, −9, 13}, {1, 11, 31, −13, 31, 25}, {1, −3, −19, −5, −27, −13}, {1, −27, 19, −23, 31, −11}, {1, 25, 17, −7, −27, −5}, {1, 27, 3, −7, 3, −19}, {1, 21, −3, 9, 3, −21}, {1, −17, −9, 7, 25, 21}, {1, 19, −29, 17, −29, 29}, {1, −11, 3, −5, 9, 23}, {1, 9, −13, 27, 17, −27}, {1, −7, 13, −19, 25, −3}, {1, 19, −27, 5, 23, 11}, {1, 11, −11, −11, −31, −15}, {1, 15, 5, 19, −3, −13}, {1, 23, 9, −17, 3, −11}, {1, −7, 31, 9, −29, −7}, {1, 25, −17, 25, −31, 5}, {1, 17, 1, −13, −25, −9}, or {1, −19, 3, 29, 23, −7}.

Optionally, when delta=1, the method further includes:

determining the first sequence based on a preset condition and a sequence $\{s_n\}$, where the preset condition is $x_n = y_{(n+M) \bmod K}$, $$y_n = A \cdot e^{\frac{j \times \pi \times s_n}{32}},$$

$M \in \{0, 1, 2, \ldots, 5\}$, K=6, A is a non-zero complex number, and $j=\sqrt{-1}$; and the sequence $\{s_n\}$ includes at least one of the following sequences:

{1, −23, 21, −1, −3, 17}, {1, 19, −3, −23, −7, −27}, {1, −17, −13, 29, −3, 17}, {1, −21, 5, 25, 17, −21}, {1, 23, −19, −19, −29, −7}, {1, −11, 13, 11, −31, −9}, {1, 7, −17, 5, 15, −9}, {1, 1, 11, −11, 13, −9}, {1, 23, −1, −11, 15, −27}, {1, 23, 27, 7, 27, −17}, {1, −19, −27, −7, 11, −31}, {1, −3, −23, 21, −23, 21}, {1, 29, 9, 17, −1, 11}, {1, 27, 29, 5, −15, 23}, {1, −5, 17, −21, −29, 11}, {1, −17, −13, 9, −7, 11}, {1, −3, −25, −9, −27, 15}, {1, −19, 1, −11, −7, 13}, {1, 17, −27, 13, 9, −13}, {1, −17, −11, 11, 31, −17}, {1, 19, 13, −9, −29, 19}, {1, −21, 31, −15, −23, −3}, {1, −21, −19, 19, 31, −9}, {1, 23, 31, 5, 15, −5}, {1, −23, 17, 21, −19, 23}, {1, 21, 27, −15, −29, 17}, {1, 23, 23, 11, −29, −7}, {1, −25, −3, −1, 13, −9}, {1, 21, −23, −21, 23, −21}, or {1, 21, 11, 31, 11, 13}.

Optionally, when delta=1, the method further includes:

determining the first sequence based on a preset condition and a sequence {s(n)}, where the preset condition is $x_n = y_{(n+M) \bmod K}$, where $$y_n = A \cdot e^{\frac{j \times \pi \times s_n}{16}},$$

$M \in \{0, 1, 2, \ldots, 5\}$, K=6, A is a non-zero complex number, and $j=\sqrt{-1}$; and the sequence $\{s_n\}$ includes at least one of the following sequences:

{1, 3, −11, 9, −5, −3}, {1, 9, −15, 13, 3, 11}, {1, −9, −13, −5, 3, −7}, {1, −13, −15, 5, −9, −3}, {1, −13, 7, 5, −9, −3}, {1, −11, 7, 11, 9, 15}, {1, −11, −1, 5, 15, 7}, {1, 11, 5, −7, −15, −5}, {1, 11, −1, −9, −15, −5}, {1, −11, 13, −9, −1, −7}, {1, 11, 3, −9, −1, −7}, {1, 9, −3, −11, −1, −7}, {1, −11, −3, 5, −1, 9}, {1, 9, −1, −5, −13, −5}, {1, −13, 5, 5, 11, −3}, {1, −13, −9, 9, 15, 15}, {1, −9, 9, 5, 11, 15}, {1, 3, 3, −11, 7, 15}, {1, 5, 11, 7, −7, 15}, {1, 9, −5, 13, 13, 15}, {1, −11, −1, 7, −3, 5}, {1, 9, −13, 7, 3, 11}, {1, 9, −15, 15, 5, −7}, {1, 11, 3, −11, −13, −5}, {1, −1, −15, −9, 9, −5}, {1, −13, −15, −9, 9, −5}, {1, −11, −5, 13, −1, −5}, {1, −13, 5, 11, −1, 5}, {1, −13, 5, −9, −1, 3}, or {1, −13, 5, −9, −11, −7}; or

{1, 3, −11, 9, −5, −3}, {1, 3, 7, −7, 13, −1}, {1, −13, −9, −7, −5, 13}, {1, −11, 7, 11, 11, 15}, {1, −11, 7, 11, 15, 15}, {1, 1, 5, 9, −5, 15}, {1, −13, −13, −11, −5, 13}, {1, 7, −7, 13, −1, 1}, {1, −11, 7, 13, 13, 15}, {1, −13, −11, −5, −5, 13}, {1, 3, −11, 9, −5, −5}, {1, −11, 7, 13, 15, 15}, {1, −11, −15, −7, 1, −7}, {1, 5, −9, 11, −3, −5}, {1, −13, −15, −11, −5, 13}, {1, −13, −15, 5, −9, −3}, {1, −13, 7, 5, −9, −3}, {1, 5, 3, −11, 9, −5}, {1, −11, 7, 11, −15, 3}, {1, −7, 1, 9, 5, −7}, {1, 5, 11, 9, −5, 15}, {1, −11, 7, 11, 9, 15}, {1, −13, 7, −7, −1, −3}, {1, −13, 7, 5, −9, −5}, {1, −11, −1, 5, 15, 7}, {1, 11, 5, −7, −15, −5}, {1, 11, 3, −9, −15, −5}, {1, 11, −1, −9, −15, −5}, {1, −15, −9, −7, −5, 13}, {1, 3, 9, 11, −5, 15}, {1, 11, −1, −7, −15, −5}, {1, 11, 5, −3, −15, −5}, {1, −15, −13, −7, −5, 13}, {1, 3, 5, 11, −5, 15}, {1, −13, −13, −5, −5, 13}, {1, −11, 13, −9, −1, −7}, {1, 11, 5, −3, −15, −7}, {1, 11, 5, −7, −15, −7}, {1, −9, −15, −5, 1, 11}, {1, 11, 3, −9, −1, −7}, {1, 7, 7, 11, −3, −15}, {1, −15, −11, −7, −5, 13}, {1, 5, 7, 11, −5, 15}, {1, −11, −3, 5, 15, 7}, {1, −5, −15, −5, 1, 11}, {1, 9, −1, −5, −13, −5}, {1, −11, 5, 11, 15, 15}, {1, 7, 11, −5, 15, 1}, {1, 9, 3, 11, 3, −9}, {1, −7, −11, 11, −13, −7}, {1, 1, 7, −9,

11, −3}, {1, 5, 11, −5, 15, 1}, {1, −13, 13, −9, −3, 7}, {1, −15, −11, −5, −5, 13}, {1, 11, 5, −5, −15, −5}, {1, −11, 5, 9, 9, 15}, {1, 7, 7, 11, −5, 15}, {1, 3, 7, 11, −5, 15}, {1, 9, 15, −9, −13, 11}, {1, −9, 15, 11, −13, −7}, {1, 9, 1, 9, 3, −9}, {1, 11, −1, −7, 1, −7}, {1, −11, 5, 9, 11, 15}, {1, −13, 7, −9, −7, 1}, {1, 11, −1, −9, −1, −7}, {1, 9, 11, −5, 15, 1}, {1, −11, 15, 7, −15, −7}, {1, 9, 1, −11, 15, −7}, {1, −7, −13, −3, 5, 13}, {1, −7, −15, −5, 1, 11}, {1, 11, 3, −5, −15, −5}, {1, 11, 5, −5, −15, −7}, {1, 11, 3, −7, −15, −5}, {1, −9, 1, 9, 3, 11}, {1, −9, −15, −5, 3, 11}, {1, −9, −1, −7, 1, 11}, {1, −9, −15, 11, −13, −7}, {1, −5, −11, 11, −13, −7}, {1, −13, 5, 5, 11, −3}, {1, −13, −9, 9, 15, 15}, {1, −13, 5, 11, −3, 1}, {1, −13, −13, −9, 9, 15}, {1, −11, −13, 9, −15, −9}, {1, −11, −13, 9, −13, −7}, {1, 7, 15, 5, 3, −9}, {1, −11, −13, −5, 1, 11}, {1, 3, −11, 9, −5, −7}, {1, 9, 7, −5, −15, −5}, {1, 11, −1, −11, −13, −5}, {1, −11, −1, 5, 13, 11}, {1, −13, 7, −7, −5, 3}, {1, −1, −13, −5, 1, 11}, {1, −3, −15, −5, 1, 11}, {1, 11, 7, −5, −15, −5}, {1, 11, 7, −3, −15, −5}, {1, −15, −9, −11, −5, 11}, {1, −13, −7, −11, −7, 11}, {1, 11, −1, −11, −15, −5}, {1, 3, −11, −3, −3, 15}, {1, 11, −1, −5, −15, −5}, {1, 9, −1, −11, −13, −5}, {1, −11, −15, −5, 1, 11}, {1, 3, 3, −11, 7, 15}, {1, 9, 3, 11, −3, −9}, {1, −9, 13, −11, −13, −7}, {1, 9, 15, −9, 13, 11}, {1, −9, −1, 5, 13, 11}, {1, −5, 3, 11, −11, 15}, {1, −13, 9, −5, −1, −5}, {1, 9, −13, 13, −1, 7}, {1, −1, 7, −3, −13, −5}, {1, 3, −11, 7, 7, 15}, {1, 9, −5, 13, 13, 15}, {1, −13, 13, −9, −1, 7}, {1, 11, 7, −7, −15, −5}, {1, 11, 3, −11, −15, −5}, {1, −11, −3, 5, 15, 5}, {1, −11, −1, 7, −3, 5}, {1, −11, −1, −11, −3, 5}, {1, 11, 1, −11, −3, −7}, {1, 11, −1, −11, −3, −7}, {1, 11, −1, −11, −15, −7}, {1, 11, −1, −5, −15, −7}, {1, −11, −1, −5, 3, 11}, {1, 11, −1, −5, 3, 11}, {1, −11, −15, −5, 3, 11}, {1, −11, −3, 5, 15, 11}, {1, 9, −13, 7, 3, 11}, {1, −11, −3, 5, 1, 11}, {1, −3, 7, −5, −15, −7}, {1, 9, −13, 15, 3, −7}, {1, −11, −1, 7, 3, 11}, {1, −11, −15, −7, 1, 11}, {1, −11, −1, 7, 15, 5}, {1, −11, −1, 7, 15, 11}, {1, 11, −13, −5, 15, 11}, {1, −9, 1, −3, 5, 13}, {1, −9, 1, 9, −15, 13}, {1, 9, −3, −13, −3, 5}, {1, −9, −13, −3, 5, 13}, {1, −11, −5, −9, −3, 13}, {1, 7, 13, 9, −3, −15}, {1, −11, 5, 11, 7, 13}, {1, −11, −15, −9, −3, 13}, {1, 9, −15, 15, 3, 11}, {1, 9, −15, 15, 5, −7}, {1, 9, −15, 15, −9, 13}, {1, 9, −1, 7, −5, −7}, {1, −11, −13, −5, 3, 11}, {1, −1, −11, −3, −15, −7}, {1, −1, 7, 15, 3, 11}, {1, 9, −15, 15, 3, −7}, {1, −11, −3, −5, 3, 11}, {1, −1, 7, −5, −15, −7}, {1, −1, 7, 15, 3, −7}, {1, 9, −15, −7, 13, 3}, {1, −11, 5, 11, 9, 15}, {1, 7, 13, 11, −3, −15}, {1, −1, 5, 11, −3, −15}, {1, 7, 5, −11, 9, −5}, {1, 7, 5, 11, −5, 15}, {1, −15, 5, −9, −11, −5}, {1, −11, 5, 9, 7, 15}, {1, −11, −13, 11, −13, −7}, {1, 9, −13, 15, 1, −7}, {1, −11, 7, 11, 7, 13}, {1, 11, 3, −11, −3, −7}, {1, 11, 3, −11, −15, −7}, {1, −7, 3, 11, −13, 15}, {1, 11, 3, −11, −3, 5}, {1, −11, 5, 13, 11, 15}, {1, 5, −11, −13, 5, −7}, {1, −1, 7, 13, −11, 13}, {1, 5, 13, 11, −3, −15}, {1, −3, −15, 3, 7, 13}, {1, −1, −13, 3, 7, 15}, {1, 9, −7, 13, −1, 3}, {1, −7, 1, −13, 15, −7}, {1, 9, −13, 15, 1, 9}, {1, −13, 7, −5, 1, −3}, {1, −1, 7, 11, −3, −15}, {1, −7, 3, 11, 7, 15}, {1, −11, 7, 13, 9, 13}, {1, 9, 1, −13, 15, −7}, {1, −11, −15, −9, −5, 13}, {1, 9, 7, −9, 11, −3}, {1, −11, 7, 3, 9, 13}, {1, 9, 13, −3, −15, 15}, {1, −1, −13, 11, −13, −7}, {1, −15, 5, −9, −11, −3}, {1, −1, 3, −13, 7, −7}, {1, 9, −5, −13, −3, −7}, {1, 5, −9, 11, 7, −5}, {1, 9, 1, −1, −13, −5}, {1, 5, 1, 7, −7, 13}, {1, −11, 7, 11, −15, 13}, {1, 5, 1, −11, 9, −5}, {1, −13, 7, −5, −9, −5}, {1, −13, 7, −5, −1, 5}, {1, 9, −3, 15, 13, −3}, {1, 11, 3, −11, −13, −5}, {1, −7, 3, 9, −15, 15}, {1, −11, −15, −7, −3, 13}, {1, 5, 13, 9, −3, −15}, {1, −13, −15, −9, 9, 15}, {1, −1, 5, 11, −3, 15}, {1, −13, 5, 3, −11, −5}, {1, −1, −15, −9, 9, −5}, {1, −13, 5, 11, −3, 3}, {1, 7, 13, 11, −3, 15}, {1, −13, −7, −1, −15, 15}, {1, −13, −15, −9, 9, −5}, {1, 7, −5, 13, −13, 15}, {1, −3, 15, 3, −11, −5}, {1, −13, −7, −11, 7, −5}, {1, −11, −5, 13, −1, −5}, {1, −13, 5, 11, −1, 5}, {1, 7, −7, 13, −13, 5}, {1, −11, −5, 1, −3, 15}, {1, −11, 7, −7, −11, −5}, {1, −13, −7, −11, −5, 13}, {1, −3, 3, 9, −5, 15}, {1, 7, −5, 13, 9, 15}, {1, −13, −5, −7, 11, −3}, {1, −13, 5, −9, −11, −3}, {1, −13, 5, 3, −11, −3}, {1, −1, −15, −11, −3, 15}, {1, 9, −5, 13, 11, 15}, {1, 5, −9, 9, 7, 15}, {1, 9, −5, −7, 11, −3}, {1, −1, −15, 3, 11, 15}, {1, 5, 13, 11, −3, 15}, {1, 5, 3, −11, 7, 15}, {1, −13, 5, −9, −1, 3}, {1, −13, 5, −9, −11, −7}, {1, −13, −5, 13, 11, 15}, {1, 5, 3, −11, −3, 15}, {1, 7, 15, 3, 1, −11}, {1, −11, −3, 3, 15, 3}, {1, 7, 15, 13, 1, −11}, {1, −11, −13, −5, 1, 13}, {1, −11, −13, −7, 1, 13}, {1, −11, 1, 9, 15, 13}, {1, 13, 3, −11, −5, −7}, {1, 7, −15, 7, −5, −5}, {1, −13, −15, −5, −3, 13}, {1, −11, 11, −11, −5, 1}, {1, −9, 3, 9, −15, 15}, {1, −13, −15, −9, −1, 11}, {1, 3, 13, 11, −3, −15}, {1, −9, 3, 11, −15, 15}, {1, −1, 5, −9, 13, −7}, or {1, 13, 3, −11, −13, −5}.

Optionally, when delta=1, the method further includes:

determining the first sequence based on a preset condition and a sequence {s(n)}, where the preset condition is $x_n = y_{(n+M) \bmod K}$, $$y_n = A \cdot e^{\frac{j \times \pi \times s_n}{8}},$$

M∈{0, 1, 2, . . . , 5}, K=6, A is a non-zero complex number, and $j=\sqrt{-1}$; and the sequence $\{s_n\}$ includes at least one of the following sequences:

{1, −7, −7, −3, −1, 7}, {1, 5, 5, −3, 5, 7}, {1, 5, −3, −5, 1, 5}, {1, 7, −7, −1, −3, 7}, {1, −1, 1, −5, −3, 7}, {1, 7, 3, −5, −1, −3}, {1, 7, −7, −1, −7, 7}, {1, −5, −3, −5, 5, −1}, {1, 5, 7, 7, −1, 7}, {1, −7, 3, 3, −5, −1}, {1, 7, −1, 3, −1, −3}, {1, −1, 1, −7, 3, −3}, {1, 1, −5, 3, 5, −7}, {1, −1, 5, 1, −7, −3}, {1, 5, −7, 5, −5, 5}, {1, 5, 1, 1, −5, −1}, {1, 5, −7, 7, 1, 5}, {1, 5, −7, 1, −3, 3}, {1, −5, 3, 3, 7, −1}, {1, 3, −5, −1, −1, 7}, {1, −7, −5, −7, −3, 7}, {1, −1, −5, −1, −7, −3}, {1, −5, 5, 3, −7, −5}, {1, −7, 3, 7, −1, −1}, {1, −3, 5, 3, −7, −3}, {1, −7, −5, 5, −3, 1}, {1, −5, 5, −5, −1, −1}, {1, 3, −3, 1, −7, 1}, {1, −1, 7, 3, 7, −5}, or {1, 1, 5, −3, 7, −7}; or

{1, −5, 3, 3, 5, −3}, {1, −1, 3, −5, 5, −1}, {1, 5, 1, 1, −5, −1}, {1, −1, 1, −5, −3, 7}, {1, −5, 3, 3, 7, −1}, {1, −1, 7, 3, 7, −5}, {1, −7, −7, −3, −1, 7}, {1, 5, 5, −3, 7, −1}, {1, −5, 5, 3, 7, −7}, {1, 1, 5, −3, 7, −7}, {1, 5, −5, 5, −1, −1}, {1, −1, 3, 5, −1, −7}, {1, −7, 3, 7, −1, −1}, {1, 3, −5, 5, 1, −3}, {1, −7, 3, 3, −5, −1}, {1, 1, −3, 1, 3, 7}, {1, −5, 1, 5, 7, 7}, {1, −1, −7, 3, −5, −3}, {1, 1, −7, 3, 7, −1}, {1, 5, −1, 1, 1, −7}, {1, 7, −7, −3, 7, 7}, {1, −7, −7, −3, 7, −7}, {1, 5, 7, 1, 1, −5}, {1, 1, 3, 7, −1, −7}, {1, 5, 5, −3, 5, 7}, {1, −5, 3, 7, −7, 1}, {1, −1, 1, −7, 3, −3}, {1, −5, 3, 5, −7, 5}, {1, −3, 5, 3, −7, −3}, {1, −1, 5, 1, −7, −3}, {1, 1, −5, −1, 7, −1}, {1, −7, −5, 5, −3, 1}, {1, −5, 1, 3, 7, 7}, {1, 3, −3, 7, −1, 3}, {1, −7, −5, −7, −3, 7}, {1, 5, 7, −3, 7, 7}, {1, −7, 3, −3, −1, 3}, {1, 3, −5, 3, 7, 1}, {1, −7, 3, 1, −5, −1}, {1, 1, −5, 3, 5, −7}, {1, 5, −7, 1, −3, 3}, {1, −1, 3, 7, −3, −7}, {1, 3, −7, 3, −3, −3}, {1, −1, −7, 1, 3, 7}, {1, 1, 3, 7, 1, −7}, {1, 3, −5, −1, −1, 7}, {1, −5, −3, −5, 5, −1}, {1, −7, −5, −5, −1, 7}, {1, 1, −7, −5, −1, 7}, {1, 5, −7, 7, −1, −5}, {1, 7, 1, 1, −5, −3}, {1, 5, 7, 7, −1, 7}, {1, −7, 3, −5, −1, 1}, {1, −5, 5, −5, −1, −1}, {1, 7, 1, −5, −3, −3}, {1, 3, −3, 1, −7, 1}, {1, 1, 3, −5, 5, −3}, or {1, 3, 3, −5, −1, −7}.

According to a second aspect, a signal processing method is provided. The method includes:

generating a local sequence, where the local sequence is a first sequence or a conjugate transpose of a first sequence, the local sequence is used to process a first signal, and the first signal is a signal modulated by using π/2 binary phase shift keying BPSK; and receiving a reference signal of the first signal on a first frequency-domain resource, where the first frequency-domain resource includes K subcarriers each having a subcarrier number of k, k=u+M*n+delta, n=0, 1, . . . , K−1, M is an integer greater than or equal to 2, delta∈{0, 1, . . . , M−1}, u is an integer, the subcarrier numbers are numbered in ascending or descending order of frequencies, and the reference signal is generated by using the first sequence, where the first sequence varies as a delta value varies.

Optionally, the method further includes:

sending indication information, where the indication information is used to indicate a sequence that is in each of at least two sequence groups and used to generate the reference signal.

According to a third aspect, a signal processing method is provided. The method includes:

When delta=0, the method further includes:

determining the first sequence {x(n)} based on a preset condition and a sequence {s(n)}, where the preset condition is $x_n = y_{(n+M) \bmod K}$, where $$y_n = A \cdot e^{\frac{j \times \pi \times s_n}{16}},$$

M∈{0, 1, 2, . . . , 5}, K=6, A is a non-zero complex number, and $j=\sqrt{-1}$; and the sequence {s(n)} includes at least one of the following sequences:

{1, −5, 5, 11, −13, 11}, {1, −5, 3, 13, 3, −5}, {1, −5, 5, 13, 5, 11}, {1, −9, −5, 5, 15, 11}, {1, 9, −15, 11, −13, 11}, {1, 9, −15, 11, 3, 11}, {1, 11, −11, −9, 13, 3}, {1, −7, 7, 15, 11, 15}, {1, −9, −1, −5, −15, −7}, {1, −13, −9, −15, −5, 7}, {1, −1, 7, 15, 3, 11}, {1, 9, −15, 15, −9, 11}, {1, 15, 7, −5, −11, −9}, {1, 11, 15, −3, −13, 5}, {1, 9, −15, 15, 7, 15}, {1, 9, −15, 9, 7, 15}, {1, −11, −3, 11, −15, 13}, {1, 11, 1, 5, −9, −9}, {1, −3, 9, −1, −15, −11}, {1, 15, −13, 7, −5, −9}, {1, 11, −3, 3, 1, −9}, {1, −11, −13, 9, −13, −3}, {1, −11, −7, 3, 13, 3}, {1, −11, 11, −11, −7, 3}, {1, −11, −15, −9, 3, 11}, {1, 15, 5, −9, −7, −9}, {1, 11, 15, 9, −1, −11}, {1, −11, −1, −5, 5, 11}, {1, 7, −5, 5, 15, 11}, or {1, 11, 3, 13, −13, 15}; or

{1, −11, 11, −1, 7, 13}, {1, −3, −13, 15, −5, 5}, {1, −11, 11, −1, 3, 13}, {1, 13, −9, 3, −3, −13}, {1, −11, 11, −1, 7, 13}, {1, −3, 9, −13, −1, −9}, {1, 11, 13, 1, −9, 11}, {1, 11, −9, 13, 7, 5}, {1, 3, −9, 13, 1, 11}, {1, 11, −9, 15, 7, 5}, {1, −11, −3, 5, 7, −5}, {1, 7, −15, 5, −5, 15}, {1, −5, −15, −3, 7, −13}, {1, 9, 13, 1, −9, 11}, {1, −7, −11, 1, 11, −9}, {1, 9, −3, −13, 7, 11}, {1, 11, −9, −13, 13, 5}, {1, −9, −15, −3, 7, −13}, {1, −11, −9, 1, 7, −5}, {1, 9, −3, −13, 7, 9}, {1, 13, 11, 3, −5, 7}, {1, 13, 9, 1, −5, 7}, {1, 9, 15, 3, −7, 13}, {1, −7, 5, 13, −7, −15}, {1, 1, 9, −3, −11, 9}, {1, −11, −5, 1, 7, −5}, {1, −5, −11, 1, 11, −9}, {1, −9, 1, 11, −9, −15}, {1, 13, −9, 1, −5, −15}, {1, −5, 7, −15, −5, −15}, {1, −9, 11, −15, −15, −5}, {1, −9, −15, −5, 5, −15}, {1, −9, 13, −13, −3, −3}, {1, −9, 13, 1, 1, 11}, {1, −9, 1, 1, 7, −5}, {1, −11, −15, −3, 7, −13}, {1, −11, −13, −1, 9, −11}, {1, 3, 15, −13, 7, −3}, {1, −11, −7, 5, 7, −5}, {1, 11, 11, 1, −9, 9}, {1, 15, 7, −3, −3, 7}, {1, −9, 13, 13, −9, −1}, {1, 11, 11, 1, −7, 7}, {1, −11, −3, 3, −9, −5}, {1, 7, 15, 3, −7, −3}, {1, 11, 7, −13, 13, 5}, {1, 13, 5, −1, 11, 7}, {1, −11, −3, 1, 7, −5}, {1, −11, −5, −1, 7, −5}, {1, −3, −11, 1, 11, −9}, {1, 13, −9, 3, −5, −9}, {1, 11, −1, −11, 9, 15}, {1, 11, 13, −13, 7, −3}, {1, 11, −9, −15, 15, 5}, {1, 11, −9, 13, 11, 5}, {1, −11, −3, 5, −7, −5}, {1, −7, −15, −3, 7, 5}, {1, −7, −15, −3, −5, 5}, {1, −9, −7, 13, −11, −3}, {1, −7, −15, −15, −5, 5}, {1, 11, 11, 3, −5, 7}, {1, 13, −9, 1, −7, −15}, {1, 9, 9, −1, −11, 9}, {1, −9, −9, −1, 7, −5}, {1, −9, −1, 7, 7, −5}, {1, −9, 13, 1, 1, 9}, {1, 13, 13, 5, −3, 7}, {1, 15, 7, −1, −3, 7}, {1, 11, 9, 1, −7, 7}, {1, −9, −7, 1, 9, −5}, {1, 3, −7, 15, 1, 9}, {1, −9, −15, −3, 5, −15}, {1, −5, −15, −15, −3, 5}, {1, 1, 11, −15, 5, −3}, {1, −7, 13, −13, −3, −3}, {1, −7, 3, 13, −7, −15}, {1, −7, 5, 15, −7, −15}, {1, −9, 13, −11, −11, −3}, {1, −11, −3, −3, 5, −5}, {1, −11, −3, 3, −9, 13}, {1, −11, −7, 1, −11, −5}, {1, −7, −11, 1, 11, 5}, {1, −3, −11, 1, 11, 5}, {1, −11, −3, 1, −11, −5}, {1, 11, 15, −13, 7, −3}, {1, 7, 15, 3, 7, −3}, {1, −9, −3, −15, −11, −3}, {1, 5, 15, 3, −7, 13}, {1, 11, 7, −13, 11, 5}, {1, −9, −3, −15, −7, −3}, {1, −3, −11, 1, −5, 5}, {1, −7, −11, 1, −5, 5}, {1, −3, 9, −13, −1, −11}, {1, −9, 3, 13, −7, −11}, {1, 13, 7, −1, 11, 7}, {1, −5, −11, 1, 11, 5}, {1, −11, −5, 1, −11, −5}, {1, −9, −3, −15, −9, −3}, {1, −5, −11, 1, −5, 5}, {1, 11, −11, 1, −5, −15}, {1, −9, −15, −3, 7, −15}, {1, 11, 11, 1, −9, 11}, {1, 1, 11, −15, 5, −5}, {1, 9, 11, −1, −11, −3}, {1, 11, 3, 15, 7, 5}, {1, 3, 11, −1, 7, −3}, {1, −7, 5, −3, 7, −13}, {1, −9, −11, 1, 11, 5}, {1, −1, −11, 1, 11, 5}, {1, −11, −9, 1, −11, −5}, {1, 11, −1, −11, −5, 15}, {1, −11, −1, 1, −11, −5}, {1, −9, −3, −15, −5, −3}, {1, −1, −11, 1, −5, 5}, or {1, −9, −11, 1, −5, 5}.

According to a fourth aspect, a signal processing method is provided. The method includes:

When delta=1, the method further includes:

determining the first sequence based on a preset condition and a sequence {s(n)}, where the preset condition is $x_n = y_{(n+M) \bmod K}$, where $$y_n = A \cdot e^{\frac{j \times \pi \times s_n}{16}},$$

M∈{0, 1, 2, . . . , 5}, K=6, A is a non-zero complex number, and $j=\sqrt{-1}$; and the sequence {s(n)} includes at least one of the following sequences:

{1, −7, 13, −13, −11, −3}, {1, −7, −9, −15, −3, 5}, {1, 5, 15, −15, 5, −3}, {1, 13, 11, 1, −3, 9}, {1, 11, 3, 15, 11, 5}, {1, −11, −3, 3, −9, −5}, {1, −11, −3, 3, −9, 13}, {1, −7, 3, 15, 11, 5}, {1, −3, 7, −13, 9, 5}, {1, 11, 7, −13, 9, 5}, {1, 13, −9, 1, −9, −15}, {1, −9, 13, 1, 1, 7}, {1, 3, 11, −1, −11, −3}, {1, 3, 11, −1, 7, −3}, {1, 9, −1, 7, 9, −3}, {1, 11, −11, 13, 15, −7}, {1, −7, 3, −5, −3, 7}, {1, 9, 7, −3, 5, −5}, {1, 13, 15, 7, −3, 5}, {1, −7, 3, 11, 9, −3}, {1, 13, −7, −5, −15, −7}, {1, −7, 13, 15, −3, 3}, {1, −13, −15, −3, 5, −9}, {1, 15, 11, −1, 11, 7}, {1, −3, 11, 7, −5, 5}, {1, −13, −9, 3, −7, −3}, {1, 7, 7, −5, −15, −3}, {1, 11, 1, 11, −11, −9}, {1, −5, 5, −7, −11, 9}, or {1, −9, 1, 3, −3, 7}; or

{1, 9, −15, −7, −15, 9}, {1, −5, 3, 13, −13, 11}, {1, 11, −13, 13, 3, −5}, {1, −5, 1, 9, −13, 11}, {1, −5, 5, 11, −13, 9}, {1, −7, −13, 9, 15, −9}, {1, −7, 3, 11, −15, 11}, {1, −9, −3, −9, −1, 9}, {1, 9, 3, 9, −1, −9}, {1, −5, −13, 9, −15, −9}, {1, −5, −13, 9, 15, −9}, {1, −5, −15, 9, 15, −9}, {1, −9, 15, 9, −13, −5}, {1, −9, −15, 9, −13, −5}, {1, −7, 15, 9, −13, −5}, {1, −9, −5, 5, 15, 11}, {1, 11, 15, 5, −5, −9}, {1, −7, −15, 9, −13, −5}, {1, −7, 1, 9, −15, 11}, {1, 9, −15, −7, −15, 11}, {1, 9, −15, −7, −13, 11}, {1, −7, −15, 9, 15, −9}, {1, −5, −13, −5, 3, 11}, {1, −7, −13, −5, 3, 11}, {1, 9, −15, 9, −1, −7}, {1, −5, 1, −11, 15, −7}, {1, −5, 5, 15, −13, 11}, {1, 9, −13, 15, 5, −5}, {1, 9, 5, −5, −15, −9}, {1, 9, −1, −11, −15, −9}, {1, 9, 15, 5, −5, −9}, {1, −9, −1, 9, 15, 11}, {1, −5, 3, 13, 7, −5}, {1, −9, 15, −13, −3, 7}, {1, 7, −3, −13, 15, −9}, {1, −7, −1, −13, 15, −7}, {1, 9, −13, 15, 3, 9}, {1, 9, 5, −5, −15, −7}, {1, 9, −1, −11, −15, −7}, {1, 5, −9, −15, −3, 7}, {1, −13, −9, −15, −5, 7}, {1, −5, 7, 15, 9, 15}, {1, −5, 3, 15, 9, −5}, {1, 9, 15, 9, −3, −11}, {1, 11, 7, 11, −3, −11}, {1, −11, −5, −11, −3, 9}, {1, −7, 3, 15, 11, −3}, {1, 9, 3, 9, −3, −11}, {1, 11, 3, 7, −7, −11}, {1, 7, 15, −5, −13, 7}, {1, −3, 7, −13, 11,

−3}, {1, 11, 3, −9, −15, −9}, {1, −9, −15, −3, 3, 11}, {1, 11, 5, −7, −1, −9}, {1, 7, −5, −11, −1, 9}, {1, −7, 3, 13, −13, 13}, {1, −9, 13, −11, −5, 7}, {1, 9, 15, 7, −3, −11}, {1, 11, 15, 9, −3, −11}, {1, 11, 3, −7, −15, −7}, {1, 11, 1, −9, −15, −5}, {1, 11, 3, −9, −15, −7}, {1, 11, 5, 9, −3, −11}, {1, 7, 15, 7, −3, −11}, {1, 11, 5, −5, −15, −5}, {1, 11, 5, −7, −15, −7}, {1, −11, −7, −11, −1, 11}, {1, 11, 7, 11, −1, −11}, {1, 11, 15, 11, −1, −11}, {1, −11, −15, −11, −1, 11}, {1, 9, −15, 9, 5, −5}, {1, −7, −13, 11, −13, −5}, {1, 9, −15, 9, 3, −5}, {1, 5, 3, 11, −11, 13}, {1, −9, −13, 11, −13, −5}, {1, −7, 3, 11, −13, 13}, {1, −7, 3, 11, −13, 11}, {1, −7, −1, 7, −13, 11}, {1, −11, 13, −9, −1, −3}, {1, −7, 1, 7, −13, 11}, {1, 11, −13, 13, 1, −7}, {1, −7, 13, 7, −15, −7}, {1, −11, −7, −13, −3, 9}, {1, 11, −13, 11, −1, −7}, {1, 5, 15, −5, −13, 7}, {1, 11, 3, −7, −15, −5}, {1, 11, 1, −9, −15, −7}, {1, −9, 13, −9, −1, 7}, {1, −11, −15, −5, 1, 11}, {1, −11, −15, −9, 1, 11}, {1, 11, 7, −5, −15, −5}, {1, 11, 5, 9, −1, −11}, {1, −9, −5, −11, −1, 11}, {1, 9, −15, −9, 13, 11}, {1, 7, 3, −9, 13, −9}, {1, 9, 15, −9, 13, 11}, {1, 7, 15, −9, 13, 11}, {1, −9, −15, −5, 3, 11}, {1, 11, 5, −5, −15, −7}, {1, 11, 3, −7, −1, −9}, or {1, 7, −3, −11, −1, 9}.

In another implementation of the fourth aspect, the sequence {s(n)} may alternatively include at least one of the following sequences:

{1, −7, 13, −13, −11, −3}, {1, −7, −9, −15, −3, 5}, {1, 5, 15, −15, 5, −3}, {1, 13, 11, 1, −3, 9}, {1, 11, 3, 15, 11, 5}, {1, −11, −3, 3, −9, −5}, {1, −11, −3, 3, −9, 13}, {1, −7, 3, 15, 11, 5}, {1, −3, 7, −13, 9, 5}, {1, 11, 7, −13, 9, 5}, {1, 13, −9, 1, −9, −15}, {1, −9, 13, 1, 1, 7}, {1, 3, 11, −1, −11, −3}, {1, 3, 11, −1, 7, −3}, {1, 9, −1, 7, 9, −3}, {1, 11, −11, 13, 15, −7}, {1, −7, 3, −5, −3, 7}, {1, 9, 7, −3, 5, −5}, {1, 13, 15, 7, −3, 5}, {1, −7, 3, 11, 9, −3}, {1, 13, −7, −5, −15, −7}, {1, −7, 13, 15, −3, 3}, {1, −13, −15, −3, 5, −9}, {1, 15, 11, −1, 11, 7}, {1, −3, 11, 7, −5, 5}, {1, −13, −9, 3, −7, −3}, {1, 7, 7, −5, −15, −3}, {1, 11, 1, 11, −11, −9}, {1, −5, 5, −7, −11, 9}, or {1, −9, 1, 3, −3, 7}; or

{1, −11, 11, −1, 7, 13}, {1, −3, −13, 15, −5, 5}, {1, −11, 11, −1, 3, 13}, {1, 13, −9, 3, −3, −13}, {1, −11, 11, −1, 7, 13}, {1, −3, 9, −13, −1, −9}, {1, 11, 13, 1, −9, 11}, {1, 11, −9, 13, 7, 5}, {1, 3, −9, 13, 1, 11}, {1, 11, −9, 15, 7, 5}, {1, −11, −3, 5, 7, −5}, {1, 7, −15, 5, −5, 15}, {1, −5, −15, −3, 7, −13}, {1, 9, 13, 1, −9, 11}, {1, −7, −11, 1, 11, −9}, {1, 9, −3, −13, 7, 11}, {1, 11, −9, −13, 13, 5}, {1, −9, −15, −3, 7, −13}, {1, −11, −9, 1, 7, −5}, {1, 9, −3, −13, 7, 9}, {1, 13, 11, 3, −5, 7}, {1, 13, 9, 1, −5, 7}, {1, 9, 15, 3, −7, 13}, {1, −7, 5, 13, −7, −15}, {1, 1, 9, −3, −11, 9}, {1, −11, −5, 1, 7, −5}, {1, −5, −11, 1, 11, −9}, {1, −9, 1, 11, −9, −15}, {1, 13, −9, 1, −5, −15}, {1, −5, 7, −15, −5, −15}, {1, −9, 11, −15, −15, −5}, {1, −9, −15, −5, 5, −15}, {1, −9, 13, −13, −3, −3}, {1, −9, 13, 1, 1, 11}, {1, −9, 1, 1, 7, −5}, {1, −11, −15, −3, 7, −13}, {1, −11, −13, −1, 9, −11}, {1, 3, 15, −13, 7, −3}, {1, −11, −7, 5, 7, −5}, {1, 11, 11, 1, −9, 9}, {1, 15, 7, −3, −3, 7}, {1, −9, 13, 13, −9, −1}, {1, 11, 11, 1, −7, 7}, {1, −11, −3, 3, −9, −5}, {1, 7, 15, 3, −7, −3}, {1, 11, 7, −13, 13, 5}, {1, 13, 5, −1, 11, 7}, {1, −11, −3, 1, 7, −5}, {1, −11, −5, −1, 7, −5}, {1, −3, −11, 1, 11, −9}, {1, 13, −9, 3, −5, −9}, {1, 11, −1, −11, 9, 15}, {1, 11, 13, −13, 7, −3}, {1, 11, −9, −15, 15, 5}, {1, 11, −9, 13, 11, 5}, {1, −11, −3, 5, −7, −5}, {1, −7, −15, −3, 7, 5}, {1, −7, −15, −3, −5, 5}, {1, −9, −7, 13, −11, −3}, {1, −7, −15, −15, −5, 5}, {1, 11, 11, 3, −5, 7}, {1, 13, −9, 1, −7, −15}, {1, 9, 9, −1, −11, 9}, {1, −9, −9, −1, 7, −5}, {1, −9, −1, 7, 7, −5}, {1, −9, 13, 1, 1, 9}, {1, 13, 13, 5, −3, 7}, {1, 15, 7, −1, −3, 7}, {1, 11, 9, 1, −7, 7}, {1, −9, −7, 1, 9, −5}, {1, 3, −7, 15, 1, 9}, {1, −9, −15, −3, 5, −15}, {1, −5, −15, −15, −3, 5}, {1, 1, 11, −15, 5, −3}, {1, −7, 13, −13, −3, −3}, {1, −7, 3, 13, −7, −15}, {1, −7, 5, 15, −7, −15}, {1, −9, 13, −11, −11, −3}, {1, −11, −3, −3, 5, −5}, {1, −11, −3, 3, −9, 13}, {1, −11, −7, 1, −11, −5}, {1, −7, −11, 1, 11, 5}, {1, −3, −11, 1, 11, 5}, {1, −11, −3, 1, −11, −5}, {1, 11, 15, −13, 7, −3}, {1, 7, 15, 3, 7, −3}, {1, −9, −3, −15, −11, −3}, {1, 5, 15, 3, −7, 13}, {1, 11, 7, −13, 11, 5}, {1, −9, −3, −15, −7, −3}, {1, −3, −11, 1, −5, 5}, {1, −7, −11, 1, −5, 5}, {1, −3, 9, −13, −1, −11}, {1, −9, 3, 13, −7, −11}, {1, 13, 7, −1, 11, 7}, {1, −5, −11, 1, 11, 5}, {1, −11, −5, 1, −11, −5}, {1, −9, −3, −15, −9, −3}, {1, −5, −11, 1, −5, 5}, {1, 11, −11, 1, −5, −15}, {1, −9, −15, −3, 7, −15}, {1, 11, 11, 1, −9, 11}, {1, 1, 11, −15, 5, −5}, {1, 9, 11, −1, −11, −3}, {1, 11, 3, 15, 7, 5}, {1, 3, 11, −1, 7, −3}, {1, −7, 5, −3, 7, −13}, {1, −9, −11, 1, 11, 5}, {1, −1, −11, 1, 11, 5}, {1, −11, −9, 1, −11, −5}, {1, 11, −1, −11, −5, 15}, {1, −11, −1, 1, −11, −5}, {1, −9, −3, −15, −5, −3}, {1, −1, −11, 1, −5, 5}, or {1, −9, −11, 1, −5, 5}.

According to a fifth aspect, a signal processing method is provided. The method includes:

When delta=0, the method further includes:

determining the first sequence based on a preset condition and a sequence $\{s_n\}$, where the preset condition is $x_n = y_{(n+M) \bmod K}$, where $$y_n = A \cdot e^{\frac{j\times\pi\times s_n}{8}},$$

$M \in \{0, 1, 2, \ldots, 5\}$, K=6, A is a non-zero complex number, and $j=\sqrt{-1}$; and the sequence $\{s_n\}$ includes at least one of the following sequences:

{1, 3, 1, −5, 1, 7}, {1, −3, 3, 1, 7, −7}, {1, −5, 5, 5, −5, 1}, {1, 7, 1, −1, 1, −5}, {1, 7, 1, −1, −7, −1}, {1, 5, 1, −7, −3, −5}, {1, 7, 1, −5, −3, 3}, {1, 5, 1, −1, 3, −7}, {1, 5, 1, −5, 7, −1}, {1, 3, 1, 7, −3, −7}, {1, 5, 1, −1, 3, −3}, {1, −3, 1, 5, −1, 3}, {1, −5, 1, 3, −7, 7}, {1, −3, 1, −7, 7, −5}, {1, −3, 5, −7, −5, 5}, {1, 5, 1, −5, −1, −3}, {1, 7, 5, −1, −7, −5}, {1, −3, 1, 5, 3, −7}, {1, −5, 5, 3, −7, −1}, {1, 5, 1, 5, −5, −7}, {1, 3, 1, −5, 5, −7}, {1, 5, 1, −3, 1, 5}, {1, 7, 1, −5, −7, −1}, {1, 5, 1, 5, −5, 5}, {1, 5, 1, −5, −1, 3}, {1, −1, 1, −7, −3, 7}, {1, −3, 1, 5, −7, 7}, {1, 5, 1, 7, −1, −3}, {1, −3, 1, −5, −1, 5}, or {1, −7, 5, −1, −5, −3}; or

{1, 3, 1, −5, 1, 7}, {1, 3, 1, −5, 5, −7}, {1, 3, 1, 7, −3, −7}, {1, 3, 1, −5, 7, −3}, {1, 5, 1, −5, −1, 3}, {1, 5, 1, −5, 1, 5}, {1, 5, 1, −3, 1, 5}, {1, 5, 1, 5, −7, 5}, {1, 5, 1, 5, −5, 5}, {1, 5, 1, −3, 3, 7}, {1, 5, 1, −1, 3, 7}, {1, 5, 1, 5, −5, 7}, {1, 5, 1, −1, 3, −7}, {1, 5, 1, 5, −5, −7}, {1, 5, 1, −7, −3, −5}, {1, 5, 1, 5, −1, −5}, {1, 5, 1, 7, 1, −3}, {1, 5, 1, −5, 1, −3}, {1, 5, 1, −1, 3, −3}, {1, 5, 1, −5, 7, −3}, {1, 5, 1, −5, −7, −3}, {1, 5, 1, −3, −7, −3}, {1, 5, 1, 7, −1, −3}, {1, 5, 1, −7, −1, −3}, {1, 5, 1, −5, −1, −3}, {1, 5, 1, −5, 7, −1}, {1, 7, 1, −5, −3, 3}, {1, 7, 1, −1, 1, −5}, {1, 7, 1, −5, −7, −1}, {1, 7, 1, −1, −7, −1}, {1, −5, 1, −1, 5, 7}, {1, −5, 1, 3, −7, 7}, {1, −3, 1, 5, −1, 3}, {1, −3, 1, −7, −1, 3}, {1, −3, 1, −5, −1, 3}, {1, −3, 1, −5, −1, 5}, {1, −3, 1, 5, 3, 7}, {1, −3, 1, −1, 3, 7}, {1, −3, 1, 5, −7, 7}, {1, −3, 1, 3, −5, 7}, {1, −3, 1, 5, −5, 7}, {1, −3, 1, 5, 3, −7{ }, {1, −3, 1, 5, 3, −5}, {1, −3, 1, −7, 7, −5}, {1, −1, 1, 5, −5, 7}, {1, −1, 1, −7, −3, 7}, {1, 5, 3, 7, −3, −7}, {1, 5, 3, 7, −1, −5}, {1, 7, 3, −5, −3, 3}, {1, 7, 3, −1, −7, −3}, {1, −3, 3, 7, −5, 5}, {1, −3, 3, 1, 7, −7}, {1, 7, 5, −1, −7, −5}, {1, −7, 5, 1, −5, −3}, {1, −7, 5, −1, −5, −3}, {1, −7, 5, 1, −5, −1}, {1, −5, 5, 5, −5, 1}, {1, −5, 5, 3, −7, −1}, {1, −3, 5, 7, −5, 5}, {1, −3, 5, −7, −5, 5}, or {1, −3, 5, −7, −5, 7}.

According to a sixth aspect, a signal processing method is provided. The method includes:

When delta=1, the method further includes:

determining the first sequence based on a preset condition and a sequence $\{s_n\}$, where the preset condition is $x_n = y_{(n+M) \bmod K}$, where $$y_n = A \cdot e^{\frac{j \times \pi \times s_n}{8}},$$

$M \in \{0, 1, 2, \ldots, 5\}$, K=6, A is a non-zero complex number, and $j = \sqrt{-1}$; and the sequence $\{s_n\}$ includes at least one of the following sequences:

{1, 5, 1, −5, 3, 3}, {1, −5, 1, 3, −3, 7}, {1, 7, 1, 7, −3, −5}, {1, 5, 5, −5, 3, −1}, {1, 7, 1, 1, −3, 5}, {1, 7, 1, −1, 5, −5}, {1, 7, 1, −5, −3, −1}, {1, −1, 5, −7, −1, −1}, {1, 7, 1, −5, −3, 7}, {1, −3, 1, 1, −5, 3}, {1, 1, 7, −7, 3, −1}, {1, 5, 1, 1, 7, −1}, {1, −5, 1, 7, 5, −5}, {1, −5, 1, 7, −3, −5}, {1, 7, 3, −1, 5, 5}, {1, 5, 1, 3, −1, 5}, {1, −3, 1, −5, 3, −7}, {1, −7, 5, −1, 3, −7}, {1, 5, 1, 7, −1, −7}, {1, 5, 1, −5, −5, 3}, {1, −5, 1, −1, 5, −5}, {1, −5, 1, 3, −3, −1}, {1, −3, 1, 5, −1, −5}, {1, −3, 1, −1, 3, −3}, {1, 7, 1, −5, 5, 7}, {1, 7, 1, 3, 5, −1}, {1, 7, 3, −1, −1, 5}, {1, 7, 1, 7, 5, 3}, {1, 5, 1, −3, 3, 7}, or {1, −5, 3, 7, −3, −3}; or

{1, −5, 1, 3, −3, −1}, {1, −5, 1, 3, 5, −1}, {1, −5, 3, 7, −3, −3}, {1, −5, 3, −7, −3, −3}, {1, −3, 1, 1, −5, 3}, {1, −3, 1, 7, −1, −1}, {1, −3, 1, 7, 7, −1}, {1, −3, 3, 7, −5, −3}, {1, −3, 3, 7, −3, −3}, {1, −3, 3, 7, −1, −1}, {1, −3, 5, 5, −5, −1}, {1, −3, 5, −7, −5, −1}, {1, −3, 5, −7, −3, −1}, {1, −3, 5, −7, −1, −1}, {1, −1, 5, −7, −1, −1}, {1, 1, 5, −5, 3, −1}, {1, 1, 5, −1, −5, 3}, {1, 1, 5, −1, −5, 5}, {1, 1, 5, −7, 3, −1}, {1, 1, 7, −7, 3, −1}, {1, 3, 5, −1, −5, 5}, {1, 3, 5, −7, 3, −1}, {1, 3, 7, −7, 3, −1}, {1, 5, 1, −5, −5, 3}, {1, 5, 1, −5, 3, 3}, {1, 5, 1, −1, −5, 5}, {1, 5, 1, 1, 7, −1}, {1, 5, 1, 3, −1, 5}, {1, 5, 3, −1, −5, 5}, {1, 5, 5, −5, 3, −1}, {1, 5, 5, −1, −5, 3}, {1, 5, 5, −1, −5, 5}, {1, 7, 1, −5, −3, −1}, {1, 7, 1, −1, −3, 3}, {1, 7, 1, −1, 5, 3}, {1, 7, 1, 1, −3, 5}, {1, 7, 1, 3, 5, −1}, {1, 7, 1, 7, 5, 3}, {1, 7, 3, −3, −3, 5}, {1, 7, 3, −1, −1, 5}, {1, 7, 3, −1, 1, 5}, {1, 7, 3, −1, 5, 5}, {1, 7, 3, 1, −3, 5}, {1, 7, 3, 1, −1, 5}, {1, 7, 3, 3, −3, 5}, {1, 7, 3, 3, −1, 5}, {1, 7, 5, −1, −3, 3}, {1, 7, 5, −1, −1, 5}, {1, 7, 5, 1, −3, 5}, {1, 7, 5, 1, −1, 5}, {1, −7, 3, −1, −1, 3}, {1, −7, 3, −1, −1, 5}, {1, −7, 3, 3, −1, 5}, {1, −7, 5, −1, 1, 5}, {1, −7, 5, −1, 3, 5}, or {1, −7, 5, 1, −1, 5}.

Optionally, when delta=1, the method further includes:

determining the first sequence based on a preset condition and a sequence $\{s_n\}$, where the preset condition is $x_n = y_{(n+M) \bmod K}$, where $$y_n = A \cdot e^{\frac{j \times \pi \times s_n}{32}},$$

$M \in \{0, 1, 2, \ldots, 5\}$, K=6, A is a non-zero complex number, and $j = \sqrt{-1}$; and the sequence $\{s_n\}$ includes at least one of the following sequences:

{1, −23, 21, −1, −3, 17}, {1, 19, −3, −23, −7, −27}, {1, −17, −13, 29, −3, 17}, {1, −21, 5, 25, 17, −21}, {1, 23, −19, −19, −29, −7}, {1, −11, 13, 11, −31, −9}, {1, 7, −17, 5, 15, −9}, {1, 1, 11, −11, 13, −9}, {1, 23, −1, −11, 15, −27}, {1, 23, 27, 7, 27, −17}, {1, −19, −27, −7, 11, −31}, {1, −3, −23, 21, −23, 21}, {1, 29, 9, 17, −1, 11}, {1, 27, 29, 5, −15, 23}, {1, −5, 17, −21, −29, 11}, {1, −17, −13, 9, −7, 11}, {1, −3, −25, −9, −27, 15}, {1, −19, 1, −11, −7, 13}, {1, 17, −27, 13, 9, −13}, {1, −17, −11, 11, 31, −17}, {1, 19, 13, −9, −29, 19}, {1, −21, 31, −15, −23, −3}, {1, −21, −19, 19, 31, −9}, {1, 23, 31, 5, 15, −5}, {1, −23, 17, 21, −19, 23}, {1, 21, 27, −15, −29, 17}, {1, 23, 23, 11, −29, −7}, {1, −25, −3, −1, 13, −9}, {1, 21, −23, −21, 23, −21}, or {1, 21, 11, 31, 11, 13}.

Optionally, when delta=1, the method further includes:

determining the first sequence based on a preset condition and a sequence {s(n)}, where the preset condition is $x_n = y_{(n+M) \bmod K}$, where $$y_n = A \cdot e^{\frac{j \times \pi \times s_n}{16}},$$

$M \in \{0, 1, 2, \ldots, 5\}$, K=6, A is a non-zero complex number, and $j = \sqrt{-1}$; and the sequence $\{s_n\}$ includes at least one of the following sequences:

{1, 3, −11, 9, −5, −3}, {1, 9, −15, 13, 3, 11}, {1, −9, −13, −5, 3, −7}, {1, −13, −15, 5, −9, −3}, {1, −13, 7, 5, −9, −3}, {1, −11, 7, 11, 9, 15}, {1, −11, −1, 5, 15, 7}, {1, 11, 5, −7, −15, −5}, {1, 11, −1, −9, −15, −5}, {1, −11, 13, −9, −1, −7}, {1, 11, 3, −9, −1, −7}, {1, 9, −3, −11, −1, −7}, {1, −11, −3, 5, −1, 9}, {1, 9, −1, −5, −13, −5}, {1, −13, 5, 5, 11, −3}, {1, −13, −9, 9, 15, 15}, {1, −9, 9, 5, 11, 15}, {1, 3, 3, −11, 7, 15}, {1, 5, 11, 7, −7, 15}, {1, 9, −5, 13, 13, 15}, {1, −11, −1, 7, −3, 5}, {1, 9, −13, 7, 3, 11}, {1, 9, −15, 15, 5, −7}, {1, 11, 3, −11, −13, −5}, {1, −1, −15, −9, 9, −5}, {1, −13, −15, −9, 9, −5}, {1, −11, −5, 13, −1, −5}, {1, −13, 5, 11, −1, 5}, {1, −13, 5, −9, −1, 3}, or {1, −13, 5, −9, −11, −7}; or

{1, 3, −11, 9, −5, −3}, {1, 3, 7, −7, 13, −1}, {1, −13, −9, −7, −5, 13}, {1, −11, 7, 11, 11, 15}, {1, −11, 7, 11, 15, 15}, {1, 1, 5, 9, −5, 15}, {1, −13, −13, −11, −5, 13}, {1, 7, −7, 13, −1, 1}, {1, −11, 7, 13, 13, 15}, {1, −13, −11, −5, −5, 13}, {1, 3, −11, 9, −5, −5}, {1, −11, 7, 13, 15, 15}, {1, −11, −15, −7, 1, −7}, {1, 5, −9, 11, −3, −5}, {1, −13, −15, −11, −5, 13}, {1, −13, −15, 5, −9, −3}, {1, −13, 7, 5, −9, −3}, {1, 5, 3, −11, 9, −5}, {1, −11, 7, 11, −15, 3}, {1, −7, 1, 9, 5, −7}, {1, 5, 11, 9, −5, 15}, {1, −11, 7, 11, 9, 15}, {1, −13, 7, −7, −1, −3}, {1, −13, 7, 5, −9, −5}, {1, −11, −1, 5, 15, 7}, {1, 11, 5, −7, −15, −5}, {1, 11, 3, −9, −15, −5}, {1, 11, −1, −9, −15, −5}, {1, −15, −9, −7, −5, 13}, {1, 3, 9, 11, −5, 15}, {1, 11, −1, −7, −15, −5}, {1, 11, 5, −3, −15, −5}, {1, −15, −13, −7, −5, 13}, {1, 3, 5, 11, −5, 15}, {1, −13, −13, −5, −5, 13}, {1, −11, 13, −9, −1, −7}, {1, 11, 5, −3, −15, −7}, {1, 11, 5, −7, −15, −7}, {1, −9, −15, −5, 1, 11}, {1, 11, 3, −9, −1, −7}, {1, 7, 7, 11, −3, −15}, {1, −15, −11, −7, −5, 13}, {1, 5, 7, 11, −5, 15}, {1, −11, −3, 5, 15, 7}, {1, −5, −15, −5, 1, 11}, {1, 9, −1, −5, −13, −5}, {1, −11, 5, 11, 15, 15}, {1, 7, 11, −5, 15, 1}, {1, 9, 3, 11, 3, −9}, {1, −7, −11, 11, −13, −7}, {1, 1, 7, −9, 11, −3}, {1, 5, 11, −5, 15, 1}, {1, −13, 13, −9, −3, 7}, {1, −15, −11, −5, −5, 13}, {1, 11, 5, −5, −15, −5}, {1, −11, 5, 9, 9, 15}, {1, 7, 7, 11, −5, 15}, {1, 3, 7, 11, −5, 15}, {1, 9, 15, −9, −13, 11}, {1, −9, 15, 11, −13, −7}, {1, 9, 1, 9, 3, −9}, {1, 11, −1, −7, 1, −7}, {1, −11, 5, 9, 11, 15}, {1, −13, 7, −9, −7, 1}, {1, 11, −1, −9, −1, −7}, {1, 9, 11, −5, 15, 1}, {1, −11, 15, 7, −15, −7}, {1, 9, 1, −11, 15, −7}, {1, −7, −13, −3, 5, 13}, {1, −7, −15, −5, 1, 11}, {1, 11, 3, −5, −15, −5}, {1, 11, 5, −5, −15, −7}, {1, 11, 3, −7, −15, −5}, {1, −9, 1, 9, 3, 11}, {1, −9, −15, −5, 3, 11}, {1, −9, −1, −7, 1, 11}, {1, −9, −15, 11, −13, −7}, {1, −5, −11, 11, −13, −7}, {1, −13, 5, 5, 11, −3}, {1, −13, −9, 9, 15, 15}, {1, −13, 5, 11, −3, 1}, {1, −13, −13, −9, 9, 15}, {1, −11, −13, 9, −15, −9}, {1, −11, −13, 9, −13, −7}, {1, 7, 15, 5, 3, −9}, {1, −11, −13, −5, 1, 11}, {1, 3, −11, 9, −5, −7}, {1, 9, 7, −5, −15, −5}, {1, 11, −1, −11, −13, −5}, {1, −11, −1, 5, 13, 11}, {1, −13, 7, −7, −5, 3}, {1, −1, −13, −5, 1, 11}, {1, −3, −15, −5, 1, 11}, {1, 11, 7, −5,

−15, −5}, {1, 11, 7, −3, −15, −5}, {1, −15, −9, −11, −5, 11}, {1, −13, −7, −11, −7, 11}, {1, 11, −1, −11, −15, −5}, {1, 3, −11, −3, −3, 15}, {1, 11, −1, −5, −15, −5}, {1, 9, −1, −11, −13, −5}, {1, −11, −15, −5, 1, 11}, {1, 3, 3, −11, 7, 15}, {1, 9, 3, 11, −3, −9}, {1, −9, 13, −11, −13, −7}, {1, 9, 15, −9, 13, 11}, {1, −9, −1, 5, 13, 11}, {1, −5, 3, 11, −11, 15}, {1, −13, 9, −5, −1, −5}, {1, 9, −13, 13, −1, 7}, {1, −1, 7, −3, −13, −5}, {1, 3, −11, 7, 7, 15}, {1, 9, −5, 13, 13, 15}, {1, −13, 13, −9, −1, 7}, {1, 11, 7, −7, −15, −5}, {1, 11, 3, −11, −15, −5}, {1, −11, −3, 5, 15, 5}, {1, −11, −1, 7, −3, 5}, {1, −11, −1, −11, −3, 5}, {1, 11, 1, −11, −3, −7}, {1, 11, −1, −11, −3, −7}, {1, 11, −1, −11, −15, −7}, {1, 11, −1, −5, −15, −7}, {1, −11, −1, −5, 3, 11}, {1, 11, −1, −5, 3, 11}, {1, −11, −15, −5, 3, 11}, {1, −11, −3, 5, 15, 11}, {1, 9, −13, 7, 3, 11}, {1, −11, −3, 5, 1, 11}, {1, −3, 7, −5, −15, −7}, {1, 9, −13, 15, 3, −7}, {1, −11, −1, 7, 3, 11}, {1, −11, −15, −7, 1, 11}, {1, −11, −1, 7, 15, 5}, {1, −11, −1, 7, 15, 11}, {1, 11, −13, −5, 15, 11}, {1, −9, 1, −3, 5, 13}, {1, −9, 1, 9, −15, 13}, {1, 9, −3, −13, −3, 5}, {1, −9, −13, −3, 5, 13}, {1, −11, −5, −9, −3, 13}, {1, 7, 13, 9, −3, −15}, {1, −11, 5, 11, 7, 13}, {1, −11, −15, −9, −3, 13}, {1, 9, −15, 15, 3, 11}, {1, 9, −15, 15, 5, −7}, {1, 9, −15, 15, −9, 13}, {1, 9, −1, 7, −5, −7}, {1, −11, −13, −5, 3, 11}, {1, −1, −11, −3, −15, −7}, {1, −1, 7, 15, 3, 11}, {1, 9, −15, 15, 3, −7}, {1, −11, −3, −5, 3, 11}, {1, −1, 7, −5, −15, −7}, {1, −1, 7, 15, 3, −7}, {1, 9, −15, −7, 13, 3}, {1, −11, 5, 11, 9, 15}, {1, 7, 13, 11, −3, −15}, {1, −1, 5, 11, −3, −15}, {1, 7, 5, −11, 9, −5}, {1, 7, 5, 11, −5, 15}, {1, −15, 5, −9, −11, −5}, {1, −11, 5, 9, 7, 15}, {1, −11, −13, 11, −13, −7}, {1, 9, −13, 15, 1, −7}, {1, −11, 7, 11, 7, 13}, {1, 11, 3, −11, −3, −7}, {1, 11, 3, −11, −15, −7}, {1, −7, 3, 11, −13, 15}, {1, 11, 3, −11, −3, 5}, {1, −11, 5, 13, 11, 15}, {1, 5, −11, −13, 5, −7}, {1, −1, 7, 13, −11, 13}, {1, 5, 13, 11, −3, −15}, {1, −3, −15, 3, 7, 13}, {1, −1, −13, 3, 7, 15}, {1, 9, −7, 13, −1, 3}, {1, −7, 1, −13, 15, −7}, {1, 9, −13, 15, 1, 9}, {1, −13, 7, −5, 1, −3}, {1, −1, 7, 11, −3, −15}, {1, −7, 3, 11, 7, 15}, {1, −11, 7, 13, 9, 13}, {1, 9, 1, −13, 15, −7}, {1, −11, −15, −9, −5, 13}, {1, 9, 7, −9, 11, −3}, {1, −11, 7, 3, 9, 13}, {1, 9, 13, −3, −15, 15}, {1, −1, −13, 11, −13, −7}, {1, −15, 5, −9, −11, −3}, {1, −1, 3, −13, 7, −7}, {1, 9, −5, −13, −3, −7}, {1, 5, −9, 11, 7, −5}, {1, 9, 1, −1, −13, −5}, {1, 5, 1, 7, −7, 13}, {1, −11, 7, 11, −15, 13}, {1, 5, 1, −11, 9, −5}, {1, −13, 7, −5, −9, −5}, {1, −13, 7, −5, −1, 5}, {1, 9, −3, 15, 13, −3}, {1, 11, 3, −11, −13, −5}, {1, −7, 3, 9, −15, 15}, {1, −11, −15, −7, −3, 13}, {1, 5, 13, 9, −3, −15}, {1, −13, −15, −9, 9, 15}, {1, −1, 5, 11, −3, 15}, {1, −13, 5, 3, −11, −5}, {1, −1, −15, −9, 9, −5}, {1, −13, 5, 11, −3, 3}, {1, 7, 13, 11, −3, 15}, {1, −13, −7, −1, −15, 15}, {1, −13, −15, −9, 9, −5}, {1, 7, −5, 13, −13, 15}, {1, −3, 15, 3, −11, −5}, {1, −13, −7, −11, 7, −5}, {1, −11, −5, 13, −1, −5}, {1, −13, 5, 11, −1, 5}, {1, 7, −7, 13, −13, 5}, {1, −11, −5, 1, −3, 15}, {1, −11, 7, −7, −11, −5}, {1, −13, −7, −11, −5, 13}, {1, −3, 3, 9, −5, 15}, {1, 7, −5, 13, 9, 15}, {1, −13, −5, −7, 11, −3}, {1, −13, 5, −9, −11, −3}, {1, −13, 5, 3, −11, −3}, {1, −1, −15, −11, −3, 15}, {1, 9, −5, 13, 11, 15}, {1, 5, −9, 9, 7, 15}, {1, 9, −5, −7, 11, −3}, {1, −1, −15, 3, 11, 15}, {1, 5, 13, 11, −3, 15}, {1, 5, 3, −11, 7, 15}, {1, −13, 5, −9, −1, 3}, {1, −13, 5, −9, −11, −7}, {1, −13, −5, 13, 11, 15}, {1, 5, 3, −11, −3, 15}, {1, 7, 15, 3, 1, −11}, {1, −11, −3, 3, 15, 3}, {1, 7, 15, 13, 1, −11}, {1, −11, −13, −5, 1, 13}, {1, −11, −13, −7, 1, 13}, {1, −11, 1, 9, 15, 13}, {1, 13, 3, −11, −5, −7}, {1, 7, −15, 7, −5, −5}, {1, −13, −15, −5, −3, 13}, {1, −11, 11, −11, −5, 1}, {1, −9, 3, 9, −15, 15}, {1, −13, −15, −9, −1, 11}, {1, 3, 13, 11, −3, −15}, {1, −9, 3, 11, −15, 15}, {1, −1, 5, −9, 13, −7}, or {1, 13, 3, −11, −13, −5}.

Optionally, when delta=1, the method further includes:

determining the first sequence based on a preset condition and a sequence {s(n)}, where the preset condition is $x_n = y_{(n+M) \bmod K}$, where $$y_n = A \cdot e^{\frac{j \times \pi \times s_n}{8}},$$

M∈{0, 1, 2, . . . , 5}, K=6, A is a non-zero complex number, and $j=\sqrt{-1}$; and the sequence $\{s_n\}$ includes at least one of the following sequences:

{1, −7, −7, −3, −1, 7}, {1, 5, 5, −3, 5, 7}, {1, 5, −3, −5, 1, 5}, {1, 7, −7, −1, −3, 7}, {1, −1, 1, −5, −3, 7}, {1, 7, 3, −5, −1, −3}, {1, 7, −7, −1, −7, 7}, {1, −5, −3, −5, 5, −1}, {1, 5, 7, 7, −1, 7}, {1, −7, 3, 3, −5, −1}, {1, 7, −1, 3, −1, −3}, {1, −1, 1, −7, 3, −3}, {1, 1, −5, 3, 5, −7}, {1, −1, 5, 1, −7, −3}, {1, 5, −7, 5, −5, 5}, {1, 5, 1, 1, −5, −1}, {1, 5, −7, 7, 1, 5}, {1, 5, −7, 1, −3, 3}, {1, −5, 3, 3, 7, −1}, {1, 3, −5, −1, −1, 7}, {1, −7, −5, −7, −3, 7}, {1, −1, −5, −1, −7, −3}, {1, −5, 5, 3, −7, −5}, {1, −7, 3, 7, −1, −1}, {1, −3, 5, 3, −7, −3}, {1, −7, −5, 5, −3, 1}, {1, −5, 5, −5, −1, −1}, {1, 3, −3, 1, −7, 1}, {1, −1, 7, 3, 7, −5}, or {1, 1, 5, −3, 7, −7}; or

{1, −5, 3, 3, 5, −3}, {1, −1, 3, −5, 5, −1}, {1, 5, 1, 1, −5, −1}, {1, −1, 1, −5, −3, 7}, {1, −5, 3, 3, 7, −1}, {1, −1, 7, 3, 7, −5}, {1, −7, −7, −3, −1, 7}, {1, 5, 5, −3, 7, −1}, {1, −5, 5, 3, 7, −7}, {1, 1, 5, −3, 7, −7}, {1, 5, −5, 5, −1, −1}, {1, −1, 3, 5, −1, −7}, {1, −7, 3, 7, −1, −1}, {1, 3, −5, 5, 1, −3}, {1, −7, 3, 3, −5, −1}, {1, 1, −3, 1, 3, 7}, {1, −5, 1, 5, 7, 7}, {1, −1, −7, 3, −5, −3}, {1, 1, −7, 3, 7, −1}, {1, 5, −1, 1, 1, −7}, {1, 7, −7, −3, 7, 7}, {1, −7, −7, −3, 7, −7}, {1, 5, 7, 1, 1, −5}, {1, 1, 3, 7, −1, −7}, {1, 5, 5, −3, 5, 7}, {1, −5, 3, 7, −7, 1}, {1, −1, 1, −7, 3, −3}, {1, −5, 3, 5, −7, 5}, {1, −3, 5, 3, −7, −3}, {1, −1, 5, 1, −7, −3}, {1, 1, −5, −1, 7, −1}, {1, −7, −5, 5, −3, 1}, {1, −5, 1, 3, 7, 7}, {1, 3, −3, 7, −1, 3}, {1, −7, −5, −7, −3, 7}, {1, 5, 7, −3, 7, 7}, {1, −7, 3, −3, −1, 3}, {1, 3, −5, 3, 7, 1}, {1, −7, 3, 1, −5, −1}, {1, 1, −5, 3, 5, −7}, {1, 5, −7, 1, −3, 3}, {1, −1, 3, 7, −3, −7}, {1, 3, −7, 3, −3, −3}, {1, −1, −7, 1, 3, 7}, {1, 1, 3, 7, 1, −7}, {1, 3, −5, −1, −1, 7}, {1, −5, −3, −5, 5, −1}, {1, −7, −5, −5, −1, 7}, {1, 1, −7, −5, −1, 7}, {1, 5, −7, 7, −1, −5}, {1, 7, 1, 1, −5, −3}, {1, 5, 7, 7, −1, 7}, {1, −7, 3, −5, −1, 1}, {1, −5, 5, −5, −1, −1}, {1, 7, 1, −5, −3, −3}, {1, 3, −3, 1, −7, 1}, {1, 1, 3, −5, 5, −3}, or {1, 3, 3, −5, −1, −7}.

According to a seventh aspect, a sequence-based signal processing method is provided. The method includes:

determining a sequence $\{x_n\}$, where $x_n$ is an element in the sequence $\{x_n\}$, the sequence $\{x_n\}$ is a sequence satisfying a preset condition, and the preset condition is:

the preset condition is $x_n = y_{(n+M) \bmod K}$, where $$y_n = A \cdot e^{\frac{j \times \pi \times s_n}{8}},$$

M∈{0, 1, 2, . . . , 5}, K=6, A is a non-zero complex number, $j=\sqrt{-1}$, and a set of a sequence $\{s_n\}$ including an element $s_n$ includes at least one of sequences in a first sequence set, where the sequences in the first sequence set include:

{1, 1, 3, −7, 5, −3}, {1, 1, 5, −7, 3, 5}, {1, 1, 5, −5, −3, 7}, {1, 1, −7, −5, 5, −7}, {1, 1, −7, −3, 7, −7}, {1, 3, 1, 7, −1, −5}, {1, 3, 1, −7, −3, 7}, {1, 3, 1, −7, −1, −5}, {1, 3, 3, 7, −1, −5}, {1, 5, 1, 1, −5, −3}, {1, 5, 1, 3, −5, 5}, {1, 5, 1, 3, −5, −7}, {1, 5, 1, 3, −3, 1}, {1, 5, 1, 3, −1, −7}, {1, 5, 1, 5, 3, −7}, {1, 5, 1, 5, 3, −5}, {1, 5, 1, 5, 7, 7}, {1, 5, 1, 5, −5, 3}, {1, 5, 1, 5, −3, 3}, {1, 5, 1, 5, −1, 3}, {1, 5, 1, 5, −1,

−1}, {1, 5, 1, 7, 3, −3}, {1, 5, 1, 7, −5, 5}, {1, 5, 1, −5, 3, 5}, {1, 5, 1, −5, −7, −1}, {1, 5, 1, −5, −5, −3}, {1, 5, 1, −5, −3, 1}, {1, 5, 1, −5, −1, 1}, {1, 5, 1, −5, −1, 5}, {1, 5, 1, −5, −1, −1}, {1, 5, 1, −3, 1, 7}, {1, 5, 1, −3, 1, −5}, {1, 5, 1, −3, 7, −7}, {1, 5, 1, −3, 7, −5}, {1, 5, 1, −3, −5, −1}, {1, 5, 1, −1, 3, −5}, {1, 5, 1, −1, 5, −7}, {1, 5, 1, −1, −7, −3}, {1, 5, 1, −1, −5, −3}, {1, 5, 3, −3, −7, −5}, {1, 5, 3, −3, −7, −1}, {1, 5, 3, −3, −1, −7}, {1, 5, 3, −1, 5, −7}, {1, 5, 3, −1, −5, −3}, {1, 5, 5, 1, 3, −3}, {1, 5, 5, −1, −7, −5}, {1, 7, 1, 1, 1, −5}, {1, 7, 1, 1, −7, −7}, {1, 7, 1, 1, −5, −5}, {1, 7, 1, 3, −7, 7}, {1, 7, 1, 3, −3, 3}, {1, 7, 1, −7, 1, 1}, {1, 7, 1, −7, −7, −7}, {1, 7, 1, −5, 1, 1}, {1, 7, 1, −5, −5, 1}, {1, 7, 1, −5, −3, 1}, {1, 7, 1, −5, −1, 1}, {1, 7, 1, −5, −1, −1}, {1, 7, 1, −1, 5, 7}, {1, 7, 3, 1, 5, −3}, {1, 7, 3, 1, −5, −5}, {1, 7, 3, 5, −5, −7}, {1, 7, 3, −7, 7, −1}, {1, 7, 3, −7, −5, 3}, {1, 7, 3, −5, −7, −1}, {1, 7, 3, −3, −5, 1}, {1, 7, 3, −3, −5, −1}, {1, 7, 3, −3, −3, −3}, {1, 7, 3, −1, −5, −3}, {1, 7, 5, 1, −5, −5}, {1, 7, 5, 1, −5, −3}, {1, 7, 5, −5, 3, −1}, {1, 7, 5, −5, −3, −7}, {1, 7, 5, −3, −7, 1}, {1, 7, 5, −1, −5, −5}, {1, 7, 5, −1, −5, −3}, {1, −7, 1, −5, 1, 1}, {1, −7, 3, 3, −5, −5}, {1, −7, 3, 5, −1, −3}, {1, −7, 3, −5, 1, 1}, {1, −7, 3, −5, −5, 1}, {1, −7, 3, −5, −5, −5}, {1, −7, 5, −3, −5, 1}, {1, −5, 1, 1, 3, 7}, {1, −5, 1, 1, 5, 7}, {1, −5, 1, 1, 7, 7}, {1, −5, 1, 3, 3, 7}, {1, −5, 1, 7, 5, −1}, {1, −5, 1, 7, 7, 1}, {1, −5, 1, −7, −7, 1}, {1, −5, 1, −7, −7, −7}, {1, −5, 3, −7, −7, 1}, {1, −5, 5, 3, −5, −3}, {1, −5, 5, 3, −5, −1}, {1, −5, 5, 5, −5, −3}, {1, −5, 5, 5, −5, −1}, {1, −5, 5, 7, −5, 1}, {1, −5, 5, 7, −5, 3}, {1, −5, 5, −7, −5, 1}, {1, −5, 5, −7, −5, 3}, {1, −5, 7, 3, 5, −3}, {1, −5, −7, 3, 5, −3}, {1, −5, −7, 3, 5, −1}, {1, −5, −7, 3, 7, −1}, {1, −3, 1, 1, 3, 7}, {1, −3, 1, 1, 5, 7}, {1, −3, 1, 1, 5, −1}, {1, −3, 1, 3, 3, 7}, {1, −3, 1, 3, −7, 7}, {1, −3, 1, 5, 7, 1}, {1, −3, 1, 5, 7, 3}, {1, −3, 1, 5, 7, 7}, {1, −3, 1, 5, −7, 3}, {1, −3, 1, 7, −5, 5}, {1, −3, 1, 7, −1, 3}, {1, −3, 1, −7, 3, −1}, {1, −3, 1, −7, 7, −1}, {1, −3, 1, −7, −5, 5}, {1, −3, 1, −7, −3, 3}, {1, −3, 1, −5, 7, −1}, {1, −3, 3, 3, −7, 7}, {1, −3, 3, 5, −5, −7}, {1, −3, 3, 7, 7, 7}, {1, −3, 3, 7, −7, 5}, {1, −3, 3, −7, −7, 3}, {1, −3, 3, −5, −7, −1}, {1, −3, 7, −5, 3, 5}, {1, −1, 1, 7, 3, −7}, {1, −1, 1, 7, 3, −5}, {1, −1, 1, −5, 5, −7}, {1, −1, 3, −7, −5, 7}, {1, −1, 5, −7, −5, 5}, {1, −1, 5, −7, −5, 7}, {1, −1, 5, −5, −5, 5}, and {1, −1, 5, −5, −5, 7};

{1, 1, 5, −7, 3, 7}, {1, 1, 5, −7, 3, −3}, {1, 1, 5, −1, 3, 7}, {1, 1, 5, −1, −7, −3}, {1, 3, 1, 7, −1, −7}, {1, 3, 1, −7, 1, −5}, {1, 3, 1, −7, 3, −5}, {1, 3, 1, −7, −1, −7}, {1, 3, 1, −5, 1, −7}, {1, 3, 1, −5, 3, −7}, {1, 3, 5, −7, 3, 7}, {1, 3, 5, −1, 3, 7}, {1, 3, 5, −1, 3, −3}, {1, 3, 5, −1, −5, 7}, {1, 3, 7, 1, 5, 7}, {1, 3, 7, −7, 3, 7}, {1, 3, 7, −5, 5, 7}, {1, 5, 1, 1, 5, −7}, {1, 5, 1, 1, 5, −3}, {1, 5, 1, 5, 5, −7}, {1, 5, 1, 5, 5, −3}, {1, 5, 1, 5, −7, 1}, {1, 5, 1, 5, −7, −7}, {1, 5, 1, 5, −3, 1}, {1, 5, 1, 5, −3, −3}, {1, 5, 1, 5, −1, 3}, {1, 5, 1, 7, −3, −5}, {1, 5, 1, −7, 1, −3}, {1, 5, 1, −7, −3, 5}, {1, 5, 1, −5, 5, 7}, {1, 5, 1, −5, −3, 7}, {1, 5, 1, −3, 1, −7}, {1, 5, 1, −3, 5, −7}, {1, 5, 1, −3, 7, −7}, {1, 5, 1, −3, 7, −5}, {1, 5, 1, −3, −5, −1}, {1, 5, 3, 1, 5, −7}, {1, 5, 3, 1, 5, −3}, {1, 5, 3, 7, −3, −5}, {1, 5, 3, 7, −1, 3}, {1, 5, 3, −7, −3, 7}, {1, 5, 3, −3, 7, −5}, {1, 5, 3, −1, −5, −3}, {1, 5, 5, −1, 3, 7}, {1, 5, 5, −1, 3, −3}, {1, 5, 7, 1, 3, −3}, {1, 5, −7, −3, 7, 7}, {1, 7, 1, 1, 3, −5}, {1, 7, 1, 1, −7, −5}, {1, 7, 1, 1, −1, −7}, {1, 7, 1, 3, −7, −7}, {1, 7, 1, 3, −5, −7}, {1, 7, 1, 3, −5, −5}, {1, 7, 1, 3, −1, −5}, {1, 7, 1, 5, −1, −3}, {1, 7, 1, 7, −7, −7}, {1, 7, 1, 7, −1, −1}, {1, 7, 1, −7, 1, −1}, {1, 7, 1, −7, −5, −5}, {1, 7, 1, −7, −1, 1}, {1, 7, 1, −7, −1, −1}, {1, 7, 1, −5, −7, 1}, {1, 7, 1, −5, −7, −3}, {1, 7, 1, −5, −5, 3}, {1, 7, 1, −5, −1, 3}, {1, 7, 1, −5, −1, −3}, {1, 7, 1, −3, −7, −5}, {1, 7, 1, −3, −7, −1}, {1, 7, 1, −3, −1, 5}, {1, 7, 1, −1, 1, −7}, {1, 7, 1, −1, 7, −7}, {1, 7, 1, −1, −7, −3}, {1, 7, 3, 1, 7, −5}, {1, 7, 3, 1, 7, −3}, {1, 7, 3, 5, −1, −5}, {1, 7, 3, −7, 7, −3}, {1, 7, 3, −7, −3, 3}, {1, 7, 3, −7, −1, −3}, {1, 7, 3, −3, −7, −5}, {1, 7, 3, −3, −7, −1}, {1, 7, 3, −3, −1, −5}, {1, 7, 3, −1, −7, −5}, {1, 7, 5, −1, 3, −3}, {1, 7, 5, −1, −7, −7}, {1, 7, 5, −1, −7, −3}, {1, −7, 1, 3, −3, 3}, {1, −7, 1, −7, 1, 1}, {1, −7, 3, 1, 7, −1}, {1, −7, 3, 1, −7, −5}, {1, −7, 3, 1, −7, −1}, {1, −7, 3, 3, −3, −5}, {1, −7, 3, 5, −3, −5}, {1, −7, 3, −5, −7, −1}, {1, −7, 3, −5, −3, 3}, {1, −7, 3, −3, −3, 3}, {1, −7, 5, 1, −7, −3}, {1, −5, 1, 1, 3, −7}, {1, −5, 1, 1, −7, 7}, {1, −5, 1, 3, 3, −7}, {1, −5, 1, 3, −7, 5}, {1, −5, 1, 5, 3, 7}, {1, −5, 1, 5, 3, −3}, {1, −5, 1, 5, −7, 3}, {1, −5, 1, 5, −7, 7}, {1, −5, 1, 7, 3, −1}, {1, −5, 1, 7, 5, −1}, {1, −5, 1, 7, 7, −7}, {1, −5, 1, 7, 7, −1}, {1, −5, 1, 7, −7, 1}, {1, −5, 1, 7, −7, 5}, {1, −5, 1, 7, −1, 1}, {1, −5, 1, −7, 3, 1}, {1, −5, 1, −7, 7, −7}, {1, −5, 1, −7, 7, −1}, {1, −5, 1, −7, −7, −1}, {1, −5, 1, −7, −5, 3}, {1, −5, 1, −3, 3, 5}, {1, −5, 1, −1, 3, 7}, {1, −5, 1, −1, 7, 7}, {1, −5, 3, 1, 7, 7}, {1, −5, 3, 5, −5, 3}, {1, −5, 3, 5, −3, 3}, {1, −5, 3, −7, 7, 1}, {1, −5, 3, −7, 7, −1}, {1, −5, 3, −7, −5, 3}, {1, −5, 5, 1, 3, 7}, {1, −5, 5, 1, −5, −3}, {1, −5, 5, 3, −7, 1}, {1, −5, 5, 3, −7, −3}, {1, −5, 5, 7, 3, −3}, {1, −5, 5, −7, −5, 5}, {1, −5, 5, −1, 3, 5}, {1, −5, 7, 1, 3, −3}, {1, −5, 7, 1, 3, −1}, {1, −5, 7, 1, 5, −1}, {1, −5, −7, 3, 3, −3}, {1, −5, −7, 3, 7, 1}, {1, −5, −7, 3, 7, −3}, {1, −3, 1, 5, −3, 1}, {1, −3, 1, 7, 5, −5}, {1, −3, 1, 7, −5, 5}, {1, −3, 1, −7, −5, 5}, {1, −3, 1, −7, −3, 1}, {1, −3, 1, −7, −3, 5}, {1, −3, 1, −5, −3, 7}, {1, −3, 3, 7, −3, 3}, {1, −3, 3, −7, −5, 5}, {1, −3, 3, −7, −5, 7}, {1, −3, 3, −7, −3, 3}, {1, −1, 1, 7, −1, −7}, {1, −1, 1, −7, 3, −5}, {1, −1, 1, −7, −1, 7}, {1, −1, 3, −7, −3, 7}, {1, −1, 3, −3, 7, −5}, and {1, −1, 5, −7, 3, 7};

{1, 1, 5, −5, 3, −3}, {1, 1, 7, −5, 7, −1}, {1, 1, 7, −1, 3, −1}, {1, 1, −5, 3, −1, 3}, {1, 1, −5, 7, −5, 3}, {1, 1, −3, 7, −1, 5}, {1, 3, 7, −5, 3, −3}, {1, 3, −1, −7, 1, 5}, {1, 5, 1, −7, 3, 3}, {1, 5, 1, −5, −5, 1}, {1, 5, 3, −1, −5, 3}, {1, 5, 5, 1, −5, 3}, {1, 5, 7, 3, −3, 5}, {1, 5, −7, 1, −5, 7}, {1, 5, −7, −5, 7, 1}, {1, 5, −5, 3, −3, −7}, {1, 5, −5, 3, −1, −5}, {1, 5, −5, −5, 5, −3}, {1, 5, −3, 3, 3, −3}, {1, 5, −3, 7, 3, 5}, {1, 7, 7, 1, −7, 5}, {1, 7, 7, 1, −3, 1}, {1, 7, −5, 7, −1, −7}, {1, 7, −5, −7, 5, 1}, {1, 7, −5, −5, 7, 1}, {1, 7, −1, 3, −1, −7}, {1, 7, −1, −7, 5, 5}, {1, 7, −1, −5, 7, 5}, {1, −7, 3, 3, −7, −3}, {1, −7, 3, −1, 1, 5}, {1, −7, 5, 1, −1, 3}, {1, −7, 5, −7, −1, −1}, {1, −7, −3, 1, 3, −1}, {1, −7, −3, −7, 3, 3}, {1, −7, −1, 3, 3, −1}, {1, −7, −1, −1, −7, 5}, {1, −5, 3, 7, −5, −3}, {1, −5, 3, −1, 3, −7}, {1, −5, 7, 7, −5, 1}, {1, −5, 7, −7, −3, 1}, {1, −5, 7, −5, 3, −7}, {1, −5, −5, 1, 5, 1}, {1, −5, −5, 1, −7, −3}, {1, −3, 1, 7, 7, 1}, {1, −3, 1, −7, −1, −1}, {1, −3, 5, −5, −1, −3}, {1, −3, 5, −1, −1, 5}, {1, −3, 7, 7, −3, 5}, {1, −3, 7, −1, 3, 7}, {1, −3, 7, −1, 5, −7}, {1, −3, −7, 1, 7, −5}, {1, −3, −7, 7, −5, 1}, {1, −3, −3, 1, 7, −1}, {1, −3, −1, 3, 7, −1}, {1, −1, 3, −7, 1, −3}, and {1, −1, −5, 7, −1, 5};

{1, 3, 7, −5, 1, −3}, {1, 3, −7, 5, 1, 5}, {1, 3, −7, −3, 1, −3}, {1, 3, −1, −5, 1, 5}, {1, 5, 1, −3, 3, 5}, {1, 5, 1, −3, 7, 5}, {1, 5, 1, −3, −5, 5}, {1, 5, 1, −3, −1, 5}, {1, 5, 3, −3, −7, 5}, {1, 5, 7, 3, −1, 5}, {1, 5, 7, −3, −7, 5}, {1, 5, −7, 3, 1, −3}, {1, 5, −7, 5, 1, 7}, {1, 5, −7, 7, 3, −1}, {1, 5, −7, −5, 1, −3}, {1, 5, −7, −1, 1, −3}, {1, 5, −5, 7, 3, 5}, {1, 5, −5, −3, −7, 5}, {1, 5, −1, −5, 7, 5}, {1, 5, −1, −3, −7, 5}, {1, 7, 3, −1, 3, 7}, {1, 7, −7, 5, 1, 5}, {1, 7, −7, −3, 1, −3}, {1, 7, −5, −1, 1, −3}, {1, −5, 7, 3, 1, 5}, {1, −5, −7, 5, 1, 5}, {1, −3, 1, 5, 7, −3}, {1, −3, 1, 5, −5, −3}, {1, −3, 3, 5, −7, −3}, {1, −3, −7, 3, 1, 5}, {1, −3, −7, 7, 1, 5}, {1, −3, −7, −5, 1, 5}, {1, −3, −7, −3, 1, −1}, {1, −3, −7, −1, 1, 5}, {1, −3, −5, 5, −7, −3}, {1, −3, −1, 3, 7, −3}, {1, −3, −1, 5, −7, −3}, {1, −1, 3, 7, 3, −1}, {1, −1, −7, 5, 1, 5}, and {1, −1, −5, 7, 1, 5};

{1, 3, −3, 1, 3, −3}, {1, 3, −3, 1, −5, −1}, {1, 3, −3, −7, 3, 7}, {1, 3, −3, −7, −5, 5}, {1, 3, −3, −1, 3, −3}, {1, 5, −1, −7, 3, 7}, {1, 7, 3, 1, 5, −1}, {1, 7, 3, 1, 7, 5}, {1, 7, 3, 1, −5, −1}, {1, 7, 3, 1, −3, 3}, {1, 7, 3, 5, −7, 3}, {1, 7, 3, 5, −1, 3}, {1, 7, 3, 7, 1, 3}, {1, 7, 3, −7, 3, 7}, {1, 7, 3, −7, 5, −5}, {1, 7, 3, −7, 7, −3}, {1, 7, 3, −7, −3, 7}, {1, 7, 3, −7,

−1, −3}, {1, 7, 3, −3, 1, −5}, {1, 7, 3, −3, 7, −5}, {1, 7, 3, −1, −7, −5}, {1, 7, 5, 1, 7, 5}, {1, 7, 5, −7, −1, −3}, {1, 7, 5, −1, −7, −3}, {1, −5, −3, 1, −5, −3}, {1, −5, −3, 7, −5, 5}, {1, −5, −3, −7, 3, 5}, {1, −5, −3, −7, 3, 7}, {1, −5, −3, −1, 3, −3}, {1, −3, 3, 1, 3, −3}, {1, −3, 3, 1, 5, −1}, {1, −3, 3, 1, −5, −1}, {1, −3, 3, 5, −7, 3}, {1, −3, 3, 5, −1, 3}, {1, −3, 3, 7, −3, −5}, {1, −3, 3, −7, 3, 7}, {1, −3, 3, −7, −5, 5}, {1, −3, 3, −7, −3, 7}, {1, −3, 3, −3, 7, −5}, {1, −3, 3, −1, 5, 3}, {1, −1, 5, 1, −1, 5}, {1, −1, 5, −7, 7, −3}, and {1, −1, 5, −7, −3, 7};

{1, 1, 3, 5, −3, 7}, {1, 1, 3, −7, −1, 7}, {1, 1, 3, −5, 5, −1}, {1, 1, 3, −3, 7, −1}, {1, 1, 5, 7, −5, 5}, {1, 3, 1, −7, 3, −5}, {1, 3, 1, −5, 3, −5}, {1, 3, 1, −5, 5, −3}, {1, 3, 1, −5, 5, −1}, {1, 3, 3, −3, 5, −5}, {1, 3, 3, −3, 7, −1}, {1, 3, 5, 1, −5, 5}, {1, 3, 5, 1, −5, 7}, {1, 3, 5, 7, 3, −3}, {1, 3, 5, −7, −3, 7}, {1, 3, 5, −1, −7, 7}, {1, 3, 5, −1, −7, −3}, {1, 3, 5, −1, −3, 7}, {1, 5, 1, 3, −5, −7}, {1, 5, 1, 5, 5, −3}, {1, 5, 1, 5, −7, 1}, {1, 5, 1, 5, −7, −7}, {1, 5, 1, 5, −3, −3}, {1, 5, 1, 7, 3, −3}, {1, 5, 1, 7, 5, −5}, {1, 5, 1, 7, 5, −3}, {1, 5, 1, −7, 5, −3}, {1, 5, 1, −7, 7, −5}, {1, 5, 1, −3, 3, −3}, {1, 5, 1, −3, 5, −3}, {1, 5, 3, −5, 5, 7}, {1, 5, 3, −3, 7, 7}, {1, 5, 3, −3, 7, −5}, {1, 5, 3, −3, −3, 7}, {1, 5, 3, −1, 7, −5}, {1, 5, 3, −1, −7, −3}, {1, 5, 5, 1, −5, −1}, {1, 7, 1, 3, −7, 7}, {1, 7, 1, 3, −7, −7}, {1, 7, 1, 3, −5, −7}, {1, 7, 1, 3, −3, 3}, {1, 7, 1, 5, −7, 7}, {1, 7, 1, 7, 7, −1}, {1, 7, 1, 7, −7, 1}, {1, 7, 1, −7, −7, −5}, {1, 7, 1, −7, −5, 3}, {1, 7, 1, −5, −7, −3}, {1, 7, 1, −3, 3, 5}, {1, 7, 1, −3, 3, −1}, {1, 7, 1, −1, 3, 7}, {1, 7, 1, −1, 5, 7}, {1, 7, 3, 5, −3, 3}, {1, −7, 1, 1, 5, 7}, {1, −7, 1, 1, 7, 7}, {1, −7, 1, 3, 7, 7}, {1, −7, 1, 3, −7, 7}, {1, −7, 1, 3, −3, −5}, {1, −7, 1, 5, 7, 7}, {1, −7, 1, 7, 5, −1}, {1, −7, 1, −5, −7, −5}, {1, −7, 1, −5, −7, −1}, {1, −7, 1, −5, −5, 1}, {1, −7, 1, −5, −5, −3}, {1, −7, 1, −5, −5, −1}, {1, −7, 1, −5, −3, 1}, {1, −7, 1, −5, −3, 3}, {1, −7, 1, −3, −7, −3}, {1, −7, 1, −1, 5, 7}, {1, −7, 3, 3, −7, −5}, {1, −7, 3, 3, −5, −5}, {1, −7, 3, 5, −5, −5}, {1, −7, 3, 5, −3, 3}, {1, −7, 3, 5, −3, −5}, {1, −7, 3, 5, −3, −1}, {1, −7, 3, 7, 7, −1}, {1, −7, 3, −5, −3, −1}, {1, −7, 3, −1, −5, −3}, {1, −5, 1, 3, 5, 7}, {1, −5, 1, 3, −1, 5}, {1, −5, 1, 5, −7, 7}, {1, −5, 1, 7, −7, −7}, {1, −5, 1, −7, 7, −1}, {1, −5, 1, −7, −7, −1}, {1, −5, 1, −3, −7, −3}, {1, −5, 1, −3, −1, 5}, {1, −5, 1, −1, 7, −7}, {1, −5, 3, 1, 5, −1}, {1, −5, 3, 1, 7, −1}, {1, −5, 3, 5, 7, −1}, {1, −5, 3, 5, −3, −3}, {1, −5, 3, 7, −7, 5}, {1, −5, 3, −7, 7, −1}, {1, −5, 3, −7, −7, 1}, {1, −5, 3, −7, −7, −1}, {1, −5, 3, −7, −5, 1}, {1, −5, 5, 1, 3, 7}, {1, −5, 5, 1, −5, −3}, {1, −5, 5, 7, −5, −3}, {1, −5, 5, −7, −5, 5}, {1, −5, 5, −7, −5, −1}, {1, −5, 5, −1, 3, 5}, {1, −3, 1, 5, −3, −7}, {1, −3, 1, 5, −3, −5}, {1, −3, 1, 7, −5, −7}, {1, −3, 1, 7, −3, −5}, {1, −3, 1, −7, 7, −1}, {1, −3, 3, 1, 7, −1}, {1, −1, 1, 3, −3, 7}, {1, −1, 1, 5, −3, 7}, {1, −1, 1, 7, −1, −7}, {1, −1, 3, 7, −5, 5}, {1, −1, 3, −7, −3, 5}, {1, −1, 3, −7, −3, 7}, {1, −1, 3, −3, 7, 7}, and {1, −1, 3, −3, −3, 7};

{1, 1, 3, 5, −3, 7}, {1, 1, 3, −7, −1, 7}, {1, 1, 3, −5, 5, −1}, {1, 1, 3, −3, 7, −1}, {1, 1, 5, 7, −5, 5}, {1, 3, 1, −7, 3, −5}, {1, 3, 1, −5, 3, −5}, {1, 3, 1, −5, 5, −3}, {1, 3, 1, −5, 5, −1}, {1, 3, 3, −3, 5, −5}, {1, 3, 3, −3, 7, −1}, {1, 3, 5, 1, −5, 5}, {1, 3, 5, 1, −5, 7}, {1, 3, 5, 7, 3, −3}, {1, 3, 5, −7, −3, 7}, {1, 3, 5, −1, −7, 7}, {1, 3, 5, −1, −7, −3}, {1, 3, 5, −1, −3, 7}, {1, 5, 1, 3, −5, −7}, {1, 5, 1, 5, 5, −3}, {1, 5, 1, 5, −7, 1}, {1, 5, 1, 5, −7, −7}, {1, 5, 1, 5, −3, −3}, {1, 5, 1, 7, 3, −3}, {1, 5, 1, 7, 5, −5}, {1, 5, 1, 7, 5, −3}, {1, 5, 1, −7, 5, −3}, {1, 5, 1, −7, 7, −5}, {1, 5, 1, −3, 3, −3}, {1, 5, 1, −3, 5, −3}, {1, 5, 3, −5, 5, 7}, {1, 5, 3, −3, 7, 7}, {1, 5, 3, −3, 7, −5}, {1, 5, 3, −3, −3, 7}, {1, 5, 3, −1, 7, −5}, {1, 5, 3, −1, −7, −3}, {1, 5, 5, 1, −5, −1}, {1, 7, 1, 3, −7, 7}, {1, 7, 1, 3, −7, −7}, {1, 7, 1, 3, −5, −7}, {1, 7, 1, 3, −3, 3}, {1, 7, 1, 5, −7, 7}, {1, 7, 1, 7, 7, −1}, {1, 7, 1, 7, −7, 1}, {1, 7, 1, −7, −7, −5}, {1, 7, 1, −7, −5, 3}, {1, 7, 1, −5, −7, −3}, {1, 7, 1, −3, 3, 5}, {1, 7, 1, −3, 3, −1}, {1, 7, 1, −1, 3, 7}, {1, 7, 1, −1, 5, 7}, {1, 7, 3, 5, −3, 3}, {1, −7, 1, 1, 5, 7}, {1, −7, 1, 1, 7, 7}, {1, −7, 1, 3, 7, 7}, {1, −7, 1, 3, −7, 7}, {1, −7, 1, 3, −3, −5}, {1, −7, 1, 5, 7, 7}, {1, −7, 1, 7, 5, −1}, {1, −7, 1, −5, −7, −5}, {1, −7, 1, −5, −7, −1}, {1, −7, 1, −5, −5, 1}, {1, −7, 1, −5, −5, −3}, {1, −7, 1, −5, −5, −1}, {1, −7, 1, −5, −3, 1}, {1, −7, 1, −5, −3, 3}, {1, −7, 1, −3, −7, −3}, {1, −7, 1, −1, 5, 7}, {1, −7, 3, 3, −7, −5}, {1, −7, 3, 3, −5, −5}, {1, −7, 3, 5, −5, −5}, {1, −7, 3, 5, −3, 3}, {1, −7, 3, 5, −3, −5}, {1, −7, 3, 5, −3, −1}, {1, −7, 3, 7, 7, −1}, {1, −7, 3, −5, −3, −1}, {1, −7, 3, −1, −5, −3}, {1, −5, 1, 3, 5, 7}, {1, −5, 1, 3, −1, 5}, {1, −5, 1, 5, −7, 7}, {1, −5, 1, 7, −7, −7}, {1, −5, 1, −7, 7, −1}, {1, −5, 1, −7, −7, −1}, {1, −5, 1, −3, −7, −3}, {1, −5, 1, −3, −1, 5}, {1, −5, 1, −1, 7, −7}, {1, −5, 3, 1, 5, −1}, {1, −5, 3, 1, 7, −1}, {1, −5, 3, 5, 7, −1}, {1, −5, 3, 5, −3, −3}, {1, −5, 3, 7, −7, 5}, {1, −5, 3, −7, 7, −1}, {1, −5, 3, −7, −7, 1}, {1, −5, 3, −7, −7, −1}, {1, −5, 3, −7, −5, 1}, {1, −5, 5, 1, 3, 7}, {1, −5, 5, 1, −5, −3}, {1, −5, 5, 7, −5, −3}, {1, −5, 5, −7, −5, 5}, {1, −5, 5, −7, −5, −1}, {1, −5, 5, −1, 3, 5}, {1, −3, 1, 5, −3, −7}, {1, −3, 1, 5, −3, −5}, {1, −3, 1, 7, −5, −7}, {1, −3, 1, 7, −3, −5}, {1, −3, 1, −7, 7, −1}, {1, −3, 3, 1, 7, −1}, {1, −1, 1, 3, −3, 7}, {1, −1, 1, 5, −3, 7}, {1, −1, 1, 7, −1, −7}, {1, −1, 3, 7, −5, 5}, {1, −1, 3, −7, −3, 5}, {1, −1, 3, −7, −3, 7}, {1, −1, 3, −3, 7, 7}, and {1, −1, 3, −3, −3, 7}; or {1, 1, −7, 5, −1, 1}, {1, 1, −7, 7, −3, 1}, {1, 1, −7, −5, 5, 1}, {1, 1, −7, −3, 3, 1}, {1, 1, −7, −3, −5, 1}, {1, 1, −7, −1, −3, 1}, {1, 3, 7, 1, 5, 1}, {1, 3, −5, 3, 5, 1}, {1, 3, −5, 3, 5, −3}, {1, 3, −5, 7, −7, 1}, {1, 3, −5, 7, −5, 5}, {1, 3, −5, 7, −1, 1}, {1, 3, −5, −5, 3, −1}, {1, 3, −5, −3, 5, 1}, {1, 3, −3, 1, −5, −1}, {1, 3, −3, −7, 1, 1}, {1, 3, −1, 7, −7, 1}, {1, 5, 1, −7, −5, −1}, {1, 5, 3, −7, 1, 1}, {1, 5, 7, −1, −5, −1}, {1, 5, −5, −7, 1, 1}, {1, 5, −3, −5, 3, 1}, {1, 5, −1, 3, 5, −3}, {1, 5, −1, 3, −3, −1}, {1, 5, −1, 3, −1, 7}, {1, 7, 5, −7, 1, 1}, {1, 7, 5, −3, −3, 5}, {1, 7, −5, 3, 3, −5}, {1, −7, 1, 3, −5, 7}, {1, −7, 1, 3, −1, 7}, {1, −7, 5, 7, −1, 7}, {1, −7, 5, −7, 3, 7}, {1, −7, 5, −3, −1, 7}, {1, −7, 5, −1, 1, −7}, {1, −7, 7, −3, 1, −7}, {1, −7, 7, −1, 3, −5}, {1, −7, 7, −1, −3, 5}, {1, −7, −7, 1, 3, −3}, {1, −7, −7, 1, 5, −5}, {1, −7, −7, 1, 7, 5}, {1, −7, −7, 1, −3, 7}, {1, −7, −7, 1, −1, 5}, {1, −7, −5, 3, 5, −3}, {1, −7, −5, 3, −5, −3}, {1, −7, −5, 3, −1, 1}, {1, −7, −5, 3, −1, 7}, {1, −7, −5, 5, 1, −7}, {1, −7, −5, 7, −1, 1}, {1, −7, −5, −1, −7, −3}, {1, −7, −3, 3, 1, −7}, {1, −7, −3, 5, 3, −5}, {1, −7, −3, −5, 1, −7}, {1, −7, −1, −3, 1, −7}, {1, −5, 7, −1, −1, 7}, {1, −5, −3, 5, 5, −3}, {1, −5, −3, 7, −5, 5}, {1, −5, −1, −7, −5, 5}, {1, −5, −1, −7, −3, 7}, {1, −5, −1, −5, 3, 5}, {1, −3, 1, −5, −1, 1}, {1, −3, 5, 5, −3, −1}, {1, −3, 5, 7, −1, 1}, {1, −3, 5, 7, −1, 7}, {1, −3, 7, −7, 1, 1}, {1, −3, −1, 7, −1, 1}, {1, −1, 3, −5, −5, 3}, {1, −1, 5, −7, 1, 1}, {1, −1, 5, −3, −3, 5}, {1, −1, 7, 5, −3, 1}, {1, −1, 7, 7, −1, 3}, {1, −1, 7, −5, 3, 1};

generating a first signal based on the sequence $\{x_n\}$; and sending the first signal.

With reference to the seventh aspect, in a first implementation of the seventh aspect, the set of the sequence $\{s_n\}$ includes at least one of sequences in a second sequence set, and the second sequence set includes some sequences in the first sequence set.

With reference to the seventh aspect, in a second implementation of the seventh aspect, the generating a first signal based on the sequence $\{x_n\}$ includes:

performing discrete Fourier transform on N elements in the sequence $\{x_n\}$ to obtain a sequence $\{f_n\}$ including the N elements;

mapping the N elements in the sequence $\{f_n\}$ to N subcarriers respectively, to obtain a frequency-domain signal including the N elements; and generating the first signal based on the frequency-domain signal.

With reference to the seventh aspect, in a third implementation of the seventh aspect, the N subcarriers are N consecutive subcarriers or N equi-spaced subcarriers.

With reference to the seventh aspect, in a fourth implementation of the seventh aspect, before the performing discrete Fourier transform on N elements in the sequence $\{x_n\}$, the first signal processing method further includes: filtering the sequence $\{x_n\}$; or after the performing discrete Fourier transform on N elements in the sequence $\{x_n\}$, the first signal processing method further includes: filtering the sequence $\{x_n\}$.

With reference to the seventh aspect, in a fifth implementation of the seventh aspect, the first signal is a reference signal of a second signal, and a modulation scheme of the second signal is π/2 binary phase shift keying BPSK.

According to an eighth aspect, a sequence-based signal processing apparatus is provided. The apparatus includes:

a determining unit, configured to determine a sequence $\{x_n\}$, where $x_n$ is an element in the sequence $\{x_n\}$, the sequence $\{x_n\}$ is a sequence satisfying a preset condition, and the preset condition is:

the preset condition is $x_n = y_{(n+M) \bmod K}$, where $$y_n = A \cdot e^{\frac{j \times \pi \times s_n}{8}},$$

$M \in \{0, 1, 2, \ldots, 5\}$ $K=6$, A is a non-zero complex number, $j=\sqrt{-1}$, and a set of a sequence $\{s_n\}$ including an element $s_n$ includes at least one of sequences in a first sequence set, where the sequences in the first sequence set include:

{1, 1, 3, −7, 5, −3}, {1, 1, 5, −7, 3, 5}, {1, 1, 5, −5, −3, 7}, {1, 1, −7, −5, 5, −7}, {1, 1, −7, −3, 7, −7}, {1, 3, 1, 7, −1, −5}, {1, 3, 1, −7, −3, 7}, {1, 3, 1, −7, −1, −5}, {1, 3, 3, 7, −1, −5}, {1, 5, 1, 1, −5, −3}, {1, 5, 1, 3, −5, 5}, {1, 5, 1, 3, −5, −7}, {1, 5, 1, 3, −3, 1}, {1, 5, 1, 3, −1, −7}, {1, 5, 1, 5, 3, −7}, {1, 5, 1, 5, 3, −5}, {1, 5, 1, 5, 7, 7}, {1, 5, 1, 5, −5, 3}, {1, 5, 1, 5, −3, 3}, {1, 5, 1, 5, −1, 3}, {1, 5, 1, 5, −1, −1}, {1, 5, 1, 7, 3, −3}, {1, 5, 1, 7, −5, 5}, {1, 5, 1, −5, 3, 5}, {1, 5, 1, −5, −7, −1}, {1, 5, 1, −5, −5, −3}, {1, 5, 1, −5, −3, 1}, {1, 5, 1, −5, −1, 1}, {1, 5, 1, −5, −1, 5}, {1, 5, 1, −5, −1, −1}, {1, 5, 1, −3, 1, 7}, {1, 5, 1, −3, 1, −5}, {1, 5, 1, −3, 7, −7}, {1, 5, 1, −3, 7, −5}, {1, 5, 1, −3, −5, −1}, {1, 5, 1, −1, 3, −5}, {1, 5, 1, −1, 5, −7}, {1, 5, 1, −1, −7, −3}, {1, 5, 1, −1, −5, −3}, {1, 5, 3, −3, −7, −5}, {1, 5, 3, −3, −7, −1}, {1, 5, 3, −3, −1, −7}, {1, 5, 3, −1, 5, −7}, {1, 5, 3, −1, −5, −3}, {1, 5, 5, 1, 3, −3}, {1, 5, 5, −1, −7, −5}, {1, 7, 1, 1, 1, −5}, {1, 7, 1, 1, −7, −7}, {1, 7, 1, 1, −5, −5}, {1, 7, 1, 3, −7, 7}, {1, 7, 1, 3, −3, 3}, {1, 7, 1, −7, 1, 1}, {1, 7, 1, −7, −7, −7}, {1, 7, 1, −5, 1, 1}, {1, 7, 1, −5, −5, 1}, {1, 7, 1, −5, −3, 1}, {1, 7, 1, −5, −1, 1}, {1, 7, 1, −5, −1, −1}, {1, 7, 1, −1, 5, 7}, {1, 7, 3, 1, 5, −3}, {1, 7, 3, 1, −5, −5}, {1, 7, 3, 5, −5, −7}, {1, 7, 3, −7, 7, −1}, {1, 7, 3, −7, −5, 3}, {1, 7, 3, −5, −7, −1}, {1, 7, 3, −3, −5, 1}, {1, 7, 3, −3, −5, −1}, {1, 7, 3, −3, −3, −3}, {1, 7, 3, −1, −5, −3}, {1, 7, 5, 1, −5, −5}, {1, 7, 5, 1, −5, −3}, {1, 7, 5, −5, 3, −1}, {1, 7, 5, −5, −3, −7}, {1, 7, 5, −3, −7, 1}, {1, 7, 5, −1, −5, −5}, {1, 7, 5, −1, −5, −3}, {1, −7, 1, −5, 1, 1}, {1, −7, 3, 3, −5, −5}, {1, −7, 3, 5, −1, −3}, {1, −7, 3, −5, 1, 1}, {1, −7, 3, −5, −5, 1}, {1, −7, 3, −5, −5, −5}, {1, −7, 5, −3, −5, 1}, {1, −5, 1, 1, 3, 7}, {1, −5, 1, 1, 5, 7}, {1, −5, 1, 1, 7, 7}, {1, −5, 1, 3, 3, 7}, {1, −5, 1, 7, 5, −1}, {1, −5, 1, 7, 7, 1}, {1, −5, 1, −7, −7, 1}, {1, −5, 1, −7, −7, −7}, {1, −5, 3, −7, −7, 1}, {1, −5, 5, 3, −5, −3}, {1, −5, 5, 3, −5, −1}, {1, −5, 5, 5, −5, −3}, {1, −5, 5, 5, −5, −1}, {1, −5, 5, 7, −5, 1}, {1, −5, 5, 7, −5, 3}, {1, −5, 5, −7, −5, 1}, {1, −5, 5, −7, −5, 3}, {1, −5, 7, 3, 5, −3}, {1, −5, −7, 3, 5, −3}, {1, −5, −7, 3, 5, −1}, {1, −5, −7, 3, 7, −1}, {1, −3, 1, 1, 3, 7}, {1, −3, 1, 1, 5, 7}, {1, −3, 1, 1, 5, −1}, {1, −3, 1, 3, 3, 7}, {1, −3, 1, 3, −7, 7}, {1, −3, 1, 5, 7, 1}, {1, −3, 1, 5, 7, 3}, {1, −3, 1, 5, 7, 7}, {1, −3, 1, 5, −7, 3}, {1, −3, 1, 7, −5, 5}, {1, −3, 1, 7, −1, 3}, {1, −3, 1, −7, 3, −1}, {1, −3, 1, −7, 7, −1}, {1, −3, 1, −7, −5, 5}, {1, −3, 1, −7, −3, 3}, {1, −3, 1, −5, 7, −1}, {1, −3, 3, 3, −7, 7}, {1, −3, 3, 5, −5, −7}, {1, −3, 3, 7, 7, 7}, {1, −3, 3, 7, −7, 5}, {1, −3, 3, −7, −7, 3}, {1, −3, 3, −5, −7, −1}, {1, −3, 7, −5, 3, 5}, {1, −1, 1, 7, 3, −7}, {1, −1, 1, 7, 3, −5}, {1, −1, 1, −5, 5, −7}, {1, −1, 3, −7, −5, 7}, {1, −1, 5, −7, −5, 5}, {1, −1, 5, −7, −5, 7}, {1, −1, 5, −5, −5, 5}, and {1, −1, 5, −5, −5, 7};

{1, 1, 5, −7, 3, 7}, {1, 1, 5, −7, 3, −3}, {1, 1, 5, −1, 3, 7}, {1, 1, 5, −1, −7, −3}, {1, 3, 1, 7, −1, −7}, {1, 3, 1, −7, 1, −5}, {1, 3, 1, −7, 3, −5}, {1, 3, 1, −7, −1, −7}, {1, 3, 1, −5, 1, −7}, {1, 3, 1, −5, 3, −7}, {1, 3, 5, −7, 3, 7}, {1, 3, 5, −1, 3, 7}, {1, 3, 5, −1, 3, −3}, {1, 3, 5, −1, −5, 7}, {1, 3, 7, 1, 5, 7}, {1, 3, 7, −7, 3, 7}, {1, 3, 7, −5, 5, 7}, {1, 5, 1, 1, 5, −7}, {1, 5, 1, 1, 5, −3}, {1, 5, 1, 5, 5, −7}, {1, 5, 1, 5, 5, −3}, {1, 5, 1, 5, −7, 1}, {1, 5, 1, 5, −7, −7}, {1, 5, 1, 5, −3, 1}, {1, 5, 1, 5, −3, −3}, {1, 5, 1, 5, −1, 3}, {1, 5, 1, 7, −3, −5}, {1, 5, 1, −7, 1, −3}, {1, 5, 1, −7, −3, 5}, {1, 5, 1, −5, 5, 7}, {1, 5, 1, −5, −3, 7}, {1, 5, 1, −3, 1, −7}, {1, 5, 1, −3, 5, −7}, {1, 5, 1, −3, 7, −7}, {1, 5, 1, −3, 7, −5}, {1, 5, 1, −3, −5, −1}, {1, 5, 3, 1, 5, −7}, {1, 5, 3, 1, 5, −3}, {1, 5, 3, 7, −3, −5}, {1, 5, 3, 7, −1, 3}, {1, 5, 3, −7, −3, 7}, {1, 5, 3, −3, 7, −5}, {1, 5, 3, −1, −5, −3}, {1, 5, 5, −1, 3, 7}, {1, 5, 5, −1, 3, −3}, {1, 5, 7, 1, 3, −3}, {1, 5, −7, −3, 7, 7}, {1, 7, 1, 1, 3, −5}, {1, 7, 1, 1, −7, −5}, {1, 7, 1, 1, −1, −7}, {1, 7, 1, 3, −7, −7}, {1, 7, 1, 3, −5, −7}, {1, 7, 1, 3, −5, −5}, {1, 7, 1, 3, −1, −5}, {1, 7, 1, 5, −1, −3}, {1, 7, 1, 7, −7, −7}, {1, 7, 1, 7, −1, −1}, {1, 7, 1, −7, 1, −1}, {1, 7, 1, −7, −5, −5}, {1, 7, 1, −7, −1, 1}, {1, 7, 1, −7, −1, −1}, {1, 7, 1, −5, −7, 1}, {1, 7, 1, −5, −7, −3}, {1, 7, 1, −5, −5, 3}, {1, 7, 1, −5, −1, 3}, {1, 7, 1, −5, −1, −3}, {1, 7, 1, −3, −7, −5}, {1, 7, 1, −3, −7, −1}, {1, 7, 1, −3, −1, 5}, {1, 7, 1, −1, 1, −7}, {1, 7, 1, −1, 7, −7}, {1, 7, 1, −1, −7, −3}, {1, 7, 3, 1, 7, −5}, {1, 7, 3, 1, 7, −3}, {1, 7, 3, 5, −1, −5}, {1, 7, 3, −7, 7, −3}, {1, 7, 3, −7, −3, 3}, {1, 7, 3, −7, −1, −3}, {1, 7, 3, −3, −7, −5}, {1, 7, 3, −3, −7, −1}, {1, 7, 3, −3, −1, −5}, {1, 7, 3, −1, −7, −5}, {1, 7, 5, −1, 3, −3}, {1, 7, 5, −1, −7, −7}, {1, 7, 5, −1, −7, −3}, {1, −7, 1, 3, −3, 3}, {1, −7, 1, −7, 1, 1}, {1, −7, 3, 1, 7, −1}, {1, −7, 3, 1, −7, −5}, {1, −7, 3, 1, −7, −1}, {1, −7, 3, 3, −3, −5}, {1, −7, 3, 5, −3, −5}, {1, −7, 3, −5, −7, −1}, {1, −7, 3, −5, −3, 3}, {1, −7, 3, −3, −3, 3}, {1, −7, 5, 1, −7, −3}, {1, −5, 1, 1, 3, −7}, {1, −5, 1, 1, −7, 7}, {1, −5, 1, 3, 3, −7}, {1, −5, 1, 3, −7, 5}, {1, −5, 1, 5, 3, 7}, {1, −5, 1, 5, 3, −3}, {1, −5, 1, 5, −7, 3}, {1, −5, 1, 5, −7, 7}, {1, −5, 1, 7, 3, −1}, {1, −5, 1, 7, 5, −1}, {1, −5, 1, 7, 7, −7}, {1, −5, 1, 7, 7, −1}, {1, −5, 1, 7, −7, 1}, {1, −5, 1, 7, −7, 5}, {1, −5, 1, 7, −1, 1}, {1, −5, 1, −7, 3, 1}, {1, −5, 1, −7, 7, −7}, {1, −5, 1, −7, 7, −1}, {1, −5, 1, −7, −7, −1}, {1, −5, 1, −7, −5, 3}, {1, −5, 1, −3, 3, 5}, {1, −5, 1, −1, 3, 7}, {1, −5, 1, −1, 7, 7}, {1, −5, 3, 1, 7, 7}, {1, −5, 3, 5, −5, 3}, {1, −5, 3, 5, −3, 3}, {1, −5, 3, −7, 7, 1}, {1, −5, 3, −7, 7, −1}, {1, −5, 3, −7, −5, 3}, {1, −5, 5, 1, 3, 7}, {1, −5, 5, 1, −5, −3}, {1, −5, 5, 3, −7, 1}, {1, −5, 5, 3, −7, −3}, {1, −5, 5, 7, 3, −3}, {1, −5, 5, −7, −5, 5}, {1, −5, 5, −1, 3, 5}, {1, −5, 7, 1, 3, −3}, {1, −5, 7, 1, 3, −1}, {1, −5, 7, 1, 5, −1}, {1, −5, −7, 3, 3, −3}, {1, −5, −7, 3, 7, 1}, {1, −5, −7, 3, 7, −3}, {1, −3, 1, 5, −3, 1}, {1, −3, 1, 7, 5, −5}, {1, −3, 1, 7, −5, 5}, {1, −3, 1, −7, −5, 5}, {1, −3, 1, −7, −3, 1}, {1, −3, 1, −7, −3, 5}, {1, −3, 1, −5, −3, 7}, {1, −3, 3, 7, −3, 3}, {1, −3, 3, −7, −5, 5}, {1, −3, 3, −7, −5, 7}, {1, −3,

3, –7, –3, 3}, {1, –1, 1, 7, –1, –7}, {1, –1, 1, –7, 3, –5}, {1, –1, 1, –7, –1, 7}, {1, –1, 3, –7, –3, 7}, {1, –1, 3, –3, 7, –5}, and {1, –1, 5, –7, 3, 7};

{1, 1, 5, –5, 3, –3}, {1, 1, 7, –5, 7, –1}, {1, 1, 7, –1, 3, –1}, {1, 1, –5, 3, –1, 3}, {1, 1, –5, 7, –5, 3}, {1, 1, –3, 7, –1, 5}, {1, 3, 7, –5, 3, –3}, {1, 3, –1, –7, 1, 5}, {1, 5, 1, –7, 3, 3}, {1, 5, 1, –5, –5, 1}, {1, 5, 3, –1, –5, 3}, {1, 5, 5, 1, –5, 3}, {1, 5, 7, 3, –3, 5}, {1, 5, –7, 1, –5, 7}, {1, 5, –7, –5, 7, 1}, {1, 5, –5, 3, –3, –7}, {1, 5, –5, 3, –1, –5}, {1, 5, –5, –5, 5, –3}, {1, 5, –3, 3, 3, –3}, {1, 5, –3, 7, 3, 5}, {1, 7, 7, 1, –7, 5}, {1, 7, 7, 1, –3, 1}, {1, 7, –5, 7, –1, –7}, {1, 7, –5, –7, 5, 1}, {1, 7, –5, –5, 7, 1}, {1, 7, –1, 3, –1, –7}, {1, 7, –1, –7, 5, 5}, {1, 7, –1, –5, 7, 5}, {1, –7, 3, 3, –7, –3}, {1, –7, 3, –1, 1, 5}, {1, –7, 5, 1, –1, 3}, {1, –7, 5, –7, –1, –1}, {1, –7, –3, 1, 3, –1}, {1, –7, –3, –7, 3, 3}, {1, –7, –1, 3, 3, –1}, {1, –7, –1, –1, –7, 5}, {1, –5, 3, 7, –5, –3}, {1, –5, 3, –1, 3, –7}, {1, –5, 7, 7, –5, 1}, {1, –5, 7, –7, –3, 1}, {1, –5, 7, –5, 3, –7}, {1, –5, –5, 1, 5, 1}, {1, –5, –5, 1, –7, –3}, {1, –3, 1, 7, 7, 1}, {1, –3, 1, –7, –1, –1}, {1, –3, 5, –5, –1, –3}, {1, –3, 5, –1, –1, 5}, {1, –3, 7, 7, –3, 5}, {1, –3, 7, –1, 3, 7}, {1, –3, 7, –1, 5, –7}, {1, –3, –7, 1, 7, –5}, {1, –3, –7, 7, –5, 1}, {1, –3, –3, 1, 7, –1}, {1, –3, –1, 3, 7, –1}, {1, –1, 3, –7, 1, –3}, and {1, –1, –5, 7, –1, 5};

{1, 3, 7, –5, 1, –3}, {1, 3, –7, 5, 1, 5}, {1, 3, –7, –3, 1, –3}, {1, 3, –1, –5, 1, 5}, {1, 5, 1, –3, 3, 5}, {1, 5, 1, –3, 7, 5}, {1, 5, 1, –3, –5, 5}, {1, 5, 1, –3, –1, 5}, {1, 5, 3, –3, –7, 5}, {1, 5, 7, 3, –1, 5}, {1, 5, 7, –3, –7, 5}, {1, 5, –7, 3, 1, –3}, {1, 5, –7, 5, 1, 7}, {1, 5, –7, 7, 3, –1}, {1, 5, –7, –5, 1, –3}, {1, 5, –7, –1, 1, –3}, {1, 5, –5, 7, 3, 5}, {1, 5, –5, –3, –7, 5}, {1, 5, –1, –5, 7, 5}, {1, 5, –1, –3, –7, 5}, {1, 7, 3, –1, 3, 7}, {1, 7, –7, 5, 1, 5}, {1, 7, –7, –3, 1, –3}, {1, 7, –5, –1, 1, –3}, {1, –5, 7, 3, 1, 5}, {1, –5, –7, 5, 1, 5}, {1, –3, 1, 5, 7, –3}, {1, –3, 1, 5, –5, –3}, {1, –3, 3, 5, –7, –3}, {1, –3, –7, 3, 1, 5}, {1, –3, –7, 7, 1, 5}, {1, –3, –7, –5, 1, 5}, {1, –3, –7, –3, 1, –1}, {1, –3, –7, –1, 1, 5}, {1, –3, –5, 5, –7, –3}, {1, –3, –1, 3, 7, –3}, {1, –3, –1, 5, –7, –3}, {1, –1, 3, 7, 3, –1}, {1, –1, –7, 5, 1, 5}, and {1, –1, –5, 7, 1, 5};

{1, 3, –3, 1, 3, –3}, {1, 3, –3, 1, –5, –1}, {1, 3, –3, –7, 3, 7}, {1, 3, –3, –7, –5, 5}, {1, 3, –3, –1, 3, –3}, {1, 5, –1, –7, 3, 7}, {1, 7, 3, 1, 5, –1}, {1, 7, 3, 1, 7, 5}, {1, 7, 3, 1, –5, –1}, {1, 7, 3, 1, –3, 3}, {1, 7, 3, 5, –7, 3}, {1, 7, 3, 5, –1, 3}, {1, 7, 3, 7, 1, 3}, {1, 7, 3, –7, 3, 7}, {1, 7, 3, –7, 5, –5}, {1, 7, 3, –7, 7, –3}, {1, 7, 3, –7, –3, 7}, {1, 7, 3, –7, –1, –3}, {1, 7, 3, –3, 1, –5}, {1, 7, 3, –3, 7, –5}, {1, 7, 3, –1, –7, –5}, {1, 7, 5, 1, 7, 5}, {1, 7, 5, –7, –1, –3}, {1, 7, 5, –1, –7, –3}, {1, –5, –3, 1, –5, –3}, {1, –5, –3, 7, –5, 5}, {1, –5, –3, –7, 3, 5}, {1, –5, –3, –7, 3, 7}, {1, –5, –3, –1, 3, –3}, {1, –3, 3, 1, 3, –3}, {1, –3, 3, 1, 5, –1}, {1, –3, 3, 1, –5, –1}, {1, –3, 3, 5, –7, 3}, {1, –3, 3, 5, –1, 3}, {1, –3, 3, 7, –3, –5}, {1, –3, 3, –7, 3, 7}, {1, –3, 3, –7, –5, 5}, {1, –3, 3, –7, –3, 7}, {1, –3, 3, –3, 7, –5}, {1, –3, 3, –1, 5, 3}, {1, –1, 5, 1, –1, 5}, {1, –1, 5, –7, 7, –3}, and {1, –1, 5, –7, –3, 7};

{1, 1, 3, 5, –3, 7}, {1, 1, 3, –7, –1, 7}, {1, 1, 3, –5, 5, –1}, {1, 1, 3, –3, 7, –1}, {1, 1, 5, 7, –5, 5}, {1, 3, 1, –7, 3, –5}, {1, 3, 1, –5, 3, –5}, {1, 3, 1, –5, 5, –3}, {1, 3, 1, –5, 5, –1}, {1, 3, 3, –3, 5, –5}, {1, 3, 3, –3, 7, –1}, {1, 3, 5, 1, –5, 5}, {1, 3, 5, 1, –5, 7}, {1, 3, 5, 7, 3, –3}, {1, 3, 5, –7, –3, 7}, {1, 3, 5, –1, –7, 7}, {1, 3, 5, –1, –7, –3}, {1, 3, 5, –1, –3, 7}, {1, 5, 1, 3, –5, –7}, {1, 5, 1, 5, 5, –3}, {1, 5, 1, 5, –7, 1}, {1, 5, 1, 5, –7, –7}, {1, 5, 1, 5, –3, –3}, {1, 5, 1, 7, 3, –3}, {1, 5, 1, 7, 5, –5}, {1, 5, 1, 7, 5, –3}, {1, 5, 1, –7, 5, –3}, {1, 5, 1, –7, 7, –5}, {1, 5, 1, –3, 3, –3}, {1, 5, 1, –3, 5, –3}, {1, 5, 3, –5, 5, 7}, {1, 5, 3, –3, 7, 7}, {1, 5, 3, –3, 7, –5}, {1, 5, 3, –3, –3, 7}, {1, 5, 3, –1, 7, –5}, {1, 5, 3, –1, –7, –3}, {1, 5, 5, 1, –5, –1}, {1, 7, 1, 3, –7, 7}, {1, 7, 1, 3, –7, –7}, {1, 7, 1, 3, –5, –7}, {1, 7, 1, 3, –3, 3}, {1, 7, 1, 5, –7, 7}, {1, 7, 1, 7, 7, –1}, {1, 7, 1, 7, –7, 1}, {1, 7, 1, –7, –7, –5}, {1, 7, 1, –7, –5, 3}, {1, 7, 1, –5, –7, –3}, {1, 7, 1, –3, 3, 5}, {1, 7, 1, –3, 3, –1}, {1, 7, 1, –1, 3, 7}, {1, 7, 1, –1, 5, 7}, {1, 7, 3, 5, –3, 3}, {1, –7, 1, 1, 5, 7}, {1, –7, 1, 1, 7, 7}, {1, –7, 1, 3, 7, 7}, {1, –7, 1, 3, –7, 7}, {1, –7, 1, 3, –3, –5}, {1, –7, 1, 5, 7, 7}, {1, –7, 1, 7, 5, –1}, {1, –7, 1, –5, –7, –5}, {1, –7, 1, –5, –7, –1}, {1, –7, 1, –5, –5, 1}, {1, –7, 1, –5, –5, –3}, {1, –7, 1, –5, –5, –1}, {1, –7, 1, –5, –3, 1}, {1, –7, 1, –5, –3, 3}, {1, –7, 1, –3, –7, –3}, {1, –7, 1, –1, 5, 7}, {1, –7, 3, 3, –7, –5}, {1, –7, 3, 3, –5, –5}, {1, –7, 3, 5, –5, –5}, {1, –7, 3, 5, –3, 3}, {1, –7, 3, 5, –3, –5}, {1, –7, 3, 5, –3, –1}, {1, –7, 3, 7, 7, –1}, {1, –7, 3, –5, –3, –1}, {1, –7, 3, –1, –5, –3}, {1, –5, 1, 3, 5, 7}, {1, –5, 1, 3, –1, 5}, {1, –5, 1, 5, –7, 7}, {1, –5, 1, 7, –7, –7}, {1, –5, 1, –7, 7, –1}, {1, –5, 1, –7, –7, –1}, {1, –5, 1, –3, –7, –3}, {1, –5, 1, –3, –1, 5}, {1, –5, 1, –1, 7, –7}, {1, –5, 3, 1, 5, –1}, {1, –5, 3, 1, 7, –1}, {1, –5, 3, 5, 7, –1}, {1, –5, 3, 5, –3, –3}, {1, –5, 3, 7, –7, 5}, {1, –5, 3, –7, 7, –1}, {1, –5, 3, –7, –7, 1}, {1, –5, 3, –7, –7, –1}, {1, –5, 3, –7, –5, 1}, {1, –5, 5, 1, 3, 7}, {1, –5, 5, 1, –5, –3}, {1, –5, 5, 7, –5, –3}, {1, –5, 5, –7, –5, 5}, {1, –5, 5, –7, –5, –1}, {1, –5, 5, –1, 3, 5}, {1, –3, 1, 5, –3, –7}, {1, –3, 1, 5, –3, –5}, {1, –3, 1, 7, –5, –7}, {1, –3, 1, 7, –3, –5}, {1, –3, 1, –7, 7, –1}, {1, –3, 3, 1, 7, –1}, {1, –1, 1, 3, –3, 7}, {1, –1, 1, 5, –3, 7}, {1, –1, 1, 7, –1, –7}, {1, –1, 3, 7, –5, 5}, {1, –1, 3, –7, –3, 5}, {1, –1, 3, –7, –3, 7}, {1, –1, 3, –3, 7, 7}, and {1, –1, 3, –3, –3, 7};

{1, 1, 3, 5, –3, 7}, {1, 1, 3, –7, –1, 7}, {1, 1, 3, –5, 5, –1}, {1, 1, 3, –3, 7, –1}, {1, 1, 5, 7, –5, 5}, {1, 3, 1, –7, 3, –5}, {1, 3, 1, –5, 3, –5}, {1, 3, 1, –5, 5, –3}, {1, 3, 1, –5, 5, –1}, {1, 3, 3, –3, 5, –5}, {1, 3, 3, –3, 7, –1}, {1, 3, 5, 1, –5, 5}, {1, 3, 5, 1, –5, 7}, {1, 3, 5, 7, 3, –3}, {1, 3, 5, –7, –3, 7}, {1, 3, 5, –1, –7, 7}, {1, 3, 5, –1, –7, –3}, {1, 3, 5, –1, –3, 7}, {1, 5, 1, 3, –5, –7}, {1, 5, 1, 5, 5, –3}, {1, 5, 1, 5, –7, 1}, {1, 5, 1, 5, –7, –7}, {1, 5, 1, 5, –3, –3}, {1, 5, 1, 7, 3, –3}, {1, 5, 1, 7, 5, –5}, {1, 5, 1, 7, 5, –3}, {1, 5, 1, –7, 5, –3}, {1, 5, 1, –7, 7, –5}, {1, 5, 1, –3, 3, –3}, {1, 5, 1, –3, 5, –3}, {1, 5, 3, –5, 5, 7}, {1, 5, 3, –3, 7, 7}, {1, 5, 3, –3, 7, –5}, {1, 5, 3, –3, –3, 7}, {1, 5, 3, –1, 7, –5}, {1, 5, 3, –1, –7, –3}, {1, 5, 5, 1, –5, –1}, {1, 7, 1, 3, –7, 7}, {1, 7, 1, 3, –7, –7}, {1, 7, 1, 3, –5, –7}, {1, 7, 1, 3, –3, 3}, {1, 7, 1, 5, –7, 7}, {1, 7, 1, 7, 7, –1}, {1, 7, 1, 7, –7, 1}, {1, 7, 1, –7, –7, –5}, {1, 7, 1, –7, –5, 3}, {1, 7, 1, –5, –7, –3}, {1, 7, 1, –3, 3, 5}, {1, 7, 1, –3, 3, –1}, {1, 7, 1, –1, 3, 7}, {1, 7, 1, –1, 5, 7}, {1, 7, 3, 5, –3, 3}, {1, –7, 1, 1, 5, 7}, {1, –7, 1, 1, 7, 7}, {1, –7, 1, 3, 7, 7}, {1, –7, 1, 3, –7, 7}, {1, –7, 1, 3, –3, –5}, {1, –7, 1, 5, 7, 7}, {1, –7, 1, 7, 5, –1}, {1, –7, 1, –5, –7, –5}, {1, –7, 1, –5, –7, –1}, {1, –7, 1, –5, –5, 1}, {1, –7, 1, –5, –5, –3}, {1, –7, 1, –5, –5, –1}, {1, –7, 1, –5, –3, 1}, {1, –7, 1, –5, –3, 3}, {1, –7, 1, –3, –7, –3}, {1, –7, 1, –1, 5, 7}, {1, –7, 3, 3, –7, –5}, {1, –7, 3, 3, –5, –5}, {1, –7, 3, 5, –5, –5}, {1, –7, 3, 5, –3, 3}, {1, –7, 3, 5, –3, –5}, {1, –7, 3, 5, –3, –1}, {1, –7, 3, 7, 7, –1}, {1, –7, 3, –5, –3, –1}, {1, –7, 3, –1, –5, –3}, {1, –5, 1, 3, 5, 7}, {1, –5, 1, 3, –1, 5}, {1, –5, 1, 5, –7, 7}, {1, –5, 1, 7, –7, –7}, {1, –5, 1, –7, 7, –1}, {1, –5, 1, –7, –7, –1}, {1, –5, 1, –3, –7, –3}, {1, –5, 1, –3, –1, 5}, {1, –5, 1, –1, 7, –7}, {1, –5, 3, 1, 5, –1}, {1, –5, 3, 1, 7, –1}, {1, –5, 3, 5, 7, –1}, {1, –5, 3, 5, –3, –3}, {1, –5, 3, 7, –7, 5}, {1, –5, 3, –7, 7, –1}, {1, –5, 3, –7, –7, 1}, {1, –5, 3, –7, –7, –1}, {1, –5, 3, –7, –5, 1}, {1, –5, 5, 1, 3, 7}, {1, –5, 5, 1, –5, –3}, {1, –5, 5, 7, –5, –3}, {1, –5, 5, –7, –5, 5}, {1, –5, 5, –7, –5, –1}, {1, –5, 5, –1, 3, 5}, {1, –3, 1, 5, –3, –7}, {1, –3, 1, 5, –3, –5}, {1, –3, 1, 7, –5, –7}, {1, –3, 1, 7, –3, –5}, {1, –3, 1, –7, 7, –1}, {1, –3, 3, 1, 7, –1}, {1, –1, 1, 3, –3, 7}, {1, –1, 1, 5, –3, 7}, {1, –1, 1, 7, –1, –7}, {1, –1, 3, 7, –5, 5}, {1, –1, 3, –7, –3, 5}, {1, –1, 3, –7, –3, 7}, {1, –1, 3, –3, 7, 7}, and {1, –1, 3, –3, –3, 7}; or {1, 1, −7, 5, −1, 1}, {1, 1, −7, 7, −3, 1}, {1, 1, −7, −5, 5, 1}, {1, 1, −7, −3, 3, 1}, {1, 1, −7, −3, −5, 1}, {1, 1, −7, −1, −3, 1}, {1, 3, 7, 1, 5, 1}, {1, 3, −5, 3, 5, 1}, {1, 3, −5, 3, 5, −3}, {1, 3, −5, 7, −7, 1}, {1, 3, −5, 7, −5, 5}, {1, 3, −5, 7, −1, 1}, {1, 3, −5, −5, 3, −1}, {1, 3, −5, −3, 5, 1}, {1, 3, −3, 1, −5, −1}, {1, 3, −3, −7, 1, 1}, {1, 3, −1, 7, −7, 1}, {1, 5, 1, −7, −5, −1}, {1, 5, 3, −7, 1, 1}, {1, 5, 7, −1, −5, −1}, {1, 5, −5, −7, 1, 1}, {1, 5, −3, −5, 3, 1}, {1, 5, −1, 3, 5, −3}, {1, 5, −1, 3, −3, −1}, {1, 5, −1, 3, −1, 7}, {1, 7, 5, −7, 1, 1}, {1, 7, 5, −3, −3, 5}, {1, 7, −5, 3, 3, −5}, {1, −7, 1, 3, −5, 7}, {1, −7, 1, 3, −1, 7}, {1, −7, 5, 7, −1, 7}, {1, −7, 5, −7, 3, 7}, {1, −7, 5, −3, −1, 7}, {1, −7, 5, −1, 1, −7}, {1, −7, 7, −3, 1, −7}, {1, −7, 7, −1, 3, −5}, {1, −7, 7, −1, −3, 5}, {1, −7, −7, 1, 3, −3}, {1, −7, −7, 1, 5, −5}, {1, −7, −7, 1, 7, 5}, {1, −7, −7, 1, −3, 7}, {1, −7, −7, 1, −1, 5}, {1, −7, −5, 3, 5, −3}, {1, −7, −5, 3, −5, −3}, {1, −7, −5, 3, −1, 1}, {1, −7, −5, 3, −1, 7}, {1, −7, −5, 5, 1, −7}, {1, −7, −5, 7, −1, 1}, {1, −7, −5, −1, −7, −3}, {1, −7, −3, 3, 1, −7}, {1, −7, −3, 5, 3, −5}, {1, −7, −3, −5, 1, −7}, {1, −7, −1, −3, 1, −7}, {1, −5, 7, −1, −1, 7}, {1, −5, −3, 5, 5, −3}, {1, −5, −3, 7, −5, 5}, {1, −5, −1, −7, −5, 5}, {1, −5, −1, −7, −3, 7}, {1, −5, −1, −5, 3, 5}, {1, −3, 1, −5, −1, 1}, {1, −3, 5, 5, −3, −1}, {1, −3, 5, 7, −1, 1}, {1, −3, 5, 7, −1, 7}, {1, −3, 7, −7, 1, 1}, {1, −3, −1, 7, −1, 1}, {1, −1, 3, −5, −5, 3}, {1, −1, 5, −7, 1, 1}, {1, −1, 5, −3, −3, 5}, {1, −1, 7, 5, −3, 1}, {1, −1, 7, 7, −1, 3}, and {1, −1, 7, −5, 3, 1};

a generation unit, configured to generate a first signal based on the sequence $\{x_n\}$; and a sending unit, configured to send the first signal.

With reference to the eighth aspect, in a first implementation of the eighth aspect, the set of the sequence $\{s_n\}$ includes at least one of sequences in a second sequence set, and the second sequence set includes some sequences in the first sequence set.

With reference to the eighth aspect, in a second implementation of the eighth aspect, the generation unit is further configured to perform discrete Fourier transform on N elements in the sequence $\{x_n\}$ to obtain a sequence $\{f_n\}$ including the N elements;

the generation unit is further configured to map the N elements in the sequence $\{f_n\}$ to N subcarriers respectively, to obtain a frequency-domain signal including the N elements; and the generation unit is further configured to generate the first signal based on the frequency-domain signal.

With reference to the eighth aspect, in a third implementation of the eighth aspect, the N subcarriers are N consecutive subcarriers or N equi-spaced subcarriers.

With reference to the eighth aspect, in a fourth implementation of the eighth aspect, the signal processing apparatus further includes a filter unit, configured to: filter the sequence $\{x_n\}$ before the discrete Fourier transform is performed on the N elements in the sequence $\{x_n\}$; or filter the sequence $\{x_n\}$ after the discrete Fourier transform is performed on the N elements in the sequence $\{x_n\}$.

With reference to the eighth aspect, in a fifth implementation of the eighth aspect, the first signal is a reference signal of a second signal, and a modulation scheme of the second signal is $\pi/2$ binary phase shift keying BPSK.

According to a ninth aspect, a communications apparatus is provided. The apparatus may be a terminal, or may be a chip in a terminal. The apparatus has a function of implementing any one of the first aspect, the third aspect to the sixth aspect, the seventh aspect, and the possible implementations. This function may be implemented by hardware, or may be implemented by hardware executing corresponding software. The hardware or software includes one or more modules corresponding to the function.

In a possible design, the apparatus includes a processing module and a transceiver module. The transceiver module may be, for example, at least one of a transceiver, a receiver, or a transmitter. The transceiver module may include a radio frequency circuit or an antenna. The processing module may be a processor.

Optionally, the apparatus further includes a storage module, and the storage module may be, for example, a memory. When the storage module is included, the storage module is configured to store an instruction. The processing module is connected to the storage module, and the processing module may execute the instruction stored in the storage module or an instruction from another module, to enable the apparatus to perform the method according to any one of the first aspect, the third aspect, the sixth aspect, and the possible implementations.

In another possible design, when the apparatus is a chip, the chip includes a processing module. Optionally, the chip further includes a transceiver module. The transceiver module may be, for example, an input/output interface, a pin, or a circuit on the chip. The processing module may be, for example, a processor. The processing module may execute an instruction, to enable the chip in the terminal to perform the method according to any one of the first aspect, the third aspect to the sixth aspect, the seventh aspect, and the possible implementations.

Optionally, the processing module may execute an instruction in a storage module, and the storage module may be a storage module in the chip, for example, a register or a cache. The storage module may alternatively be located inside a communications device but outside the chip, for example, a read-only memory (ROM), another type of static storage device that can store static information and instructions, or a random access memory (RAM).

The processor mentioned above may be a general-purpose central processing unit (CPU), a microprocessor, an application-specific integrated circuit (ASIC), or one or more integrated circuits configured to control program execution of the communication methods in the foregoing aspects.

According to a tenth aspect, a communications apparatus is provided. The apparatus may be a network device, or may be a chip in a network device. The apparatus has a function of implementing any one of the second aspect, the eighth aspect, and the possible implementations. This function may be implemented by hardware, or may be implemented by hardware executing corresponding software. The hardware or software includes one or more modules corresponding to the function.

In a possible design, the apparatus includes a processing module and a transceiver module. The transceiver module may be, for example, at least one of a transceiver, a receiver, or a transmitter. The transceiver module may include a radio frequency circuit or an antenna. The processing module may be a processor.

Optionally, the apparatus further includes a storage module, and the storage module may be, for example, a memory. When the storage module is included, the storage module is configured to store an instruction. The processing module is connected to the storage module, and the processing module may execute the instruction stored in the storage module or an instruction from another module to enable the apparatus to perform the method according to any one of the second aspect, the eighth aspect, and the possible implementations. In this design, the apparatus may be a network device.

In another possible design, when the apparatus is a chip, the chip includes a transceiver module and a processing module. The transceiver module may be, for example, an input/output interface, a pin, or a circuit on the chip. The processing module may be, for example, a processor. The processing module may execute an instruction to enable the chip in the network device to perform the method according to any one of the second aspect, the eighth aspect, and the possible implementations.

Optionally, the processing module may execute an instruction in a storage module, and the storage module may be a storage module in the chip, for example, a register or a cache. The storage module may alternatively be located inside a communications device but outside the chip, for example, a read-only memory, another type of static storage device that can store static information and instructions, or a random access memory.

The processor mentioned above may be a general-purpose central processing unit, a microprocessor, an application-specific integrated circuit, or one or more integrated circuits configured to control program execution of the communication methods in the foregoing aspects.

According to an eleventh aspect, a computer storage medium is provided. The computer storage medium stores program code. The program code is used to indicate an instruction for performing the method according to any one of the first aspect, the third aspect to the sixth aspect, the seventh aspect, and the possible implementations.

According to a twelfth aspect, a computer storage medium is provided. The computer storage medium stores program code. The program code is used to indicate an instruction for performing the method according to any one of the second aspect and the seventh aspect and the possible implementations.

According to a thirteenth aspect, a computer program product including an instruction is provided. When the computer program product runs on a computer, the computer is enabled to perform the method according to any one of the first aspect, the third aspect to the sixth aspect, the seventh aspect, and the possible implementations.

According to a fourteenth aspect, a computer program product including an instruction is provided. When the computer program product runs on a computer, the computer is enabled to perform the method according to any one of the second aspect or the possible implementations thereof.

According to a fifteenth aspect, a processor is provided. The processor is configured to couple to a memory and configured to perform the method according to any one of the first aspect, the third aspect to the sixth aspect, the seventh aspect, and the possible implementations.

According to a sixteenth aspect, a processor is provided. The processor is configured to couple to a memory, and configured to perform the method according to any one of the second aspect, the eighth aspect, and the possible implementations.

According to a seventeenth aspect, a chip is provided. The chip includes a processor and a communications interface. The communications interface is configured to communicate with an external component or an internal component. The processor is configured to implement the method according to any one of the first aspect, the third aspect to the sixth aspect, the seventh aspect, and the possible implementations.

Optionally, the chip may further include a memory. The memory stores an instruction. The processor is configured to execute the instruction stored in the memory or an instruction from another module. When the instruction is executed, the processor is configured to implement the method according to any one of the first aspect, the third aspect to the sixth aspect, and the possible implementations.

Optionally, the chip may be integrated on a terminal.

According to an eighteenth aspect, a chip is provided. The chip includes a processor and a communications interface. The communications interface is configured to communicate with an external component or an internal component. The processor is configured to implement the method according to any one of the second aspect, the eighth aspect, and the possible implementations.

Optionally, the chip may further include a memory. The memory stores an instruction. The processor is configured to execute the instruction stored in the memory or an instruction from another module. When the instruction is executed, the processor is configured to implement the method according to any one of the second aspect, the eighth aspect, and the possible implementations.

Optionally, the chip may be integrated on a network device.

Based on the foregoing technical solution, in frequency-domain resources of a comb structure, reference signals mapped to frequency-domain resources on different combs may be generated by using different sequences. In other words, the reference signals on different frequency-domain resources may be generated by using the different sequences. This improves performance of the reference signals transmitted on the frequency-domain resources of the comb structure. According to some embodiments of the present disclosure, auto-correlations and PAPRs of the reference signals transmitted on the frequency-domain resource of the comb structure are reduced, and a cross-correlation between reference signals that use different sequences and occupy a same frequency-domain resource is also reduced. This improves transmission performance of the reference signals.

DESCRIPTION OF EMBODIMENTS

Figure 1:
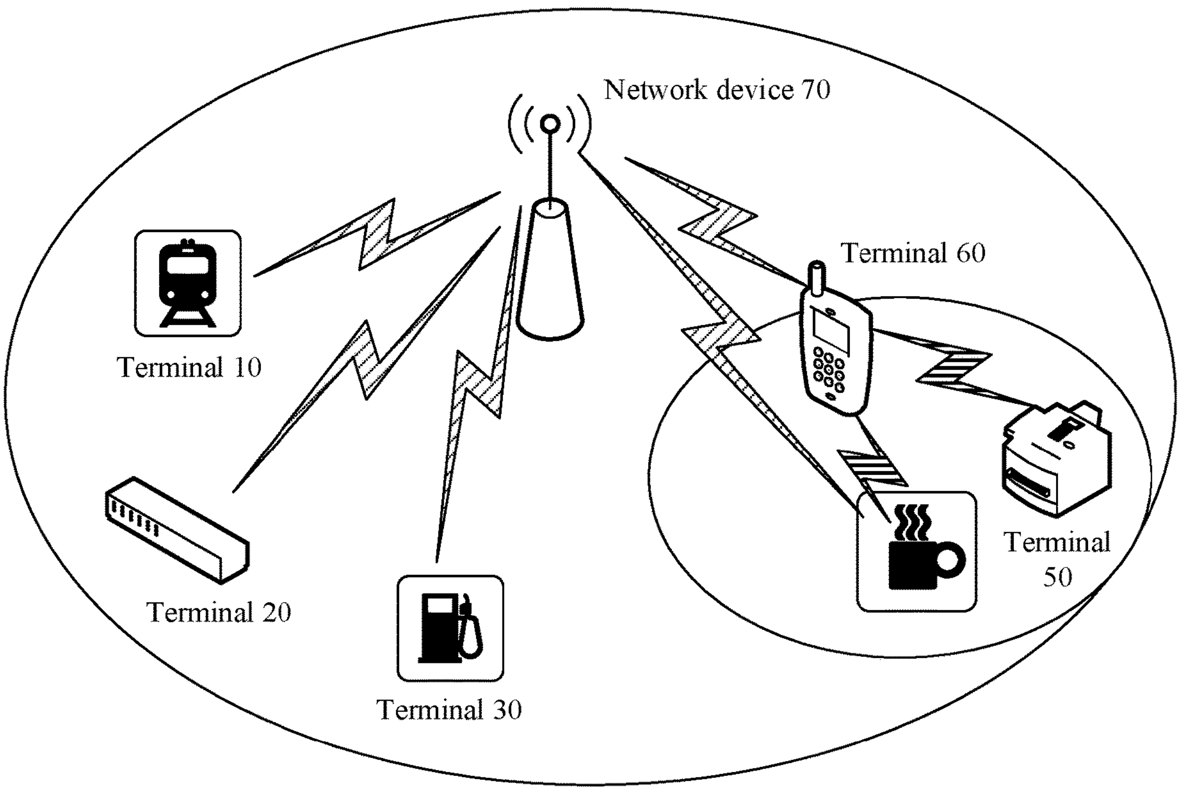
FIG. 1 is a schematic diagram of a communications system according to this application.

The following describes technical solutions of this application with reference to the accompanying drawings.

The technical solutions of embodiments of this application may be applied to various communications systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a future 5th generation (5G) system or new radio (NR) system.

A terminal device in some embodiments of this application may be user equipment, an access terminal, a subscriber unit, a subscriber station, a mobile station, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application.

A network device in the embodiments this application may be a device configured to communicate with a terminal device. The network device may be a base transceiver station (BTS) in a global system for mobile communications (GSM) or a code division multiple access (CDMA) system, or may be a NodeB (NB) in a wideband code division multiple access (WCDMA) system, or may be an evolved NodeB (eNB or eNodeB) in an LTE system, or may be a radio controller in a cloud radio access network (CRAN) scenario, or the like. Alternatively, the network device may be a relay station, an access point, a vehicle-mounted device, a wearable device, a network device in a future 5G network, a network device in a future evolved PLMN network, or the like. This is not limited in the embodiments of this application.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (also referred to as main memory). The operating system may be any one or more types of computer operating systems, for example, a Linux operating system, a Unix operating system, an Android operating system, an iOS operating system, or a Windows operating system, that implement service processing by using a process. The application layer includes applications such as a browser, an address book, word processing software, and instant messaging software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the execution body of the method provided in the embodiments of this application may be the terminal device or the network device, or a function module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include, but is not limited to, a magnetic storage component (for example, a hard disk, a floppy disk, or a magnetic tape), an optical disc (for example, a compact disc (CD), or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include, but is not limited to, a radio channel and various other media that can store, contain, and/or carry an instruction and/or data.

FIG. 1 is a schematic diagram of a communications system according to this application. The communications system in FIG. 1 may include at least one terminal (for example, a terminal 10, a terminal 20, a terminal 30, a terminal 40, a terminal 50, and a terminal 60) and a network device 70. The network device 70 is configured to: provide a communications service for the terminal and connect the terminal to a core network. The terminal may access the network by searching for a synchronization signal, a broadcast signal, and the like sent by the network device 70 to communicate with the network. The terminal 10, the terminal 20, the terminal 30, the terminal 40, and the terminal 60 in FIG. 1 may perform uplink and downlink transmission with the network device 70. For example, the network device 70 may send a downlink signal to the terminal 10, the terminal 20, the terminal 30, the terminal 40, and the terminal 60, and may also receive uplink signals that are sent by the terminal 10, the terminal 20, the terminal 30, the terminal 40, and the terminal 60.

In addition, the terminal 40, the terminal 50, and the terminal 60 may alternatively be considered as a communications system. The terminal 60 may send a downlink signal to the terminal 40 and the terminal 50, and may also receive uplink signals sent by the terminal 40 and the terminal 50.

In a conventional solution, a DMRS sequence having a length of 6 is used to support transmission of a PUSCH whose frequency-domain bandwidth includes 12 subcarriers. The DMRS sequence having the length of 6 is mapped to six equi-spaced subcarriers, for example, mapped to bandwidth having a spacing of one subcarrier. The DMRS sequence having the length of 6 is any group of elements φ(0), . . . , φ(5) in Table 1. The DMRS sequence s(n) having the length of 6 is transformed into a sequence y(m).

In the conventional solution, to support transmission of a PUSCH whose frequency-domain bandwidth includes 12 subcarriers (one RB), the DMRS sequence is determined based on a CGS sequence that is mapped to frequency domain to obtain a comb-2 structure. To be specific, a time-domain base sequence is repeated twice, an OCC[+1, +1] is used for one of the repeated time-domain base sequences, an OCC [+1, −1] is used for the other one of the repeated time-domain base sequences, and then DFT transform is performed. To ensure a plurality of factors such as a low PAPR characteristic, good frequency-domain flatness, a good time-domain auto-correlation characteristic, and a low sequence cross-correlation characteristic, a modulation scheme used by the DMRS sequence is usually a high-order modulation scheme. For example, a generation manner of a sequence using 8PSK is $s(n)=e^{j\varphi(n)\pi/8}$ with $0 \le n \le 5$, where φ(n) may be determined based on Table 1.

TABLE 1

| u | φ(0), . . . , φ(5) φ(0), . . . , φ(5) | PAPR (dB) |
|---|---|---|
| 0 | −7 5 −7 −3 −5 5 | 1.4610 |
| 1 | −7 −3 −7 −3 7 5 | 1.4610 |
| 2 | −7 −3 3 7 3 −3 | 1.5421 |
| 3 | −7 5 −7 −3 7 5 | 1.6373 |
| 4 | −7 −3 −7 −3 −5 5 | 1.6373 |
| 5 | −7 1 −1 5 −7 5 | 1.6492 |
| 6 | −7 5 −1 1 −3 1 | 1.8773 |
| 7 | −7 −3 −7 −5 5 1 | 1.8773 |
| 8 | −7 −5 3 7 5 −1 | 1.9518 |
| 9 | −7 3 −3 −5 −1 7 | 1.9518 |
| 10 | −7 1 −3 1 7 5 | 1.9574 |
| 11 | −7 −3 −3 −1 −7 5 | 1.9661 |
| 12 | −7 −7 −3 1 −3 7 | 1.9661 |
| 13 | −7 5 −5 −1 −3 5 | 1.9682 |
| 14 | −7 −1 5 7 5 −1 | 1.9911 |
| 15 | −7 3 −3 −5 −3 3 | 1.9911 |
| 16 | −7 −3 3 −1 −7 −5 | 1.9939 |
| 17 | −7 −3 −5 −3 7 3 | 1.9939 |
| 18 | −7 −1 −3 −1 7 3 | 2.0232 |
| 19 | −7 5 7 −1 −3 3 | 2.0314 |
| 20 | −7 −1 −3 5 7 3 | 2.0314 |
| 21 | −7 −1 3 7 3 −1 | 2.0425 |
| 22 | −7 3 −1 −5 −1 3 | 2.0425 |
| 23 | −7 3 3 7 −5 7 | 2.0490 |
| 24 | −7 5 −7 −3 −3 7 | 2.0491 |
| 25 | −7 −5 3 7 3 −3 | 2.0927 |
| 26 | −7 3 −1 3 −5 −3 | 2.0928 |
| 27 | −7 1 −3 5 7 5 | 2.1111 |
| 28 | −7 5 −3 1 1 −1 | 2.1966 |
| 29 | −7 7 7 −5 3 −1 | 2.1966 |

Figure 2:
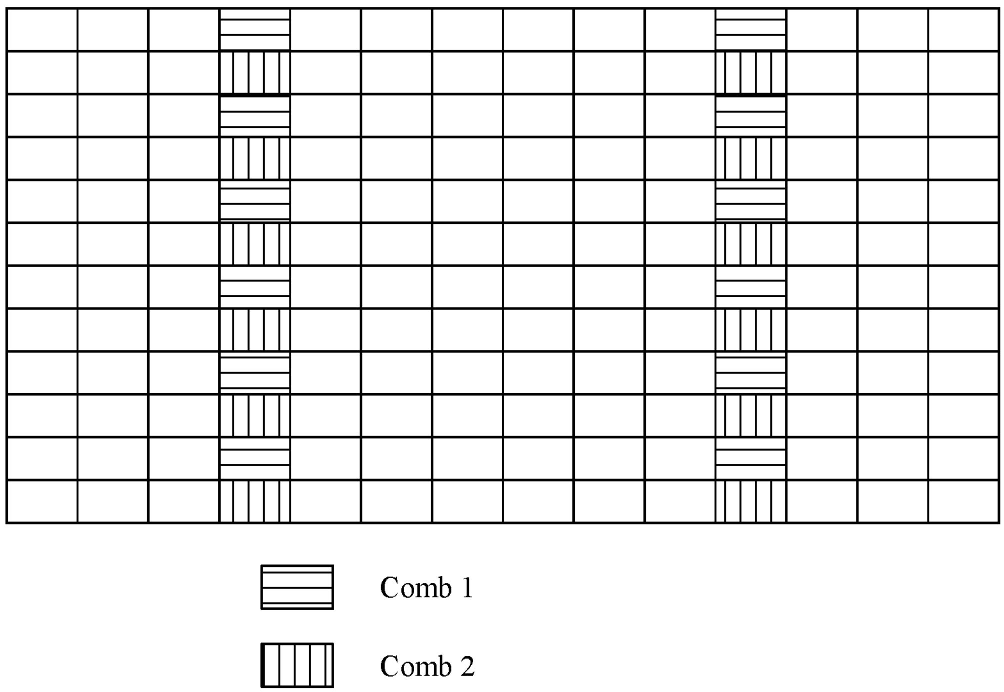
FIG. 2 is a schematic flowchart of a signal transmission method according to a conventional solution.

The comb-2 structure used for DMRS mapping in frequency domain is shown in FIG. 2. To be specific, for a PUSCH of a user, a DMRS occupies only an odd-numbered subcarrier or an even-numbered subcarrier. For a system, a PUSCH of another user that is scheduled at the same time may occupy the other group of subcarriers.

Figure 3:
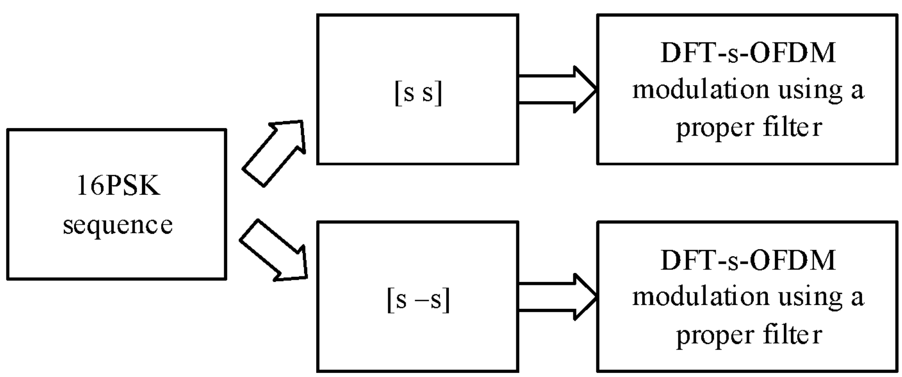
FIG. 3 is a schematic flowchart of a signal processing method according to a conventional solution.

Sequences in Table 1 are repeated by using [+1 +1] and [+1 −1] and are transformed into the frequency domain for frequency-domain filtering. A sequence value on each subcarrier is finally output, as shown in Table 2. The foregoing transform process is shown in FIG. 3. For example, a base sequence $s_{N/2}$ having a length of N/2 is repeated to obtain $s^{(0)}=[s_{N/2}, s_{N/2}]$ and $s^{(1)}=[s_{N/2}, -s_{N/2}]$, and then DFT transform is performed on $s^{(0)}$ and $s^{(1)}$ to obtain $s^{(0)}=DFT(s^{(0)})$ and $s^{(1)}=DFT(s^{(1)})$, where the sequence $s^{(0)}$ having a length of N occupies only even-numbered subcarriers shown in FIG. 2, and the sequence $s^{(1)}$ having a length of N occupies only odd-numbered subcarriers shown in FIG. 2.

It may be learned from the following Table 2 and the foregoing Table 1 that, a sequence s having a length of 6 may be searched for, where a PAPR value of a sequence obtained after the sequence s is repeated by using [+1 +1] is lower than a PAPR value of the sequence s in Table 1, but a PAPR value of a sequence obtained after the sequence s is repeated by using [+1 −1] is higher than the PAPR value of the sequence s in Table 1. In other words, in the conventional solution, a proper sequence cannot be found, where both a PAPR value of a sequence obtained after the proper sequence is repeated by using [+1 +1] and a PAPR value of a sequence obtained after the proper sequence is repeated by using [+1 −1] are lower than a PAPR value of a PUSCH.

TABLE 2

| u | φ(0), . . . , φ(5) φ(0), . . . , φ(5) | PAPR with [s s] structure (dB) | PAPR with [s −s] structure (dB) |
|---|---|---|---|
| 0 | −7 5 −7 −3 −5 5 | 1.4610 | 1.4479 |
| 1 | −7 −3 −7 −3 7 5 | 1.4610 | 1.5786 |
| 2 | −7 −3 3 7 3 −3 | 1.5421 | 1.7852 |
| 3 | −7 5 −7 −3 7 5 | 1.6373 | 2.1837 |
| 4 | −7 −3 −7 −3 −5 5 | 1.6373 | 2.2430 |
| 5 | −7 1 −1 5 −7 5 | 1.6492 | 2.3795 |
| 6 | −7 5 −1 1 −3 1 | 1.8773 | 2.3797 |
| 7 | −7 −3 −7 −5 5 1 | 1.8773 | 2.3797 |
| 8 | −7 −5 3 7 5 −1 | 1.9518 | 2.3822 |
| 9 | −7 3 −3 −5 −1 7 | 1.9518 | 2.3905 |
| 10 | −7 1 −3 1 7 5 | 1.9574 | 2.3905 |
| 11 | −7 −3 −3 −1 −7 5 | 1.9661 | 2.3905 |
| 12 | −7 −7 −3 1 −3 7 | 1.9661 | 2.4530 |
| 13 | −7 5 −5 −1 −3 5 | 1.9682 | 2.4702 |
| 14 | −7 −1 5 7 5 −1 | 1.9911 | 2.5254 |
| 15 | −7 3 −3 −5 −3 3 | 1.9911 | 2.5254 |
| 16 | −7 −3 3 −1 −7 −5 | 1.9939 | 2.6289 |
| 17 | −7 −3 −5 −3 7 3 | 1.9939 | 2.6671 |
| 18 | −7 −1 −3 −1 7 3 | 2.0232 | 2.6671 |
| 19 | −7 5 7 −1 −3 3 | 2.0314 | 2.9176 |
| 20 | −7 −1 −3 5 7 3 | 2.0314 | 3.0113 |
| 21 | −7 −1 3 7 3 −1 | 2.0425 | 3.4406 |
| 22 | −7 3 −1 −5 −1 3 | 2.0425 | 3.4408 |
| 23 | −7 3 3 7 −5 7 | 2.0490 | 3.4847 |
| 24 | −7 5 −7 −3 −3 7 | 2.0491 | 3.5402 |
| 25 | −7 −5 3 7 3 −3 | 2.0927 | 3.6761 |
| 26 | −7 3 −1 3 −5 −3 | 2.0928 | 3.7384 |
| 27 | −7 1 −3 5 7 5 | 2.1111 | 3.7385 |
| 28 | −7 5 −3 1 1 −1 | 2.1966 | 4.0684 |
| 29 | −7 7 7 −5 3 −1 | 2.1966 | 4.0686 |

In another conventional solution, a DMRS sequence having a length of 6 is used to generate a DMRS of a PUSCH/PUCCH whose frequency-domain bandwidth includes 12 subcarriers. The DMRS sequence having the length of 6 is mapped to six equi-spaced subcarriers, for example, mapped to bandwidth having a spacing of one subcarrier. To be specific, only one of every two consecutive subcarriers carries a DMRS. The DMRS sequence having the length of 6 is generated based on any group of elements Φ(0), . . . , Φ(5) in Table 1a. A generation manner includes: Φ(0), . . . , Φ(5) are modulated by using 8PSK, and are mapped to odd-numbered subcarriers and even-numbered subcarriers in frequency domain in different repetition manners. Assuming that a number of a start subcarrier occupied by the DMRS is 0, the DMRS sequence may be mapped to the even-numbered subcarriers after DFT transform is performed by repetition way as {Φ(0), . . . , Φ(5), Φ(0), . . . , Φ(5)}, and the DMRS sequence may be mapped to the odd-numbered subcarriers after DFT transform is performed on by repetition way as {Φ(0), . . . , Φ(5), −Φ(0), . . . , −Φ(5)}.

TABLE 1a

| u | Φ(0), . . . , Φ(5) | PAPR (dB) |
|---|---|---|
| 0 | −7 5 −7 −3 −5 5 | 1.4610 |
| 1 | −7 −3 −7 −3 7 5 | 1.4610 |
| 2 | −7 −3 3 7 3 −3 | 1.5421 |
| 3 | −7 5 −7 −3 7 5 | 1.6373 |
| 4 | −7 −3 −7 −3 −5 5 | 1.6373 |
| 5 | −7 1 −1 5 −7 5 | 1.6492 |
| 6 | −7 5 −1 1 −3 1 | 1.8773 |
| 7 | −7 −3 −7 −5 5 1 | 1.8773 |
| 8 | −7 −5 3 7 5 −1 | 1.9518 |
| 9 | −7 3 −3 −5 −1 7 | 1.9518 |
| 10 | −7 1 −3 1 7 5 | 1.9574 |
| 11 | −7 −3 −3 −1 −7 5 | 1.9661 |
| 12 | −7 −7 −3 1 −3 7 | 1.9661 |
| 13 | −7 5 −5 −1 −3 5 | 1.9682 |
| 14 | −7 −1 5 7 5 −1 | 1.9911 |
| 15 | −7 3 −3 −5 −3 3 | 1.9911 |
| 16 | −7 −3 3 −1 −7 −5 | 1.9939 |
| 17 | −7 −3 −5 −3 7 3 | 1.9939 |
| 18 | −7 −1 −3 −1 7 3 | 2.0232 |
| 19 | −7 5 7 −1 −3 3 | 2.0314 |
| 20 | −7 −1 −3 5 7 3 | 2.0314 |
| 21 | −7 −1 3 7 3 −1 | 2.0425 |
| 22 | −7 3 −1 −5 −1 3 | 2.0425 |
| 23 | −7 3 3 7 −5 7 | 2.0490 |
| 24 | −7 5 −7 −3 −3 7 | 2.0491 |
| 25 | −7 −5 3 7 3 −3 | 2.0927 |
| 26 | −7 3 −1 3 −5 −3 | 2.0928 |
| 27 | −7 1 −3 5 7 5 | 2.1111 |
| 28 | −7 5 −3 1 1 −1 | 2.1966 |
| 29 | −7 7 7 −5 3 −1 | 2.1966 |

A structure of comb-2 used for DMRS mapping in frequency domain is shown in FIG. 2. To be specific, for uplink transmission data of a user, a DMRS occupies only odd-numbered subcarriers or even-numbered subcarriers. For a system, uplink transmission data of another user that is scheduled at the same time may occupy the other group of subcarriers.

Sequences in Table 1a are modulated and then repeated in different manners, and are transformed, through DFT transform, into the frequency domain for frequency-domain filtering. PARP values of sequences are finally obtained, as shown in Table 2a. The foregoing transform process is shown in FIG. 3. For example, a modulated base sequence $s_{N/2}$ having a length of N/2 is repeated to obtain $s^{(0)}=[s_{N/2}, s_{N/2}]$ and $s^{(1)}=[s_{N/2}, -s_{N/2}]$, and then DFT transform is performed on $s^{(0)}$ and $s^{(1)}$ to obtain $s^{(0)}=DFT(s^{(0)})$ and $s^{(1)}=DFT(s^{(1)})$, where the sequence $s^{(0)}$ having a length of N occupies only even-numbered subcarriers shown in FIG. 2, and the sequence $s^{(1)}$ having a length of N occupies only odd-numbered subcarriers shown in FIG. 2.

It may be learned from the following Table 2a and the foregoing Table 1a that, after a base sequence $s_{N/2}$ having a length of 6 is repeated through {Φ(0), . . . , Φ(5), −Φ(0), . . . , −Φ(5)}, a PAPR is higher than a PAPR value of the data.

TABLE 2a

| u | Φ(0), . . . , Φ(5) | PAPR (dB) of {Φ(0), . . . , Φ(5), Φ(0), . . . , Φ(5)} | PAPR (dB) of {Φ(0), . . . , Φ(5), −Φ(0), . . . , −Φ(5)} |
|---|---|---|---|
| 0 | −7 5 −7 −3 −5 5 | 1.4610 | 1.4479 |
| 1 | −7 −3 −7 −3 7 5 | 1.4610 | 1.5786 |
| 2 | −7 −3 3 7 3 −3 | 1.5421 | 1.7852 |
| 3 | −7 5 −7 −3 7 5 | 1.6373 | 2.1837 |
| 4 | −7 −3 −7 −3 −5 5 | 1.6373 | 2.2430 |
| 5 | −7 1 −1 5 −7 5 | 1.6492 | 2.3795 |
| 6 | −7 5 −1 1 −3 1 | 1.8773 | 2.3797 |
| 7 | −7 −3 −7 −5 5 1 | 1.8773 | 2.3797 |
| 8 | −7 −5 3 7 5 −1 | 1.9518 | 2.3822 |
| 9 | −7 3 −3 −5 −1 7 | 1.9518 | 2.3905 |
| 10 | −7 1 −3 1 7 5 | 1.9574 | 2.3905 |
| 11 | −7 −3 −3 −1 −7 5 | 1.9661 | 2.3905 |
| 12 | −7 −7 −3 1 −3 7 | 1.9661 | 2.4530 |
| 13 | −7 5 −5 −1 −3 5 | 1.9682 | 2.4702 |
| 14 | −7 −1 5 7 5 −1 | 1.9911 | 2.5254 |
| 15 | −7 3 −3 −5 −3 3 | 1.9911 | 2.5254 |
| 16 | −7 −3 3 −1 −7 −5 | 1.9939 | 2.6289 |
| 17 | −7 −3 −5 −3 7 3 | 1.9939 | 2.6671 |
| 18 | −7 −1 −3 −1 7 3 | 2.0232 | 2.6671 |
| 19 | −7 5 7 −1 −3 3 | 2.0314 | 2.9176 |
| 20 | −7 −1 −3 5 7 3 | 2.0314 | 3.0113 |
| 21 | −7 −1 3 7 3 −1 | 2.0425 | 3.4406 |
| 22 | −7 3 −1 −5 −1 3 | 2.0425 | 3.4408 |
| 23 | −7 3 3 7 −5 7 | 2.0490 | 3.4847 |
| 24 | −7 5 −7 −3 −3 7 | 2.0491 | 3.5402 |
| 25 | −7 −5 3 7 3 −3 | 2.0927 | 3.6761 |
| 26 | −7 3 −1 3 −5 −3 | 2.0928 | 3.7384 |
| 27 | −7 1 −3 5 7 5 | 2.1111 | 3.7385 |
| 28 | −7 5 −3 1 1 −1 | 2.1966 | 4.0684 |
| 29 | −7 7 7 −5 3 −1 | 2.1966 | 4.0686 |

Figure 4:
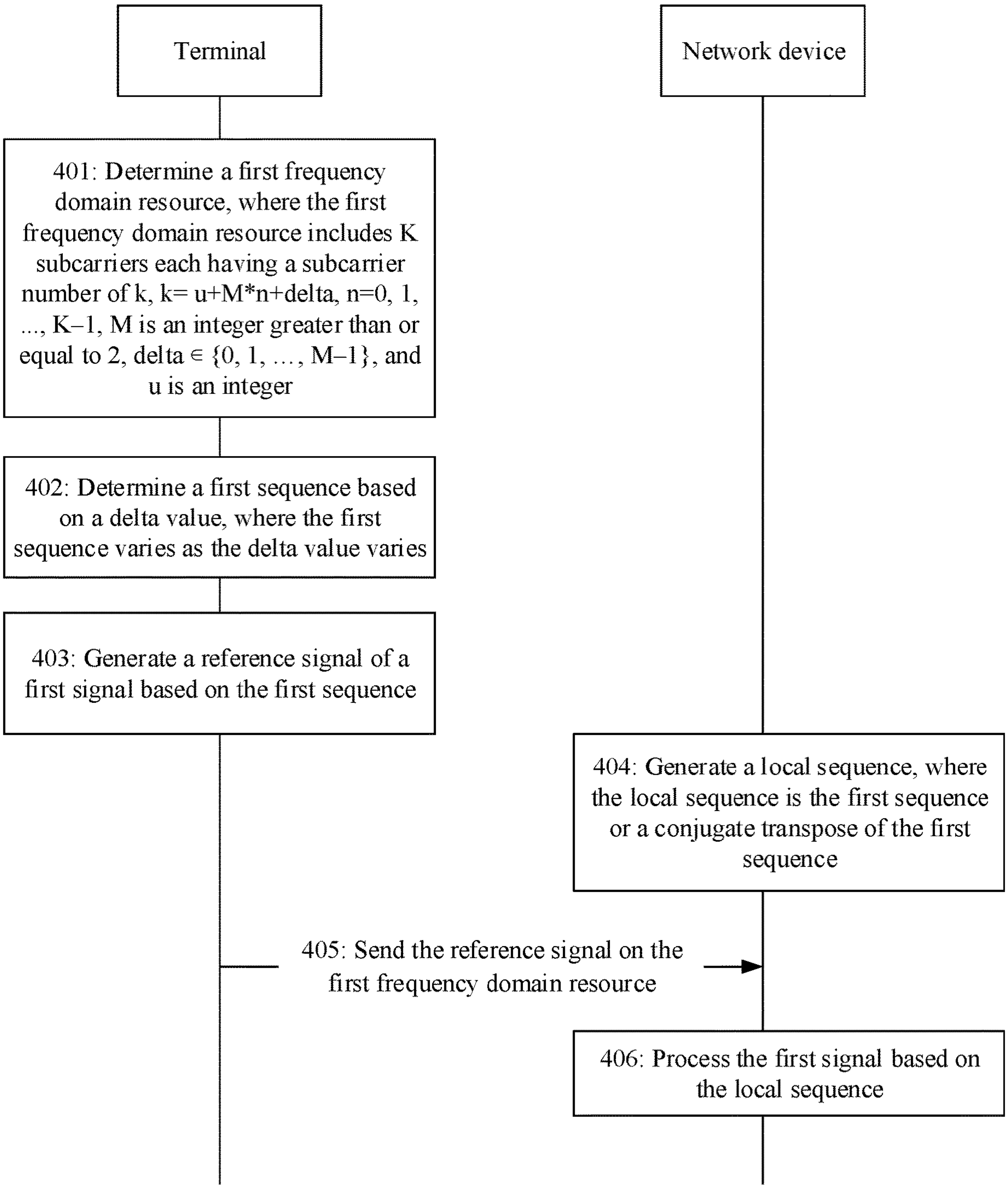
FIG. 4 is a schematic flowchart of a signal processing method according to an embodiment of this application.

FIG. 4 is a schematic flowchart of signal processing according to an embodiment of this application.

In this embodiment of this application, a transmit end may be a terminal, and a corresponding receive end is a network device; or a transmit end is a network device, and a receive end is a terminal. The following embodiment is described by using an example in which the transmit end is a terminal, and the receive end is a network device. This is not limited in this application.

401: The terminal determines a first frequency-domain resource, where the first frequency-domain resource includes K subcarriers each having a subcarrier number of k, k=u+L*n+delta, n=0, 1, . . . , K−1, L is an integer greater than or equal to 2, delta∈{0, 1, . . . , L−1}, u is an integer, and the subcarrier numbers are sequentially numbered in ascending or descending order of frequencies.

Figure 5:
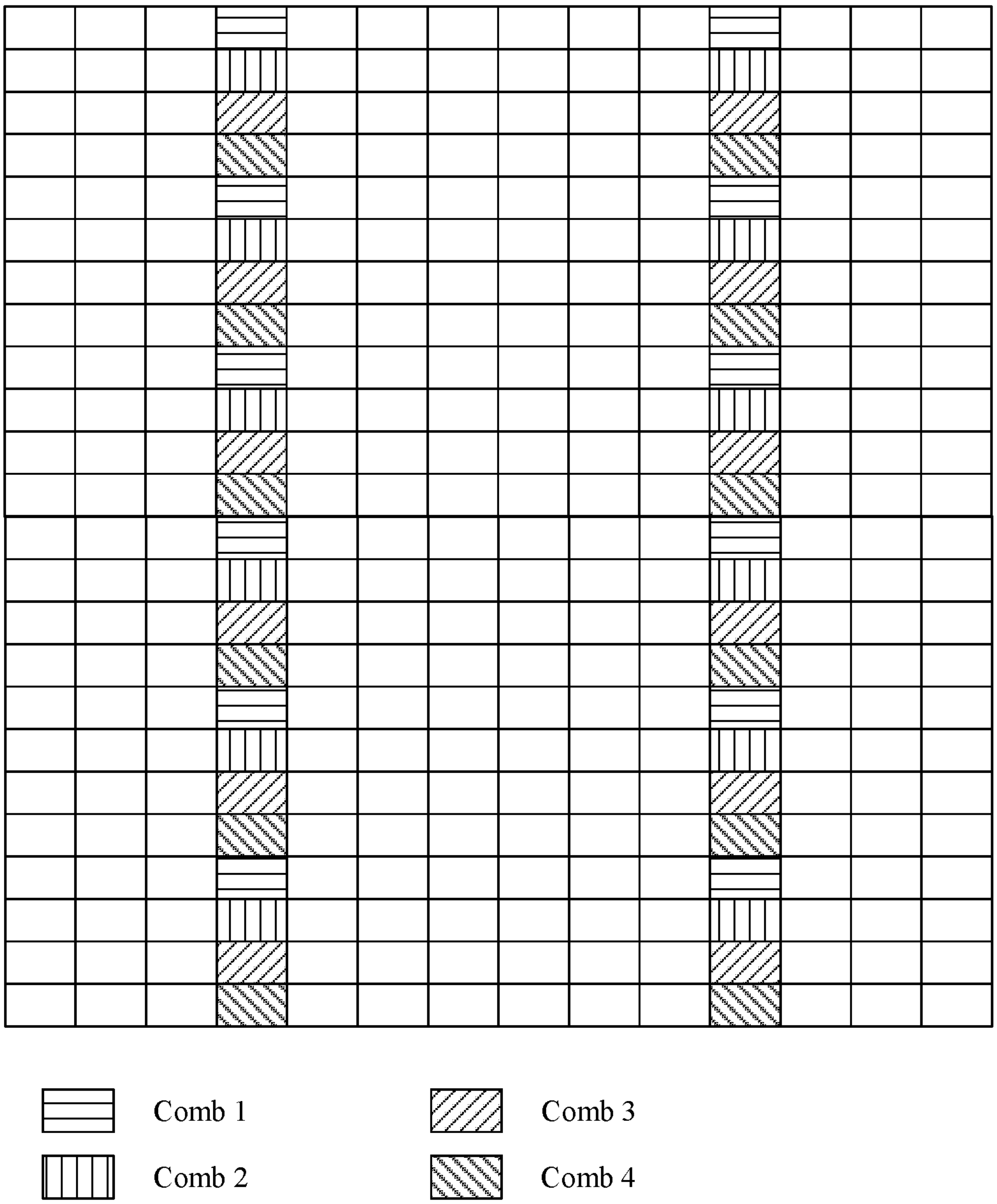
FIG. 5 is a schematic flowchart of a signal processing method according to another embodiment of this application.

Specifically, when n is 0, 1, . . . , or K−1, subcarriers obtained based on k=u+L*n+delta may constitute a comb structure. k is the subcarrier number, u may be the subcarrier number of the first subcarrier in the K subcarriers, and a value of L may be determined based on the comb structure. For example, for a comb-2 structure (as shown in FIG. 2), L is 2. For a comb-4 structure (as shown in FIG. 5), L is 4. A delta value may be any one of 0, 1, . . . , and L−1. The obtained first frequency-domain resource varies as the delta value varies. In other words, different delta values correspond to subcarrier combinations on different combs. For example, as shown in FIG. 2, when delta=0, the first frequency-domain resource may include a subcarrier corresponding to a comb 1. When delta=1, the first frequency-domain resource may include a subcarrier corresponding to a comb 2. That n is 0, 1, . . . , or K−1 means that n is valued 0, 1, . . . , or K−1.

It should be understood that, in this embodiment of this application, a frequency-domain resource is described by using a "subcarrier" as an example, but the frequency-domain resource may alternatively be a carrier or another frequency-domain unit. This is not limited in this application.

It should be further understood that, the value of L varies as the comb structure comb-L varies, and may be another value. This is not limited in this application.

It should be understood that, the foregoing step of determining the first sequence may be optional, or may be replaced with another step. In an embodiment, before the reference signal is generated, the method further includes: determining a first sequence based on the delta value. Specifically, the first sequence is determined based on a mapping relationship. The mapping relationship may be stored after being configured by another device or apparatus, or may be predefined. The mapping relationship may be a mapping relationship between a delta and the first sequence, or may be a parameter in a generation formula. In another embodiment, the first sequence may alternatively be directly generated based on the delta value. The first sequence is associated with the delta value.

In another embodiment, the reference signal is sent on the first frequency-domain resource. The first frequency-domain resource includes a first subcarrier set, and there is a fixed subcarrier spacing between subcarriers in the first subcarrier set, for example, the first subcarrier set is in the foregoing comb-shaped form. For example, a subcarrier spacing in the first subcarrier set is one subcarrier. Using 6 as an example, the first subcarrier set is {a0, a1, a2, a3, a4, a5}. If the spacing is one subcarrier, subcarriers that are in the first subcarrier set and arranged in ascending order in frequency domain may be {a0, b, a1, c, a2, d, a3, e, a4, f, a5, g}, where b, c, d, e, f, and g are other subcarriers. When the first frequency-domain resource is determined, a used first sequence is determined based on an offset value of the first subcarrier set. The offset value may be a relative offset value or an absolute offset value. In an embodiment, if b, c, d, e, f, and g belong to a second subcarrier set, and all or some of b, c, d, e, f, and g constitute a second resource. That is, b, c, d, e, f, and g are {b0, b1, b2, b3, b4, b5} respectively. The subcarriers that are in the subcarrier set and arranged in ascending order in frequency domain are {a0, b0, a1, b1, a2, b2, a3, b3, a4, b4, a5, b5}. Based on the relative offset value, because a position of a start subcarrier in the first subcarrier set is a0, and a position of a start subcarrier in the second subcarrier set is b0, a0 may be configured to generate the first sequence, and b0 may be configured to generate a second sequence (which is similar to the first sequence and is equivalent to a first sequence of b0). That is, the first sequence and the second sequence are determined based on a relative position of a start position of the first frequency-domain resource. Because the two subcarrier sets are arranged in a comb-shaped manner, the first sequence and the second sequence may alternatively be directly determined based on positions of the two subcarrier sets. The relative position may be determined through comparison, and the absolute position may be determined through calculation, for example, may be determined directly based on a parameter in a preset calculation rule (similar to delta in the foregoing embodiment), or may be determined directly based on an association relationship between a parameter and the first sequence. For example, in this embodiment, k=u+L*n+delta; when delta=0, the subcarriers correspond to the first sequence; and when delta=1, the subcarriers correspond to the second sequence. In this case, when (or before) sending the reference signal, the transmit end may determine, directly based on a resource corresponding to each reference signal in the foregoing formula, a position and a first sequence, where the first sequence is used at the position to generate the reference signal.

In another embodiment, calculation may be performed based on an offset value. For uplink data transmission, for example, when transmission precoding is disabled, a transmission sequence r(m) may be first mapped to a median value $\tilde{a}_{k,l}^{(\tilde{p}_j,\mu)}$ based on the following relationship:

$$\tilde{a}_{k,l}^{(\tilde{p}_j,\mu)} = w_f(k')w_t(l')r(2n+k')$$

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

$$j = 0, 1, \ldots \nu - 1;$$

when the transmission precoding is enabled:

the transmission sequence r(m) may be first mapped to a median value $\tilde{a}_{k,l}^{(\tilde{p}_j,\mu)}$ based on the following relationship:

$$\tilde{a}_{k,l}^{(\tilde{p}_j,\mu)} = w_f(k')w_t(l')r(2n+k')$$

$$k = 4n+2k'+\Delta$$

$$k' = 0,1$$

$$l = \bar{l}+l'$$

$$n = 0,1, \ldots .$$

A manner of mapping a sequence to a frequency-domain resource in the present disclosure is applicable to the foregoing configuration type 1.

Optionally, the median value is a signal, and after being transformed, the signal is mapped to a time-frequency resource including k subcarriers and one OFDM symbol.

The configuration type may be configured by using higher layer signaling. For example, for DMRS-UplinkConfig, both k' and Δ correspond to $\tilde{p}_0, \ldots, \tilde{p}_{\nu-1}$. (In an embodiment, Δ in the formula is delta in the foregoing embodiment). When k' or Δ does not correspond to $\tilde{p}_0, \ldots, \tilde{p}_{\nu-1}$, a value of Δ may satisfy the following relationship (in an embodiment, for the first configuration manner type 1):

| | CDM | | $w_f$(k') | | $w_t$ (l') | |
|---|---|---|---|---|---|---|
| p̃ | group | Δ | k' = 0 | k' = 1 | l' = 0 | l' = 1 |
| 0 | 0 | 0 | +1 | +1 | +1 | +1 |
| 1 | 0 | 0 | +1 | −1 | +1 | +1 |
| 2 | 1 | 1 | +1 | +1 | +1 | +1 |
| 3 | 1 | 1 | +1 | −1 | +1 | +1 |
| 4 | 0 | 0 | +1 | +1 | +1 | −1 |
| 5 | 0 | 0 | +1 | −1 | +1 | −1 |
| 6 | 1 | 1 | +1 | +1 | +1 | −1 |
| 7 | 1 | 1 | +1 | −1 | +1 | −1 |

(In an embodiment, for the first configuration manner type 2):

| | CDM | | $w_f$(k') | | $w_t$ (l') | |
|---|---|---|---|---|---|---|
| p̃ | group | Δ | k' = 0 | k' = 1 | l' = 0 | l' = 1 |
| 0 | 0 | 0 | +1 | +1 | +1 | +1 |
| 1 | 0 | 0 | +1 | −1 | +1 | +1 |

-continued

| $\tilde{p}$ | CDM group | Δ | $w_f(k')$ k' = 0 | $w_f(k')$ k' = 1 | $w_t(l')$ l' = 0 | $w_t(l')$ l' = 1 |
|---|---|---|---|---|---|---|
| 2 | 1 | 2 | +1 | +1 | +1 | +1 |
| 3 | 1 | 2 | +1 | −1 | +1 | +1 |
| 4 | 2 | 4 | +1 | +1 | +1 | +1 |
| 5 | 2 | 4 | +1 | −1 | +1 | +1 |
| 6 | 0 | 0 | +1 | +1 | +1 | −1 |
| 7 | 0 | 0 | +1 | −1 | +1 | −1 |
| 8 | 1 | 2 | +1 | +1 | +1 | −1 |
| 9 | 1 | 2 | +1 | −1 | +1 | −1 |
| 10 | 2 | 4 | +1 | +1 | +1 | −1 |
| 11 | 2 | 4 | +1 | −1 | +1 | −1 |

Optionally, downlink data is also applicable to the foregoing method.

Optionally, based on the foregoing association relationship, in this embodiment of the present disclosure, the first sequence is directly determined based on the foregoing $\tilde{p}$ and CDM group.

Optionally, based on the foregoing association relationship, in this embodiment of the present disclosure, the first sequence is determined directly based on a time-frequency resource of the first signal.

Optionally, there is at least one first sequence group. In a same sequence length, a first sequence group includes two different sequences.

In an embodiment, L=2, K=6, n=0, 1, 2, 3, 4, and 5, and delta=0.

Specifically, L=2 indicates that the comb structure is the comb-2. K=6 indicates that the first frequency-domain resource includes six subcarriers. With reference to n=0, 1, 2, 3, 4, and 5, delta=0, and k=u+L*n+delta, the terminal may determine that the first frequency domain includes subcarriers at odd-numbered positions, namely, combs 1 in FIG. 2. In addition, based on K=6 and L=2, it may be further learned that the first frequency-domain resource may include subcarriers at odd-numbered positions in 12 subcarriers in one RB.

In another embodiment, if L=2, K=6, n=0, 1, 2, 3, 4, and 5, and delta=1, the first frequency-domain resource may include subcarriers shown by combs 2 in FIG. 2.

402: The terminal determines the first sequence based on the delta value, where the first sequence varies as the delta values varies, and a length of the first sequence is K.

Specifically, that a length of the first sequence is K indicates that the first sequence includes K elements. The different delta values may correspond to different sequences. For example, a plurality of delta values may have a one-to-one mapping relationship with a plurality of sequences. In this case, the terminal may determine, based on the mapping relationship, a sequence corresponding to a delta value. It should be noted that the mapping relationship may be represented in a form of a list.

Optionally, the first sequence is neither a sequence modulated by using BPSK nor a sequence modulated by using pi/2 BPSK.

Optionally, the first sequence is a sequence modulated by using any one of 8PSK, 16PSK, or 32PSK.

Specifically, different modulation schemes correspond to different quantities of sequences. A quantity of sequences corresponding to any one modulation scheme of 8PSK, 16PSK, or 32PSK is greater than a quantity of sequences corresponding to the modulation scheme pi/2 BPSK. This helps select sequences with low correlations for frequency-domain resources on different combs to improve efficiency of communication on the frequency-domain resources on different combs.

In an embodiment, the terminal may determine the first sequence group based on the delta value.

Specifically, frequency-domain resources corresponding to different delta values may be different subcarrier combinations. For example, as shown in FIG. 2, if delta=0, the first frequency-domain resource includes the subcarriers shown by the combs 1; and if delta=1, the first frequency-domain resource includes the subcarriers shown by the combs 2. A plurality of delta values have a mapping relationship with a plurality of sequence groups. In this case, the terminal may determine, based on the mapping relationship, the first sequence group corresponding to a value (for example, a first delta value).

Different modulation schemes correspond to different quantities of sequences. A quantity of sequences corresponding to any one modulation scheme of 8PSK, 16PSK, or 32PSK is greater than a quantity of sequences corresponding to the modulation scheme pi/2 BPSK. In this case, PAPRs of DMRS sequences carried on frequency-domain resources on different combs are relatively low so that out-of-band spurious emission and in-band signal loss are avoided, or uplink coverage is improved. In addition, it may further be ensured that characteristics such as an auto-correlation and frequency-domain flatness of DMRS sequences carried on the frequency-domain resources of different combs are relatively low so that DMRS-based channel estimation performance is improved.

In an embodiment, the terminal may determine the first sequence based on the delta value and a cell identifier or a sequence group identifier.

Specifically, frequency-domain resources corresponding to different delta values may be different subcarrier combinations. For example, as shown in FIG. 2, if delta=0, the first frequency-domain resource includes the subcarriers shown by the combs 1; and if delta=1, the first frequency-domain resource includes the subcarriers shown by the combs 2. A plurality of delta values have a mapping relationship with a plurality of sequence sets. The mapping relationship may be predefined. In this way, the terminal may determine, based on the mapping relationship and a delta value (for example, a first delta value) at a current transmission moment, a sequence set in the plurality of sequence sets. The sequence set corresponds to the first delta value. The terminal may determine, based on the cell identifier or the sequence group identifier, a sequence in the sequence set as a sequence for generating a DMRS.

Optionally, the terminal may determine the first sequence based on the cell identifier or the sequence group identifier.

Specifically, both the terminal and the network device prestore a plurality of sequence groups, and each sequence group corresponds to a cell identifier or a sequence group identifier. The terminal may determine, based on configuration information by the network device, a sequence group used to transmit a DMRS, where the configuration information includes the cell identifier or the sequence group identifier. Therefore, different cells may use different sequence groups, thereby reducing inter-cell signal interference. Further, a plurality of delta values have a predefined mapping relationship with a plurality of sequences in a sequence group, and the terminal determines, based on the delta value, a sequence in the sequence group as a sequence for generating the DMRS.

Optionally, the terminal may determine the first sequence based on the cell identifier or the sequence group identifier.

Specifically, the terminal may group sequences having a same cell identifier into one sequence group. In other words, different sequence groups serve different cells respectively. Alternatively, the terminal may agree on a sequence group identifier with the network device, and different sequence group identifiers correspond to different sequence groups. In this way, the terminal may determine a corresponding sequence group based on the sequence group identifier configured by the network device. To be specific, the terminal may select a sequence from the proper sequence group to generate the reference signal so that the first signal can be accurately demodulated. This improves data transmission quality.

Optionally, the terminal receives indication information. The indication information is used to indicate a sequence that is in each of at least two sequence groups and used to generate the reference signal. Correspondingly, the network device sends the indication information.

Specifically, the network device may send the indication information to the terminal to indicate the sequence in each of the at least two sequence groups by using the indication information, that is, further notify the terminal to use the sequence in the sequence group. In this way, the terminal generates the reference signal based on the sequence indicated by the indication information. Compared with a manner in which indication information is configured to select a sequence from each sequence group, in this embodiment of this application, signaling overheads can be reduced. It should be understood that step 401 and step 402 are two optional steps.

403: The terminal generates the reference signal of the first signal based on the first sequence, where the first signal is a signal modulated by using pi/2 BPSK.

Specifically, the terminal may map K elements in the first sequence to K subcarriers respectively on the first frequency-domain resource, to obtain the reference signal.

It should be noted that, reference signals mapped to frequency-domain resources corresponding to different delta values may be different reference signals of a same terminal, or may be reference signals of different terminals. This is not limited in this application.

It should be understood that, the first signal may be data or signaling modulated by using pi/2 BPSK. This is not limited in this application.

It should be further understood that, the reference signal may be a demodulation reference signal (DMRS), UCI, an SRS, and a PTRS, or may be acknowledgment (ACK) information, negative acknowledgment (NACK) information, or uplink scheduling request (SR) information. This is not limited in this application.

Optionally, when delta=0, the generating the reference signal of the first signal includes:

performing discrete Fourier transform on elements in a sequence {z(t)} to obtain a sequence {f(t)} with t=0, . . . , L*K−1, where when t=0, 1, . . . , L*K−1, z(t)=x(t mod K), and x(t) represents the first sequence; and mapping elements numbered L*p+delta in the sequence {f(t)} to subcarriers each having the subcarrier number of u+L*p+delta respectively, to generate the reference signal, where p=0, . . . , K−1.

Optionally, when L=2 and delta=1, the generating the reference signal of the first signal includes:

performing discrete Fourier transform on elements in a sequence {z(t)} to obtain a sequence {f(t)} with t=0, . . . , L*K−1, where when t=0, . . . , K−1, z(t)=x(t), when t=K, . . . , L*K−1, z(t)=−x(t mod K), and x(t) represents the first sequence; and mapping elements numbered L*p+delta in the sequence {f(t)} to subcarriers each having the subcarrier number of L*p+delta respectively, to generate the reference signal, where p=0, . . . , K−1.

Optionally, when L=4, the generating the reference signal of the first signal includes:

performing discrete Fourier transform on elements in a sequence {z(t)} to obtain a sequence {f(t)} with t=0, . . . , 4K−1, where when t=0, 1, . . . , 4K−1, $$z(t) = w_{delta}\left(\left\lfloor \frac{t}{K} \right\rfloor\right)x(t \bmod K),$$

where $w_0$=(1, 1, 1, 1), $w_1$=(1, −1, 1 −1), $w_2$=(1, 1, −1, −1), $w_3$=(1, −1, −1, 1), ⌊c⌋ represents rounding down of c, and x(t) represents the first sequence, where in another embodiment, $w_0$=(1, 1, 1, 1), $w_1$=(1, j, −1, −j), $w_2$=(1, −1, 1, −1), and $w_3$=(1, −j, −1, j); and mapping elements numbered 4p+delta in the sequence {f(t)} to subcarriers each having the subcarrier number of u+L*p+delta respectively to generate the reference signal, where p=0, . . . , K−1, and $w_{delta}$ may represent a different OCC value when the delta varies.

Optionally, the generating the reference signal of the first signal includes:

performing discrete Fourier transform on elements in a sequence {x(t)} to obtain a sequence {f(t)} with t=0, . . . , K−1, where x(t) represents the first sequence; and mapping elements numbered p in the sequence {f(t)} to subcarriers each having the subcarrier number of u+L*p+delta respectively, to generate the reference signal, where p=0, . . . , K−1.

Specifically, the terminal and the network device may pre-agree on sequence combinations corresponding to different modulation schemes. For example, 30 sequences are selected from a plurality of sequences modulated by using 16 PSK, and the 30 sequences may be sequences used to generate reference signals with relatively high performance. The terminal then selects the first sequence from the sequence combination to generate the reference signal. Therefore, efficiency of communication between the terminal and the network device is improved. Correspondingly, the terminal or the network device may alternatively select 30 sequences from a plurality of sequences modulated by using 8PSK, or may alternatively select 30 sequences from a plurality of sequences modulated by using 32PSK. Herein, a principle of $x_n$ obtained by using the following two formulas may be further described. In this case, for the comb-2 structure, the terminal may determine, based on a preset condition and a sequence {s(n)}, the first sequence used to generate the reference signal transmitted on the combs 1 in the comb-2.

Optionally, when delta=0, the method further includes:

determining the first sequence {x(n)} based on the preset condition and the sequence {s(n)}, where the preset condition is $x_n=y_{(n+M) \bmod K}$, where $$y_n = A \cdot e^{\frac{j \times \pi \times s_n}{16}},$$

M∈{0, 1, 2, . . . , 5}, K=6, A is a non-zero complex number, and $j=\sqrt{-1}$; and the sequence {s(n)} includes at least one of the following sequences:

{1, −5, 5, 11, −13, 11}, {1, −5, 3, 13, 3, −5}, {1, −5, 5, 13, 5, 11}, {1, −9, −5, 5, 15, 11}, {1, 9, −15, 11, −13, 11}, {1, 9, −15, 11, 3, 11}, {1, 11, −11, −9, 13, 3}, {1, −7, 7, 15, 11, 15}, {1, −9, −1, −5, −15, −7}, {1, −13, −9, −15, −5, 7}, {1, −1, 7, 15, 3, 11}, {1, 9, −15, 15, −9, 11}, {1, 15, 7, −5, −11, −9}, {1, 11, 15, −3, −13, 5}, {1, 9, −15, 15, 7, 15}, {1, 9, −15, 9, 7, 15}, {1, −11, −3, 11, −15, 13}, {1, 11, 1, 5, −9, −9}, {1, −3, 9, −1, −15, −11}, {1, 15, −13, 7, −5, −9}, {1, 11, −3, 3, 1, −9}, {1, −11, −13, 9, −13, −3}, {1, −11, −7, 3, 13, 3}, {1, −11, 11, −11, −7, 3}, {1, −11, −15, −9, 3, 11}, {1, 15, 5, −9, −7, −9}, {1, 11, 15, 9, −1, −11}, {1, −11, −1, −5, 5, 11}, {1, 7, −5, 5, 15, 11}, or {1, 11, 3, 13, −13, 15}; or

{1, −11, 11, −1, 7, 13}, {1, −3, −13, 15, −5, 5}, {1, −11, 11, −1, 3, 13}, {1, 13, −9, 3, −3, −13}, {1, −11, 11, −1, 7, 13}, {1, −3, 9, −13, −1, −9}, {1, 11, 13, 1, −9, 11}, {1, 11, −9, 13, 7, 5}, {1, 3, −9, 13, 1, 11}, {1, 11, −9, 15, 7, 5}, {1, −11, −3, 5, 7, −5}, {1, 7, −15, 5, −5, 15}, {1, −5, −15, −3, 7, −13}, {1, 9, 13, 1, −9, 11}, {1, −7, −11, 1, 11, −9}, {1, 9, −3, −13, 7, 11}, {1, 11, −9, −13, 13, 5}, {1, −9, −15, −3, 7, −13}, {1, −11, −9, 1, 7, −5}, {1, 9, −3, −13, 7, 9}, {1, 13, 11, 3, −5, 7}, {1, 13, 9, 1, −5, 7}, {1, 9, 15, 3, −7, 13}, {1, −7, 5, 13, −7, −15}, {1, 1, 9, −3, −11, 9}, {1, −11, −5, 1, 7, −5}, {1, −5, −11, 1, 11, −9}, {1, −9, 1, 11, −9, −15}, {1, 13, −9, 1, −5, −15}, {1, −5, 7, −15, −5, −15}, {1, −9, 11, −15, −15, −5}, {1, −9, −15, −5, 5, −15}, {1, −9, 13, −13, −3, −3}, {1, −9, 13, 1, 1, 11}, {1, −9, 1, 1, 7, −5}, {1, −11, −15, −3, 7, −13}, {1, −11, −13, −1, 9, −11}, {1, 3, 15, −13, 7, −3}, {1, −11, −7, 5, 7, −5}, {1, 11, 11, 1, −9, 9}, {1, 15, 7, −3, −3, 7}, {1, −9, 13, 13, −9, −1}, {1, 11, 11, 1, −7, 7}, {1, −11, −3, 3, −9, −5}, {1, 7, 15, 3, −7, −3}, {1, 11, 7, −13, 13, 5}, {1, 13, 5, −1, 11, 7}, {1, −11, −3, 1, 7, −5}, {1, −11, −5, −1, 7, −5}, {1, −3, −11, 1, 11, −9}, {1, 13, −9, 3, −5, −9}, {1, 11, −1, −11, 9, 15}, {1, 11, 13, −13, 7, −3}, {1, 11, −9, −15, 15, 5}, {1, 11, −9, 13, 11, 5}, {1, −11, −3, 5, −7, −5}, {1, −7, −15, −3, 7, 5}, {1, −7, −15, −3, −5, 5}, {1, −9, −7, 13, −11, −3}, {1, −7, −15, −15, −5, 5}, {1, 11, 11, 3, −5, 7}, {1, 13, −9, 1, −7, −15}, {1, 9, 9, −1, −11, 9}, {1, −9, −9, −1, 7, −5}, {1, −9, −1, 7, 7, −5}, {1, −9, 13, 1, 1, 9}, {1, 13, 13, 5, −3, 7}, {1, 15, 7, −1, −3, 7}, {1, 11, 9, 1, −7, 7}, {1, −9, −7, 1, 9, −5}, {1, 3, −7, 15, 1, 9}, {1, −9, −15, −3, 5, −15}, {1, −5, −15, −15, −3, 5}, {1, 1, 11, −15, 5, −3}, {1, −7, 13, −13, −3, −3}, {1, −7, 3, 13, −7, −15}, {1, −7, 5, 15, −7, −15}, {1, −9, 13, −11, −11, −3}, {1, −11, −3, −3, 5, −5}, {1, −11, −3, 3, −9, 13}, {1, −11, −7, 1, −11, −5}, {1, −7, −11, 1, 11, 5}, {1, −3, −11, 1, 11, 5}, {1, −11, −3, 1, −11, −5}, {1, 11, 15, −13, 7, −3}, {1, 7, 15, 3, 7, −3}, {1, −9, −3, −15, −11, −3}, {1, 5, 15, 3, −7, 13}, {1, 11, 7, −13, 11, 5}, {1, −9, −3, −15, −7, −3}, {1, −3, −11, 1, −5, 5}, {1, −7, −11, 1, −5, 5}, {1, −3, 9, −13, −1, −11}, {1, −9, 3, 13, −7, −11}, {1, 13, 7, −1, 11, 7}, {1, −5, −11, 1, 11, 5}, {1, −11, −5, 1, −11, −5}, {1, −9, −3, −15, −9, −3}, {1, −5, −11, 1, −5, 5}, {1, 11, −11, 1, −5, −15}, {1, −9, −15, −3, 7, −15}, {1, 11, 11, 1, −9, 11}, {1, 1, 11, −15, 5, −5}, {1, 9, 11, −1, −11, −3}, {1, 11, 3, 15, 7, 5}, {1, 3, 11, −1, 7, −3}, {1, −7, 5, −3, 7, −13}, {1, −9, −11, 1, 11, 5}, {1, −1, −11, 1, 11, 5}, {1, −11, −9, 1, −11, −5}, {1, 11, −1, −11, −5, 15}, {1, −11, −1, 1, −11, −5}, {1, −9, −3, −15, −5, −3}, {1, −1, −11, 1, −5, 5}, or {1, −9, −11, 1, −5, 5}.

Optionally, when delta=1, the method further includes:

determining the first sequence based on the preset condition and the sequence {s(n)}, where the preset condition is $x_n = y_{(n+M) \bmod K}$, where $$y_n = A \cdot e^{\frac{j \times \pi \times s_n}{16}},$$

$M \in \{0, 1, 2, \ldots, 5\}$, K=6, A is a non-zero complex number, and $j=\sqrt{-1}$; and the sequence {s(n)} includes at least one of the following sequences:

{1, −7, 13, −13, −11, −3}, {1, −7, −9, −15, −3, 5}, {1, 5, 15, −15, 5, −3}, {1, 13, 11, 1, −3, 9}, {1, 11, 3, 15, 11, 5}, {1, −11, −3, 3, −9, −5}, {1, −11, −3, 3, −9, 13}, {1, −7, 3, 15, 11, 5}, {1, −3, 7, −13, 9, 5}, {1, 11, 7, −13, 9, 5}, {1, 13, −9, 1, −9, −15}, {1, −9, 13, 1, 1, 7}, {1, 3, 11, −1, −11, −3}, {1, 3, 11, −1, 7, −3}, {1, 9, −1, 7, 9, −3}, {1, 11, −11, 13, 15, −7}, {1, −7, 3, −5, −3, 7}, {1, 9, 7, −3, 5, −5}, {1, 13, 15, 7, −3, 5}, {1, −7, 3, 11, 9, −3}, {1, 13, −7, −5, −15, −7}, {1, −7, 13, 15, −3, 3}, {1, −13, −15, −3, 5, −9}, {1, 15, 11, −1, 11, 7}, {1, −3, 11, 7, −5, 5}, {1, −13, −9, 3, −7, −3}, {1, 7, 7, −5, −15, −3}, {1, 11, 1, 11, −11, −9}, {1, −5, 5, −7, −11, 9}, or {1, −9, 1, 3, −3, 7}; or

{1, 9, −15, −7, −15, 9}, {1, −5, 3, 13, −13, 11}, {1, 11, −13, 13, 3, −5}, {1, −5, 1, 9, −13, 11}, {1, −5, 5, 11, −13, 9}, {1, −7, −13, 9, 15, −9}, {1, −7, 3, 11, −15, 11}, {1, −9, −3, −9, −1, 9}, {1, 9, 3, 9, −1, −9}, {1, −5, −13, 9, −15, −9}, {1, −5, −13, 9, 15, −9}, {1, −5, −15, 9, 15, −9}, {1, −9, 15, 9, −13, −5}, {1, −9, −15, 9, −13, −5}, {1, −7, 15, 9, −13, −5}, {1, −9, −5, 5, 15, 11}, {1, 11, 15, 5, −5, −9}, {1, −7, −15, 9, −13, −5}, {1, −7, 1, 9, −15, 11}, {1, 9, −15, −7, −15, 11}, {1, 9, −15, −7, −13, 11}, {1, −7, −15, 9, 15, −9}, {1, −5, −13, −5, 3, 11}, {1, −7, −13, −5, 3, 11}, {1, 9, −15, 9, −1, −7}, {1, −5, 1, −11, 15, −7}, {1, −5, 5, 15, −13, 11}, {1, 9, −13, 15, 5, −5}, {1, 9, 5, −5, −15, −9}, {1, 9, −1, −11, −15, −9}, {1, 9, 15, 5, −5, −9}, {1, −9, −1, 9, 15, 11}, {1, −5, 3, 13, 7, −5}, {1, −9, 15, −13, −3, 7}, {1, 7, −3, −13, 15, −9}, {1, −7, −1, −13, 15, −7}, {1, 9, −13, 15, 3, 9}, {1, 9, 5, −5, −15, −7}, {1, 9, −1, −11, −15, −7}, {1, 5, −9, −15, −3, 7}, {1, −13, −9, −15, −5, 7}, {1, −5, 7, 15, 9, 15}, {1, −5, 3, 15, 9, −5}, {1, 9, 15, 9, −3, −11}, {1, 11, 7, 11, −3, −11}, {1, −11, −5, −11, −3, 9}, {1, −7, 3, 15, 11, −3}, {1, 9, 3, 9, −3, −11}, {1, 11, 3, 7, −7, −11}, {1, 7, 15, −5, −13, 7}, {1, −3, 7, −13, 11, −3}, {1, 11, 3, −9, −15, −9}, {1, −9, −15, −3, 3, 11}, {1, 11, 5, −7, −1, −9}, {1, 7, −5, −11, −1, 9}, {1, −7, 3, 13, −13, 13}, {1, −9, 13, −11, −5, 7}, {1, 9, 15, 7, −3, −11}, {1, 11, 15, 9, −3, −11}, {1, 11, 3, −7, −15, −7}, {1, 11, 1, −9, −15, −5}, {1, 11, 3, −9, −15, −7}, {1, 11, 5, 9, −3, −11}, {1, 7, 15, 7, −3, −11}, {1, 11, 5, −5, −15, −5}, {1, 11, 5, −7, −15, −7}, {1, −11, −7, −11, −1, 11}, {1, 11, 7, 11, −1, −11}, {1, 11, 15, 11, −1, −11}, {1, −11, −15, −11, −1, 11}, {1, 9, −15, 9, 5, −5}, {1, −7, −13, 11, −13, −5}, {1, 9, −15, 9, 3, −5}, {1, 5, 3, 11, −11, 13}, {1, −9, −13, 11, −13, −5}, {1, −7, 3, 11, −13, 13}, {1, −7, 3, 11, −13, 11}, {1, −7, −1, 7, −13, 11}, {1, −11, 13, −9, −1, −3}, {1, −7, 1, 7, −13, 11}, {1, 11, −13, 13, 1, −7}, {1, −7, 13, 7, −15, −7}, {1, −11, −7, −13, −3, 9}, {1, 11, −13, 11, −1, −7}, {1, 5, 15, −5, −13, 7}, {1, 11, 3, −7, −15, −5}, {1, 11, 1, −9, −15, −7}, {1, −9, 13, −9, −1, 7}, {1, −11, −15, −5, 1, 11}, {1, −11, −15, −9, 1, 11}, {1, 11, 7, −5, −15, −5}, {1, 11, 5, 9, −1, −11}, {1, −9, −5, −11, −1, 11}, {1, 9, −15, −9, 13, 11}, {1, 7, 3, −9, 13, −9}, {1, 9, 15, −9, 13, 11}, {1, 7, 15, −9, 13, 11}, {1, −9, −15, −5, 3, 11}, {1, 11, 5, −5, −15, −7}, {1, 11, 3, −7, −1, −9}, or {1, 7, −3, −11, −1, 9}.

Optionally, when delta=0, the method further includes:

determining the first sequence {x(n)} based on the preset condition and the sequence {s(n)}, where the preset condition is $x_n = y_{(n+M) \bmod K}$, where $$y_n = A \cdot e^{\frac{j \times \pi \times s_n}{16}},$$

M∈{0, 1, 2, . . . , 5}, K=6, A is a non-zero complex number, and $j=\sqrt{-1}$; and the sequence {s(n)} includes at least one of the following sequences:

{1, −5, 5, 11, −13, 11}, {1, −5, 3, 13, 3, −5}, {1, −5, 5, 13, 5, 11}, {1, −9, −5, 5, 15, 11}, {1, 9, −15, 11, −13, 11}, {1, 9, −15, 11, 3, 11}, {1, 11, −11, −9, 13, 3}, {1, −7, 7, 15, 11, 15}, {1, −9, −1, −5, −15, −7}, {1, −13, −9, −15, −5, 7}, {1, −1, 7, 15, 3, 11}, {1, 9, −15, 15, −9, 11}, {1, 15, 7, −5, −11, −9}, {1, 11, 15, −3, −13, 5}, {1, 9, −15, 15, 7, 15}, {1, 9, −15, 9, 7, 15}, {1, −11, −3, 11, −15, 13}, {1, 11, 1, 5, −9, −9}, {1, −3, 9, −1, −15, −11}, {1, 15, −13, 7, −5, −9}, {1, 11, −3, 3, 1, −9}, {1, −11, −13, 9, −13, −3}, {1, −11, −7, 3, 13, 3}, {1, −11, 11, −11, −7, 3}, {1, −11, −15, −9, 3, 11}, {1, 15, 5, −9, −7, −9}, {1, 11, 15, 9, −1, −11}, {1, −11, −1, −5, 5, 11}, {1, 7, −5, 5, 15, 11}, or {1, 11, 3, 13, −13, 15} (where these sequences are denoted as a sequence set A for ease of subsequent description); or {1, 9, −15, −7, −15, 9}, {1, −5, 3, 13, −13, 11}, {1, 11, −13, 13, 3, −5}, {1, −5, 1, 9, −13, 11}, {1, −5, 5, 11, −13, 9}, {1, −7, −13, 9, 15, −9}, {1, −7, 3, 11, −15, 11}, {1, −9, −3, −9, −1, 9}, {1, 9, 3, 9, −1, −9}, {1, −5, −13, 9, −15, −9}, {1, −5, −13, 9, 15, −9}, {1, −5, −15, 9, 15, −9}, {1, −9, 15, 9, −13, −5}, {1, −9, −15, 9, −13, −5}, {1, −7, 15, 9, −13, −5}, {1, −9, −5, 5, 15, 11}, {1, 11, 15, 5, −5, −9}, {1, −7, −15, 9, −13, −5}, {1, −7, 1, 9, −15, 11}, {1, 9, −15, −7, −15, 11}, {1, 9, −15, −7, −13, 11}, {1, −7, −15, 9, 15, −9}, {1, −5, −13, −5, 3, 11}, {1, −7, −13, −5, 3, 11}, {1, 9, −15, 9, −1, −7}, {1, −5, 1, −11, 15, −7}, {1, −5, 5, 15, −13, 11}, {1, 9, −13, 15, 5, −5}, {1, 9, 5, −5, −15, −9}, {1, 9, −1, −11, −15, −9}, {1, 9, 15, 5, −5, −9}, {1, −9, −1, 9, 15, 11}, {1, −5, 3, 13, 7, −5}, {1, −9, 15, −13, −3, 7}, {1, 7, −3, −13, 15, −9}, {1, −7, −1, −13, 15, −7}, {1, 9, −13, 15, 3, 9}, {1, 9, 5, −5, −15, −7}, {1, 9, −1, −11, −15, −7}, {1, 5, −9, −15, −3, 7}, {1, −13, −9, −15, −5, 7}, {1, −5, 7, 15, 9, 15}, {1, −5, 3, 15, 9, −5}, {1, 9, 15, 9, −3, −11}, {1, 11, 7, 11, −3, −11}, {1, −11, −5, −11, −3, 9}, {1, −7, 3, 15, 11, −3}, {1, 9, 3, 9, −3, −11}, {1, 11, 3, 7, −7, −11}, {1, 7, 15, −5, −13, 7}, {1, −3, 7, −13, 11, −3}, {1, 11, 3, −9, −15, −9}, {1, −9, −15, −3, 3, 11}, {1, 11, 5, −7, −1, −9}, {1, 7, −5, −11, −1, 9}, {1, −7, 3, 13, −13, 13}, {1, −9, 13, −11, −5, 7}, {1, 9, 15, 7, −3, −11}, {1, 11, 15, 9, −3, −11}, {1, 11, 3, −7, −15, −7}, {1, 11, 1, −9, −15, −5}, {1, 11, 3, −9, −15, −7}, {1, 11, 5, 9, −3, −11}, {1, 7, 15, 7, −3, −11}, {1, 11, 5, −5, −15, −5}, {1, 11, 5, −7, −15, −7}, {1, −11, −7, −11, −1, 11}, {1, 11, 7, 11, −1, −11}, {1, 11, 15, 11, −1, −11}, {1, −11, −15, −11, −1, 11}, {1, 9, −15, 9, 5, −5}, {1, −7, −13, 11, −13, −5}, {1, 9, −15, 9, 3, −5}, {1, 5, 3, 11, −11, 13}, {1, −9, −13, 11, −13, −5}, {1, −7, 3, 11, −13, 13}, {1, −7, 3, 11, −13, 11}, {1, −7, −1, 7, −13, 11}, {1, −11, 13, −9, −1, −3}, {1, −7, 1, 7, −13, 11}, {1, 11, −13, 13, 1, −7}, {1, −7, 13, 7, −15, −7}, {1, −11, −7, −13, −3, 9}, {1, 11, −13, 11, −1, −7}, {1, 5, 15, −5, −13, 7}, {1, 11, 3, −7, −15, −5}, {1, 11, 1, −9, −15, −7}, {1, −9, 13, −9, −1, 7}, {1, −11, −15, −5, 1, 11}, {1, −11, −15, −9, 1, 11}, {1, 11, 7, −5, −15, −5}, {1, 11, 5, 9, −1, −11}, {1, −9, −5, −11, −1, 11}, {1, 9, −15, −9, 13, 11}, {1, 7, 3, −9, 13, −9}, {1, 9, 15, −9, 13, 11}, {1, 7, 15, −9, 13, 11}, {1, −9, −15, −5, 3, 11}, {1, 11, 5, −5, −15, −7}, {1, 11, 3, −7, −1, −9}, or {1, 7, −3, −11, −1, 9} (where these sequences are denoted as a sequence set B for ease of subsequent description).

Optionally, when delta=1, the method further includes:

determining the first sequence based on the preset condition and the sequence {s(n)}, where the preset condition is $x_n=y_{(n+M)\bmod K}$, where $$y_n = A\cdot e^{\frac{j\times\pi\times s_n}{16}},$$

M∈{0, 1, 2, . . . , 5}, K=6, A is a non-zero complex number, and $j=\sqrt{-1}$; and the sequence {s(n)} includes at least one of the following sequences:

{1, −7, 13, −13, −11, −3}, {1, −7, −9, −15, −3, 5}, {1, 5, 15, −15, 5, −3}, {1, 13, 11, 1, −3, 9}, {1, 11, 3, 15, 11, 5}, {1, −11, −3, 3, −9, −5}, {1, −11, −3, 3, −9, 13}, {1, −7, 3, 15, 11, 5}, {1, −3, 7, −13, 9, 5}, {1, 11, 7, −13, 9, 5}, {1, 13, −9, 1, −9, −15}, {1, −9, 13, 1, 1, 7}, {1, 3, 11, −1, −11, −3}, {1, 3, 11, −1, 7, −3}, {1, 9, −1, 7, 9, −3}, {1, 11, −11, 13, 15, −7}, {1, −7, 3, −5, −3, 7}, {1, 9, 7, −3, 5, −5}, {1, 13, 15, 7, −3, 5}, {1, −7, 3, 11, 9, −3}, {1, 13, −7, −5, −15, −7}, {1, −7, 13, 15, −3, 3}, {1, −13, −15, −3, 5, −9}, {1, 15, 11, −1, 11, 7}, {1, −3, 11, 7, −5, 5}, {1, −13, −9, 3, −7, −3}, {1, 7, 7, −5, −15, −3}, {1, 11, 1, 11, −11, −9}, {1, −5, 5, −7, −11, 9}, or {1, −9, 1, 3, −3, 7} (where these sequences are denoted as a sequence set C for ease of subsequent description); or {1, −11, 11, −1, 7, 13}, {1, −3, −13, 15, −5, 5}, {1, −11, 11, −1, 3, 13}, {1, 13, −9, 3, −3, −13}, {1, −11, 11, −1, 7, 13}, {1, −3, 9, −13, −1, −9}, {1, 11, 13, 1, −9, 11}, {1, 11, −9, 13, 7, 5}, {1, 3, −9, 13, 1, 11}, {1, 11, −9, 15, 7, 5}, {1, −11, −3, 5, 7, −5}, {1, 7, −15, 5, −5, 15}, {1, −5, −15, −3, 7, −13}, {1, 9, 13, 1, −9, 11}, {1, −7, −11, 1, 11, −9}, {1, 9, −3, −13, 7, 11}, {1, 11, −9, −13, 13, 5}, {1, −9, −15, −3, 7, −13}, {1, −11, −9, 1, 7, −5}, {1, 9, −3, −13, 7, 9}, {1, 13, 11, 3, −5, 7}, {1, 13, 9, 1, −5, 7}, {1, 9, 15, 3, −7, 13}, {1, −7, 5, 13, −7, −15}, {1, 1, 9, −3, −11, 9}, {1, −11, −5, 1, 7, −5}, {1, −5, −11, 1, 11, −9}, {1, −9, 1, 11, −9, −15}, {1, 13, −9, 1, −5, −15}, {1, −5, 7, −15, −5, −15}, {1, −9, 11, −15, −15, −5}, {1, −9, −15, −5, 5, −15}, {1, −9, 13, −13, −3, −3}, {1, −9, 13, 1, 1, 11}, {1, −9, 1, 1, 7, −5}, {1, −11, −15, −3, 7, −13}, {1, −11, −13, −1, 9, −11}, {1, 3, 15, −13, 7, −3}, {1, −11, −7, 5, 7, −5}, {1, 11, 11, 1, −9, 9}, {1, 15, 7, −3, −3, 7}, {1, −9, 13, 13, −9, −1}, {1, 11, 11, 1, −7, 7}, {1, −11, −3, 3, −9, −5}, {1, 7, 15, 3, −7, −3}, {1, 11, 7, −13, 13, 5}, {1, 13, 5, −1, 11, 7}, {1, −11, −3, 1, 7, −5}, {1, −11, −5, −1, 7, −5}, {1, −3, −11, 1, 11, −9}, {1, 13, −9, 3, −5, −9}, {1, 11, −1, −11, 9, 15}, {1, 11, 13, −13, 7, −3}, {1, 11, −9, −15, 15, 5}, {1, 11, −9, 13, 11, 5}, {1, −11, −3, 5, −7, −5}, {1, −7, −15, −3, 7, 5}, {1, −7, −15, −3, −5, 5}, {1, −9, −7, 13, −11, −3}, {1, −7, −15, −15, −5, 5}, {1, 11, 11, 3, −5, 7}, {1, 13, −9, 1, −7, −15}, {1, 9, 9, −1, −11, 9}, {1, −9, −9, −1, 7, −5}, {1, −9, −1, 7, 7, −5}, {1, −9, 13, 1, 1, 9}, {1, 13, 13, 5, −3, 7}, {1, 15, 7, −1, −3, 7}, {1, 11, 9, 1, −7, 7}, {1, −9, −7, 1, 9, −5}, {1, 3, −7, 15, 1, 9}, {1, −9, −15, −3, 5, −15}, {1, −5, −15, −15, −3, 5}, {1, 1, 11, −15, 5, −3}, {1, −7, 13, −13, −3, −3}, {1, −7, 3, 13, −7, −15}, {1, −7, 5, 15, −7, −15}, {1, −9, 13, −11, −11, −3}, {1, −11, −3, −3, 5, −5}, {1, −11, −3, 3, −9, 13}, {1, −11, −7, 1, −11, −5}, {1, −7, −11, 1, 11, 5}, {1, −3, −11, 1, 11, 5}, {1, −11, −3, 1, −11, −5}, {1, 11, 15, −13, 7, −3}, {1, 7, 15, 3, 7, −3}, {1, −9, −3, −15, −11, −3}, {1, 5, 15, 3, −7, 13}, {1, 11, 7, −13, 11, 5}, {1, −9, −3, −15, −7, −3}, {1, −3, −11, 1, −5, 5}, {1, −7, −11, 1, −5, 5}, {1, −3, 9, −13, −1, −11}, {1, −9, 3, 13, −7, −11}, {1, 13, 7, −1, 11, 7}, {1, −5, −11, 1, 11, 5}, {1, −11, −5, 1, −11, −5}, {1, −9, −3, −15, −9, −3}, {1, −5, −11, 1, −5, 5}, {1, 11, −11, 1, −5, −15}, {1, −9, −15, −3, 7, −15}, {1, 11, 11, 1, −9, 11}, {1, 1, 11, −15, 5, −5}, {1, 9, 11, −1, −11, −3}, {1, 11, 3, 15, 7, 5}, {1, 3, 11, −1, 7, −3}, {1, −7, 5, −3, 7, −13}, {1, −9, −11, 1, 11, 5}, {1, −1, −11, 1, 11, 5}, {1, −11, −9, 1, −11, −5}, {1, 11, −1, −11, −5, 15}, {1, −11, −1, 1, −11, −5}, {1, −9, −3, −15, −5, −3}, {1, −1, −11, 1, −5, 5}, or {1, −9, −11, 1, −5, 5} (where these sequences are denoted as a sequence set D for ease of subsequent description).

Optionally, when delta=0, the method further includes:

determining the first sequence based on the preset condition and a sequence $\{s_n\}$, where the preset condition is $x_n = y_{(n+M) mod\ K}$, where $$y_n = A \cdot e^{\frac{j \times \pi \times s_n}{8}},$$

$M \in \{0, 1, 2, \ldots, 5\}$, K=6, A is a non-zero complex number, and $j=\sqrt{-1}$; and the sequence $\{s_n\}$ includes at least one of the following sequences:

{1, 3, 1, −5, 1, 7}, {1, −3, 3, 1, 7, −7}, {1, −5, 5, 5, −5, 1}, {1, 7, 1, −1, 1, −5}, {1, 7, 1, −1, −7, −1}, {1, 5, 1, −7, −3, −5}, {1, 7, 1, −5, −3, 3}, {1, 5, 1, −1, 3, −7}, {1, 5, 1, −5, 7, −1}, {1, 3, 1, 7, −3, −7}, {1, 5, 1, −1, 3, −3}, {1, −3, 1, 5, −1, 3}, {1, −5, 1, 3, −7, 7}, {1, −3, 1, −7, 7, −5}, {1, −3, 5, −7, −5, 5}, {1, 5, 1, −5, −1, −3}, {1, 7, 5, −1, −7, −5}, {1, −3, 1, 5, 3, −7}, {1, −5, 5, 3, −7, −1}, {1, 5, 1, 5, −5, −7}, {1, 3, 1, −5, 5, −7}, {1, 5, 1, −3, 1, 5}, {1, 7, 1, −5, −7, −1}, {1, 5, 1, 5, −5, 5}, {1, 5, 1, −5, −1, 3}, {1, −1, 1, −7, −3, 7}, {1, −3, 1, 5, −7, 7}, {1, 5, 1, 7, −1, −3}, {1, −3, 1, −5, −1, 5}, or {1, −7, 5, −1, −5, −3} (where these sequences are denoted as a sequence set E for ease of subsequent description); or {1, 3, 1, −5, 1, 7}, {1, 3, 1, −5, 5, −7}, {1, 3, 1, 7, −3, −7}, {1, 3, 1, −5, 7, −3}, {1, 5, 1, −5, −1, 3}, {1, 5, 1, −5, 1, 5}, {1, 5, 1, −3, 1, 5}, {1, 5, 1, 5, −7, 5}, {1, 5, 1, 5, −5, 5}, {1, 5, 1, −3, 3, 7}, {1, 5, 1, −1, 3, 7}, {1, 5, 1, 5, −5, 7}, {1, 5, 1, −1, 3, −7}, {1, 5, 1, 5, −5, −7}, {1, 5, 1, −7, −3, −5}, {1, 5, 1, 5, −1, −5}, {1, 5, 1, 7, 1, −3}, {1, 5, 1, −5, 1, −3}, {1, 5, 1, −1, 3, −3}, {1, 5, 1, −5, 7, −3}, {1, 5, 1, −5, −7, −3}, {1, 5, 1, −3, −7, −3}, {1, 5, 1, 7, −1, −3}, {1, 5, 1, −7, −1, −3}, {1, 5, 1, −5, −1, −3}, {1, 5, 1, −5, 7, −1}, {1, 7, 1, −5, −3, 3}, {1, 7, 1, −1, 1, −5}, {1, 7, 1, −5, −7, −1}, {1, 7, 1, −1, −7, −1}, {1, −5, 1, −1, 5, 7}, {1, −5, 1, 3, −7, 7}, {1, −3, 1, 5, −1, 3}, {1, −3, 1, −7, −1, 3}, {1, −3, 1, −5, −1, 3}, {1, −3, 1, −5, −1, 5}, {1, −3, 1, 5, 3, 7}, {1, −3, 1, −1, 3, 7}, {1, −3, 1, 5, −7, 7}, {1, −3, 1, 3, −5, 7}, {1, −3, 1, 5, −5, 7}, {1, −3, 1, 5, 3, −7{ }, {1, −3, 1, 5, 3, −5}, {1, −3, 1, −7, 7, −5}, {1, −1, 1, 5, −5, 7}, {1, −1, 1, −7, −3, 7}, {1, 5, 3, 7, −3, −7}, {1, 5, 3, 7, −1, −5}, {1, 7, 3, −5, −3, 3}, {1, 7, 3, −1, −7, −3}, {1, −3, 3, 7, −5, 5}, {1, −3, 3, 1, 7, −7}, {1, 7, 5, −1, −7, −5}, {1, −7, 5, 1, −5, −3}, {1, −7, 5, −1, −5, −3}, {1, −7, 5, 1, −5, −1}, {1, −5, 5, 5, −5, 1}, {1, −5, 5, 3, −7, −1}, {1, −3, 5, 7, −5, 5}, {1, −3, 5, −7, −5, 5}, or {1, −3, 5, −7, −5, 7} (where these sequences are denoted as a sequence set F for ease of subsequent description).

Optionally, when delta=0, the method further includes:

determining the first sequence based on the preset condition and a sequence $\{s_n\}$, where the preset condition is $x_n = y_{(n+M) mod\ K}$, where $$y_n = A \cdot e^{\frac{j \times \pi \times s_n}{8}},$$

$M \in \{0, 1, 2, \ldots, 5\}$, K=6, A is a non-zero complex number, and $j=\sqrt{-1}$; and the sequence $\{s_n\}$ includes at least one of the following sequences:

{1, 1, 3, −7, 5, −3}, {1, 1, 5, −7, 3, 5}, {1, 1, 5, −5, −3, 7}, {1, 1, −7, −5, 5, −7}, {1, 1, −7, −3, 7, −7}, {1, 3, 1, 7, −1, −5}, {1, 3, 1, −7, −3, 7}, {1, 3, 1, −7, −1, −5}, {1, 3, 3, 7, −1, −5}, {1, 5, 1, 1, −5, −3}, {1, 5, 1, 3, −5, 5}, {1, 5, 1, 3, −5, −7}, {1, 5, 1, 3, −3, 1}, {1, 5, 1, 3, −1, −7}, {1, 5, 1, 5, 3, −7}, {1, 5, 1, 5, 3, −5}, {1, 5, 1, 5, 7, 7}, {1, 5, 1, 5, −5, 3}, {1, 5, 1, 5, −3, 3}, {1, 5, 1, 5, −1, 3}, {1, 5, 1, 5, −1, −1}, {1, 5, 1, 7, 3, −3}, {1, 5, 1, 7, −5, 5}, {1, 5, 1, −5, 3, 5}, {1, 5, 1, −5, −7, −1}, {1, 5, 1, −5, −5, −3}, {1, 5, 1, −5, −3, 1}, {1, 5, 1, −5, −1, 1}, {1, 5, 1, −5, −1, 5}, {1, 5, 1, −5, −1, −1}, {1, 5, 1, −3, 1, 7}, {1, 5, 1, −3, 1, −5}, {1, 5, 1, −3, 7, −7}, {1, 5, 1, −3, 7, −5}, {1, 5, 1, −3, −5, −1}, {1, 5, 1, −1, 3, −5}, {1, 5, 1, −1, 5, −7}, {1, 5, 1, −1, −7, −3}, {1, 5, 1, −1, −5, −3}, {1, 5, 3, −3, −7, −5}, {1, 5, 3, −3, −7, −1}, {1, 5, 3, −3, −1, −7}, {1, 5, 3, −1, 5, −7}, {1, 5, 3, −1, −5, −3}, {1, 5, 5, 1, 3, −3}, {1, 5, 5, −1, −7, −5}, {1, 7, 1, 1, 1, −5}, {1, 7, 1, 1, −7, −7}, {1, 7, 1, 1, −5, −5}, {1, 7, 1, 3, −7, 7}, {1, 7, 1, 3, −3, 3}, {1, 7, 1, −7, 1, 1}, {1, 7, 1, −7, −7, −7}, {1, 7, 1, −5, 1, 1}, {1, 7, 1, −5, −5, 1}, {1, 7, 1, −5, −3, 1}, {1, 7, 1, −5, −1, 1}, {1, 7, 1, −5, −1, −1}, {1, 7, 1, −1, 5, 7}, {1, 7, 3, 1, 5, −3}, {1, 7, 3, 1, −5, −5}, {1, 7, 3, 5, −5, −7}, {1, 7, 3, −7, 7, −1}, {1, 7, 3, −7, −5, 3}, {1, 7, 3, −5, −7, −1}, {1, 7, 3, −3, −5, 1}, {1, 7, 3, −3, −5, −1}, {1, 7, 3, −3, −3, −3}, {1, 7, 3, −1, −5, −3}, {1, 7, 5, 1, −5, −5}, {1, 7, 5, 1, −5, −3}, {1, 7, 5, −5, 3, −1}, {1, 7, 5, −5, −3, −7}, {1, 7, 5, −3, −7, 1}, {1, 7, 5, −1, −5, −5}, {1, 7, 5, −1, −5, −3}, {1, −7, 1, −5, 1, 1}, {1, −7, 3, 3, −5, −5}, {1, −7, 3, 5, −1, −3}, {1, −7, 3, −5, 1, 1}, {1, −7, 3, −5, −5, 1}, {1, −7, 3, −5, −5, −5}, {1, −7, 5, −3, −5, 1}, {1, −5, 1, 1, 3, 7}, {1, −5, 1, 1, 5, 7}, {1, −5, 1, 1, 7, 7}, {1, −5, 1, 3, 3, 7}, {1, −5, 1, 7, 5, −1}, {1, −5, 1, 7, 7, 1}, {1, −5, 1, −7, −7, 1}, {1, −5, 1, −7, −7, −7}, {1, −5, 3, −7, −7, 1}, {1, −5, 5, 3, −5, −3}, {1, −5, 5, 3, −5, −1}, {1, −5, 5, 5, −5, −3}, {1, −5, 5, 5, −5, −1}, {1, −5, 5, 7, −5, 1}, {1, −5, 5, 7, −5, 3}, {1, −5, 5, −7, −5, 1}, {1, −5, 5, −7, −5, 3}, {1, −5, 7, 3, 5, −3}, {1, −5, −7, 3, 5, −3}, {1, −5, −7, 3, 5, −1}, {1, −5, −7, 3, 7, −1}, {1, −3, 1, 1, 3, 7}, {1, −3, 1, 1, 5, 7}, {1, −3, 1, 1, 5, −1}, {1, −3, 1, 3, 3, 7}, {1, −3, 1, 3, −7, 7}, {1, −3, 1, 5, 7, 1}, {1, −3, 1, 5, 7, 3}, {1, −3, 1, 5, 7, 7}, {1, −3, 1, 5, −7, 3}, {1, −3, 1, 7, −5, 5}, {1, −3, 1, 7, −1, 3}, {1, −3, 1, −7, 3, −1}, {1, −3, 1, −7, 7, −1}, {1, −3, 1, −7, −5, 5}, {1, −3, 1, −7, −3, 3}, {1, −3, 1, −5, 7, −1}, {1, −3, 3, 3, −7, 7}, {1, −3, 3, 5, −5, −7}, {1, −3, 3, 7, 7, 7}, {1, −3, 3, 7, −7, 5}, {1, −3, 3, −7, −7, 3}, {1, −3, 3, −5, −7, −1}, {1, −3, 7, −5, 3, 5}, {1, −1, 1, 7, 3, −7}, {1, −1, 1, 7, 3, −5}, {1, −1, 1, −5, 5, −7}, {1, −1, 3, −7, −5, 7}, {1, −1, 5, −7, −5, 5}, {1, −1, 5, −7, −5, 7}, {1, −1, 5, −5, −5, 5}, or {1, −1, 5, −5, −5, 7} (where these sequences are denoted as a sequence set G for ease of subsequent description), where a largest PAPR value of this group of sequences is lower than 2.41, and an auto-correlation of the sequences is lower than 0.236, thereby ensuring transmission performance and demodulation performance of the DMRS; or {1, 1, 5, −7, 3, 7}, {1, 1, 5, −7, 3, −3}, {1, 1, 5, −1, 3, 7}, {1, 1, 5, −1, −7, −3}, {1, 3, 1, 7, −1, −7}, {1, 3, 1, −7, 1, −5}, {1, 3, 1, −7, 3, −5}, {1, 3, 1, −7, −1, −7}, {1, 3, 1, −5, 1, −7}, {1, 3, 1, −5, 3, −7}, {1, 3, 5, −7, 3, 7}, {1, 3, 5, −1, 3, 7}, {1, 3, 5, −1, 3, −3}, {1, 3, 5, −1, −5, 7}, {1, 3, 7, 1, 5, 7}, {1, 3, 7, −7, 3, 7}, {1, 3, 7, −5, 5, 7}, {1, 5, 1, 1, 5, −7}, {1, 5, 1, 1, 5, −3}, {1, 5, 1, 5, 5, −7}, {1, 5, 1, 5, 5, −3}, {1, 5, 1, 5, −7, 1}, {1, 5, 1, 5, −7, −7}, {1, 5, 1, 5, −3, 1}, {1, 5, 1, 5, −3, −3}, {1, 5, 1, 5, −1, 3}, {1, 5, 1, 7, −3, −5}, {1, 5, 1, −7, 1, −3}, {1, 5, 1, −7, −3, 5}, {1, 5, 1, −5, 5, 7}, {1, 5, 1, −5, −3, 7}, {1, 5, 1, −3, 1, −7}, {1, 5, 1, −3, 5, −7}, {1, 5, 1, −3, 7, −7}, {1, 5, 1, −3, 7, −5}, {1, 5, 1, −3, −5, −1}, {1, 5, 3, 1, 5, −7}, {1, 5, 3, 1, 5, −3}, {1, 5, 3, 7, −3, −5}, {1, 5, 3, 7, −1, 3}, {1, 5, 3, −7, −3, 7}, {1, 5, 3, −3, 7, −5}, {1, 5, 3, −1, −5, −3}, {1, 5, 5, −1, 3, 7}, {1, 5, 5, −1, 3, −3}, {1, 5, 7, 1, 3, −3}, {1, 5, −7, −3, 7, 7}, {1, 7, 1, 1, 3, −5}, {1, 7, 1, 1, −7, −5}, {1, 7, 1, 1, −1, −7}, {1, 7, 1, 3, −7, −7}, {1, 7, 1, 3, −5, −7}, {1, 7, 1, 3, −5, −5}, {1, 7, 1, 3, −1, −5}, {1, 7, 1, 5, −1, −3}, {1, 7, 1, 7, −7, −7}, {1, 7, 1, 7, −1, −1}, {1, 7, 1, −7, 1, −1}, {1, 7, 1, −7, −5, −5}, {1, 7, 1, −7, −1, 1}, {1, 7, 1, −7, −1, −1}, {1, 7, 1, −5, −7, 1}, {1, 7, 1, −5, −7, −3}, {1, 7, 1, −5, −5, 3}, {1, 7, 1, −5, −1, 3}, {1, 7, 1, −5, −1, −3}, {1, 7, 1, −3, −7, −5}, {1, 7, 1, −3, −7, −1}, {1, 7, 1, −3, −1, 5}, {1, 7, 1, −1, 1, −7}, {1, 7, 1, −1, 7, −7}, {1, 7, 1, −1, −7, −3}, {1, 7, 3, 1, 7, −5}, {1, 7, 3, 1, 7, −3}, {1, 7, 3, 5, −1, −5}, {1, 7, 3, −7, 7, −3}, {1, 7, 3, −7, −3, 3}, {1, 7, 3, −7, −1, −3}, {1, 7, 3, −3, −7, −5}, {1, 7, 3, −3, −7, −1}, {1, 7, 3, −3, −1, −5}, {1, 7, 3, −1, −7, −5}, {1, 7, 5, −1, 3, −3}, {1, 7, 5, −1, −7, −7}, {1, 7, 5, −1, −7, −3}, {1, −7, 1, 3, −3, 3}, {1, −7, 1, −7, 1, 1}, {1, −7, 3, 1, 7, −1}, {1, −7, 3, 1, −7, −5}, {1, −7, 3, 1, −7, −1}, {1, −7, 3, 3, −3, −5}, {1, −7, 3, 5, −3, −5}, {1, −7, 3, −5, −7, −1}, {1, −7, 3, −5, −3, 3}, {1, −7, 3, −3, −3, 3}, {1, −7, 5, 1, −7, −3}, {1, −5, 1, 1, 3, −7}, {1, −5, 1, 1, −7, 7}, {1, −5, 1, 3, 3, −7}, {1, −5, 1, 3, −7, 5}, {1, −5, 1, 5, 3, 7}, {1, −5, 1, 5, 3, −3}, {1, −5, 1, 5, −7, 3}, {1, −5, 1, 5, −7, 7}, {1, −5, 1, 7, 3, −1}, {1, −5, 1, 7, 5, −1}, {1, −5, 1, 7, 7, −7}, {1, −5, 1, 7, 7, −1}, {1, −5, 1, 7, −7, 1}, {1, −5, 1, 7, −7, 5}, {1, −5, 1, 7, −1, 1}, {1, −5, 1, −7, 3, 1}, {1, −5, 1, −7, 7, −7}, {1, −5, 1, −7, 7, −1}, {1, −5, 1, −7, −7, −1}, {1, −5, 1, −7, −5, 3}, {1, −5, 1, −3, 3, 5}, {1, −5, 1, −1, 3, 7}, {1, −5, 1, −1, 7, 7}, {1, −5, 3, 1, 7, 7}, {1, −5, 3, 5, −5, 3}, {1, −5, 3, 5, −3, 3}, {1, −5, 3, −7, 7, 1}, {1, −5, 3, −7, 7, −1}, {1, −5, 3, −7, −5, 3}, {1, −5, 5, 1, 3, 7}, {1, −5, 5, 1, −5, −3}, {1, −5, 5, 3, −7, 1}, {1, −5, 5, 3, −7, −3}, {1, −5, 5, 7, 3, −3}, {1, −5, 5, −7, −5, 5}, {1, −5, 5, −1, 3, 5}, {1, −5, 7, 1, 3, −3}, {1, −5, 7, 1, 3, −1}, {1, −5, 7, 1, 5, −1}, {1, −5, −7, 3, 3, −3}, {1, −5, −7, 3, 7, 1}, {1, −5, −7, 3, 7, −3}, {1, −3, 1, 5, −3, 1}, {1, −3, 1, 7, 5, −5}, {1, −3, 1, 7, −5, 5}, {1, −3, 1, −7, −5, 5}, {1, −3, 1, −7, −3, 1}, {1, −3, 1, −7, −3, 5}, {1, −3, 1, −5, −3, 7}, {1, −3, 3, 7, −3, 3}, {1, −3, 3, −7, −5, 5}, {1, −3, 3, −7, −5, 7}, {1, −3, 3, −7, −3, 3}, {1, −1, 1, 7, −1, −7}, {1, −1, 1, −7, 3, −5}, {1, −1, 1, −7, −1, 7}, {1, −1, 3, −7, −3, 7}, {1, −1, 3, −3, 7, −5}, or {1, −1, 5, −7, 3, 7} (where these sequences are denoted as a sequence set H for ease of subsequent description), where a largest PAPR value of this group of sequences is lower than 2.11, and an auto-correlation of the sequences is lower than 0.334, thereby ensuring transmission performance and demodulation performance of the DMRS.

Optionally, when delta=1, the method further includes:

determining the first sequence based on the preset condition and a sequence $\{s_n\}$, where the preset condition is $x_n=y_{(n+M) mod\ K}$, where $$y_n = A \cdot e^{\frac{j\times\pi\times s_n}{8}},$$

$M\in\{0, 1, 2, \ldots, 5\}$, K=6, A is a non-zero complex number, and $j=\sqrt{-1}$; and the sequence $\{s_n\}$ includes at least one of the following sequences:

a third sequence set, including: {1, 1, 5, −5, 3, −3}, {1, 1, 7, −5, 7, −1}, {1, 1, 7, −1, 3, −1}, {1, 1, −5, 3, −1, 3}, {1, 1, −5, 7, −5, 3}, {1, 1, −3, 7, −1, 5}, {1, 3, 7, −5, 3, −3}, {1, 3, −1, −7, 1, 5}, {1, 5, 1, −7, 3, 3}, {1, 5, 1, −5, −5, 1}, {1, 5, 3, −1, −5, 3}, {1, 5, 5, 1, −5, 3}, {1, 5, 7, 3, −3, 5}, {1, 5, −7, 1, −5, 7}, {1, 5, −7, −5, 7, 1}, {1, 5, −5, 3, −3, −7}, {1, 5, −5, 3, −1, −5}, {1, 5, −5, −5, 5, −3}, {1, 5, −3, 3, 3, −3}, {1, 5, −3, 7, 3, 5}, {1, 7, 7, 1, −7, 5}, {1, 7, 7, 1, −3, 1}, {1, 7, −5, 7, −1, −7}, {1, 7, −5, −7, 5, 1}, {1, 7, −5, −5, 7, 1}, {1, 7, −1, 3, −1, −7}, {1, 7, −1, −7, 5, 5}, {1, 7, −1, −5, 7, 5}, {1, −7, 3, 3, −7, −3}, {1, −7, 3, −1, 1, 5}, {1, −7, 5, 1, −1, 3}, {1, −7, 5, −7, −1, −1}, {1, −7, −3, 1, 3, −1}, {1, −7, −3, −7, 3, 3}, {1, −7, −1, 3, 3, −1}, {1, −7, −1, −1, −7, 5}, {1, −5, 3, 7, −5, −3}, {1, −5, 3, −1, 3, −7}, {1, −5, 7, 7, −5, 1}, {1, −5, 7, −7, −3, 1}, {1, −5, 7, −5, 3, −7}, {1, −5, −5, 1, 5, 1}, {1, −5, −5, 1, −7, −3}, {1, −3, 1, 7, 7, 1}, {1, −3, 1, −7, −1, −1}, {1, −3, 5, −5, −1, −3}, {1, −3, 5, −1, −1, 5}, {1, −3, 7, 7, −3, 5}, {1, −3, 7, −1, 3, 7}, {1, −3, 7, −1, 5, −7}, {1, −3, −7, 1, 7, −5}, {1, −3, −7, 7, −5, 1}, {1, −3, −3, 1, 7, −1}, {1, −3, −1, 3, 7, −1}, {1, −1, 3, −7, 1, −3}, and {1, −1, −5, 7, −1, 5};

a fourth sequence set, including: {1, 3, 7, −5, 1, −3}, {1, 3, −7, 5, 1, 5}, {1, 3, −7, −3, 1, −3}, {1, 3, −1, −5, 1, 5}, {1, 5, 1, −3, 3, 5}, {1, 5, 1, −3, 7, 5}, {1, 5, 1, −3, −5, 5}, {1, 5, 1, −3, −1, 5}, {1, 5, 3, −3, −7, 5}, {1, 5, 7, 3, −1, 5}, {1, 5, 7, −3, −7, 5}, {1, 5, −7, 3, 1, −3}, {1, 5, −7, 5, 1, 7}, {1, 5, −7, 7, 3, −1}, {1, 5, −7, −5, 1, −3}, {1, 5, −7, −1, 1, −3}, {1, 5, −5, 7, 3, 5}, {1, 5, −5, −3, −7, 5}, {1, 5, −1, −5, 7, 5}, {1, 5, −1, −3, −7, 5}, {1, 7, 3, −1, 3, 7}, {1, 7, −7, 5, 1, 5}, {1, 7, −7, −3, 1, −3}, {1, 7, −5, −1, 1, −3}, {1, −5, 7, 3, 1, 5}, {1, −5, −7, 5, 1, 5}, {1, −3, 1, 5, 7, −3}, {1, −3, 1, 5, −5, −3}, {1, −3, 3, 5, −7, −3}, {1, −3, −7, 3, 1, 5}, {1, −3, −7, 7, 1, 5}, {1, −3, −7, −5, 1, 5}, {1, −3, −7, −3, 1, −1}, {1, −3, −7, −1, 1, 5}, {1, −3, −5, 5, −7, −3}, {1, −3, −1, 3, 7, −3}, {1, −3, −1, 5, −7, −3}, {1, −1, 3, 7, 3, −1}, {1, −1, −7, 5, 1, 5}, and {1, −1, −5, 7, 1, 5};

a fifth sequence set, including: {1, 3, −3, 1, 3, −3}, {1, 3, −3, 1, −5, −1}, {1, 3, −3, −7, 3, 7}, {1, 3, −3, −7, −5, 5}, {1, 3, −3, −1, 3, −3}, {1, 5, −1, −7, 3, 7}, {1, 7, 3, 1, 5, −1}, {1, 7, 3, 1, 7, 5}, {1, 7, 3, 1, −5, −1}, {1, 7, 3, 1, −3, 3}, {1, 7, 3, 5, −7, 3}, {1, 7, 3, 5, −1, 3}, {1, 7, 3, 7, 1, 3}, {1, 7, 3, −7, 3, 7}, {1, 7, 3, −7, 5, −5}, {1, 7, 3, −7, 7, −3}, {1, 7, 3, −7, −3, 7}, {1, 7, 3, −7, −1, −3}, {1, 7, 3, −3, 1, −5}, {1, 7, 3, −3, 7, −5}, {1, 7, 3, −1, −7, −5}, {1, 7, 5, 1, 7, 5}, {1, 7, 5, −7, −1, −3}, {1, 7, 5, −1, −7, −3}, {1, −5, −3, 1, −5, −3}, {1, −5, −3, 7, −5, 5}, {1, −5, −3, −7, 3, 5}, {1, −5, −3, −7, 3, 7}, {1, −5, −3, −1, 3, −3}, {1, −3, 3, 1, 3, −3}, {1, −3, 3, 1, 5, −1}, {1, −3, 3, 1, −5, −1}, {1, −3, 3, 5, −7, 3}, {1, −3, 3, 5, −1, 3}, {1, −3, 3, 7, −3, −5}, {1, −3, 3, −7, 3, 7}, {1, −3, 3, −7, −5, 5}, {1, −3, 3, −7, −3, 7}, {1, −3, 3, −3, 7, −5}, {1, −3, 3, −1, 5, 3}, {1, −1, 5, 1, −1, 5}, {1, −1, 5, −7, 7, −3}, and {1, −1, 5, −7, −3, 7};

a sixth sequence set, including: {1, 1, 3, 5, −3, 7}, {1, 1, 3, −7, −1, 7}, {1, 1, 3, −5, 5, −1}, {1, 1, 3, −3, 7, −1}, {1, 1, 5, 7, −5, 5}, {1, 3, 1, −7, 3, −5}, {1, 3, 1, −5, 3, −5}, {1, 3, 1, −5, 5, −3}, {1, 3, 1, −5, 5, −1}, {1, 3, 3, −3, 5, −5}, {1, 3, 3, −3, 7, −1}, {1, 3, 5, 1, −5, 5}, {1, 3, 5, 1, −5, 7}, {1, 3, 5, 7, 3, −3}, {1, 3, 5, −7, −3, 7}, {1, 3, 5, −1, −7, 7}, {1, 3, 5, −1, −7, −3}, {1, 3, 5, −1, −3, 7}, {1, 5, 1, 3, −5, −7}, {1, 5, 1, 5, 5, −3}, {1, 5, 1, 5, −7, 1}, {1, 5, 1, 5, −7, −7}, {1, 5, 1, 5, −3, −3}, {1, 5, 1, 7, 3, −3}, {1, 5, 1, 7, 5, −5}, {1, 5, 1, 7, 5, −3}, {1, 5, 1, −7, 5, −3}, {1, 5, 1, −7, 7, −5}, {1, 5, 1, −3, 3, −3}, {1, 5, 1, −3, 5, −3}, {1, 5, 3, −5, 5, 7}, {1, 5, 3, −3, 7, 7}, {1, 5, 3, −3, 7, −5}, {1, 5, 3, −3, −3, 7}, {1, 5, 3, −1, 7, −5}, {1, 5, 3, −1, −7, −3}, {1, 5, 5, 1, −5, −1}, {1, 7, 1, 3, −7, 7}, {1, 7, 1, 3, −7, −7}, {1, 7, 1, 3, −5, −7}, {1, 7, 1, 3, −3, 3}, {1, 7, 1, 5, −7, 7}, {1, 7, 1, 7, 7, −1}, {1, 7, 1, 7, −7, 1}, {1, 7, 1, −7, −7, −5}, {1, 7, 1, −7, −5, 3}, {1, 7, 1, −5, −7, −3}, {1, 7, 1, −3, 3, 5}, {1, 7, 1, −3, 3, −1}, {1, 7, 1, −1, 3, 7}, {1, 7, 1, −1, 5, 7}, {1, 7, 3, 5, −3, 3}, {1, −7, 1, 1, 5, 7}, {1, −7, 1, 1, 7, 7}, {1, −7, 1, 3, 7, 7}, {1, −7, 1, 3, −7, 7}, {1, −7, 1, 3, −3, −5}, {1, −7, 1, 5, 7, 7}, {1, −7, 1, 7, 5, −1}, {1, −7, 1, −5, −7, −5}, {1, −7, 1, −5, −7, −1}, {1, −7, 1, −5, −5, 1}, {1, −7, 1, −5, −5, −3}, {1, −7, 1, −5, −5, −1}, {1, −7, 1, −5, −3, 1}, {1, −7, 1, −5, −3, 3}, {1, −7, 1, −3, −7, −3}, {1, −7, 1, −1, 5, 7}, {1, −7, 3, 3, −7, −5}, {1, −7, 3, 3, −5, −5}, {1, −7, 3, 5, −5, −5}, {1, −7, 3, 5, −3, 3}, {1, −7, 3, 5, −3, −5}, {1, −7, 3, 5, −3, −1}, {1, −7, 3, 7, 7, −1}, {1, −7, 3, −5, −3, −1}, {1, −7, 3, −1, −5, −3}, {1, −5, 1, 3, 5, 7}, {1, −5, 1, 3, −1, 5}, {1, −5, 1, 5, −7, 7}, {1, −5, 1, 7, −7, −7}, {1, −5, 1, −7, 7, −1}, {1, −5, 1, −7, −7, −1}, {1, −5, 1, −3, −7, −3}, {1, −5, 1, −3, −1, 5}, {1, −5, 1, −1, 7, −7}, {1, −5, 3, 1, 5, −1}, {1, −5, 3, 1, 7, −1}, {1, −5, 3, 5, 7, −1}, {1, −5, 3, 5, −3, −3}, {1, −5, 3, 7, −7, 5}, {1, −5, 3, −7, 7, −1}, {1, −5, 3, −7, −7, 1}, {1, −5, 3, −7, −7, −1}, {1, −5, 3, −7, −5, 1}, {1, −5, 5, 1, 3, 7}, {1, −5, 5, 1, −5, −3}, {1, −5, 5, 7, −5, −3}, {1, −5, 5, −7, −5, 5}, {1, −5, 5, −7, −5, −1}, {1, −5, 5, −1, 3, 5}, {1, −3, 1, 5, −3, −7}, {1, −3, 1, 5, −3, −5}, {1, −3, 1, 7, −5, −7}, {1, −3, 1, 7, −3, −5}, {1, −3, 1, −7, 7, −1}, {1, −3, 3, 1, 7, −1}, {1, −1, 1, 3, −3, 7}, {1, −1, 1, 5, −3, 7}, {1, −1, 1, 7, −1, −7}, {1, −1, 3, 7, −5, 5}, {1, −1, 3, −7, −3, 5}, {1, −1, 3, −7, −3, 7}, {1, −1, 3, −3, 7, 7}, and {1, −1, 3, −3, −3, 7};

a seventh sequence set, including: {1, 1, 3, 5, −3, 7}, {1, 1, 3, −7, −1, 7}, {1, 1, 3, −5, 5, −1}, {1, 1, 3, −3, 7, −1}, {1, 1, 5, 7, −5, 5}, {1, 3, 1, −7, 3, −5}, {1, 3, 1, −5, 3, −5}, {1, 3, 1, −5, 5, −3}, {1, 3, 1, −5, 5, −1}, {1, 3, 3, −3, 5, −5}, {1, 3, 3, −3, 7, −1}, {1, 3, 5, 1, −5, 5}, {1, 3, 5, 1, −5, 7}, {1, 3, 5, 7, 3, −3}, {1, 3, 5, −7, −3, 7}, {1, 3, 5, −1, −7, 7}, {1, 3, 5, −1, −7, −3}, {1, 3, 5, −1, −3, 7}, {1, 5, 1, 3, −5, −7}, {1, 5, 1, 5, 5, −3}, {1, 5, 1, 5, −7, 1}, {1, 5, 1, 5, −7, −7}, {1, 5, 1, 5, −3, −3}, {1, 5, 1, 7, 3, −3}, {1, 5, 1, 7, 5, −5}, {1, 5, 1, 7, 5, −3}, {1, 5, 1, −7, 5, −3}, {1, 5, 1, −7, 7, −5}, {1, 5, 1, −3, 3, −3}, {1, 5, 1, −3, 5, −3}, {1, 5, 3, −5, 5, 7}, {1, 5, 3, −3, 7, 7}, {1, 5, 3, −3, 7, −5}, {1, 5, 3, −3, −3, 7}, {1, 5, 3, −1, 7, −5}, {1, 5, 3, −1, −7, −3}, {1, 5, 5, 1, −5, −1}, {1, 7, 1, 3, −7, 7}, {1, 7, 1, 3, −7, −7}, {1, 7, 1, 3, −5, −7}, {1, 7, 1, 3, −3, 3}, {1, 7, 1, 5, −7, 7}, {1, 7, 1, 7, 7, −1}, {1, 7, 1, 7, −7, 1}, {1, 7, 1, −7, −7, −5}, {1, 7, 1, −7, −5, 3}, {1, 7, 1, −5, −7, −3}, {1, 7, 1, −3, 3, 5}, {1, 7, 1, −3, 3, −1}, {1, 7, 1, −1, 3, 7}, {1, 7, 1, −1, 5, 7}, {1, 7, 3, 5, −3, 3}, {1, −7, 1, 1, 5, 7}, {1, −7, 1, 1, 7, 7}, {1, −7, 1, 3, 7, 7}, {1, −7, 1, 3, −7, 7}, {1, −7, 1, 3, −3, −5}, {1, −7, 1, 5, 7, 7}, {1, −7, 1, 7, 5, −1}, {1, −7, 1, −5, −7, −5}, {1, −7, 1, −5, −7, −1}, {1, −7, 1, −5, −5, 1}, {1, −7, 1, −5, −5, −3}, {1, −7, 1, −5, −5, −1}, {1, −7, 1, −5, −3, 1}, {1, −7, 1, −5, −3, 3}, {1, −7, 1, −3, −7, −3}, {1, −7, 1, −1, 5, 7}, {1, −7, 3, 3, −7, −5}, {1, −7, 3, 3, −5, −5}, {1, −7, 3, 5, −5, −5}, {1, −7, 3, 5, −3, 3}, {1, −7, 3, 5, −3, −5}, {1, −7, 3, 5, −3, −1}, {1, −7, 3, 7, 7, −1}, {1, −7, 3, −5, −3, −1}, {1, −7, 3, −1, −5, −3}, {1, −5, 1, 3, 5, 7}, {1, −5, 1, 3, −1, 5}, {1, −5, 1, 5, −7, 7}, {1, −5, 1, 7, −7, −7}, {1, −5, 1, −7, 7, −1}, {1, −5, 1, −7, −7, −1}, {1, −5, 1, −3, −7, −3}, {1, −5, 1, −3, −1, 5}, {1, −5, 1, −1, 7, −7}, {1, −5, 3, 1, 5, −1}, {1, −5, 3, 1, 7, −1}, {1, −5, 3, 5, 7, −1}, {1, −5, 3, 5, −3, −3}, {1, −5, 3, 7, −7, 5}, {1, −5, 3, −7, 7, −1}, {1, −5, 3, −7, −7, 1}, {1, −5, 3, −7, −7, −1}, {1, −5, 3, −7, −5, 1}, {1, −5, 5, 1, 3, 7}, {1, −5, 5, 1, −5, −3}, {1, −5, 5, 7, −5, −3}, {1, −5, 5, −7, −5, 5}, {1, −5, 5, −7, −5, −1}, {1, −5, 5, −1, 3, 5}, {1, −3, 1, 5, −3, −7}, {1, −3, 1, 5, −3, −5}, {1, −3, 1, 7, −5, −7}, {1, −3, 1, 7, −3, −5}, {1, −3, 1, −7, 7, −1}, {1, −3, 3, 1, 7, −1}, {1, −1, 1, 3, −3, 7}, {1, −1, 1, 5, −3, 7}, {1, −1, 1, 7, −1, −7}, {1, −1, 3, 7, −5, 5}, {1, −1, 3, −7, −3, 5}, {1, −1, 3, −7, −3, 7}, {1, −1, 3, −3, 7, 7}, and {1, −1, 3, −3, −3, 7}; or an eighth sequence set, including: {1, 1, −7, 5, −1, 1}, {1, 1, −7, 7, −3, 1}, {1, 1, −7, −5, 5, 1}, {1, 1, −7, −3, 3, 1}, {1, 1, −7, −3, −5, 1}, {1, 1, −7, −1, −3, 1}, {1, 3, 7, 1, 5, 1}, {1, 3, −5, 3, 5, 1}, {1, 3, −5, 3, 5, −3}, {1, 3, −5, 7, −7, 1}, {1, 3, −5, 7, −5, 5}, {1, 3, −5, 7, −1, 1}, {1, 3, −5, −5, 3, −1}, {1, 3, −5, −3, 5, 1}, {1, 3, −3, 1, −5, −1}, {1, 3, −3, −7, 1, 1}, {1, 3, −1, 7, −7, 1}, {1, 5, 1, −7, −5, −1}, {1, 5, 3, −7, 1, 1}, {1, 5, 7, −1, −5, −1}, {1, 5, −5, −7, 1, 1}, {1, 5, −3, −5, 3, 1}, {1, 5, −1, 3, 5, −3}, {1, 5, −1, 3, −3, −1}, {1, 5, −1, 3, −1, 7}, {1, 7, 5, −7, 1, 1}, {1, 7, 5, −3, −3, 5}, {1, 7, −5, 3, 3, −5}, {1, −7, 1, 3, −5, 7}, {1, −7, 1, 3, −1, 7}, {1, −7, 5, 7, −1, 7}, {1, −7, 5, −7, 3, 7}, {1, −7, 5, −3, −1, 7}, {1, −7, 5, −1, 1, −7}, {1, −7, 7, −3, 1, −7}, {1, −7, 7, −1, 3, −5}, {1, −7, 7, −1, −3, 5}, {1, −7, −7, 1, 3, −3}, {1, −7, −7, 1, 5, −5}, {1, −7, −7, 1, 7, 5}, {1, −7, −7, 1, −3, 7}, {1, −7, −7, 1, −1, 5}, {1, −7, −5, 3, 5, −3}, {1, −7, −5, 3, −5, −3}, {1, −7, −5, 3, −1, 1}, {1, −7, −5, 3, −1, 7}, {1, −7, −5, 5, 1, −7}, {1, −7, −5, 7, −1, 1}, {1, −7, −5, −1, −7, −3}, {1, −7, −3, 3, 1, −7}, {1, −7, −3, 5, 3, −5}, {1, −7, −3, −5, 1, −7}, {1, −7, −1, −3, 1, −7}, {1, −5, 7, −1, −1, 7}, {1, −5, −3, 5, 5, −3}, {1, −5, −3, 7, −5, 5}, {1, −5, −1, −7, −5, 5}, {1, −5, −1, −7, −3, 7}, {1, −5, −1, −5, 3, 5}, {1, −3, 1, −5, −1, 1}, {1, −3, 5, 5, −3, −1}, {1, −3, 5, 7, −1, 1}, {1, −3, 5, 7, −1, 7}, {1, −3, 7, −7, 1, 1}, {1, −3, −1, 7, −1, 1}, {1, −1, 3, −5, −5, 3}, {1, −1, 5, −7, 1, 1}, {1, −1, 5, −3, −3, 5}, {1, −1, 7, 5, −3, 1}, {1, −1, 7, 7, −1, 3}, and {1, −1, 7, −5, 3, 1}.

Optionally, when delta=1, the method further includes:

determining the first sequence based on the preset condition and a sequence $\{s_n\}$, where the preset condition is $x_n = y_{(n+M) \bmod K}$, where $$y_n = A \cdot e^{\frac{j \times \pi \times s_n}{8}},$$

$M \in \{0, 1, 2, \ldots, 5\}$, K=6, A is a non-zero complex number, and $j=\sqrt{-1}$; and the sequence $\{s_n\}$ includes at least one of the following sequences:

{1, 5, 1, −5, 3, 3}, {1, −5, 1, 3, −3, 7}, {1, 7, 1, 7, −3, −5}, {1, 5, 5, −5, 3, −1}, {1, 7, 1, 1, −3, 5}, {1, 7, 1, −1, 5, −5}, {1, 7, 1, −5, −3, −1}, {1, −1, 5, −7, −1, −1}, {1, 7, 1, −5, −3, 7}, {1, −3, 1, 1, −5, 3}, {1, 1, 7, −7, 3, −1}, {1, 5, 1, 1, 7, −1}, {1, −5, 1, 7, 5, −5}, {1, −5, 1, 7, −3, −5}, {1, 7, 3, −1, 5, 5}, {1, 5, 1, 3, −1, 5}, {1, −3, 1, −5, 3, −7}, {1, −7, 5, −1, 3, −7}, {1, 5, 1, 7, −1, −7}, {1, 5, 1, −5, −5, 3}, {1, −5, 1, −1, 5, −5}, {1, −5, 1, 3, −3, −1}, {1, −3, 1, 5, −1, −5}, {1, −3, 1, −1, 3, −3}, {1, 7, 1, −5, 5, 7}, {1, 7, 1, 3, 5, −1}, {1, 7, 3, −1, −1, 5}, {1, 7, 1, 7, 5, 3}, {1, 5, 1, −3, 3, 7}, or {1, −5, 3, 7, −3, −3} (where these sequences are denoted as a sequence set I for ease of subsequent description); or {1, −5, 1, 3, −3, −1}, {1, −5, 1, 3, 5, −1}, {1, −5, 3, 7, −3, −3}, {1, −5, 3, −7, −3, −3}, {1, −3, 1, 1, −5, 3}, {1, −3, 1, 7, −1, −1}, {1, −3, 1, 7, 7, −1}, {1, −3, 3, 7, −5, −3}, {1, −3, 3, 7, −3, −3}, {1, −3, 3, 7, −1, −1}, {1, −3, 5, 5, −5, −1}, {1, −3, 5, −7, −5, −1}, {1, −3, 5, −7, −3, −1}, {1, −3, 5, −7, −1, −1}, {1, −1, 5, −7, −1, −1}, {1, 1, 5, −5, 3, −1}, {1, 1, 5, −1, −5, 3}, {1, 1, 5, −1, −5, 5}, {1, 1, 5, −7, 3, −1}, {1, 1, 7, −7, 3, −1}, {1, 3, 5, −1, −5, 5}, {1, 3, 5, −7, 3, −1}, {1, 3, 7, −7, 3, −1}, {1, 5, 1, −5, −5, 3}, {1, 5, 1, −5, 3, 3}, {1, 5, 1, −1, −5, 5}, {1, 5, 1, 1, 7, −1}, {1, 5, 1, 3, −1, 5}, {1, 5, 3, −1, −5, 5}, {1, 5, 5, −5, 3, −1}, {1, 5, 5, −1, −5, 3}, {1, 5, 5, −1, −5, 5}, {1, 7, 1, −5, −3, −1}, {1, 7, 1, −1, −3, 3}, {1, 7, 1, −1, 5, 3}, {1, 7, 1, 1, −3, 5}, {1, 7, 1, 3, 5, −1}, {1, 7, 1, 7, 5, 3}, {1, 7, 3, −3, −3, 5}, {1, 7, 3, −1, −1, 5}, {1, 7, 3, −1, 1, 5}, {1, 7, 3, −1, 5, 5}, {1, 7, 3, 1, −3, 5}, {1, 7, 3, 1, −1, 5}, {1, 7, 3, 3, −3, 5}, {1, 7, 3, 3, −1, 5}, {1, 7, 5, −1, −3, 3}, {1, 7, 5, −1, −1, 5}, {1, 7, 5, 1, −3, 5}, {1, 7, 5, 1, −1, 5}, {1, −7, 3, −1, −1, 3}, {1, −7, 3, −1, −1, 5}, {1, −7, 3, 3, −1, 5}, {1, −7, 5, −1, 1, 5}, {1, −7, 5, −1, 3, 5}, or {1, −7, 5, 1, −1, 5} (where these sequences are denoted as a sequence set J for ease of subsequent description).

Optionally, when delta=0, the method further includes:

determining the first sequence based on the preset condition and a sequence $\{s_n\}$, where the preset condition is $x_n = y_{(n+M) \bmod K}$, where $$y_n = A \cdot e^{\frac{j \times \pi \times s_n}{32}},$$

M∈{0, 1, 2, . . . , 5}, K=6, A is a non-zero complex number, and $j=\sqrt{-1}$; and the sequence $\{s_n\}$ includes at least one of the following sequences:

{1, 19, 1, −19, 29, −17}, {1, −17, −1, 17, 17, −9}, {1, 11, −29, 15, −15, 5}, {1, 15, −5, −5, 9, −13}, {1, −19, 19, 29, −13, −21}, {1, 7, 31, −9, −17, 25}, {1, −19, −7, −29, −29, −13}, {1, 19, 7, −25, −9, −21}, {1, −19, −5, 9, −13, 1}, {1, 21, −25, −19, 25, 5}, {1, 19, −11, −25, −9, 13}, {1, 11, 31, −13, 31, 25}, {1, −3, −19, −5, −27, −13}, {1, −27, 19, −23, 31, −11}, {1, 25, 17, −7, −27, −5}, {1, 27, 3, −7, 3, −19}, {1, 21, −3, 9, 3, −21}, {1, −17, −9, 7, 25, 21}, {1, 19, −29, 17, −29, 29}, {1, −11, 3, −5, 9, 23}, {1, 9, −13, 27, 17, −27}, {1, −7, 13, −19, 25, −3}, {1, 19, −27, 5, 23, 11}, {1, 11, −11, −11, −31, −15}, {1, 15, 5, 19, −3, −13}, {1, 23, 9, −17, 3, −11}, {1, −7, 31, 9, −29, −7}, {1, 25, −17, 25, −31, 5}, {1, 17, 1, −13, −25, −9}, or {1, −19, 3, 29, 23, −7} (where these sequences are denoted as a sequence set K for ease of subsequent description).

Optionally, when delta=1, the method further includes:

determining the first sequence based on the preset condition and a sequence $\{s_n\}$, where the preset condition is $x_n=y_{(n+M) mod K}$, where $$y_n = A \cdot e^{\frac{j \times \pi \times s_n}{32}},$$

M∈{0, 1, 2, . . . , 5}, K=6, A is a non-zero complex number, and $j=\sqrt{-1}$; and the sequence $\{s_n\}$ includes at least one of the following sequences:

{1, −23, 21, −1, −3, 17}, {1, 19, −3, −23, −7, −27}, {1, −17, −13, 29, −3, 17}, {1, −21, 5, 25, 17, −21}, {1, 23, −19, −19, −29, −7}, {1, −11, 13, 11, −31, −9}, {1, 7, −17, 5, 15, −9}, {1, 1, 11, −11, 13, −9}, {1, 23, −1, −11, 15, −27}, {1, 23, 27, 7, 27, −17}, {1, −19, −27, −7, 11, −31}, {1, −3, −23, 21, −23, 21}, {1, 29, 9, 17, −1, 11}, {1, 27, 29, 5, −15, 23}, {1, −5, 17, −21, −29, 11}, {1, −17, −13, 9, −7, 11}, {1, −3, −25, −9, −27, 15}, {1, −19, 1, −11, −7, 13}, {1, 17, −27, 13, 9, −13}, {1, −17, −11, 11, 31, −17}, {1, 19, 13, −9, −29, 19}, {1, −21, 31, −15, −23, −3}, {1, −21, −19, 19, 31, −9}, {1, 23, 31, 5, 15, −5}, {1, −23, 17, 21, −19, 23}, {1, 21, 27, −15, −29, 17}, {1, 23, 23, 11, −29, −7}, {1, −25, −3, −1, 13, −9}, {1, 21, −23, −21, 23, −21}, or {1, 21, 11, 31, 11, 13} (where these sequences are denoted as a sequence set L for ease of subsequent description).

Optionally, when delta=1, the method further includes:

determining the first sequence based on the preset condition and the sequence {s(n)}, where the preset condition is $x_n=y_{(n+M) mod K}$, where $$y_n = A \cdot e^{\frac{j \times \pi \times s_n}{16}},$$

M∈{0, 1, 2, . . . , 5}, K=6, A is a non-zero complex number, and $j=\sqrt{-1}$; and the sequence $\{s_n\}$ includes at least one of the following sequences:

{1, 3, −11, 9, −5, −3}, {1, 9, −15, 13, 3, 11}, {1, −9, −13, −5, 3, −7}, {1, −13, −15, 5, −9, −3}, {1, −13, 7, 5, −9, −3}, {1, −11, 7, 11, 9, 15}, {1, −11, −1, 5, 15, 7}, {1, 11, 5, −7, −15, −5}, {1, 11, −1, −9, −15, −5}, {1, −11, 13, −9, −1, −7}, {1, 11, 3, −9, −1, −7}, {1, 9, −3, −11, −1, −7}, {1, −11, −3, 5, −1, 9}, {1, 9, −1, −5, −13, −5}, {1, −13, 5, 5, 11, −3}, {1, −13, −9, 9, 15, 15}, {1, −9, 9, 5, 11, 15}, {1, 3, 3, −11, 7, 15}, {1, 5, 11, 7, −7, 15}, {1, 9, −5, 13, 13, 15}, {1, −11, −1, 7, −3, 5}, {1, 9, −13, 7, 3, 11}, {1, 9, −15, 15, 5, −7}, {1, 11, 3, −11, −13, −5}, {1, −1, −15, −9, 9, −5}, {1, −13, −15, −9, 9, −5}, {1, −11, −5, 13, −1, −5}, {1, −13, 5, 11, −1, 5}, {1, −13, 5, −9, −1, 3}, or {1, −13, 5, −9, −11, −7} (where these sequences are denoted as a sequence set M for ease of subsequent description); or {1, 3, −11, 9, −5, −3}, {1, 3, 7, −7, 13, −1}, {1, −13, −9, −7, −5, 13}, {1, −11, 7, 11, 11, 15}, {1, −11, 7, 11, 15, 15}, {1, 1, 5, 9, −5, 15}, {1, −13, −13, −11, −5, 13}, {1, 7, −7, 13, −1, 1}, {1, −11, 7, 13, 13, 15}, {1, −13, −11, −5, −5, 13}, {1, 3, −11, 9, −5, −5}, {1, −11, 7, 13, 15, 15}, {1, −11, −15, −7, 1, −7}, {1, 5, −9, 11, −3, −5}, {1, −13, −15, −11, −5, 13}, {1, −13, −15, 5, −9, −3}, {1, −13, 7, 5, −9, −3}, {1, 5, 3, −11, 9, −5}, {1, −11, 7, 11, −15, 3}, {1, −7, 1, 9, 5, −7}, {1, 5, 11, 9, −5, 15}, {1, −11, 7, 11, 9, 15}, {1, −13, 7, −7, −1, −3}, {1, −13, 7, 5, −9, −5}, {1, −11, −1, 5, 15, 7}, {1, 11, 5, −7, −15, −5}, {1, 11, 3, −9, −15, −5}, {1, 11, −1, −9, −15, −5}, {1, −15, −9, −7, −5, 13}, {1, 3, 9, 11, −5, 15}, {1, 11, −1, −7, −15, −5}, {1, 11, 5, −3, −15, −5}, {1, −15, −13, −7, −5, 13}, {1, 3, 5, 11, −5, 15}, {1, −13, −13, −5, −5, 13}, {1, −11, 13, −9, −1, −7}, {1, 11, 5, −3, −15, −7}, {1, 11, 5, −7, −15, −7}, {1, −9, −15, −5, 1, 11}, {1, 11, 3, −9, −1, −7}, {1, 7, 7, 11, −3, −15}, {1, −15, −11, −7, −5, 13}, {1, 5, 7, 11, −5, 15}, {1, −11, −3, 5, 15, 7}, {1, −5, −15, −5, 1, 11}, {1, 9, −1, −5, −13, −5}, {1, −11, 5, 11, 15, 15}, {1, 7, 11, −5, 15, 1}, {1, 9, 3, 11, 3, −9}, {1, −7, −11, 11, −13, −7}, {1, 1, 7, −9, 11, −3}, {1, 5, 11, −5, 15, 1}, {1, −13, 13, −9, −3, 7}, {1, −15, −11, −5, −5, 13}, {1, 11, 5, −5, −15, −5}, {1, −11, 5, 9, 9, 15}, {1, 7, 7, 11, −5, 15}, {1, 3, 7, 11, −5, 15}, {1, 9, 15, −9, −13, 11}, {1, −9, 15, 11, −13, −7}, {1, 9, 1, 9, 3, −9}, {1, 11, −1, −7, 1, −7}, {1, −11, 5, 9, 11, 15}, {1, −13, 7, −9, −7, 1}, {1, 11, −1, −9, −1, −7}, {1, 9, 11, −5, 15, 1}, {1, −11, 15, 7, −15, −7}, {1, 9, 1, −11, 15, −7}, {1, −7, −13, −3, 5, 13}, {1, −7, −15, −5, 1, 11}, {1, 11, 3, −5, −15, −5}, {1, 11, 5, −5, −15, −7}, {1, 11, 3, −7, −15, −5}, {1, −9, 1, 9, 3, 11}, {1, −9, −15, −5, 3, 11}, {1, −9, −1, −7, 1, 11}, {1, −9, −15, 11, −13, −7}, {1, −5, −11, 11, −13, −7}, {1, −13, 5, 5, 11, −3}, {1, −13, −9, 9, 15, 15}, {1, −13, 5, 11, −3, 1}, {1, −13, −13, −9, 9, 15}, {1, −11, −13, 9, −15, −9}, {1, −11, −13, 9, −13, −7}, {1, 7, 15, 5, 3, −9}, {1, −11, −13, −5, 1, 11}, {1, 3, −11, 9, −5, −7}, {1, 9, 7, −5, −15, −5}, {1, 11, −1, −11, −13, −5}, {1, −11, −1, 5, 13, 11}, {1, −13, 7, −7, −5, 3}, {1, −1, −13, −5, 1, 11}, {1, −3, −15, −5, 1, 11}, {1, 11, 7, −5, −15, −5}, {1, 11, 7, −3, −15, −5}, {1, −15, −9, −11, −5, 11}, {1, −13, −7, −11, −7, 11}, {1, 11, −1, −11, −15, −5}, {1, 3, −11, −3, −3, 15}, {1, 11, −1, −5, −15, −5}, {1, 9, −1, −11, −13, −5}, {1, −11, −15, −5, 1, 11}, {1, 3, 3, −11, 7, 15}, {1, 9, 3, 11, −3, −9}, {1, −9, 13, −11, −13, −7}, {1, 9, 15, −9, 13, 11}, {1, −9, −1, 5, 13, 11}, {1, −5, 3, 11, −11, 15}, {1, −13, 9, −5, −1, −5}, {1, 9, −13, 13, −1, 7}, {1, −1, 7, −3, −13, −5}, {1, 3, −11, 7, 7, 15}, {1, 9, −5, 13, 13, 15}, {1, −13, 13, −9, −1, 7}, {1, 11, 7, −7, −15, −5}, {1, 11, 3, −11, −15, −5}, {1, −11, −3, 5, 15, 5}, {1, −11, −1, 7, −3, 5}, {1, −11, −1, −11, −3, 5}, {1, 11, 1, −11, −3, −7}, {1, 11, −1, −11, −3, −7}, {1, 11, −1, −11, −15, −7}, {1, 11, −1, −5, −15, −7}, {1, −11, −1, −5, 3, 11}, {1, 11, −1, −5, 3, 11}, {1, −11, −15, −5, 3, 11}, {1, −11, −3, 5, 15, 11}, {1, 9, −13, 7, 3, 11}, {1, −11, −3, 5, 1, 11}, {1, −3, 7, −5, −15, −7}, {1, 9, −13, 15, 3, −7}, {1, −11, −1, 7, 3, 11}, {1, −11, −15, −7, 1, 11}, {1, −11, −1, 7, 15, 5}, {1, −11, −1, 7, 15, 11}, {1, 11, −13, −5, 15, 11}, {1, −9, 1, −3, 5, 13}, {1, −9, 1, 9, −15, 13}, {1, 9, −3, −13, −3, 5}, {1, −9, −13, −3, 5, 13}, {1, −11, −5, −9, −3, 13}, {1, 7, 13, 9, −3, −15}, {1, −11, 5, 11, 7, 13}, {1, −11, −15, −9, −3, 13}, {1, 9, −15, 15, 3, 11}, {1, 9, −15, 15, 5, −7}, {1, 9, −15, 15, −9, 13}, {1, 9, −1, 7, −5, −7}, {1, −11, −13, −5, 3, 11}, {1, −1, −11, −3, −15, −7}, {1, −1, 7, 15, 3, 11}, {1, 9, −15, 15, 3, −7}, {1, −11, −3, −5, 3, 11}, {1, −1, 7, −5, −15, −7}, {1, −1, 7, 15, 3, −7}, {1, 9, −15, −7, 13, 3}, {1, −11, 5, 11, 9, 15}, {1, 7, 13, 11, −3, −15}, {1, −1, 5, 11, −3, −15}, {1, 7, 5, −11, 9, −5}, {1, 7, 5, 11, −5, 15}, {1, −15, 5, −9, −11, −5}, {1, −11, 5, 9, 7, 15}, {1, −11, −13, 11, −13, −7}, {1, 9, −13, 15, 1, −7}, {1, −11, 7, 11, 7, 13}, {1, 11, 3, −11, −3, −7}, {1, 11, 3, −11, −15, −7}, {1, −7, 3, 11, −13, 15}, {1, 11, 3, −11, −3, 5}, {1, −11, 5, 13, 11, 15}, {1, 5, −11, −13, 5, −7}, {1, −1, 7, 13, −11, 13}, {1, 5, 13, 11, −3, −15}, {1, −3, −15, 3, 7, 13}, {1, −1, −13, 3, 7, 15}, {1, 9, −7, 13, −1, 3}, {1, −7, 1, −13, 15, −7}, {1, 9, −13, 15, 1, 9}, {1, −13, 7, −5, 1, −3}, {1, −1, 7, 11, −3, −15}, {1, −7, 3, 11, 7, 15}, {1, −11, 7, 13, 9, 13}, {1, 9, 1, −13, 15, −7}, {1, −11, −15, −9, −5, 13}, {1, 9, 7, −9, 11, −3}, {1, −11, 7, 3, 9, 13}, {1, 9, 13, −3, −15, 15}, {1, −1, −13, 11, −13, −7}, {1, −15, 5, −9, −11, −3}, {1, −1, 3, −13, 7, −7}, {1, 9, −5, −13, −3, −7}, {1, 5, −9, 11, 7, −5}, {1, 9, 1, −1, −13, −5}, {1, 5, 1, 7, −7, 13}, {1, −11, 7, 11, −15, 13}, {1, 5, 1, −11, 9, −5}, {1, −13, 7, −5, −9, −5}, {1, −13, 7, −5, −1, 5}, {1, 9, −3, 15, 13, −3}, {1, 11, 3, −11, −13, −5}, {1, −7, 3, 9, −15, 15}, {1, −11, −15, −7, −3, 13}, {1, 5, 13, 9, −3, −15}, {1, −13, −15, −9, 9, 15}, {1, −1, 5, 11, −3, 15}, {1, −13, 5, 3, −11, −5}, {1, −1, −15, −9, 9, −5}, {1, −13, 5, 11, −3, 3}, {1, 7, 13, 11, −3, 15}, {1, −13, −7, −1, −15, 15}, {1, −13, −15, −9, 9, −5}, {1, 7, −5, 13, −13, 15}, {1, −3, 15, 3, −11, −5}, {1, −13, −7, −11, 7, −5}, {1, −11, −5, 13, −1, −5}, {1, −13, 5, 11, −1, 5}, {1, 7, −7, 13, −13, 5}, {1, −11, −5, 1, −3, 15}, {1, −11, 7, −7, −11, −5}, {1, −13, −7, −11, −5, 13}, {1, −3, 3, 9, −5, 15}, {1, 7, −5, 13, 9, 15}, {1, −13, −5, −7, 11, −3}, {1, −13, 5, −9, −11, −3}, {1, −13, 5, 3, −11, −3}, {1, −1, −15, −11, −3, 15}, {1, 9, −5, 13, 11, 15}, {1, 5, −9, 9, 7, 15}, {1, 9, −5, −7, 11, −3}, {1, −1, −15, 3, 11, 15}, {1, 5, 13, 11, −3, 15}, {1, 5, 3, −11, 7, 15}, {1, −13, 5, −9, −1, 3}, {1, −13, 5, −9, −11, −7}, {1, −13, −5, 13, 11, 15}, {1, 5, 3, −11, −3, 15}, {1, 7, 15, 3, 1, −11}, {1, −11, −3, 3, 15, 3}, {1, 7, 15, 13, 1, −11}, {1, −11, −13, −5, 1, 13}, {1, −11, −13, −7, 1, 13}, {1, −11, 1, 9, 15, 13}, {1, 13, 3, −11, −5, −7}, {1, 7, −15, 7, −5, −5}, {1, −13, −15, −5, −3, 13}, {1, −11, 11, −11, −5, 1}, {1, −9, 3, 9, −15, 15}, {1, −13, −15, −9, −1, 11}, {1, 3, 13, 11, −3, −15}, {1, −9, 3, 11, −15, 15}, {1, −1, 5, −9, 13, −7}, or {1, 13, 3, −11, −13, −5} (where these sequences are denoted as a sequence set N for ease of subsequent description).

Optionally, when delta=1, the method further includes:

determining the first sequence based on the preset condition and the sequence {s(n)}, where the preset condition is $x_n = y_{(n+M) \bmod K}$, where $$y_n = A \cdot e^{\frac{j \times \pi \times s_n}{8}},$$

M∈{0, 1, 2, . . . , 5}, K=6, A is a non-zero complex number, and $j=\sqrt{-1}$; and the sequence $\{s_n\}$ includes at least one of the following sequences:

{1, −7, −7, −3, −1, 7}, {1, 5, 5, −3, 5, 7}, {1, 5, −3, −5, 1, 5}, {1, 7, −7, −1, −3, 7}, {1, −1, 1, −5, −3, 7}, {1, 7, 3, −5, −1, −3}, {1, 7, −7, −1, −7, 7}, {1, −5, −3, −5, 5, −1}, {1, 5, 7, 7, −1, 7}, {1, −7, 3, 3, −5, −1}, {1, 7, −1, 3, −1, −3}, {1, −1, 1, −7, 3, −3}, {1, 1, −5, 3, 5, −7}, {1, −1, 5, 1, −7, −3}, {1, 5, −7, 5, −5, 5}, {1, 5, 1, 1, −5, −1}, {1, 5, −7, 7, 1, 5}, {1, 5, −7, 1, −3, 3}, {1, −5, 3, 3, 7, −1}, {1, 3, −5, −1, −1, 7}, {1, −7, −5, −7, −3, 7}, {1, −1, −5, −1, −7, −3}, {1, −5, 5, 3, −7, −5}, {1, −7, 3, 7, −1, −1}, {1, −3, 5, 3, −7, −3}, {1, −7, −5, 5, −3, 1}, {1, −5, 5, −5, −1, −1}, {1, 3, −3, 1, −7, 1}, {1, −1, 7, 3, 7, −5}, or {1, 1, 5, −3, 7, −7} (where these sequences are denoted as a sequence set O for ease of subsequent description); or {1, −5, 3, 3, 5, −3}, {1, −1, 3, −5, 5, −1}, {1, 5, 1, 1, −5, −1}, {1, −1, 1, −5, −3, 7}, {1, −5, 3, 3, 7, −1}, {1, −1, 7, 3, 7, −5}, {1, −7, −7, −3, −1, 7}, {1, 5, 5, −3, 7, −1}, {1, −5, 5, 3, 7, −7}, {1, 1, 5, −3, 7, −7}, {1, 5, −5, 5, −1, −1}, {1, −1, 3, 5, −1, −7}, {1, −7, 3, 7, −1, −1}, {1, 3, −5, 5, 1, −3}, {1, −7, 3, 3, −5, −1}, {1, 1, −3, 1, 3, 7}, {1, −5, 1, 5, 7, 7}, {1, −1, −7, 3, −5, −3}, {1, 1, −7, 3, 7, −1}, {1, 5, −1, 1, 1, −7}, {1, 7, −7, −3, 7, 7}, {1, −7, −7, −3, 7, −7}, {1, 5, 7, 1, 1, −5}, {1, 1, 3, 7, −1, −7}, {1, 5, 5, −3, 5, 7}, {1, −5, 3, 7, −7, 1}, {1, −1, 1, −7, 3, −3}, {1, −5, 3, 5, −7, 5}, {1, −3, 5, 3, −7, −3}, {1, −1, 5, 1, −7, −3}, {1, 1, −5, −1, 7, −1}, {1, −7, −5, 5, −3, 1}, {1, −5, 1, 3, 7, 7}, {1, 3, −3, 7, −1, 3}, {1, −7, −5, −7, −3, 7}, {1, 5, 7, −3, 7, 7}, {1, −7, 3, −3, −1, 3}, {1, 3, −5, 3, 7, 1}, {1, −7, 3, 1, −5, −1}, {1, 1, −5, 3, 5, −7}, {1, 5, −7, 1, −3, 3}, {1, −1, 3, 7, −3, −7}, {1, 3, −7, 3, −3, −3}, {1, −1, −7, 1, 3, 7}, {1, 1, 3, 7, 1, −7}, {1, 3, −5, −1, −1, 7}, {1, −5, −3, −5, 5, −1}, {1, −7, −5, −5, −1, 7}, {1, 1, −7, −5, −1, 7}, {1, 5, −7, 7, −1, −5}, {1, 7, 1, 1, −5, −3}, {1, 5, 7, 7, −1, 7}, {1, −7, 3, −5, −1, 1}, {1, −5, 5, −5, −1, −1}, {1, 7, 1, −5, −3, −3}, {1, 3, −3, 1, −7, 1}, {1, 1, 3, −5, 5, −3}, or {1, 3, 3, −5, −1, −7} (where these sequences are denoted as a sequence set P for ease of subsequent description).

Specifically, for the comb-2 structure, the terminal may determine, based on the preset condition and the sequence {s(n)}, the first sequence used to generate the reference signal transmitted on the combs 2 in the comb-2. {s(n)} may be selected from a sequence combination (referred to as a "sequence set 4" below). The sequence set 4 may be 100 sequences modulated by using 8PSK, or may be 100 sequences modulated by using 16PSK, or may be 100 sequences modulated by using 32PSK.

In addition, for the comb-2 structure, the terminal may determine, based on the preset condition and the sequence {s(n)}, the first sequence used to generate the reference signal transmitted on the combs 2 in the comb-2. {s(n)} may be determined in the sequence combination (referred to as the "sequence set 4" below). The sequence set 4 may be some of a plurality of sequences modulated by using 8PSK, or may be some of a plurality of sequences modulated by using 16PSK, or may be some of a plurality of sequences modulated by using 32PSK.

In the following, unless otherwise specified, the first sequence, the sequence {x(n)}, or the sequence $\{x_n\}$ may be obtained through transform by using the sequence sets A to P and the first sequence set to the eighth sequence set as base sequences.

It should be noted that some or all sequences included in the sequence combination 3 may be the same as sequences in the sequence combination 4. This is not limited in this application.

Optionally, A may be a modulation symbol, and may be carried on the K elements included in the sequence. A does not change with n.

Optionally, A is a constant. For example, A=1. For example, A may be a symbol known to both the terminal device and the network device. A may alternatively represent an amplitude.

It should be noted that, that A is a constant in a transmission time unit does not mean that A is fixed. When the first signal is sent at different moments, A may be variable. For example, all N elements included in the sequence {x(n)} are equivalent to the reference signal, and A is an amplitude of the reference signal. When sending the signal for the first time, the terminal device may send the signal based on A=1. When sending the signal for the second time, the terminal device may send the signal based on A=2.

Optionally, that the reference signal is generated by using the first sequence may be specifically: The first sequence is repeated, and DFT transform is performed to generate the reference signal.

Specifically, for the comb-2 structure, the terminal may repeat the first sequence by using [+1 +1] or [+1 −1]. After repeating the first sequence by using [+1 +1] and performing the DFT transform, the terminal may map odd-numbered sequences (which may be represented as 2p+delta, where p=0, . . . , L−1) in the 2K sequences to the combs 1 in the comb-2, to generate the reference signal. After repeating the first sequence by using [+1 −1] and performing the DFT transform, the terminal may map even-numbered sequences in the 2K sequences to the combs 2 in the comb-2, to generate the reference signal.

In the following embodiments, Φ(0), . . . , Φ(5) are used to represent elements in {x(n)}.

In another embodiment, for the comb-2 structure, after repeating the first sequence, the terminal may obtain {Φ(0), . . . , Φ(5), Φ(0), . . . , Φ(5)} or {Φ(0), . . . , Φ(5), −Φ(0), . . . −Φ(5)}. After performing the DFT transform on {Φ(0), . . . , Φ(5), Φ(0), . . . , Φ(5)}, the terminal may map a sequence including 12 elements to the combs 1 in the comb-2, to obtain a frequency-domain reference signal on even-numbered subcarriers. After performing the DFT transform on {Φ(0), . . . , Φ(5), . . . , −Φ(0), . . . , −Φ(5)}, the terminal may map a sequence including 12 elements to the combs 2 in the comb-2 to obtain a frequency-domain reference signal on odd-numbered subcarriers.

For the comb-4 structure, the terminal may repeat the first sequence by using [+1 +1 +1 +1], [+1 −1 +1 −1], [+1 +1 −1 −1], or [+1 −1 +1 −1]. After repeating the first sequence by using [+1 +1 +1 +1] and performing the DFT transform, the terminal may map sequences numbered 4p+delta (delta=0) in the 4K sequences to combs 1 shown in FIG. 5, to generate the reference signal. After repeating the first sequence by using [+1 −1 +1 −1] and performing the DFT transform, the terminal may map sequences numbered 4p+delta (delta=1) in the 4K sequences to combs 2 shown in FIG. 5, to generate the reference signal. After repeating the first sequence by using [+1 −1 +1 −1] and performing the DFT transform, the terminal may map sequences numbered 4p+delta (delta=2) in the 4K sequences to combs 3 shown in FIG. 5, to generate the reference signal. After repeating the first sequence by using [+1 −1 +1 −1] and performing the DFT transform, the terminal may map sequences numbered 4p+delta (delta=3) in the 4K sequences to combs 4 shown in FIG. 5, to generate the reference signal.

In another embodiment, for the comb-4 structure, after repeating the first sequence, the terminal may obtain Φ(0), . . . , Φ(5), Φ(0), . . . , Φ(5), Φ(0), . . . , Φ(5), Φ(0), . . . , Φ(5), {Φ(0), . . . , Φ(5), j×Φ(0), . . . , j×Φ(5), −Φ(0), . . . , −Φ(5), −j×Φ(0), . . . , −j×Φ(5)}, {Φ(0), . . . , Φ(5), −Φ(0), . . . , −Φ(5), Φ(0), . . . , Φ(5), −Φ(0), . . . , −Φ(5)}, or {Φ(0), . . . , Φ(5), −j×Φ(0), . . . , −j×Φ(5), −Φ(0), . . . , −Φ(5), j×Φ(0), . . . , j×Φ(5)}. After performing the DFT transform on {Φ(0), . . . , Φ(5), Φ(0), . . . , Φ(5), Φ(0), . . . , Φ(5), Φ(0), . . . , Φ(5)}, the terminal may map the sequences each having the number of 4p+delta (delta=0) in the 4K sequences to the combs 1 shown in FIG. 5, to generate the reference signal. After performing the DFT transform on {Φ(0), . . . , Φ(5), j×Φ(0), . . . , j×Φ(5), −Φ(0), . . . , −Φ(5), −j×Φ(0), . . . , −j×Φ(5)}, the terminal may map the sequences each having the number of 4p+delta (delta=1) in the 4K sequences to the combs 2 shown in FIG. 5, to generate the reference signal. After performing the DFT transform on {Φ(0), . . . , Φ(5), −Φ(0), . . . , −Φ(5), Φ(0), . . . , Φ(5), −Φ(0), . . . , −Φ(5)}, the terminal may map the sequences each having the number of 4p+delta (delta=2) in the 4K sequences to the combs 3 shown in FIG. 5 to generate the reference signal. After performing the DFT transform on {Φ(0), . . . , Φ(5), −j×Φ(0), . . . , −j×Φ(5), −Φ(0), . . . , −Φ(5), j×Φ(0), . . . , j×Φ(5)}, the terminal may map the sequences each having the number of 4p+delta (delta=3) in the 4K sequences to the combs 4 shown in FIG. 5, to generate the reference signal.

It should be noted that, when K=6, to be specific, the first sequence is a sequence having a length of 6, and the first frequency-domain resource includes six subcarriers, the comb-4 structure needs to occupy 4K=24 subcarriers (namely, two RBs) so that six subcarriers satisfying a requirement can be selected from the comb-4 structure. The comb-2 structure needs to occupy 2K=12 subcarriers (namely, oneRB) so that subcarriers satisfying a requirement can be selected from the comb-2 structure.

Optionally, when L=2, K=6, n=0, 1, 2, 3, 4, and 5, and delta=0, the generating the reference signal of the first signal includes: performing discrete Fourier transform on elements in a sequence {z(t)} to obtain a sequence {f(t)}, where t=0, . . . , 2K−1; a sequence {z(a)}=the sequence {x(n)}, and a=0, . . . , K−1; a sequence {z(b)}=the sequence {x(n)}, and b=K, . . . , 2K−1; and x(n) represents the first sequence; and mapping elements numbered 2p+delta in the sequence {f(t)} to the K subcarriers numbered k, to generate the reference signal, where p=0, . . . , L−1.

Specifically, the sequence {z(t)} may be obtained by repeating the first sequence {x(n)} by using [+1 +1]. To be specific, when t=a, {z(a)}=the sequence {x(n)}, and a=0, . . . , K−1; when t=b, the sequence {z(b)}=the sequence {x(n)}, and b=K, . . . , 2K−1. Then, the terminal may perform the discrete Fourier transform (DFT) on the elements in the sequence {z(t)} to obtain the sequence {f(t)}, and map k elements numbered 2p+delta (delta=0) in the sequence {f(t)} to the K subcarriers on the first frequency-domain resource, to generate the reference signal. In this embodiment of this application, the time-domain sequence {z(t)} can be transformed into a frequency-domain sequence, and the frequency-domain sequence is mapped to corresponding subcarriers.

Figure 6:
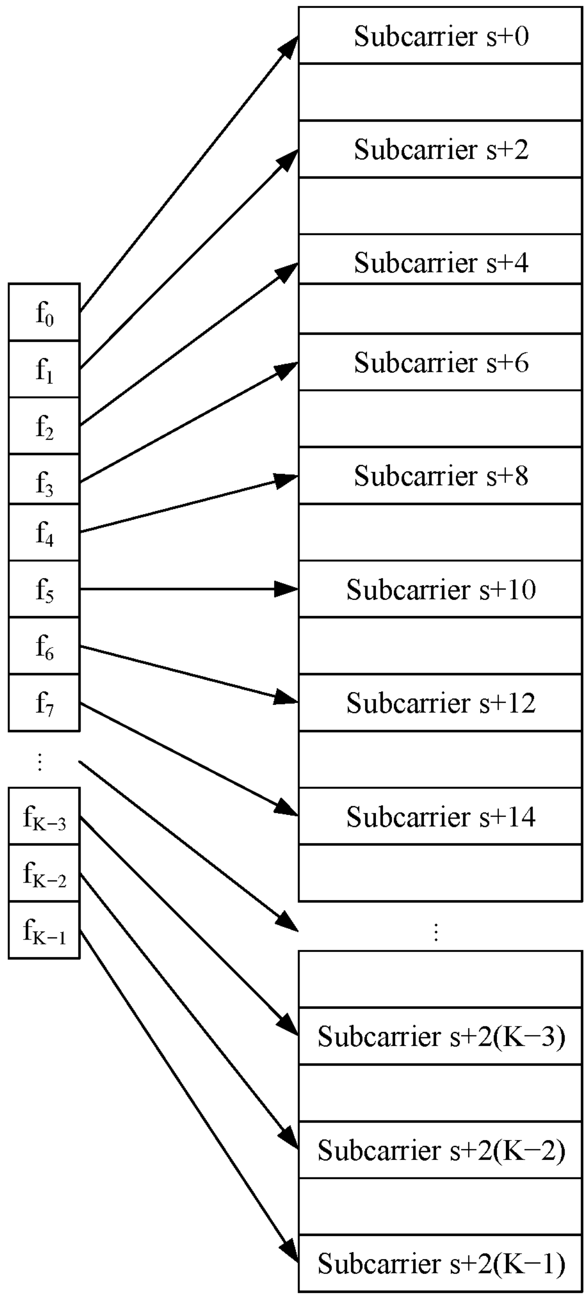
FIG. 6 is a schematic flowchart of a signal processing method according to another embodiment of this application.

For example, K elements in the sequence {f(t)} are mapped to K equi-spaced subcarriers respectively. As shown in FIG. 6, a spacing between the K subcarriers is 1, and the K subcarriers are equally spaced in frequency domain. A spacing between subcarriers to which elements f(0) to f(K−1) in the sequence {f(t)} are mapped is one subcarrier. Specifically, the elements f(0) to f(K−1) are mapped to the K equi-spaced subcarriers respectively, subcarrier numbers are s+0, s+2, . . . , s+2(K−1), and s represents an index, of the first subcarrier of the K subcarriers to which the sequence {f(t)} is mapped, in subcarriers in a communications system.

Optionally, when L=2, K=6, n=0, 1, 2, 3, 4, and 5, and delta=1, the generating the reference signal of the first signal includes: performing discrete Fourier transform on elements in a sequence {z(t)} to obtain a sequence {f(t)}, where t=0, . . . , 2K−1; a sequence {z(a)}=the sequence {−1·x(n)}, and a=0, . . . , K−1; a sequence {z(b)}=the sequence {x(n)}, and b=K, . . . , 2K−1; and x(n) represents the first sequence; and mapping elements numbered 2p+delta in the sequence $\{f(t)\}$ to the K subcarriers each having a subcarrier number of k, to generate the reference signal, where p=0, . . . , L−1. It should be understood that L=2 may be merely an example, and when a value of L is another value, the method for generating the reference signal of the first signal is also applicable.

Specifically, the sequence $\{z(t)\}$ may be obtained by repeating the first sequence $\{x(n)\}$ by using [+1 −1]. To be specific, when t=a, $\{z(a)\}$=the sequence $\{x(n)\}$, and a=0, . . . , K−1; when t=b, the sequence $\{z(b)\}$=the sequence $\{x(n)\}$, and b=K, . . . , 2K−1. Then, the terminal may perform the discrete Fourier transform on the elements in the sequence $\{z(t)\}$ to obtain the sequence $\{f(t)\}$, and map k elements numbered 2p+delta (delta=1) in the sequence $\{f(t)\}$ to the K subcarriers on the first frequency-domain resource to generate the reference signal.

Optionally, when L=4, K=6, n=0, 1, 2, and 3, and delta=0, the generating the reference signal of the first signal includes: performing discrete Fourier transform on elements in a sequence $\{z(t)\}$ to obtain a sequence $\{f(t)\}$ with t=0, . . . , 4K−1, where a sequence $\{z(a)\}$=the sequence $\{x(n)\}$, and a=0, . . . , K−1; a sequence $\{z(b)\}$=the sequence $\{x(n)\}$, and b=K, . . . , 2K−1; a sequence $\{z(c)\}$=the sequence $\{x(n)\}$, and c=2K, . . . , 3K−1; a sequence $\{z(d)\}$=the sequence $\{x(n)\}$, and d=3K, . . . , 4K−1; and x(n) represents the first sequence; and mapping elements numbered 4p+delta in the sequence $\{f(t)\}$ to the K subcarriers each having a subcarrier number of k, to generate the reference signal, where p=0, . . . , L−1.

Specifically, the terminal may repeat the sequence $\{x(n)\}$ by using [+1 +1 +1 +1] to obtain the sequence $\{z(t)\}$, perform the DFT on the sequence $\{z(t)\}$ to obtain $\{f(t)\}$, and map elements numbered 4p (p=0, 1, 2, and 3) in the sequence to subcarriers numbered u+4*n (where n=0, 1, 2, and 3).

Optionally, when L=4, K=6, n=0, 1, 2, and 3, and delta=1, the generating the reference signal of the first signal includes: performing discrete Fourier transform on elements in a sequence $\{z(t)\}$ to obtain a sequence $\{f(t)\}$, where a sequence $\{z(a)\}$=the sequence $\{x(n)\}$, and a=0, . . . , K−1; a sequence $\{z(b)\}$=the sequence $\{-1\cdot x(n)\}$, and b=K, . . . , 2K−1; a sequence $\{z(c)\}$=the sequence $\{x(n)\}$, and c=2K, . . . , 3K−1; a sequence $\{z(d)\}$=the sequence $\{-1\cdot x(n)\}$, and d=3K, . . . , 4K−1; and x(n) represents the first sequence; and mapping elements numbered 4p+delta in the sequence $\{f(t)\}$ to the K subcarriers each having a subcarrier number of k, to generate the reference signal, where p=0, . . . , L−1.

Specifically, the terminal may repeat the sequence $\{x(n)\}$ by using [+1 −1 +1 −1] to obtain the sequence $\{z(t)\}$, perform the DFT on the sequence $\{z(t)\}$ to obtain $\{f(t)\}$, and map elements numbered 4p+1 (p=0, 1, 2, and 3) in the sequence to subcarriers numbered u+4*n+1 (where n=0, 1, 2, and 3).

Optionally, when L=4, K=6, n=0, 1, 2, and 3, and delta=2, the generating the reference signal of the first signal includes: performing discrete Fourier transform on elements in a sequence $\{z(t)\}$ to obtain a sequence $\{f(t)\}$, where a sequence $\{z(a)\}$=the sequence $\{x(n)\}$, and a=0, . . . , K−1; a sequence $\{z(b)\}$=the sequence $\{x(n)\}$, and b=K, . . . , 2K−1; a sequence $\{z(c)\}$=the sequence $\{-1\cdot x(n)\}$, and c=2K, . . . , 3K−1; a sequence $\{z(d)\}$=the sequence $\{-1\cdot x(n)\}$, and d=3K, . . . , 4K−1; and x(n) represents the first sequence; and mapping elements numbered 4p+delta in the sequence $\{f(t)\}$ to the K subcarriers each having a subcarrier number of k, to generate the reference signal, where p=0, . . . , L−1.

Specifically, the terminal may repeat the sequence $\{x(n)\}$ by using [+1 +1 −1 −1] to obtain the sequence $\{z(t)\}$, perform the DFT on the sequence $\{z(t)\}$ to obtain $\{f(t)\}$, and map elements numbered 4p+2 (p=0, 1, 2, and 3) in the sequence to subcarriers numbered u+4*n+2 (where n=0, 1, 2, and 3).

Optionally, when L=4, K=6, n=0, 1, 2, and 3, and delta=3, the generating the reference signal of the first signal includes: performing discrete Fourier transform on elements in a sequence $\{z(t)\}$ to obtain a sequence $\{f(t)\}$, where a sequence $\{z(a)\}$=the sequence $\{x(n)\}$, and a=0, . . . , K−1; a sequence $\{z(b)\}$=the sequence $\{-1\cdot x(n)\}$, and b=K, . . . , 2K−1; a sequence $\{z(c)\}$=the sequence $\{-1\cdot x(n)\}$, and c=2K, . . . , 3K−1; a sequence $\{z(d)\}$=the sequence $\{x(n)\}$, and d=3K, . . . , 4K−1; and x(n) represents the first sequence; and mapping elements numbered 4p+delta in the sequence $\{f(t)\}$ to the K subcarriers each having a subcarrier number of k, to generate the reference signal, where p=0, . . . , L−1.

Specifically, the terminal may repeat the sequence $\{x(n)\}$ by using [+1 −1 +1 −1] to obtain the sequence $\{z(t)\}$, perform the DFT on the sequence $\{z(t)\}$ to obtain $\{f(t)\}$, and map elements numbered 4p+3 (p=0, 1, 2, and 3) in the sequence to subcarriers numbered u+4*n+3 (where n=0, 1, 2, and 3).

Figure 7:
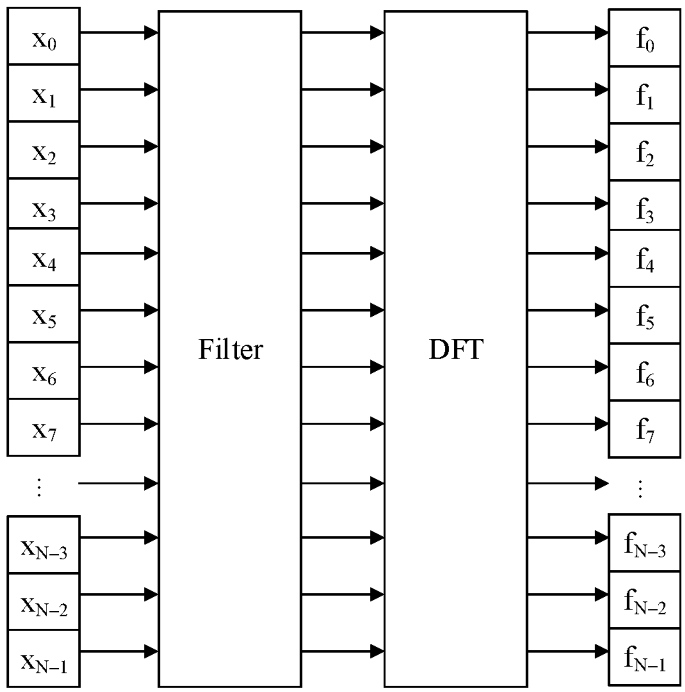
FIG. 7 is a schematic flowchart of a signal processing method according to another embodiment of this application.

Optionally, step 403 may specifically include: Filter the first sequence, then perform DFT transform, and map a sequence obtained after the filtering and the DFT to the first frequency-domain resource, to obtain the reference signal. For example, as shown in FIG. 7, $\{f(t)\}$ is obtained after filtering is performed on the first sequence $\{x(n)\}$ and then the DFT is performed.

Figure 8:
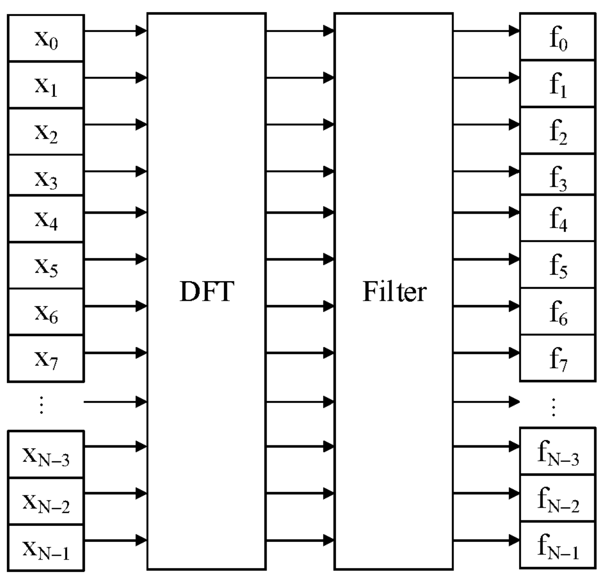
FIG. 8 is a schematic flowchart of a signal processing method according to another embodiment of this application.

Optionally, step 403 may specifically include: Perform DFT transform on the first sequence, then perform filtering, and map a sequence obtained after the DFT and the filtering to the first frequency-domain resource, to obtain the reference signal. For example, as shown in FIG. 8, $\{f(t)\}$ is obtained after the DFT is performed on the first sequence $\{x(n)\}$ and then filtering is performed.

Optionally, the terminal device performs DFT processing on the N elements in the sequence $\{x_n\}$ to obtain a sequence $\{f_n\}$. Herein, this mainly means that the terminal device performs DFT processing on N elements in a configured sequence $\{x_n\}$ to obtain a frequency-domain sequence. The frequency-domain sequence is the sequence $\{f_n\}$. Then, the terminal device maps the sequence $\{f_n\}$ to the N subcarriers, to generate the first signal, and sends the first signal to the network device.

Optionally, a specific process in which the terminal device performs DFT processing on the sequence $\{x_n\}$ including N elements to obtain a frequency-domain sequence, then maps the frequency-domain sequence to the N subcarriers respectively to generate the first signal and sends the first signal to the network device includes the following steps.

The terminal device performs the DFT processing on the sequence $\{x_n\}$ including the N elements, to obtain the sequence $\{f_n\}$.

Figure 18:
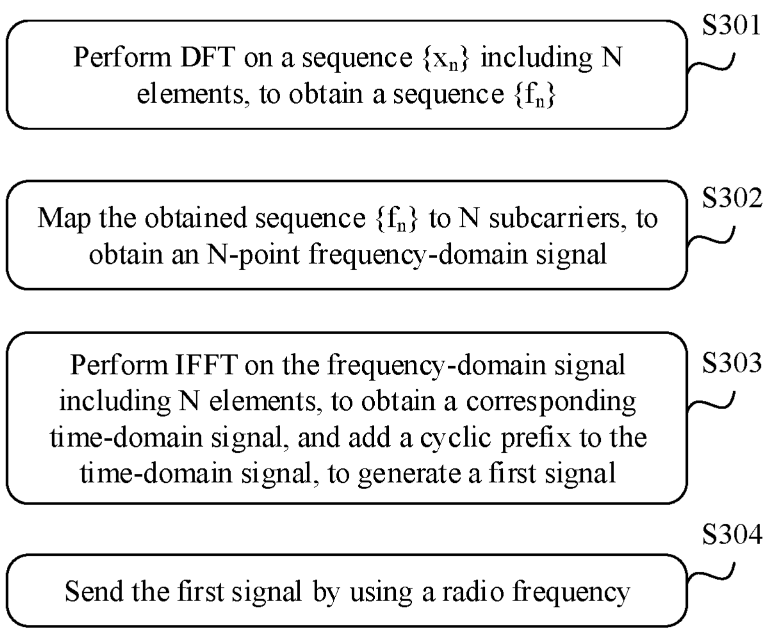
FIG. 18 is a schematic diagram of a signal processing method according to another embodiment of this application.

With reference to the foregoing descriptions, in a single embodiment, refer to FIG. 18. During execution of S301, in a process in which the terminal device performs the DFT processing on the sequence to obtain the sequence $\{f_n\}$, a filter may not be used. Optionally, in a process in which the terminal device performs the DFT processing on the sequence $\{x_n\}$ to obtain the sequence $\{f_n\}$, DFT processing may be performed after the filter is used. Optionally, in a process in which the terminal device performs the DFT processing on the sequence $\{x_n\}$ to obtain the sequence $\{f_n\}$, the terminal device may obtain the sequence by using a filter after performing DFT processing.

S302: The terminal device maps the sequence to the N subcarriers respectively to obtain an N-point frequency-domain signal.

In a specific implementation, the N-point frequency-domain signal includes frequency-domain signals of N elements.

In the following embodiments of this application, s represents an index, of the first subcarrier of the K subcarriers to which the sequence $\{f_n\}$ is mapped, in subcarriers in a communications system.

Optionally, the terminal device maps N elements in the sequence $\{f_n\}$ to N consecutive subcarriers respectively. Optionally, elements $f_0$ to $f_{N-1}$ in the sequence $\{f_n\}$ are mapped to N consecutive subcarriers, and reference signs of the subcarrier are s+0, s+1, . . . , s+N−1.

In a possible example, the terminal device sequentially maps the N elements in the sequence $\{f_n\}$ to the N subcarriers in descending order of the subcarriers. One element in the sequence $\{f_n\}$ is mapped to one frequency-domain subcarrier. The frequency-domain subcarrier is a minimum unit of a frequency-domain resource, and is used to carry data information.

In a possible example, the terminal device sequentially maps the N elements in the sequence $\{f_n\}$ to the N subcarriers in ascending order of the subcarriers. One element in the sequence $\{f_n\}$ is mapped to one subcarrier, and the subcarrier carries the element. After the mapping, when the terminal device sends data by using a radio frequency, it is equivalent to that the element is sent on the subcarrier. In the communications system, different terminal devices may send data by occupying different subcarriers. Positions of the N subcarriers in a plurality of subcarriers in the communications system may be predefined or configured by the network device by using signaling.

Optionally, the N elements in the sequence may alternatively be mapped to N equi-spaced subcarriers respectively. Optionally, a spacing between the K subcarriers is 1, and the N subcarriers are equally spaced in frequency domain. A spacing between the subcarriers to which the elements $f_0$ to $f_{N-1}$ in the sequence $\{f_n\}$ are mapped is one subcarrier. Specifically, the elements $f_0$ to $f_{N-1}$ are mapped to the N equi-spaced subcarriers respectively, and subcarrier numbers are s+0, s+2, . . . , s+2(N−1).

In the embodiments of this application, a manner in which the N elements in the sequence $\{f_n\}$ are mapped to the N subcarriers respectively is not limited to the foregoing manners.

S303: The terminal device performs inverse fast Fourier transform (IFFT) on the frequency-domain signal including the N elements, to obtain a corresponding time-domain signal, and adds a cyclic prefix to the time-domain signal, to generate the first signal.

S304: The terminal device sends the first signal by using the radio frequency.

Optionally, when S303 is performed, the time-domain signal obtained by the terminal device by performing the IFFT on the generated N-point frequency-domain signal is an orthogonal frequency division multiplexing (OFDM) symbol. When S303 is performed, the terminal device sends the first signal by using the radio frequency. In other words, the terminal device sends, on the N subcarriers, the first signal that carries the sequence $\{f_n\}$.

Optionally, the terminal device may send, on one OFDM symbol, the first signal that carries the sequence $\{f_n\}$, or may send, on a plurality of OFDM symbols, the first signal that carries the sequence $\{f_n\}$.

It should be noted that, in the embodiments of this application, a manner of generating the first signal is not limited to the foregoing implementation in which the terminal device performs the DFT processing on the sequence $\{x(n)\}$ including the N elements to obtain the frequency-domain sequence, then maps the frequency-domain sequence to the N subcarriers respectively, to generate the first signal, and sends the first signal to the network device.

Optionally, a sequence $\{y_n\}$ may be obtained by using a shaping filter for the sequence $\{x(n)\}$, then the sequence $\{y_n\}$ is modulated to a carrier to generate the first signal, and the first signal is sent to the network device.

Figure 9:
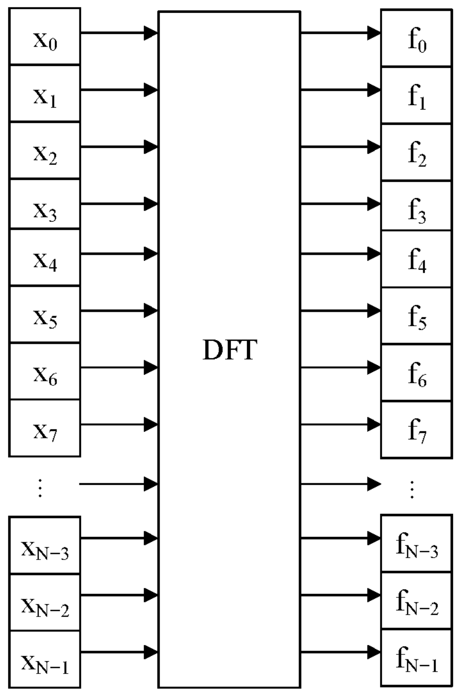
FIG. 9 is a schematic flowchart of a signal processing method according to another embodiment of this application.

It should be understood that, after the DFT transform is performed on the first sequence in step 403, filtering may not be performed, and a sequence obtained after the DFT is directly mapped to the first frequency-domain resource to obtain the reference signal. As shown in FIG. 9, $\{f(t)\}$ is obtained after the DFT transform is performed on the first sequence $\{x(n)\}$.

It should be noted that, that an element in a sequence is mapped to one subcarrier may be understood as that the subcarrier carries the element. After the mapping, the terminal may perform sending by using a radio frequency.

404: The network device generates a local sequence, where the local sequence may be the first sequence or a conjugate transpose of the first sequence.

Specifically, the network device may prestore a mapping relationship between the first sequence and a frequency-domain resource, or agree on a mapping relationship in a protocol. In this way, the network device may determine first sequences corresponding to different frequency-domain resources. Alternatively, if the network device determines to receive the reference signal only on some frequency-domain resources of the comb structure, the network device may generate only first sequences corresponding to the some frequency-domain resources.

For example, after accessing a network, the terminal may send a PUSCH or a DMRS by using the configured sequence $\{x(n)\}$, and the network device receives the PUSCH or the DMRS by using the sequence $\{x(n)\}$ configured for the terminal device.

405: The terminal sends the reference signal on the first frequency-domain resource. Correspondingly, the network device receives the reference signal on the first frequency-domain resource.

Specifically, in frequency-domain resources of a comb structure, reference signals mapped to frequency-domain resources on different combs may be generated by using different sequences. In other words, the reference signals on different frequency-domain resources may be generated by selecting different sequences as required, thereby improving performance of the reference signals transmitted on the frequency-domain resources of the comb structure. For example, the performance may be at least one of a relatively low peak to average power ratio (peak to average power ratio, PAPR), a relatively low correlation, relatively good frequency-domain flatness, and a relatively good time-domain auto-correlation.

It should be noted that the terminal may further send the first signal on the first frequency-domain resource. The first frequency-domain resource may be the same as a frequency-domain resource for sending the reference signal, but a time-domain resource for sending the first signal is different from a time-domain resource for sending the reference signal. This is not limited in this application.

406: The network device processes the first signal based on the local sequence.

Specifically, the terminal device determines a corresponding local sequence based on the first frequency-domain resource for receiving the reference signal, determines channel quality information based on the local sequence and the reference signal, and then processes the first signal based on the channel quality information. When the local sequence is the first sequence, the network device may determine the channel quality information based on a ratio of the reference signal to the first sequence. When the local sequence is a conjugate of the first sequence, the network device may determine the channel quality information based on a product of the reference signal and the conjugate of the first sequence.

The following describes another embodiment of the present disclosure. The embodiment relates to a sequence-based signal processing method, including:

determining a sequence $\{x_n\}$, where $x_n$ is an element in the sequence $\{x_n\}$, the sequence $\{x_n\}$ is a sequence satisfying a preset condition, and the preset condition is:

the preset condition is $x_n = y_{(n+M) \bmod K}$, where $$y_n = A \cdot e^{\frac{j \times \pi \times s_n}{8}},$$

$M \in \{0, 1, 2, \ldots, 5\}$, K=6, A is a non-zero complex number, $j=\sqrt{-1}$, and a set of sequence $\{s_n\}$ including an element $s_n$ includes at least one of sequences in a first sequence set; and the sequences included in the first sequence set include:

{1, 1, 3, –7, 5, –3}, {1, 1, 5, –7, 3, 5}, {1, 1, 5, –5, –3, 7}, {1, 1, –7, –5, 5, –7}, {1, 1, –7, –3, 7, –7}, {1, 3, 1, 7, –1, –5}, {1, 3, 1, –7, –3, 7}, {1, 3, 1, –7, –1, –5}, {1, 3, 3, 7, –1, –5}, {1, 5, 1, 1, –5, –3}, {1, 5, 1, 3, –5, 5}, {1, 5, 1, 3, –5, –7}, {1, 5, 1, 3, –3, 1}, {1, 5, 1, 3, –1, –7}, {1, 5, 1, 5, 3, –7}, {1, 5, 1, 5, 3, –5}, {1, 5, 1, 5, 7, 7}, {1, 5, 1, 5, –5, 3}, {1, 5, 1, 5, –3, 3}, {1, 5, 1, 5, –1, 3}, {1, 5, 1, 5, –1, –1}, {1, 5, 1, 7, 3, –3}, {1, 5, 1, 7, –5, 5}, {1, 5, 1, –5, 3, 5}, {1, 5, 1, –5, –7, –1}, {1, 5, 1, –5, –5, –3}, {1, 5, 1, –5, –3, 1}, {1, 5, 1, –5, –1, 1}, {1, 5, 1, –5, –1, 5}, {1, 5, 1, –5, –1, –1}, {1, 5, 1, –3, 1, 7}, {1, 5, 1, –3, 1, –5}, {1, 5, 1, –3, 7, –7}, {1, 5, 1, –3, 7, –5}, {1, 5, 1, –3, –5, –1}, {1, 5, 1, –1, 3, –5}, {1, 5, 1, –1, 5, –7}, {1, 5, 1, –1, –7, –3}, {1, 5, 1, –1, –5, –3}, {1, 5, 3, –3, –7, –5}, {1, 5, 3, –3, –7, –1}, {1, 5, 3, –3, –1, –7}, {1, 5, 3, –1, 5, –7}, {1, 5, 3, –1, –5, –3}, {1, 5, 5, 1, 3, –3}, {1, 5, 5, –1, –7, –5}, {1, 7, 1, 1, 1, –5}, {1, 7, 1, 1, –7, –7}, {1, 7, 1, 1, –5, –5}, {1, 7, 1, 3, –7, 7}, {1, 7, 1, 3, –3, 3}, {1, 7, 1, –7, 1, 1}, {1, 7, 1, –7, –7, –7}, {1, 7, 1, –5, 1, 1}, {1, 7, 1, –5, –5, 1}, {1, 7, 1, –5, –3, 1}, {1, 7, 1, –5, –1, 1}, {1, 7, 1, –5, –1, –1}, {1, 7, 1, –1, 5, 7}, {1, 7, 3, 1, 5, –3}, {1, 7, 3, 1, –5, –5}, {1, 7, 3, 5, –5, –7}, {1, 7, 3, –7, 7, –1}, {1, 7, 3, –7, –5, 3}, {1, 7, 3, –5, –7, –1}, {1, 7, 3, –3, –5, 1}, {1, 7, 3, –3, –5, –1}, {1, 7, 3, –3, –3, –3}, {1, 7, 3, –1, –5, –3}, {1, 7, 5, 1, –5, –5}, {1, 7, 5, 1, –5, –3}, {1, 7, 5, –5, 3, –1}, {1, 7, 5, –5, –3, –7}, {1, 7, 5, –3, –7, 1}, {1, 7, 5, –1, –5, –5}, {1, 7, 5, –1, –5, –3}, {1, –7, 1, –5, 1, 1}, {1, –7, 3, 3, –5, –5}, {1, –7, 3, 5, –1, –3}, {1, –7, 3, –5, 1, 1}, {1, –7, 3, –5, –5, 1}, {1, –7, 3, –5, –5, –5}, {1, –7, 5, –3, –5, 1}, {1, –5, 1, 1, 3, 7}, {1, –5, 1, 1, 5, 7}, {1, –5, 1, 1, 7, 7}, {1, –5, 1, 3, 3, 7}, {1, –5, 1, 7, 5, –1}, {1, –5, 1, 7, 7, 1}, {1, –5, 1, –7, –7, 1}, {1, –5, 1, –7, –7, –7}, {1, –5, 3, –7, –7, 1}, {1, –5, 5, 3, –5, –3}, {1, –5, 5, 3, –5, –1}, {1, –5, 5, 5, –5, –3}, {1, –5, 5, 5, –5, –1}, {1, –5, 5, 7, –5, 1}, {1, –5, 5, 7, –5, 3}, {1, –5, 5, –7, –5, 1}, {1, –5, 5, –7, –5, 3}, {1, –5, 7, 3, 5, –3}, {1, –5, –7, 3, 5, –3}, {1, –5, –7, 3, 5, –1}, {1, –5, –7, 3, 7, –1}, {1, –3, 1, 1, 3, 7}, {1, –3, 1, 1, 5, 7}, {1, –3, 1, 1, 5, –1}, {1, –3, 1, 3, 3, 7}, {1, –3, 1, 3, –7, 7}, {1, –3, 1, 5, 7, 1}, {1, –3, 1, 5, 7, 3}, {1, –3, 1, 5, 7, 7}, {1, –3, 1, 5, –7, 3}, {1, –3, 1, 7, –5, 5}, {1, –3, 1, 7, –1, 3}, {1, –3, 1, –7, 3, –1}, {1, –3, 1, –7, 7, –1}, {1, –3, 1, –7, –5, 5}, {1, –3, 1, –7, –3, 3}, {1, –3, 1, –5, 7, –1}, {1, –3, 3, 3, –7, 7}, {1, –3, 3, 5, –5, –7}, {1, –3, 3, 7, 7, 7}, {1, –3, 3, 7, –7, 5}, {1, –3, 3, –7, –7, 3}, {1, –3, 3, –5, –7, –1}, {1, –3, 7, –5, 3, 5}, {1, –1, 1, 7, 3, –7}, {1, –1, 1, 7, 3, –5}, {1, –1, 1, –5, 5, –7}, {1, –1, 3, –7, –5, 7}, {1, –1, 5, –7, –5, 5}, {1, –1, 5, –7, –5, 7}, {1, –1, 5, –5, –5, 5}, and {1, –1, 5, –5, –5, 7};

{1, 1, 5, –7, 3, 7}, {1, 1, 5, –7, 3, –3}, {1, 1, 5, –1, 3, 7}, {1, 1, 5, –1, –7, –3}, {1, 3, 1, 7, –1, –7}, {1, 3, 1, –7, 1, –5}, {1, 3, 1, –7, 3, –5}, {1, 3, 1, –7, –1, –7}, {1, 3, 1, –5, 1, –7}, {1, 3, 1, –5, 3, –7}, {1, 3, 5, –7, 3, 7}, {1, 3, 5, –1, 3, 7}, {1, 3, 5, –1, 3, –3}, {1, 3, 5, –1, –5, 7}, {1, 3, 7, 1, 5, 7}, {1, 3, 7, –7, 3, 7}, {1, 3, 7, –5, 5, 7}, {1, 5, 1, 1, 5, –7}, {1, 5, 1, 1, 5, –3}, {1, 5, 1, 5, 5, –7}, {1, 5, 1, 5, 5, –3}, {1, 5, 1, 5, –7, 1}, {1, 5, 1, 5, –7, –7}, {1, 5, 1, 5, –3, 1}, {1, 5, 1, 5, –3, –3}, {1, 5, 1, 5, –1, 3}, {1, 5, 1, 7, –3, –5}, {1, 5, 1, –7, 1, –3}, {1, 5, 1, –7, –3, 5}, {1, 5, 1, –5, 5, 7}, {1, 5, 1, –5, –3, 7}, {1, 5, 1, –3, 1, –7}, {1, 5, 1, –3, 5, –7}, {1, 5, 1, –3, 7, –7}, {1, 5, 1, –3, 7, –5}, {1, 5, 1, –3, –5, –1}, {1, 5, 3, 1, 5, –7}, {1, 5, 3, 1, 5, –3}, {1, 5, 3, 7, –3, –5}, {1, 5, 3, 7, –1, 3}, {1, 5, 3, –7, –3, 7}, {1, 5, 3, –3, 7, –5}, {1, 5, 3, –1, –5, –3}, {1, 5, 5, –1, 3, 7}, {1, 5, 5, –1, 3, –3}, {1, 5, 7, 1, 3, –3}, {1, 5, –7, –3, 7, 7}, {1, 7, 1, 1, 3, –5}, {1, 7, 1, 1, –7, –5}, {1, 7, 1, 1, –1, –7}, {1, 7, 1, 3, –7, –7}, {1, 7, 1, 3, –5, –7}, {1, 7, 1, 3, –5, –5}, {1, 7, 1, 3, –1, –5}, {1, 7, 1, 5, –1, –3}, {1, 7, 1, 7, –7, –7}, {1, 7, 1, 7, –1, –1}, {1, 7, 1, –7, 1, –1}, {1, 7, 1, –7, –5, –5}, {1, 7, 1, –7, –1, 1}, {1, 7, 1, –7, –1, –1}, {1, 7, 1, –5, –7, 1}, {1, 7, 1, –5, –7, –3}, {1, 7, 1, –5, –5, 3}, {1, 7, 1, –5, –1, 3}, {1, 7, 1, –5, –1, –3}, {1, 7, 1, –3, –7, –5}, {1, 7, 1, –3, –7, –1}, {1, 7, 1, –3, –1, 5}, {1, 7, 1, –1, 1, –7}, {1, 7, 1, –1, 7, –7}, {1, 7, 1, –1, –7, –3}, {1, 7, 3, 1, 7, –5}, {1, 7, 3, 1, 7, –3}, {1, 7, 3, 5, –1, –5}, {1, 7, 3, –7, 7, –3}, {1, 7, 3, –7, –3, 3}, {1, 7, 3, –7, –1, –3}, {1, 7, 3, –3, –7, –5}, {1, 7, 3, –3, –7, –1}, {1, 7, 3, –3, –1, –5}, {1, 7, 3, –1, –7, –5}, {1, 7, 5, –1, 3, –3}, {1, 7, 5, –1, –7, –7}, {1, 7, 5, –1, –7, –3}, {1, –7, 1, 3, –3, 3}, {1, –7, 1, –7, 1, 1}, {1, –7, 3, 1, 7, –1}, {1, –7, 3, 1, –7, –5}, {1, –7, 3, 1, –7, –1}, {1, –7, 3, 3, –3, –5}, {1, –7, 3, 5, –3, –5}, {1, –7, 3, –5, –7, –1}, {1, –7, 3, –5, –3, 3}, {1, –7, 3, –3, –3, 3}, {1, –7, 5, 1, –7, –3}, {1, –5, 1, 1, 3, –7}, {1, –5, 1, 1, –7, 7}, {1, –5, 1, 3, 3, –7}, {1, –5, 1, 3, –7, 5}, {1, –5, 1, 5, 3, 7}, {1, –5, 1, 5, 3, –3}, {1, –5, 1, 5, –7, 3}, {1, –5, 1, 5, –7, 7}, {1, –5, 1, 7, 3, –1}, {1, –5, 1, 7, 5, –1}, {1, –5, 1, 7, 7, –7}, {1, –5, 1, 7, 7, –1}, {1, –5, 1, 7, –7, 1}, {1, –5, 1, 7, –7, 5}, {1, –5, 1, 7, –1, 1}, {1, –5, 1, –7, 3, 1}, {1, –5, 1, –7, 7, –7}, {1, –5, 1, –7, 7, –1}, {1, –5, 1, –7, –7, –1}, {1, –5, 1, –7, –5, 3}, {1, –5, 1, –3, 3, 5}, {1, –5, 1, –1, 3, 7}, {1, –5, 1, –1, 7, 7}, {1, –5, 3, 1, 7, 7}, {1, –5, 3, 5, –5, 3}, {1, –5, 3, 5, –3, 3}, {1, –5, 3, –7, 7, 1}, {1, –5, 3, –7, 7, –1}, {1, –5, 3, –7, –5, 3}, {1, –5, 5, 1, 3, 7}, {1, –5, 5, 1, –5, –3}, {1, –5, 5, 3, –7, 1}, {1, –5, 5, 3, –7, –3}, {1, –5, 5, 7, 3, –3}, {1, –5, 5, –7, –5, 5}, {1, –5, 5, –1, 3, 5}, {1, –5, 7, 1, 3, –3}, {1, –5, 7, 1, 3, –1}, {1, –5, 7, 1, 5, –1}, {1, –5, –7, 3, 3, –3}, {1, –5, –7, 3, 7, 1}, {1, –5, –7, 3, 7, –3}, {1, –3, 1, 5, –3, 1}, {1, –3, 1, 7, 5, –5}, {1, –3, 1, 7, –5, 5}, {1, –3, 1, –7, –5, 5}, {1, –3, 1, –7, –3, 1}, {1, –3, 1, –7, –3, 5}, {1, –3, 1, –5, –3, 7}, {1, –3, 3, 7, –3, 3}, {1, –3, 3, –7, –5, 5}, {1, –3, 3, –7, –5, 7}, {1, –3, 3, –7, –3, 3}, {1, –1, 1, 7, –1, –7}, {1, –1, 1, –7, 3, –5}, {1, –1, 1, –7, –1, 7}, {1, –1, 3, –7, –3, 7}, {1, –1, 3, –3, 7, –5}, and {1, –1, 5, –7, 3, 7};

{1, 1, 5, −5, 3, −3}, {1, 1, 7, −5, 7, −1}, {1, 1, 7, −1, 3, −1}, {1, 1, −5, 3, −1, 3}, {1, 1, −5, 7, −5, 3}, {1, 1, −3, 7, −1, 5}, {1, 3, 7, −5, 3, −3}, {1, 3, −1, −7, 1, 5}, {1, 5, 1, −7, 3, 3}, {1, 5, 1, −5, −5, 1}, {1, 5, 3, −1, −5, 3}, {1, 5, 5, 1, −5, 3}, {1, 5, 7, 3, −3, 5}, {1, 5, −7, 1, −5, 7}, {1, 5, −7, −5, 7, 1}, {1, 5, −5, 3, −3, −7}, {1, 5, −5, 3, −1, −5}, {1, 5, −5, −5, 5, −3}, {1, 5, −3, 3, 3, −3}, {1, 5, −3, 7, 3, 5}, {1, 7, 7, 1, −7, 5}, {1, 7, 7, 1, −3, 1}, {1, 7, −5, 7, −1, −7}, {1, 7, −5, −7, 5, 1}, {1, 7, −5, −5, 7, 1}, {1, 7, −1, 3, −1, −7}, {1, 7, −1, −7, 5, 5}, {1, 7, −1, −5, 7, 5}, {1, −7, 3, 3, −7, −3}, {1, −7, 3, −1, 1, 5}, {1, −7, 5, 1, −1, 3}, {1, −7, 5, −7, −1, −1}, {1, −7, −3, 1, 3, −1}, {1, −7, −3, −7, 3, 3}, {1, −7, −1, 3, 3, −1}, {1, −7, −1, −1, −7, 5}, {1, −5, 3, 7, −5, −3}, {1, −5, 3, −1, 3, −7}, {1, −5, 7, 7, −5, 1}, {1, −5, 7, −7, −3, 1}, {1, −5, 7, −5, 3, −7}, {1, −5, −5, 1, 5, 1}, {1, −5, −5, 1, −7, −3}, {1, −3, 1, 7, 7, 1}, {1, −3, 1, −7, −1, −1}, {1, −3, 5, −5, −1, −3}, {1, −3, 5, −1, −1, 5}, {1, −3, 7, 7, −3, 5}, {1, −3, 7, −1, 3, 7}, {1, −3, 7, −1, 5, −7}, {1, −3, −7, 1, 7, −5}, {1, −3, −7, 7, −5, 1}, {1, −3, −3, 1, 7, −1}, {1, −3, −1, 3, 7, −1}, {1, −1, 3, −7, 1, −3}, and {1, −1, −5, 7, −1, 5};

{1, 3, 7, −5, 1, −3}, {1, 3, −7, 5, 1, 5}, {1, 3, −7, −3, 1, −3}, {1, 3, −1, −5, 1, 5}, {1, 5, 1, −3, 3, 5}, {1, 5, 1, −3, 7, 5}, {1, 5, 1, −3, −5, 5}, {1, 5, 1, −3, −1, 5}, {1, 5, 3, −3, −7, 5}, {1, 5, 7, 3, −1, 5}, {1, 5, 7, −3, −7, 5}, {1, 5, −7, 3, 1, −3}, {1, 5, −7, 5, 1, 7}, {1, 5, −7, 7, 3, −1}, {1, 5, −7, −5, 1, −3}, {1, 5, −7, −1, 1, −3}, {1, 5, −5, 7, 3, 5}, {1, 5, −5, −3, −7, 5}, {1, 5, −1, −5, 7, 5}, {1, 5, −1, −3, −7, 5}, {1, 7, 3, −1, 3, 7}, {1, 7, −7, 5, 1, 5}, {1, 7, −7, −3, 1, −3}, {1, 7, −5, −1, 1, −3}, {1, −5, 7, 3, 1, 5}, {1, −5, −7, 5, 1, 5}, {1, −3, 1, 5, 7, −3}, {1, −3, 1, 5, −5, −3}, {1, −3, 3, 5, −7, −3}, {1, −3, −7, 3, 1, 5}, {1, −3, −7, 7, 1, 5}, {1, −3, −7, −5, 1, 5}, {1, −3, −7, −3, 1, −1}, {1, −3, −7, −1, 1, 5}, {1, −3, −5, 5, −7, −3}, {1, −3, −1, 3, 7, −3}, {1, −3, −1, 5, −7, −3}, {1, −1, 3, 7, 3, −1}, {1, −1, −7, 5, 1, 5}, and {1, −1, −5, 7, 1, 5};

{1, 3, −3, 1, 3, −3}, {1, 3, −3, 1, −5, −1}, {1, 3, −3, −7, 3, 7}, {1, 3, −3, −7, −5, 5}, {1, 3, −3, −1, 3, −3}, {1, 5, −1, −7, 3, 7}, {1, 7, 3, 1, 5, −1}, {1, 7, 3, 1, 7, 5}, {1, 7, 3, 1, −5, −1}, {1, 7, 3, 1, −3, 3}, {1, 7, 3, 5, −7, 3}, {1, 7, 3, 5, −1, 3}, {1, 7, 3, 7, 1, 3}, {1, 7, 3, −7, 3, 7}, {1, 7, 3, −7, 5, −5}, {1, 7, 3, −7, 7, −3}, {1, 7, 3, −7, −3, 7}, {1, 7, 3, −7, −1, −3}, {1, 7, 3, −3, 1, −5}, {1, 7, 3, −3, 7, −5}, {1, 7, 3, −1, −7, −5}, {1, 7, 5, 1, 7, 5}, {1, 7, 5, −7, −1, −3}, {1, 7, 5, −1, −7, −3}, {1, −5, −3, 1, −5, −3}, {1, −5, −3, 7, −5, 5}, {1, −5, −3, −7, 3, 5}, {1, −5, −3, −7, 3, 7}, {1, −5, −3, −1, 3, −3}, {1, −3, 3, 1, 3, −3}, {1, −3, 3, 1, 5, −1}, {1, −3, 3, 1, −5, −1}, {1, −3, 3, 5, −7, 3}, {1, −3, 3, 5, −1, 3}, {1, −3, 3, 7, −3, −5}, {1, −3, 3, −7, 3, 7}, {1, −3, 3, −7, −5, 5}, {1, −3, 3, −7, −3, 7}, {1, −3, 3, −3, 7, −5}, {1, −3, 3, −1, 5, 3}, {1, −1, 5, 1, −1, 5}, {1, −1, 5, −7, 7, −3}, and {1, −1, 5, −7, −3, 7};

{1, 1, 3, 5, −3, 7}, {1, 1, 3, −7, −1, 7}, {1, 1, 3, −5, 5, −1}, {1, 1, 3, −3, 7, −1}, {1, 1, 5, 7, −5, 5}, {1, 3, 1, −7, 3, −5}, {1, 3, 1, −5, 3, −5}, {1, 3, 1, −5, 5, −3}, {1, 3, 1, −5, 5, −1}, {1, 3, 3, −3, 5, −5}, {1, 3, 3, −3, 7, −1}, {1, 3, 5, 1, −5, 5}, {1, 3, 5, 1, −5, 7}, {1, 3, 5, 7, 3, −3}, {1, 3, 5, −7, −3, 7}, {1, 3, 5, −1, −7, 7}, {1, 3, 5, −1, −7, −3}, {1, 3, 5, −1, −3, 7}, {1, 5, 1, 3, −5, −7}, {1, 5, 1, 5, 5, −3}, {1, 5, 1, 5, −7, 1}, {1, 5, 1, 5, −7, −7}, {1, 5, 1, 5, −3, −3}, {1, 5, 1, 7, 3, −3}, {1, 5, 1, 7, 5, −5}, {1, 5, 1, 7, 5, −3}, {1, 5, 1, −7, 5, −3}, {1, 5, 1, −7, 7, −5}, {1, 5, 1, −3, 3, −3}, {1, 5, 1, −3, 5, −3}, {1, 5, 3, −5, 5, 7}, {1, 5, 3, −3, 7, 7}, {1, 5, 3, −3, 7, −5}, {1, 5, 3, −3, −3, 7}, {1, 5, 3, −1, 7, −5}, {1, 5, 3, −1, −7, −3}, {1, 5, 5, 1, −5, −1}, {1, 7, 1, 3, −7, 7}, {1, 7, 1, 3, −7, −7}, {1, 7, 1, 3, −5, −7}, {1, 7, 1, 3, −3, 3}, {1, 7, 1, 5, −7, 7}, {1, 7, 1, 7, 7, −1}, {1, 7, 1, 7, −7, 1}, {1, 7, 1, −7, −7, −5}, {1, 7, 1, −7, −5, 3}, {1, 7, 1, −5, −7, −3}, {1, 7, 1, −3, 3, 5}, {1, 7, 1, −3, 3, −1}, {1, 7, 1, −1, 3, 7}, {1, 7, 1, −1, 5, 7}, {1, 7, 3, 5, −3, 3}, {1, −7, 1, 1, 5, 7}, {1, −7, 1, 1, 7, 7}, {1, −7, 1, 3, 7, 7}, {1, −7, 1, 3, −7, 7}, {1, −7, 1, 3, −3, −5}, {1, −7, 1, 5, 7, 7}, {1, −7, 1, 7, 5, −1}, {1, −7, 1, −5, −7, −5}, {1, −7, 1, −5, −7, −1}, {1, −7, 1, −5, −5, 1}, {1, −7, 1, −5, −5, −3}, {1, −7, 1, −5, −5, −1}, {1, −7, 1, −5, −3, 1}, {1, −7, 1, −5, −3, 3}, {1, −7, 1, −3, −7, −3}, {1, −7, 1, −1, 5, 7}, {1, −7, 3, 3, −7, −5}, {1, −7, 3, 3, −5, −5}, {1, −7, 3, 5, −5, −5}, {1, −7, 3, 5, −3, 3}, {1, −7, 3, 5, −3, −5}, {1, −7, 3, 5, −3, −1}, {1, −7, 3, 7, 7, −1}, {1, −7, 3, −5, −3, −1}, {1, −7, 3, −1, −5, −3}, {1, −5, 1, 3, 5, 7}, {1, −5, 1, 3, −1, 5}, {1, −5, 1, 5, −7, 7}, {1, −5, 1, 7, −7, −7}, {1, −5, 1, −7, 7, −1}, {1, −5, 1, −7, −7, −1}, {1, −5, 1, −3, −7, −3}, {1, −5, 1, −3, −1, 5}, {1, −5, 1, −1, 7, −7}, {1, −5, 3, 1, 5, −1}, {1, −5, 3, 1, 7, −1}, {1, −5, 3, 5, 7, −1}, {1, −5, 3, 5, −3, −3}, {1, −5, 3, 7, −7, 5}, {1, −5, 3, −7, 7, −1}, {1, −5, 3, −7, −7, 1}, {1, −5, 3, −7, −7, −1}, {1, −5, 3, −7, −5, 1}, {1, −5, 5, 1, 3, 7}, {1, −5, 5, 1, −5, −3}, {1, −5, 5, 7, −5, −3}, {1, −5, 5, −7, −5, 5}, {1, −5, 5, −7, −5, −1}, {1, −5, 5, −1, 3, 5}, {1, −3, 1, 5, −3, −7}, {1, −3, 1, 5, −3, −5}, {1, −3, 1, 7, −5, −7}, {1, −3, 1, 7, −3, −5}, {1, −3, 1, −7, 7, −1}, {1, −3, 3, 1, 7, −1}, {1, −1, 1, 3, −3, 7}, {1, −1, 1, 5, −3, 7}, {1, −1, 1, 7, −1, −7}, {1, −1, 3, 7, −5, 5}, {1, −1, 3, −7, −3, 5}, {1, −1, 3, −7, −3, 7}, {1, −1, 3, −3, 7, 7}, and {1, −1, 3, −3, −3, 7};

{1, 1, 3, 5, −3, 7}, {1, 1, 3, −7, −1, 7}, {1, 1, 3, −5, 5, −1}, {1, 1, 3, −3, 7, −1}, {1, 1, 5, 7, −5, 5}, {1, 3, 1, −7, 3, −5}, {1, 3, 1, −5, 3, −5}, {1, 3, 1, −5, 5, −3}, {1, 3, 1, −5, 5, −1}, {1, 3, 3, −3, 5, −5}, {1, 3, 3, −3, 7, −1}, {1, 3, 5, 1, −5, 5}, {1, 3, 5, 1, −5, 7}, {1, 3, 5, 7, 3, −3}, {1, 3, 5, −7, −3, 7}, {1, 3, 5, −1, −7, 7}, {1, 3, 5, −1, −7, −3}, {1, 3, 5, −1, −3, 7}, {1, 5, 1, 3, −5, −7}, {1, 5, 1, 5, 5, −3}, {1, 5, 1, 5, −7, 1}, {1, 5, 1, 5, −7, −7}, {1, 5, 1, 5, −3, −3}, {1, 5, 1, 7, 3, −3}, {1, 5, 1, 7, 5, −5}, {1, 5, 1, 7, 5, −3}, {1, 5, 1, −7, 5, −3}, {1, 5, 1, −7, 7, −5}, {1, 5, 1, −3, 3, −3}, {1, 5, 1, −3, 5, −3}, {1, 5, 3, −5, 5, 7}, {1, 5, 3, −3, 7, 7}, {1, 5, 3, −3, 7, −5}, {1, 5, 3, −3, −3, 7}, {1, 5, 3, −1, 7, −5}, {1, 5, 3, −1, −7, −3}, {1, 5, 5, 1, −5, −1}, {1, 7, 1, 3, −7, 7}, {1, 7, 1, 3, −7, −7}, {1, 7, 1, 3, −5, −7}, {1, 7, 1, 3, −3, 3}, {1, 7, 1, 5, −7, 7}, {1, 7, 1, 7, 7, −1}, {1, 7, 1, 7, −7, 1}, {1, 7, 1, −7, −7, −5}, {1, 7, 1, −7, −5, 3}, {1, 7, 1, −5, −7, −3}, {1, 7, 1, −3, 3, 5}, {1, 7, 1, −3, 3, −1}, {1, 7, 1, −1, 3, 7}, {1, 7, 1, −1, 5, 7}, {1, 7, 3, 5, −3, 3}, {1, −7, 1, 1, 5, 7}, {1, −7, 1, 1, 7, 7}, {1, −7, 1, 3, 7, 7}, {1, −7, 1, 3, −7, 7}, {1, −7, 1, 3, −3, −5}, {1, −7, 1, 5, 7, 7}, {1, −7, 1, 7, 5, −1}, {1, −7, 1, −5, −7, −5}, {1, −7, 1, −5, −7, −1}, {1, −7, 1, −5, −5, 1}, {1, −7, 1, −5, −5, −3}, {1, −7, 1, −5, −5, −1}, {1, −7, 1, −5, −3, 1}, {1, −7, 1, −5, −3, 3}, {1, −7, 1, −3, −7, −3}, {1, −7, 1, −1, 5, 7}, {1, −7, 3, 3, −7, −5}, {1, −7, 3, 3, −5, −5}, {1, −7, 3, 5, −5, −5}, {1, −7, 3, 5, −3, 3}, {1, −7, 3, 5, −3, −5}, {1, −7, 3, 5, −3, −1}, {1, −7, 3, 7, 7, −1}, {1, −7, 3, −5, −3, −1}, {1, −7, 3, −1, −5, −3}, {1, −5, 1, 3, 5, 7}, {1, −5, 1, 3, −1, 5}, {1, −5, 1, 5, −7, 7}, {1, −5, 1, 7, −7, −7}, {1, −5, 1, −7, 7, −1}, {1, −5, 1, −7, −7, −1}, {1, −5, 1, −3, −7, −3}, {1, −5, 1, −3, −1, 5}, {1, −5, 1, −1, 7, −7}, {1, −5, 3, 1, 5, −1}, {1, −5, 3, 1, 7, −1}, {1, −5, 3, 5, 7, −1}, {1, −5, 3, 5, −3, −3}, {1, −5, 3, 7, −7, 5}, {1, −5, 3, −7, 7, −1}, {1, −5, 3, −7, −7, 1}, {1, −5, 3, −7, −7, −1}, {1, −5, 3, −7, −5, 1}, {1, −5, 5, 1, 3, 7}, {1, −5, 5, 1, −5, −3}, {1, −5, 5, 7, −5, −3}, {1, −5, 5, −7, −5, 5}, {1, −5, 5, −7, −5, −1}, {1, −5, 5, −1, 3, 5}, {1, −3, 1, 5, −3, −7}, {1, −3, 1, 5, −3, −5}, {1, −3, 1, 7, −5, −7}, {1, −3, 1, 7, −3, −5}, {1, −3, 1, −7, 7, −1}, {1, −3, 3, 1, 7, −1}, {1, −1, 1, 3, −3, 7}, {1, −1, 1, 5, −3, 7}, {1, −1, 1, 7, −1, −7}, {1, −1, 3, 7, −5, 5}, {1, −1, 3, −7, −3, 5}, {1, −1, 3, −7, −3, 7}, {1, −1, 3, −3, 7, 7}, and {1, −1, 3, −3, −3, 7}; or {1, 1, −7, 5, −1, 1}, {1, 1, −7, 7, −3, 1}, {1, 1, −7, −5, 5, 1}, {1, 1, −7, −3, 3, 1}, {1, 1, −7, −3, −5, 1}, {1, 1, −7, −1, −3, 1}, {1, 3, 7, 1, 5, 1}, {1, 3, −5, 3, 5, 1}, {1, 3, −5, 3, 5, −3}, {1, 3, −5, 7, −7, 1}, {1, 3, −5, 7, −5, 5}, {1, 3, −5, 7, −1, 1}, {1, 3, −5, −5, 3, −1}, {1, 3, −5, −3, 5, 1}, {1, 3, −3, 1, −5, −1}, {1, 3, −3, −7, 1, 1}, {1, 3, −1, 7, −7, 1}, {1, 5, 1, −7, −5, −1}, {1, 5, 3, −7, 1, 1}, {1, 5, 7, −1, −5, −1}, {1, 5, −5, −7, 1, 1}, {1, 5, −3, −5, 3, 1}, {1, 5, −1, 3, 5, −3}, {1, 5, −1, 3, −3, −1}, {1, 5, −1, 3, −1, 7}, {1, 7, 5, −7, 1, 1}, {1, 7, 5, −3, −3, 5}, {1, 7, −5, 3, 3, −5}, {1, −7, 1, 3, −5, 7}, {1, −7, 1, 3, −1, 7}, {1, −7, 5, 7, −1, 7}, {1, −7, 5, −7, 3, 7}, {1, −7, 5, −3, −1, 7}, {1, −7, 5, −1, 1, −7}, {1, −7, 7, −3, 1, −7}, {1, −7, 7, −1, 3, −5}, {1, −7, 7, −1, −3, 5}, {1, −7, −7, 1, 3, −3}, {1, −7, −7, 1, 5, −5}, {1, −7, −7, 1, 7, 5}, {1, −7, −7, 1, −3, 7}, {1, −7, −7, 1, −1, 5}, {1, −7, −5, 3, 5, −3}, {1, −7, −5, 3, −5, −3}, {1, −7, −5, 3, −1, 1}, {1, −7, −5, 3, −1, 7}, {1, −7, −5, 5, 1, −7}, {1, −7, −5, 7, −1, 1}, {1, −7, −5, −1, −7, −3}, {1, −7, −3, 3, 1, −7}, {1, −7, −3, 5, 3, −5}, {1, −7, −3, −5, 1, −7}, {1, −7, −1, −3, 1, −7}, {1, −5, 7, −1, −1, 7}, {1, −5, −3, 5, 5, −3}, {1, −5, −3, 7, −5, 5}, {1, −5, −1, −7, −5, 5}, {1, −5, −1, −7, −3, 7}, {1, −5, −1, −5, 3, 5}, {1, −3, 1, −5, −1, 1}, {1, −3, 5, 5, −3, −1}, {1, −3, 5, 7, −1, 1}, {1, −3, 5, 7, −1, 7}, {1, −3, 7, −7, 1, 1}, {1, −3, −1, 7, −1, 1}, {1, −1, 3, −5, −5, 3}, {1, −1, 5, −7, 1, 1}, {1, −1, 5, −3, −3, 5}, {1, −1, 7, 5, −3, 1}, {1, −1, 7, 7, −1, 3}, and {1, −1, 7, −5, 3, 1};

generating a first signal based on the sequence $\{x_n\}$; and sending the first signal.

In an embodiment, the set of the sequence $\{s_n\}$ includes at least one of sequences in a second sequence set, and the second sequence set includes some of the sequences in the first sequence set.

In an embodiment, the generating a first signal based on the sequence $\{x_n\}$ includes:

performing discrete Fourier transform on N elements in the sequence $\{x_n\}$ to obtain a sequence $\{f_n\}$ including N elements;

mapping the N elements in the sequence $\{f_n\}$ to N subcarriers respectively to obtain a frequency-domain signal including the N elements; and generating the first signal based on the frequency-domain signal.

In an embodiment, the N subcarriers are N consecutive subcarriers, or N equi-spaced subcarriers.

In an embodiment, before the performing discrete Fourier transform on N elements in the sequence $\{x_n\}$, the first signal processing method further includes: filtering the sequence $\{x_n\}$; or after the performing discrete Fourier transform on N elements in the sequence $\{x_n\}$, the first signal processing method further includes: filtering the sequence $\{x_n\}$.

In an embodiment, the first signal is a reference signal of a second signal, and a modulation scheme of the second signal is π/2 binary phase shift keying BPSK.

The following describes another embodiment of the present disclosure. The embodiment relates to a sequence-based signal processing apparatus, including:

a determining unit, configured to determine a sequence $\{x_n\}$, where $x_n$ is an element in the sequence $\{x_n\}$, the sequence $\{x_n\}$ is a sequence satisfying a preset condition, and the preset condition is:

the preset condition is $x_n = y_{(n+M) \bmod K}$, where $$y_n = A \cdot e^{\frac{j \times \pi \times s_n}{8}},$$

$M \in \{0, 1, 2, \ldots, 5\}$, K=6, A is a non-zero complex number, $j=\sqrt{-1}$, and a set of sequence $\{s_n\}$ including an element $s_n$ includes at least one of sequences in a first sequence set; and the sequences included in the first sequence set include:

{1, 1, 3, −7, 5, −3}, {1, 1, 5, −7, 3, 5}, {1, 1, 5, −5, −3, 7}, {1, 1, −7, −5, 5, −7}, {1, 1, −7, −3, 7, −7}, {1, 3, 1, 7, −1, −5}, {1, 3, 1, −7, −3, 7}, {1, 3, 1, −7, −1, −5}, {1, 3, 3, 7, −1, −5}, {1, 5, 1, 1, −5, −3}, {1, 5, 1, 3, −5, 5}, {1, 5, 1, 3, −5, −7}, {1, 5, 1, 3, −3, 1}, {1, 5, 1, 3, −1, −7}, {1, 5, 1, 5, 3, −7}, {1, 5, 1, 5, 3, −5}, {1, 5, 1, 5, 7, 7}, {1, 5, 1, 5, −5, 3}, {1, 5, 1, 5, −3, 3}, {1, 5, 1, 5, −1, 3}, {1, 5, 1, 5, −1, −1}, {1, 5, 1, 7, 3, −3}, {1, 5, 1, 7, −5, 5}, {1, 5, 1, −5, 3, 5}, {1, 5, 1, −5, −7, −1}, {1, 5, 1, −5, −5, −3}, {1, 5, 1, −5, −3, 1}, {1, 5, 1, −5, −1, 1}, {1, 5, 1, −5, −1, 5}, {1, 5, 1, −5, −1, −1}, {1, 5, 1, −3, 1, 7}, {1, 5, 1, −3, 1, −5}, {1, 5, 1, −3, 7, −7}, {1, 5, 1, −3, 7, −5}, {1, 5, 1, −3, −5, −1}, {1, 5, 1, −1, 3, −5}, {1, 5, 1, −1, 5, −7}, {1, 5, 1, −1, −7, −3}, {1, 5, 1, −1, −5, −3}, {1, 5, 3, −3, −7, −5}, {1, 5, 3, −3, −7, −1}, {1, 5, 3, −3, −1, −7}, {1, 5, 3, −1, 5, −7}, {1, 5, 3, −1, −5, −3}, {1, 5, 5, 1, 3, −3}, {1, 5, 5, −1, −7, −5}, {1, 7, 1, 1, 1, −5}, {1, 7, 1, 1, −7, −7}, {1, 7, 1, 1, −5, −5}, {1, 7, 1, 3, −7, 7}, {1, 7, 1, 3, −3, 3}, {1, 7, 1, −7, 1, 1}, {1, 7, 1, −7, −7, −7}, {1, 7, 1, −5, 1, 1}, {1, 7, 1, −5, −5, 1}, {1, 7, 1, −5, −3, 1}, {1, 7, 1, −5, −1, 1}, {1, 7, 1, −5, −1, −1}, {1, 7, 1, −1, 5, 7}, {1, 7, 3, 1, 5, −3}, {1, 7, 3, 1, −5, −5}, {1, 7, 3, 5, −5, −7}, {1, 7, 3, −7, 7, −1}, {1, 7, 3, −7, −5, 3}, {1, 7, 3, −5, −7, −1}, {1, 7, 3, −3, −5, 1}, {1, 7, 3, −3, −5, −1}, {1, 7, 3, −3, −3, −3}, {1, 7, 3, −1, −5, −3}, {1, 7, 5, 1, −5, −5}, {1, 7, 5, 1, −5, −3}, {1, 7, 5, −5, 3, −1}, {1, 7, 5, −5, −3, −7}, {1, 7, 5, −3, −7, 1}, {1, 7, 5, −1, −5, −5}, {1, 7, 5, −1, −5, −3}, {1, −7, 1, −5, 1, 1}, {1, −7, 3, 3, −5, −5}, {1, −7, 3, 5, −1, −3}, {1, −7, 3, −5, 1, 1}, {1, −7, 3, −5, −5, 1}, {1, −7, 3, −5, −5, −5}, {1, −7, 5, −3, −5, 1}, {1, −5, 1, 1, 3, 7}, {1, −5, 1, 1, 5, 7}, {1, −5, 1, 1, 7, 7}, {1, −5, 1, 3, 3, 7}, {1, −5, 1, 7, 5, −1}, {1, −5, 1, 7, 7, 1}, {1, −5, 1, −7, −7, 1}, {1, −5, 1, −7, −7, −7}, {1, −5, 3, −7, −7, 1}, {1, −5, 5, 3, −5, −3}, {1, −5, 5, 3, −5, −1}, {1, −5, 5, 5, −5, −3}, {1, −5, 5, 5, −5, −1}, {1, −5, 5, 7, −5, 1}, {1, −5, 5, 7, −5, 3}, {1, −5, 5, −7, −5, 1}, {1, −5, 5, −7, −5, 3}, {1, −5, 7, 3, 5, −3}, {1, −5, −7, 3, 5, −3}, {1, −5, −7, 3, 5, −1}, {1, −5, −7, 3, 7, −1}, {1, −3, 1, 1, 3, 7}, {1, −3, 1, 1, 5, 7}, {1, −3, 1, 1, 5, −1}, {1, −3, 1, 3, 3, 7}, {1, −3, 1, 3, −7, 7}, {1, −3, 1, 5, 7, 1}, {1, −3, 1, 5, 7, 3}, {1, −3, 1, 5, 7, 7}, {1, −3, 1, 5, −7, 3}, {1, −3, 1, 7, −5, 5}, {1, −3, 1, 7, −1, 3}, {1, −3, 1, −7, 3, −1}, {1, −3, 1, −7, 7, −1}, {1, −3, 1, −7, −5, 5}, {1, −3, 1, −7, −3, 3}, {1, −3, 1, −5, 7, −1}, {1, −3, 3, 3, −7, 7}, {1, −3, 3, 5, −5, −7}, {1, −3, 3, 7, 7, 7}, {1, −3, 3, 7, −7, 5}, {1, −3, 3, −7, −7, 3}, {1, −3, 3, −5, −7, −1}, {1, −3, 7, −5, 3, 5}, {1, −1, 1, 7, 3, −7}, {1, −1, 1, 7, 3, −5}, {1, −1, 1, −5, 5, −7}, {1, −1, 3, −7, −5, 7}, {1, −1, 5, −7, −5, 5}, {1, −1, 5, −7, −5, 7}, {1, −1, 5, −5, −5, 5}, and {1, −1, 5, −5, −5, 7};

{1, 1, 5, −7, 3, 7}, {1, 1, 5, −7, 3, −3}, {1, 1, 5, −1, 3, 7}, {1, 1, 5, −1, −7, −3}, {1, 3, 1, 7, −1, −7}, {1, 3, 1, −7, 1, −5}, {1, 3, 1, −7, 3, −5}, {1, 3, 1, −7, −1, −7}, {1, 3, 1, −5, 1, −7}, {1, 3, 1, −5, 3, −7}, {1, 3, 5, −7, 3, 7}, {1, 3, 5, −1, 3, 7}, {1, 3, 5, −1, 3, −3}, {1, 3, 5, −1, −5, 7}, {1, 3, 7, 1, 5, 7}, {1, 3, 7, −7, 3, 7}, {1, 3, 7, −5, 5, 7}, {1, 5, 1, 1, 5, −7}, {1, 5, 1, 1, 5, −3}, {1, 5, 1, 5, 5, −7}, {1, 5, 1, 5, 5, −3}, {1, 5, 1, 5, −7, 1}, {1, 5, 1, 5, −7, −7}, {1, 5, 1, 5, −3, 1}, {1, 5, 1, 5, −3, −3}, {1, 5, 1, 5, −1, 3}, {1, 5, 1, 7, −3, −5}, {1, 5, 1, −7, 1, −3}, {1, 5, 1, −7, −3, 5}, {1, 5, 1, −5, 5, 7}, {1, 5, 1, −5, −3, 7}, {1, 5, 1, −3, 1, −7}, {1, 5, 1, −3, 5, −7}, {1, 5, 1, −3, 7, −7}, {1, 5, 1, −3, 7, −5}, {1, 5, 1, −3, −5, −1}, {1, 5, 3, 1, 5, −7}, {1, 5, 3, 1, 5, −3}, {1, 5, 3, 7, −3, −5}, {1, 5, 3, 7, −1, 3}, {1, 5, 3, −7, −3, 7}, {1, 5, 3, −3, 7, −5}, {1, 5, 3, −1, −5, −3}, {1, 5, 5, −1, 3, 7}, {1, 5, 5, −1, 3, −3}, {1, 5, 7, 1, 3, −3}, {1, 5, −7, −3, 7, 7}, {1, 7, 1, 1, 3, −5}, {1, 7, 1, 1, −7, −5}, {1, 7, 1, 1, −1, −7}, {1, 7, 1, 3, −7, −7}, {1, 7, 1, 3, −5, −7}, {1, 7, 1, 3, −5, −5}, {1, 7, 1, 3, −1, −5}, {1, 7, 1, 5, −1, −3}, {1, 7, 1, 7, −7, −7}, {1, 7, 1, 7, −1, −1},

{1, 7, 1, −7, 1, −1}, {1, 7, 1, −7, −5, −5}, {1, 7, 1, −7, −1, 1}, {1, 7, 1, −7, −1, −1}, {1, 7, 1, −5, −7, 1}, {1, 7, 1, −5, −7, −3}, {1, 7, 1, −5, −5, 3}, {1, 7, 1, −5, −1, 3}, {1, 7, 1, −5, −1, −3}, {1, 7, 1, −3, −7, −5}, {1, 7, 1, −3, −7, −1}, {1, 7, 1, −3, −1, 5}, {1, 7, 1, −1, 1, −7}, {1, 7, 1, −1, 7, −7}, {1, 7, 1, −1, −7, −3}, {1, 7, 3, 1, 7, −5}, {1, 7, 3, 1, 7, −3}, {1, 7, 3, 5, −1, −5}, {1, 7, 3, −7, 7, −3}, {1, 7, 3, −7, −3, 3}, {1, 7, 3, −7, −1, −3}, {1, 7, 3, −3, −7, −5}, {1, 7, 3, −3, −7, −1}, {1, 7, 3, −3, −1, −5}, {1, 7, 3, −1, −7, −5}, {1, 7, 5, −1, 3, −3}, {1, 7, 5, −1, −7, −7}, {1, 7, 5, −1, −7, −3}, {1, −7, 1, 3, −3, 3}, {1, −7, 1, −7, 1, 1}, {1, −7, 3, 1, 7, −1}, {1, −7, 3, 1, −7, −5}, {1, −7, 3, 1, −7, −1}, {1, −7, 3, 3, −3, −5}, {1, −7, 3, 5, −3, −5}, {1, −7, 3, −5, −7, −1}, {1, −7, 3, −5, −3, 3}, {1, −7, 3, −3, −3, 3}, {1, −7, 5, 1, −7, −3}, {1, −5, 1, 1, 3, −7}, {1, −5, 1, 1, −7, 7}, {1, −5, 1, 3, 3, −7}, {1, −5, 1, 3, −7, 5}, {1, −5, 1, 5, 3, 7}, {1, −5, 1, 5, 3, −3}, {1, −5, 1, 5, −7, 3}, {1, −5, 1, 5, −7, 7}, {1, −5, 1, 7, 3, −1}, {1, −5, 1, 7, 5, −1}, {1, −5, 1, 7, 7, −7}, {1, −5, 1, 7, 7, −1}, {1, −5, 1, 7, −7, 1}, {1, −5, 1, 7, −7, 5}, {1, −5, 1, 7, −1, 1}, {1, −5, 1, −7, 3, 1}, {1, −5, 1, −7, 7, −7}, {1, −5, 1, −7, 7, −1}, {1, −5, 1, −7, −7, −1}, {1, −5, 1, −7, −5, 3}, {1, −5, 1, −3, 3, 5}, {1, −5, 1, −1, 3, 7}, {1, −5, 1, −1, 7, 7}, {1, −5, 3, 1, 7, 7}, {1, −5, 3, 5, −5, 3}, {1, −5, 3, 5, −3, 3}, {1, −5, 3, −7, 7, 1}, {1, −5, 3, −7, 7, −1}, {1, −5, 3, −7, −5, 3}, {1, −5, 5, 1, 3, 7}, {1, −5, 5, 1, −5, −3}, {1, −5, 5, 3, −7, 1}, {1, −5, 5, 3, −7, −3}, {1, −5, 5, 7, 3, −3}, {1, −5, 5, −7, −5, 5}, {1, −5, 5, −1, 3, 5}, {1, −5, 7, 1, 3, −3}, {1, −5, 7, 1, 3, −1}, {1, −5, 7, 1, 5, −1}, {1, −5, −7, 3, 3, −3}, {1, −5, −7, 3, 7, 1}, {1, −5, −7, 3, 7, −3}, {1, −3, 1, 5, −3, 1}, {1, −3, 1, 7, 5, −5}, {1, −3, 1, 7, −5, 5}, {1, −3, 1, −7, −5, 5}, {1, −3, 1, −7, −3, 1}, {1, −3, 1, −7, −3, 5}, {1, −3, 1, −5, −3, 7}, {1, −3, 3, 7, −3, 3}, {1, −3, 3, −7, −5, 5}, {1, −3, 3, −7, −5, 7}, {1, −3, 3, −7, −3, 3}, {1, −1, 1, 7, −1, −7}, {1, −1, 1, −7, 3, −5}, {1, −1, 1, −7, −1, 7}, {1, −1, 3, −7, −3, 7}, {1, −1, 3, −3, 7, −5}, and {1, −1, 5, −7, 3, 7};

{1, 1, 5, −5, 3, −3}, {1, 1, 7, −5, 7, −1}, {1, 1, 7, −1, 3, −1}, {1, 1, −5, 3, −1, 3}, {1, 1, −5, 7, −5, 3}, {1, 1, −3, 7, −1, 5}, {1, 3, 7, −5, 3, −3}, {1, 3, −1, −7, 1, 5}, {1, 5, 1, −7, 3, 3}, {1, 5, 1, −5, −5, 1}, {1, 5, 3, −1, −5, 3}, {1, 5, 5, 1, −5, 3}, {1, 5, 7, 3, −3, 5}, {1, 5, −7, 1, −5, 7}, {1, 5, −7, −5, 7, 1}, {1, 5, −5, 3, −3, −7}, {1, 5, −5, 3, −1, −5}, {1, 5, −5, −5, 5, −3}, {1, 5, −3, 3, 3, −3}, {1, 5, −3, 7, 3, 5}, {1, 7, 7, 1, −7, 5}, {1, 7, 7, 1, −3, 1}, {1, 7, −5, 7, −1, −7}, {1, 7, −5, −7, 5, 1}, {1, 7, −5, −5, 7, 1}, {1, 7, −1, 3, −1, −7}, {1, 7, −1, −7, 5, 5}, {1, 7, −1, −5, 7, 5}, {1, −7, 3, 3, −7, −3}, {1, −7, 3, −1, 1, 5}, {1, −7, 5, 1, −1, 3}, {1, −7, 5, −7, −1, −1}, {1, −7, −3, 1, 3, −1}, {1, −7, −3, −7, 3, 3}, {1, −7, −1, 3, 3, −1}, {1, −7, −1, −1, −7, 5}, {1, −5, 3, 7, −5, −3}, {1, −5, 3, −1, 3, −7}, {1, −5, 7, 7, −5, 1}, {1, −5, 7, −7, −3, 1}, {1, −5, 7, −5, 3, −7}, {1, −5, −5, 1, 5, 1}, {1, −5, −5, 1, −7, −3}, {1, −3, 1, 7, 7, 1}, {1, −3, 1, −7, −1, −1}, {1, −3, 5, −5, −1, −3}, {1, −3, 5, −1, −1, 5}, {1, −3, 7, 7, −3, 5}, {1, −3, 7, −1, 3, 7}, {1, −3, 7, −1, 5, −7}, {1, −3, −7, 1, 7, −5}, {1, −3, −7, 7, −5, 1}, {1, −3, −3, 1, 7, −1}, {1, −3, −1, 3, 7, −1}, {1, −1, 3, −7, 1, −3}, and {1, −1, −5, 7, −1, 5};

{1, 3, 7, −5, 1, −3}, {1, 3, −7, 5, 1, 5}, {1, 3, −7, −3, 1, −3}, {1, 3, −1, −5, 1, 5}, {1, 5, 1, −3, 3, 5}, {1, 5, 1, −3, 7, 5}, {1, 5, 1, −3, −5, 5}, {1, 5, 1, −3, −1, 5}, {1, 5, 3, −3, −7, 5}, {1, 5, 7, 3, −1, 5}, {1, 5, 7, −3, −7, 5}, {1, 5, −7, 3, 1, −3}, {1, 5, −7, 5, 1, 7}, {1, 5, −7, 7, 3, −1}, {1, 5, −7, −5, 1, −3}, {1, 5, −7, −1, 1, −3}, {1, 5, −5, 7, 3, 5}, {1, 5, −5, −3, −7, 5}, {1, 5, −1, −5, 7, 5}, {1, 5, −1, −3, −7, 5}, {1, 7, 3, −1, 3, 7}, {1, 7, −7, 5, 1, 5}, {1, 7, −7, −3, 1, −3}, {1, 7, −5, −1, 1, −3}, {1, −5, 7, 3, 1, 5}, {1, −5, −7, 5, 1, 5}, {1, −3, 1, 5, 7, −3}, {1, −3, 1, 5, −5, −3}, {1, −3, 3, 5, −7, −3}, {1, −3, −7, 3, 1, 5}, {1, −3, −7, 7, 1, 5}, {1, −3, −7, −5, 1, 5}, {1, −3, −7, −3, 1, −1}, {1, −3, −7, −1, 1, 5}, {1, −3, −5, 5, −7, −3}, {1, −3, −1, 3, 7, −3}, {1, −3, −1, 5, −7, −3}, {1, −1, 3, 7, 3, −1}, {1, −1, −7, 5, 1, 5}, and {1, −1, −5, 7, 1, 5};

{1, 3, −3, 1, 3, −3}, {1, 3, −3, 1, −5, −1}, {1, 3, −3, −7, 3, 7}, {1, 3, −3, −7, −5, 5}, {1, 3, −3, −1, 3, −3}, {1, 5, −1, −7, 3, 7}, {1, 7, 3, 1, 5, −1}, {1, 7, 3, 1, 7, 5}, {1, 7, 3, 1, −5, −1}, {1, 7, 3, 1, −3, 3}, {1, 7, 3, 5, −7, 3}, {1, 7, 3, 5, −1, 3}, {1, 7, 3, 7, 1, 3}, {1, 7, 3, −7, 3, 7}, {1, 7, 3, −7, 5, −5}, {1, 7, 3, −7, 7, −3}, {1, 7, 3, −7, −3, 7}, {1, 7, 3, −7, −1, −3}, {1, 7, 3, −3, 1, −5}, {1, 7, 3, −3, 7, −5}, {1, 7, 3, −1, −7, −5}, {1, 7, 5, 1, 7, 5}, {1, 7, 5, −7, −1, −3}, {1, 7, 5, −1, −7, −3}, {1, −5, −3, 1, −5, −3}, {1, −5, −3, 7, −5, 5}, {1, −5, −3, −7, 3, 5}, {1, −5, −3, −7, 3, 7}, {1, −5, −3, −1, 3, −3}, {1, −3, 3, 1, 3, −3}, {1, −3, 3, 1, 5, −1}, {1, −3, 3, 1, −5, −1}, {1, −3, 3, 5, −7, 3}, {1, −3, 3, 5, −1, 3}, {1, −3, 3, 7, −3, −5}, {1, −3, 3, −7, 3, 7}, {1, −3, 3, −7, −5, 5}, {1, −3, 3, −7, −3, 7}, {1, −3, 3, −3, 7, −5}, {1, −3, 3, −1, 5, 3}, {1, −1, 5, 1, −1, 5}, {1, −1, 5, −7, 7, −3}, and {1, −1, 5, −7, −3, 7};

{1, 1, 3, 5, −3, 7}, {1, 1, 3, −7, −1, 7}, {1, 1, 3, −5, 5, −1}, {1, 1, 3, −3, 7, −1}, {1, 1, 5, 7, −5, 5}, {1, 3, 1, −7, 3, −5}, {1, 3, 1, −5, 3, −5}, {1, 3, 1, −5, 5, −3}, {1, 3, 1, −5, 5, −1}, {1, 3, 3, −3, 5, −5}, {1, 3, 3, −3, 7, −1}, {1, 3, 5, 1, −5, 5}, {1, 3, 5, 1, −5, 7}, {1, 3, 5, 7, 3, −3}, {1, 3, 5, −7, −3, 7}, {1, 3, 5, −1, −7, 7}, {1, 3, 5, −1, −7, −3}, {1, 3, 5, −1, −3, 7}, {1, 5, 1, 3, −5, −7}, {1, 5, 1, 5, 5, −3}, {1, 5, 1, 5, −7, 1}, {1, 5, 1, 5, −7, −7}, {1, 5, 1, 5, −3, −3}, {1, 5, 1, 7, 3, −3}, {1, 5, 1, 7, 5, −5}, {1, 5, 1, 7, 5, −3}, {1, 5, 1, −7, 5, −3}, {1, 5, 1, −7, 7, −5}, {1, 5, 1, −3, 3, −3}, {1, 5, 1, −3, 5, −3}, {1, 5, 3, −5, 5, 7}, {1, 5, 3, −3, 7, 7}, {1, 5, 3, −3, 7, −5}, {1, 5, 3, −3, −3, 7}, {1, 5, 3, −1, 7, −5}, {1, 5, 3, −1, −7, −3}, {1, 5, 5, 1, −5, −1}, {1, 7, 1, 3, −7, 7}, {1, 7, 1, 3, −7, −7}, {1, 7, 1, 3, −5, −7}, {1, 7, 1, 3, −3, 3}, {1, 7, 1, 5, −7, 7}, {1, 7, 1, 7, 7, −1}, {1, 7, 1, 7, −7, 1}, {1, 7, 1, −7, −7, −5}, {1, 7, 1, −7, −5, 3}, {1, 7, 1, −5, −7, −3}, {1, 7, 1, −3, 3, 5}, {1, 7, 1, −3, 3, −1}, {1, 7, 1, −1, 3, 7}, {1, 7, 1, −1, 5, 7}, {1, 7, 3, 5, −3, 3}, {1, −7, 1, 1, 5, 7}, {1, −7, 1, 1, 7, 7}, {1, −7, 1, 3, 7, 7}, {1, −7, 1, 3, −7, 7}, {1, −7, 1, 3, −3, −5}, {1, −7, 1, 5, 7, 7}, {1, −7, 1, 7, 5, −1}, {1, −7, 1, −5, −7, −5}, {1, −7, 1, −5, −7, −1}, {1, −7, 1, −5, −5, 1}, {1, −7, 1, −5, −5, −3}, {1, −7, 1, −5, −5, −1}, {1, −7, 1, −5, −3, 1}, {1, −7, 1, −5, −3, 3}, {1, −7, 1, −3, −7, −3}, {1, −7, 1, −1, 5, 7}, {1, −7, 3, 3, −7, −5}, {1, −7, 3, 3, −5, −5}, {1, −7, 3, 5, −5, −5}, {1, −7, 3, 5, −3, 3}, {1, −7, 3, 5, −3, −5}, {1, −7, 3, 5, −3, −1}, {1, −7, 3, 7, 7, −1}, {1, −7, 3, −5, −3, −1}, {1, −7, 3, −1, −5, −3}, {1, −5, 1, 3, 5, 7}, {1, −5, 1, 3, −1, 5}, {1, −5, 1, 5, −7, 7}, {1, −5, 1, 7, −7, −7}, {1, −5, 1, −7, 7, −1}, {1, −5, 1, −7, −7, −1}, {1, −5, 1, −3, −7, −3}, {1, −5, 1, −3, −1, 5}, {1, −5, 1, −1, 7, −7}, {1, −5, 3, 1, 5, −1}, {1, −5, 3, 1, 7, −1}, {1, −5, 3, 5, 7, −1}, {1, −5, 3, 5, −3, −3}, {1, −5, 3, 7, −7, 5}, {1, −5, 3, −7, 7, −1}, {1, −5, 3, −7, −7, 1}, {1, −5, 3, −7, −7, −1}, {1, −5, 3, −7, −5, 1}, {1, −5, 5, 1, 3, 7}, {1, −5, 5, 1, −5, −3}, {1, −5, 5, 7, −5, −3}, {1, −5, 5, −7, −5, 5}, {1, −5, 5, −7, −5, −1}, {1, −5, 5, −1, 3, 5}, {1, −3, 1, 5, −3, −7}, {1, −3, 1, 5, −3, −5}, {1, −3, 1, 7, −5, −7}, {1, −3, 1, 7, −3, −5}, {1, −3, 1, −7, 7, −1}, {1, −3, 3, 1, 7, −1}, {1, −1, 1, 3, −3, 7}, {1, −1, 1, 5, −3, 7}, {1, −1, 1, 7, −1, −7}, {1, −1, 3, 7, −5, 5}, {1, −1, 3, −7, −3, 5}, {1, −1, 3, −7, −3, 7}, {1, −1, 3, −3, 7, 7}, and {1, −1, 3, −3, −3, 7};

{1, 1, 3, 5, −3, 7}, {1, 1, 3, −7, −1, 7}, {1, 1, 3, −5, 5, −1}, {1, 1, 3, −3, 7, −1}, {1, 1, 5, 7, −5, 5}, {1, 3, 1, −7, 3, −5}, {1, 3, 1, −5, 3, −5}, {1, 3, 1, −5, 5, −3}, {1, 3, 1, −5, 5, −1}, {1, 3, 3, −3, 5, −5}, {1, 3, 3, −3, 7, −1}, {1, 3, 5, 1, −5, 5}, {1, 3, 5, 1, −5, 7}, {1, 3, 5, 7, 3, −3}, {1, 3, 5, −7, −3, 7}, {1, 3, 5, −1, −7, 7}, {1, 3, 5, −1, −7, −3}, {1, 3, 5, −1, −3, 7}, {1, 5, 1, 3, −5, −7}, {1, 5, 1, 5, 5, −3}, {1, 5, 1, 5, −7, 1}, {1, 5, 1, 5, −7, −7}, {1, 5, 1, 5, −3, −3}, {1, 5, 1, 7, 3, −3}, {1, 5, 1, 7, 5, −5}, {1, 5, 1, 7, 5, −3}, {1, 5, 1, −7, 5,

−3}, {1, 5, 1, −7, 7, −5}, {1, 5, 1, −3, 3, −3}, {1, 5, 1, −3, 5, −3}, {1, 5, 3, −5, 5, 7}, {1, 5, 3, −3, 7, 7}, {1, 5, 3, −3, 7, −5}, {1, 5, 3, −3, −3, 7}, {1, 5, 3, −1, 7, −5}, {1, 5, 3, −1, −7, −3}, {1, 5, 5, 1, −5, −1}, {1, 7, 1, 3, −7, 7}, {1, 7, 1, 3, −7, −7}, {1, 7, 1, 3, −5, −7}, {1, 7, 1, 3, −3, 3}, {1, 7, 1, 5, −7, 7}, {1, 7, 1, 7, 7, −1}, {1, 7, 1, 7, −7, 1}, {1, 7, 1, −7, −7, −5}, {1, 7, 1, −7, −5, 3}, {1, 7, 1, −5, −7, −3}, {1, 7, 1, −3, 3, 5}, {1, 7, 1, −3, 3, −1}, {1, 7, 1, −1, 3, 7}, {1, 7, 1, −1, 5, 7}, {1, 7, 3, 5, −3, 3}, {1, −7, 1, 1, 5, 7}, {1, −7, 1, 1, 7, 7}, {1, −7, 1, 3, 7, 7}, {1, −7, 1, 3, −7, 7}, {1, −7, 1, 3, −3, −5}, {1, −7, 1, 5, 7, 7}, {1, −7, 1, 7, 5, −1}, {1, −7, 1, −5, −7, −5}, {1, −7, 1, −5, −7, −1}, {1, −7, 1, −5, −5, 1}, {1, −7, 1, −5, −5, −3}, {1, −7, 1, −5, −5, −1}, {1, −7, 1, −5, −3, 1}, {1, −7, 1, −5, −3, 3}, {1, −7, 1, −3, −7, −3}, {1, −7, 1, −1, 5, 7}, {1, −7, 3, 3, −7, −5}, {1, −7, 3, 3, −5, −5}, {1, −7, 3, 5, −5, −5}, {1, −7, 3, 5, −3, 3}, {1, −7, 3, 5, −3, −5}, {1, −7, 3, 5, −3, −1}, {1, −7, 3, 7, 7, −1}, {1, −7, 3, −5, −3, −1}, {1, −7, 3, −1, −5, −3}, {1, −5, 1, 3, 5, 7}, {1, −5, 1, 3, −1, 5}, {1, −5, 1, 5, −7, 7}, {1, −5, 1, 7, −7, −7}, {1, −5, 1, −7, 7, −1}, {1, −5, 1, −7, −7, −1}, {1, −5, 1, −3, −7, −3}, {1, −5, 1, −3, −1, 5}, {1, −5, 1, −1, 7, −7}, {1, −5, 3, 1, 5, −1}, {1, −5, 3, 1, 7, −1}, {1, −5, 3, 5, 7, −1}, {1, −5, 3, 5, −3, −3}, {1, −5, 3, 7, −7, 5}, {1, −5, 3, −7, 7, −1}, {1, −5, 3, −7, −7, 1}, {1, −5, 3, −7, −7, −1}, {1, −5, 3, −7, −5, 1}, {1, −5, 5, 1, 3, 7}, {1, −5, 5, 1, −5, −3}, {1, −5, 5, 7, −5, −3}, {1, −5, 5, −7, −5, 5}, {1, −5, 5, −7, −5, −1}, {1, −5, 5, −1, 3, 5}, {1, −3, 1, 5, −3, −7}, {1, −3, 1, 5, −3, −5}, {1, −3, 1, 7, −5, −7}, {1, −3, 1, 7, −3, −5}, {1, −3, 1, −7, 7, −1}, {1, −3, 3, 1, 7, −1}, {1, −1, 1, 3, −3, 7}, {1, −1, 1, 5, −3, 7}, {1, −1, 1, 7, −1, −7}, {1, −1, 3, 7, −5, 5}, {1, −1, 3, −7, −3, 5}, {1, −1, 3, −7, −3, 7}, {1, −1, 3, −3, 7, 7}, and {1, −1, 3, −3, −3, 7}; or {1, 1, −7, 5, −1, 1}, {1, 1, −7, 7, −3, 1}, {1, 1, −7, −5, 5, 1}, {1, 1, −7, −3, 3, 1}, {1, 1, −7, −3, −5, 1}, {1, 1, −7, −1, −3, 1}, {1, 3, 7, 1, 5, 1}, {1, 3, −5, 3, 5, 1}, {1, 3, −5, 3, 5, −3}, {1, 3, −5, 7, −7, 1}, {1, 3, −5, 7, −5, 5}, {1, 3, −5, 7, −1, 1}, {1, 3, −5, −5, 3, −1}, {1, 3, −5, −3, 5, 1}, {1, 3, −3, 1, −5, −1}, {1, 3, −3, −7, 1, 1}, {1, 3, −1, 7, −7, 1}, {1, 5, 1, −7, −5, −1}, {1, 5, 3, −7, 1, 1}, {1, 5, 7, −1, −5, −1}, {1, 5, −5, −7, 1, 1}, {1, 5, −3, −5, 3, 1}, {1, 5, −1, 3, 5, −3}, {1, 5, −1, 3, −3, −1}, {1, 5, −1, 3, −1, 7}, {1, 7, 5, −7, 1, 1}, {1, 7, 5, −3, −3, 5}, {1, 7, −5, 3, 3, −5}, {1, −7, 1, 3, −5, 7}, {1, −7, 1, 3, −1, 7}, {1, −7, 5, 7, −1, 7}, {1, −7, 5, −7, 3, 7}, {1, −7, 5, −3, −1, 7}, {1, −7, 5, −1, 1, −7}, {1, −7, 7, −3, 1, −7}, {1, −7, 7, −1, 3, −5}, {1, −7, 7, −1, −3, 5}, {1, −7, −7, 1, 3, −3}, {1, −7, −7, 1, 5, −5}, {1, −7, −7, 1, 7, 5}, {1, −7, −7, 1, −3, 7}, {1, −7, −7, 1, −1, 5}, {1, −7, −5, 3, 5, −3}, {1, −7, −5, 3, −5, −3}, {1, −7, −5, 3, −1, 1}, {1, −7, −5, 3, −1, 7}, {1, −7, −5, 5, 1, −7}, {1, −7, −5, 7, −1, 1}, {1, −7, −5, −1, −7, −3}, {1, −7, −3, 3, 1, −7}, {1, −7, −3, 5, 3, −5}, {1, −7, −3, −5, 1, −7}, {1, −7, −1, −3, 1, −7}, {1, −5, 7, −1, −1, 7}, {1, −5, −3, 5, 5, −3}, {1, −5, −3, 7, −5, 5}, {1, −5, −1, −7, −5, 5}, {1, −5, −1, −7, −3, 7}, {1, −5, −1, −5, 3, 5}, {1, −3, 1, −5, −1, 1}, {1, −3, 5, 5, −3, −1}, {1, −3, 5, 7, −1, 1}, {1, −3, 5, 7, −1, 7}, {1, −3, 7, −7, 1, 1}, {1, −3, −1, 7, −1, 1}, {1, −1, 3, −5, −5, 3}, {1, −1, 5, −7, 1, 1}, {1, −1, 5, −3, −3, 5}, {1, −1, 7, 5, −3, 1}, {1, −1, 7, 7, −1, 3}, and {1, −1, 7, −5, 3, 1};

a generation unit, configured to generate a first signal based on the sequence $\{x_n\}$; and a sending unit, configured to send the first signal.

In an embodiment, the set of the sequence $\{s_n\}$ includes at least one of sequences in a second sequence set, and the second sequence set includes some of the sequences in the first sequence set.

In an embodiment:

the generation unit is further configured to perform discrete Fourier transform on N elements in the sequence $\{x_n\}$ to obtain a sequence $\{f_n\}$ including N elements;

the generation unit is further configured to map the N elements in the sequence $\{f_n\}$ to N subcarriers respectively, to obtain a frequency-domain signal including the N elements; and the generation unit is further configured to generate the first signal based on the frequency-domain signal.

In an embodiment, the N subcarriers are N consecutive subcarriers, or N equi-spaced subcarriers.

In an embodiment, the signal processing apparatus further includes a filter unit, configured to: filter the sequence $\{x_n\}$ before the discrete Fourier transform is performed on the N elements; or filter the sequence $\{x_n\}$ after the discrete Fourier transform is performed on the N elements.

In an embodiment, the first signal is a reference signal of a second signal, and a modulation scheme of the second signal is π/2 binary phase shift keying BPSK.

A plurality of orthogonal frequency division DMRS ports are supported in the foregoing process. For example, in a comb-2, two orthogonal DMRS ports are supported to occupy different subcarriers. In a comb-4, four orthogonal DMRS ports are supported to occupy different subcarriers. To support more users, more DMRS orthogonal ports need to be supported on a same frequency-domain resource through code division multiplexing.

Specifically, a sequence used by a DMRS port 0 is represented as $\{\Phi(0), \ldots, \Phi(5), \Phi(0), \ldots, \Phi(5)\}$, and DFT transform is performed on the sequence used by the DMRS port 0. Optionally, IDFT transform is performed after a sequence obtained after the DFT transform is filtered, to form the DMRS port 0. The DMRS port 0 occupies frequency-domain combs 1. In an orthogonal manner 1, a DMRS port 2 that occupies frequency-domain combs 2 may use a sequence $\{\Phi(0), \ldots, \Phi(5), -\Phi(0), \ldots, -\Phi(5)\}$, and DFT transform is performed on the sequence. Optionally, IDFT transform is performed after a sequence obtained after the DFT transform is filtered, to form the DMRS port 2.

In an orthogonal manner 2, a DMRS port 2 that occupies frequency-domain combs 2 may alternatively use a sequence $\{\Phi(0), \ldots, \Phi(5)\}$, and DFT transform is performed on the sequence. Then, a tensor product operation (Kronecker) is performed by using a vector [0 1] to form a sequence having a length of 12. For example, $\{\beta(0), \ldots, \beta(5)\}$ is a sequence obtained after the DFT transform is performed on $\{\Phi(0), \ldots, \Phi(5)\}$. In this case, the Kronecker operation is $[\beta(0) \ldots \beta(5)]\otimes[0\ 1]=[0\ \beta(0)\ 0\ \beta(1) \ldots 0\ \beta(5)]$. Optionally, IDFT transform is performed after a sequence obtained after the DFT transform is filtered, to form the DMRS port 2.

In an orthogonal manner 3, a DMRS port 2 that occupies frequency-domain combs 2 may use a sequence $[\Phi(0), \ldots, \Phi(5), \Phi(0), \ldots, \Phi(5)]\cdot[e^{\pi\times j\times 0/6}\ e^{\pi\times j\times 1/6} \ldots e^{\pi\times j\times 11/6}]$, and DFT transform is performed on the sequence. Optionally, IDFT transform is performed after a sequence obtained after the DFT transform is filtered, to form the DMRS port 2. In the orthogonal manners 1, 2, and 3, orthogonal DMRS ports occupying different subcarriers are formed.

In an orthogonal manner 4, a cyclic shift (CS) operation is performed on the sequence used by the DMRS port 0. In a cyclic shift manner, the sequence is shifted by ¼ of the length of the sequence to the left, to form a sequence of the DMRS port 1. For example, the sequence of the DMRS port 1 is $\{\Phi(3), \Phi(4), \Phi(5), \Phi(0), \ldots, \Phi(5), \Phi(0), \Phi(1), \Phi(2)\}$.

DFT transform is performed on the sequence used by the DMRS port 1. Optionally, IDFT transform is performed after a sequence obtained after the DFT transform is filtered, to form the DMRS port 1, and the DMRS port 1 occupies the frequency-domain combs 1.

In an orthogonal manner 5, a point multiplication operation is performed on the DMRS port 0 and Walsh code to form the sequence of the DMRS port 1. The Walsh code may be [1 −1 1 −1 1 −1 1 −1 1 −1 1 −1], [1 1 1 −1 −1 −1 1 1 1 −1 −1 −1], or [$e^{2\times\pi\times j\times 0/6}$ $e^{2\times\pi\times j\times 1/6}$ . . . $e^{2\times\pi\times j\times 11/6}$]. For example, if the Walsh code [1 −1 1 −1 1 −1 1 −1 1 −1 1 −1] is used, the sequence of the DMRS port 1 is {Φ(0), Φ(1), Φ(2), −Φ(3), −Φ(4), −Φ(5), Φ(0), Φ(1), Φ(2), Φ(3), Φ(4), Φ(5)}. DFT transform is performed on the sequence used by the DMRS port 1. Optionally, IDFT transform is performed after a sequence obtained after the DFT transform is filtered, to form the DMRS port 1, and the DMRS port 1 occupies the frequency-domain combs 1.

The third sequence set is used in the orthogonal manner 1 to form the DMRS port 2, and used in the orthogonal manner 4 to form the DMRS port 1 based on the DMRS port 0 and form a DMRS port 3 based on the DMRS port 2.

The fourth sequence set and the fifth sequence set are used in the orthogonal manner 1 to form the DMRS port 2, and used in the orthogonal manner 5 to form the DMRS port 1 based on the DMRS port 0 and form the DMRS port 3 based on the DMRS port 2.

The sixth sequence set is used in the orthogonal manner 2 to form the DMRS port 2, and used in the orthogonal manner 4 to form the DMRS port 1 based on the DMRS port 0 and form the DMRS port 3 based on the DMRS port 2.

The seventh sequence set is used in the orthogonal manner 3 to form the DMRS port 2, and used in the orthogonal manner 4 to form the DMRS port 1 based on the DMRS port 0 and form the DMRS port 3 based on the DMRS port 2.

The eighth sequence set is used in the orthogonal manner 5 to form the DMRS port 2, and used in the orthogonal manner 5 to form the DMRS port 1 based on the DMRS port 0 and form the DMRS port 3 based on the DMRS port 2.

The following describes another embodiment of the present disclosure. The embodiment relates to a sequence-based signal processing method, including:

determining a sequence $\{x_n\}$, where $x_n$ is an element in the sequence $\{x_n\}$, the sequence $\{x_n\}$ is a sequence satisfying a preset condition, and the preset condition is:

the preset condition is $x_n = y_{(n+M) \bmod K}$, where $$y_n = A \cdot e^{\frac{j\times\pi\times s_n}{8}},$$

$M \in \{0, 1, 2, \ldots, 5\}$, K=6, A is a non-zero complex number, $j=\sqrt{-1}$, and a set of sequence $\{s_n\}$ including an element $s_n$ includes at least one of sequences in a first sequence set; and the sequences included in the first sequence set include:

{1, 1, 3, −7, 5, −3}, {1, 1, 5, −7, 3, 5}, {1, 1, 5, −5, −3, 7}, {1, 1, −7, −5, 5, −7}, {1, 1, −7, −3, 7, −7}, {1, 3, 1, 7, −1, −5}, {1, 3, 1, −7, −3, 7}, {1, 3, 1, −7, −1, −5}, {1, 3, 3, 7, −1, −5}, {1, 5, 1, 1, −5, −3}, {1, 5, 1, 3, −5, 5}, {1, 5, 1, 3, −5, −7}, {1, 5, 1, 3, −3, 1}, {1, 5, 1, 3, −1, −7}, {1, 5, 1, 5, 3, −7}, {1, 5, 1, 5, 3, −5}, {1, 5, 1, 5, 7, 7}, {1, 5, 1, 5, −5, 3}, {1, 5, 1, 5, −3, 3}, {1, 5, 1, 5, −1, 3}, {1, 5, 1, 5, −1, −1}, {1, 5, 1, 7, 3, −3}, {1, 5, 1, 7, −5, 5}, {1, 5, 1, −5, 3, 5}, {1, 5, 1, −5, −7, −1}, {1, 5, 1, −5, −5, −3}, {1, 5, 1, −5, −3, 1}, {1, 5, 1, −5, −1, 1}, {1, 5, 1, −5, −1, 5}, {1, 5, 1, −5, −1, −1}, {1, 5, 1, −3, 1, 7}, {1, 5, 1, −3, 1, −5}, {1, 5, 1, −3, 7, −7}, {1, 5, 1, −3, 7, −5}, {1, 5, 1, −3, −5, −1}, {1, 5, 1, −1, 3, −5}, {1, 5, 1, −1, 5, −7}, {1, 5, 1, −1, −7, −3}, {1, 5, 1, −1, −5, −3}, {1, 5, 3, −3, −7, −5}, {1, 5, 3, −3, −7, −1}, {1, 5, 3, −3, −1, −7}, {1, 5, 3, −1, 5, −7}, {1, 5, 3, −1, −5, −3}, {1, 5, 5, 1, 3, −3}, {1, 5, 5, −1, −7, −5}, {1, 7, 1, 1, 1, −5}, {1, 7, 1, 1, −7, −7}, {1, 7, 1, 1, −5, −5}, {1, 7, 1, 3, −7, 7}, {1, 7, 1, 3, −3, 3}, {1, 7, 1, −7, 1, 1}, {1, 7, 1, −7, −7, −7}, {1, 7, 1, −5, 1, 1}, {1, 7, 1, −5, −5, 1}, {1, 7, 1, −5, −3, 1}, {1, 7, 1, −5, −1, 1}, {1, 7, 1, −5, −1, −1}, {1, 7, 1, −1, 5, 7}, {1, 7, 3, 1, 5, −3}, {1, 7, 3, 1, −5, −5}, {1, 7, 3, 5, −5, −7}, {1, 7, 3, −7, 7, −1}, {1, 7, 3, −7, −5, 3}, {1, 7, 3, −5, −7, −1}, {1, 7, 3, −3, −5, 1}, {1, 7, 3, −3, −5, −1}, {1, 7, 3, −3, −3, −3}, {1, 7, 3, −1, −5, −3}, {1, 7, 5, 1, −5, −5}, {1, 7, 5, 1, −5, −3}, {1, 7, 5, −5, 3, −1}, {1, 7, 5, −5, −3, −7}, {1, 7, 5, −3, −7, 1}, {1, 7, 5, −1, −5, −5}, {1, 7, 5, −1, −5, −3}, {1, −7, 1, −5, 1, 1}, {1, −7, 3, 3, −5, −5}, {1, −7, 3, 5, −1, −3}, {1, −7, 3, −5, 1, 1}, {1, −7, 3, −5, −5, 1}, {1, −7, 3, −5, −5, −5}, {1, −7, 5, −3, −5, 1}, {1, −5, 1, 1, 3, 7}, {1, −5, 1, 1, 5, 7}, {1, −5, 1, 1, 7, 7}, {1, −5, 1, 3, 3, 7}, {1, −5, 1, 7, 5, −1}, {1, −5, 1, 7, 7, 1}, {1, −5, 1, −7, −7, 1}, {1, −5, 1, −7, −7, −7}, {1, −5, 3, −7, −7, 1}, {1, −5, 5, 3, −5, −3}, {1, −5, 5, 3, −5, −1}, {1, −5, 5, 5, −5, −3}, {1, −5, 5, 5, −5, −1}, {1, −5, 5, 7, −5, 1}, {1, −5, 5, 7, −5, 3}, {1, −5, 5, −7, −5, 1}, {1, −5, 5, −7, −5, 3}, {1, −5, 7, 3, 5, −3}, {1, −5, −7, 3, 5, −3}, {1, −5, −7, 3, 5, −1}, {1, −5, −7, 3, 7, −1}, {1, −3, 1, 1, 3, 7}, {1, −3, 1, 1, 5, 7}, {1, −3, 1, 1, 5, −1}, {1, −3, 1, 3, 3, 7}, {1, −3, 1, 3, −7, 7}, {1, −3, 1, 5, 7, 1}, {1, −3, 1, 5, 7, 3}, {1, −3, 1, 5, 7, 7}, {1, −3, 1, 5, −7, 3}, {1, −3, 1, 7, −5, 5}, {1, −3, 1, 7, −1, 3}, {1, −3, 1, −7, 3, −1}, {1, −3, 1, −7, 7, −1}, {1, −3, 1, −7, −5, 5}, {1, −3, 1, −7, −3, 3}, {1, −3, 1, −5, 7, −1}, {1, −3, 3, 3, −7, 7}, {1, −3, 3, 5, −5, −7}, {1, −3, 3, 7, 7, 7}, {1, −3, 3, 7, −7, 5}, {1, −3, 3, −7, −7, 3}, {1, −3, 3, −5, −7, −1}, {1, −3, 7, −5, 3, 5}, {1, −1, 1, 7, 3, −7}, {1, −1, 1, 7, 3, −5}, {1, −1, 1, −5, 5, −7}, {1, −1, 3, −7, −5, 7}, {1, −1, 5, −7, −5, 5}, {1, −1, 5, −7, −5, 7}, {1, −1, 5, −5, −5, 5}, and {1, −1, 5, −5, −5, 7};

{1, 1, 5, −7, 3, 7}, {1, 1, 5, −7, 3, −3}, {1, 1, 5, −1, 3, 7}, {1, 1, 5, −1, −7, −3}, {1, 3, 1, 7, −1, −7}, {1, 3, 1, −7, 1, −5}, {1, 3, 1, −7, 3, −5}, {1, 3, 1, −7, −1, −7}, {1, 3, 1, −5, 1, −7}, {1, 3, 1, −5, 3, −7}, {1, 3, 5, −7, 3, 7}, {1, 3, 5, −1, 3, 7}, {1, 3, 5, −1, 3, −3}, {1, 3, 5, −1, −5, 7}, {1, 3, 7, 1, 5, 7}, {1, 3, 7, −7, 3, 7}, {1, 3, 7, −5, 5, 7}, {1, 5, 1, 1, 5, −7}, {1, 5, 1, 1, 5, −3}, {1, 5, 1, 5, 5, −7}, {1, 5, 1, 5, 5, −3}, {1, 5, 1, 5, −7, 1}, {1, 5, 1, 5, −7, −7}, {1, 5, 1, 5, −3, 1}, {1, 5, 1, 5, −3, −3}, {1, 5, 1, 5, −1, 3}, {1, 5, 1, 7, −3, −5}, {1, 5, 1, −7, 1, −3}, {1, 5, 1, −7, −3, 5}, {1, 5, 1, −5, 5, 7}, {1, 5, 1, −5, −3, 7}, {1, 5, 1, −3, 1, −7}, {1, 5, 1, −3, 5, −7}, {1, 5, 1, −3, 7, −7}, {1, 5, 1, −3, 7, −5}, {1, 5, 1, −3, −5, −1}, {1, 5, 3, 1, 5, −7}, {1, 5, 3, 1, 5, −3}, {1, 5, 3, 7, −3, −5}, {1, 5, 3, 7, −1, 3}, {1, 5, 3, −7, −3, 7}, {1, 5, 3, −3, 7, −5}, {1, 5, 3, −1, −5, −3}, {1, 5, 5, −1, 3, 7}, {1, 5, 5, −1, 3, −3}, {1, 5, 7, 1, 3, −3}, {1, 5, −7, −3, 7, 7}, {1, 7, 1, 1, 3, −5}, {1, 7, 1, 1, −7, −5}, {1, 7, 1, 1, −1, −7}, {1, 7, 1, 3, −7, −7}, {1, 7, 1, 3, −5, −7}, {1, 7, 1, 3, −5, −5}, {1, 7, 1, 3, −1, −5}, {1, 7, 1, 5, −1, −3}, {1, 7, 1, 7, −7, −7}, {1, 7, 1, 7, −1, −1}, {1, 7, 1, −7, 1, −1}, {1, 7, 1, −7, −5, −5}, {1, 7, 1, −7, −1, 1}, {1, 7, 1, −7, −1, −1}, {1, 7, 1, −5, −7, 1}, {1, 7, 1, −5, −7, −3}, {1, 7, 1, −5, −5, 3}, {1, 7, 1, −5, −1, 3}, {1, 7, 1, −5, −1, −3}, {1, 7, 1, −3, −7, −5}, {1, 7, 1, −3, −7, −1}, {1, 7, 1, −3, −1, 5}, {1, 7, 1, −1, 1, −7}, {1, 7, 1, −1, 7, −7}, {1, 7, 1, −1, −7, −3}, {1, 7, 3, 1, 7, −5}, {1, 7, 3, 1, 7, −3}, {1, 7, 3, 5, −1, −5}, {1, 7, 3, −7, 7, −3}, {1, 7, 3, −7, −3, 3}, {1, 7, 3, −7, −1, −3}, {1, 7, 3, −3, −7, −5}, {1, 7, 3, −3, −7, −1}, {1, 7, 3, −3, −1, −5}, {1, 7, 3, −1, −7, −5}, {1, 7, 5, −1, 3, −3}, {1, 7, 5, −1, −7, −7}, {1, 7, 5, −1, −7, −3}, {1, −7, 1, 3, −3, 3}, {1, −7, 1, −7, 1, 1}, {1, −7, 3, 1, 7, −1}, {1, −7, 3, 1, −7, −5}, {1, −7, 3, 1, −7, −1}, {1, −7, 3, 3, −3, −5}, {1,

−7, 3, 5, −3, −5}, {1, −7, 3, −5, −7, −1}, {1, −7, 3, −5, −3, 3}, {1, −7, 3, −3, −3, 3}, {1, −7, 5, 1, −7, −3}, {1, −5, 1, 1, 3, −7}, {1, −5, 1, 1, −7, 7}, {1, −5, 1, 3, 3, −7}, {1, −5, 1, 3, −7, 5}, {1, −5, 1, 5, 3, 7}, {1, −5, 1, 5, 3, −3}, {1, −5, 1, 5, −7, 3}, {1, −5, 1, 5, −7, 7}, {1, −5, 1, 7, 3, −1}, {1, −5, 1, 7, 5, −1}, {1, −5, 1, 7, 7, −7}, {1, −5, 1, 7, 7, −1}, {1, −5, 1, 7, −7, 1}, {1, −5, 1, 7, −7, 5}, {1, −5, 1, 7, −1, 1}, {1, −5, 1, −7, 3, 1}, {1, −5, 1, −7, 7, −7}, {1, −5, 1, −7, 7, −1}, {1, −5, 1, −7, −7, −1}, {1, −5, 1, −7, −5, 3}, {1, −5, 1, −3, 3, 5}, {1, −5, 1, −1, 3, 7}, {1, −5, 1, −1, 7, 7}, {1, −5, 3, 1, 7, 7}, {1, −5, 3, 5, −5, 3}, {1, −5, 3, 5, −3, 3}, {1, −5, 3, −7, 7, 1}, {1, −5, 3, −7, 7, −1}, {1, −5, 3, −7, −5, 3}, {1, −5, 5, 1, 3, 7}, {1, −5, 5, 1, −5, −3}, {1, −5, 5, 3, −7, 1}, {1, −5, 5, 3, −7, −3}, {1, −5, 5, 7, 3, −3}, {1, −5, 5, −7, −5, 5}, {1, −5, 5, −1, 3, 5}, {1, −5, 7, 1, 3, −3}, {1, −5, 7, 1, 3, −1}, {1, −5, 7, 1, 5, −1}, {1, −5, −7, 3, 3, −3}, {1, −5, −7, 3, 7, 1}, {1, −5, −7, 3, 7, −3}, {1, −3, 1, 5, −3, 1}, {1, −3, 1, 7, 5, −5}, {1, −3, 1, 7, −5, 5}, {1, −3, 1, −7, −5, 5}, {1, −3, 1, −7, −3, 1}, {1, −3, 1, −7, −3, 5}, {1, −3, 1, −5, −3, 7}, {1, −3, 3, 7, −3, 3}, {1, −3, 3, −7, −5, 5}, {1, −3, 3, −7, −5, 7}, {1, −3, 3, −7, −3, 3}, {1, −1, 1, 7, −1, −7}, {1, −1, 1, −7, 3, −5}, {1, −1, 1, −7, −1, 7}, {1, −1, 3, −7, −3, 7}, {1, −1, 3, −3, 7, −5}, and {1, −1, 5, −7, 3, 7};

{1, 1, 5, −5, 3, −3}, {1, 1, 7, −5, 7, −1}, {1, 1, 7, −1, 3, −1}, {1, 1, −5, 3, −1, 3}, {1, 1, −5, 7, −5, 3}, {1, 1, −3, 7, −1, 5}, {1, 3, 7, −5, 3, −3}, {1, 3, −1, −7, 1, 5}, {1, 5, 1, −7, 3, 3}, {1, 5, 1, −5, −5, 1}, {1, 5, 3, −1, −5, 3}, {1, 5, 5, 1, −5, 3}, {1, 5, 7, 3, −3, 5}, {1, 5, −7, 1, −5, 7}, {1, 5, −7, −5, 7, 1}, {1, 5, −5, 3, −3, −7}, {1, 5, −5, 3, −1, −5}, {1, 5, −5, −5, 5, −3}, {1, 5, −3, 3, 3, −3}, {1, 5, −3, 7, 3, 5}, {1, 7, 7, 1, −7, 5}, {1, 7, 7, 1, −3, 1}, {1, 7, −5, 7, −1, −7}, {1, 7, −5, −7, 5, 1}, {1, 7, −5, −5, 7, 1}, {1, 7, −1, 3, −1, −7}, {1, 7, −1, −7, 5, 5}, {1, 7, −1, −5, 7, 5}, {1, −7, 3, 3, −7, −3}, {1, −7, 3, −1, 1, 5}, {1, −7, 5, 1, −1, 3}, {1, −7, 5, −7, −1, −1}, {1, −7, −3, 1, 3, −1}, {1, −7, −3, −7, 3, 3}, {1, −7, −1, 3, 3, −1}, {1, −7, −1, −1, −7, 5}, {1, −5, 3, 7, −5, −3}, {1, −5, 3, −1, 3, −7}, {1, −5, 7, 7, −5, 1}, {1, −5, 7, −7, −3, 1}, {1, −5, 7, −5, 3, −7}, {1, −5, −5, 1, 5, 1}, {1, −5, −5, 1, −7, −3}, {1, −3, 1, 7, 7, 1}, {1, −3, 1, −7, −1, −1}, {1, −3, 5, −5, −1, −3}, {1, −3, 5, −1, −1, 5}, {1, −3, 7, 7, −3, 5}, {1, −3, 7, −1, 3, 7}, {1, −3, 7, −1, 5, −7}, {1, −3, −7, 1, 7, −5}, {1, −3, −7, 7, −5, 1}, {1, −3, −3, 1, 7, −1}, {1, −3, −1, 3, 7, −1}, {1, −1, 3, −7, 1, −3}, and {1, −1, −5, 7, −1, 5};

{1, 3, 7, −5, 1, −3}, {1, 3, −7, 5, 1, 5}, {1, 3, −7, −3, 1, −3}, {1, 3, −1, −5, 1, 5}, {1, 5, 1, −3, 3, 5}, {1, 5, 1, −3, 7, 5}, {1, 5, 1, −3, −5, 5}, {1, 5, 1, −3, −1, 5}, {1, 5, 3, −3, −7, 5}, {1, 5, 7, 3, −1, 5}, {1, 5, 7, −3, −7, 5}, {1, 5, −7, 3, 1, −3}, {1, 5, −7, 5, 1, 7}, {1, 5, −7, 7, 3, −1}, {1, 5, −7, −5, 1, −3}, {1, 5, −7, −1, 1, −3}, {1, 5, −5, 7, 3, 5}, {1, 5, −5, −3, −7, 5}, {1, 5, −1, −5, 7, 5}, {1, 5, −1, −3, −7, 5}, {1, 7, 3, −1, 3, 7}, {1, 7, −7, 5, 1, 5}, {1, 7, −7, −3, 1, −3}, {1, 7, −5, −1, 1, −3}, {1, −5, 7, 3, 1, 5}, {1, −5, −7, 5, 1, 5}, {1, −3, 1, 5, 7, −3}, {1, −3, 1, 5, −5, −3}, {1, −3, 3, 5, −7, −3}, {1, −3, −7, 3, 1, 5}, {1, −3, −7, 7, 1, 5}, {1, −3, −7, −5, 1, 5}, {1, −3, −7, −3, 1, −1}, {1, −3, −7, −1, 1, 5}, {1, −3, −5, 5, −7, −3}, {1, −3, −1, 3, 7, −3}, {1, −3, −1, 5, −7, −3}, {1, −1, 3, 7, 3, −1}, {1, −1, −7, 5, 1, 5}, and {1, −1, −5, 7, 1, 5};

{1, 3, −3, 1, 3, −3}, {1, 3, −3, 1, −5, −1}, {1, 3, −3, −7, 3, 7}, {1, 3, −3, −7, −5, 5}, {1, 3, −3, −1, 3, −3}, {1, 5, −1, −7, 3, 7}, {1, 7, 3, 1, 5, −1}, {1, 7, 3, 1, 7, 5}, {1, 7, 3, 1, −5, −1}, {1, 7, 3, 1, −3, 3}, {1, 7, 3, 5, −7, 3}, {1, 7, 3, 5, −1, 3}, {1, 7, 3, 7, 1, 3}, {1, 7, 3, −7, 3, 7}, {1, 7, 3, −7, 5, −5}, {1, 7, 3, −7, 7, −3}, {1, 7, 3, −7, −3, 7}, {1, 7, 3, −7, −1, −3}, {1, 7, 3, −3, 1, −5}, {1, 7, 3, −3, 7, −5}, {1, 7, 3, −1, −7, −5}, {1, 7, 5, 1, 7, 5}, {1, 7, 5, −7, −1, −3}, {1, 7, 5, −1, −7, −3}, {1, −5, −3, 1, −5, −3}, {1, −5, −3, 7, −5, 5}, {1, −5, −3, −7, 3, 5}, {1, −5, −3, −7, 3, 7}, {1, −5, −3, −1, 3, −3}, {1, −3, 3, 1, 3, −3}, {1, −3, 3, 1, 5, −1}, {1, −3, 3, 1, −5, −1}, {1, −3, 3, 5, −7, 3}, {1, −3, 3, 5, −1, 3}, {1, −3, 3, 7, −3, −5}, {1, −3, 3, −7, 3, 7}, {1, −3, 3, −7, −5, 5}, {1, −3, 3, −7, −3, 7}, {1, −3, 3, −3, 7, −5}, {1, −3, 3, −1, 5, 3}, {1, −1, 5, 1, −1, 5}, {1, −1, 5, −7, 7, −3}, and {1, −1, 5, −7, −3, 7};

{1, 1, 3, 5, −3, 7}, {1, 1, 3, −7, −1, 7}, {1, 1, 3, −5, 5, −1}, {1, 1, 3, −3, 7, −1}, {1, 1, 5, 7, −5, 5}, {1, 3, 1, −7, 3, −5}, {1, 3, 1, −5, 3, −5}, {1, 3, 1, −5, 5, −3}, {1, 3, 1, −5, 5, −1}, {1, 3, 3, −3, 5, −5}, {1, 3, 3, −3, 7, −1}, {1, 3, 5, 1, −5, 5}, {1, 3, 5, 1, −5, 7}, {1, 3, 5, 7, 3, −3}, {1, 3, 5, −7, −3, 7}, {1, 3, 5, −1, −7, 7}, {1, 3, 5, −1, −7, −3}, {1, 3, 5, −1, −3, 7}, {1, 5, 1, 3, −5, −7}, {1, 5, 1, 5, 5, −3}, {1, 5, 1, 5, −7, 1}, {1, 5, 1, 5, −7, −7}, {1, 5, 1, 5, −3, −3}, {1, 5, 1, 7, 3, −3}, {1, 5, 1, 7, 5, −5}, {1, 5, 1, 7, 5, −3}, {1, 5, 1, −7, 5, −3}, {1, 5, 1, −7, 7, −5}, {1, 5, 1, −3, 3, −3}, {1, 5, 1, −3, 5, −3}, {1, 5, 3, −5, 5, 7}, {1, 5, 3, −3, 7, 7}, {1, 5, 3, −3, 7, −5}, {1, 5, 3, −3, −3, 7}, {1, 5, 3, −1, 7, −5}, {1, 5, 3, −1, −7, −3}, {1, 5, 5, 1, −5, −1}, {1, 7, 1, 3, −7, 7}, {1, 7, 1, 3, −7, −7}, {1, 7, 1, 3, −5, −7}, {1, 7, 1, 3, −3, 3}, {1, 7, 1, 5, −7, 7}, {1, 7, 1, 7, 7, −1}, {1, 7, 1, 7, −7, 1}, {1, 7, 1, −7, −7, −5}, {1, 7, 1, −7, −5, 3}, {1, 7, 1, −5, −7, −3}, {1, 7, 1, −3, 3, 5}, {1, 7, 1, −3, 3, −1}, {1, 7, 1, −1, 3, 7}, {1, 7, 1, −1, 5, 7}, {1, 7, 3, 5, −3, 3}, {1, −7, 1, 1, 5, 7}, {1, −7, 1, 1, 7, 7}, {1, −7, 1, 3, 7, 7}, {1, −7, 1, 3, −7, 7}, {1, −7, 1, 3, −3, −5}, {1, −7, 1, 5, 7, 7}, {1, −7, 1, 7, 5, −1}, {1, −7, 1, −5, −7, −5}, {1, −7, 1, −5, −7, −1}, {1, −7, 1, −5, −5, 1}, {1, −7, 1, −5, −5, −3}, {1, −7, 1, −5, −5, −1}, {1, −7, 1, −5, −3, 1}, {1, −7, 1, −5, −3, 3}, {1, −7, 1, −3, −7, −3}, {1, −7, 1, −1, 5, 7}, {1, −7, 3, 3, −7, −5}, {1, −7, 3, 3, −5, −5}, {1, −7, 3, 5, −5, −5}, {1, −7, 3, 5, −3, 3}, {1, −7, 3, 5, −3, −5}, {1, −7, 3, 5, −3, −1}, {1, −7, 3, 7, 7, −1}, {1, −7, 3, −5, −3, −1}, {1, −7, 3, −1, −5, −3}, {1, −5, 1, 3, 5, 7}, {1, −5, 1, 3, −1, 5}, {1, −5, 1, 5, −7, 7}, {1, −5, 1, 7, −7, −7}, {1, −5, 1, −7, 7, −1}, {1, −5, 1, −7, −7, −1}, {1, −5, 1, −3, −7, −3}, {1, −5, 1, −3, −1, 5}, {1, −5, 1, −1, 7, −7}, {1, −5, 3, 1, 5, −1}, {1, −5, 3, 1, 7, −1}, {1, −5, 3, 5, 7, −1}, {1, −5, 3, 5, −3, −3}, {1, −5, 3, 7, −7, 5}, {1, −5, 3, −7, 7, −1}, {1, −5, 3, −7, −7, 1}, {1, −5, 3, −7, −7, −1}, {1, −5, 3, −7, −5, 1}, {1, −5, 5, 1, 3, 7}, {1, −5, 5, 1, −5, −3}, {1, −5, 5, 7, −5, −3}, {1, −5, 5, −7, −5, 5}, {1, −5, 5, −7, −5, −1}, {1, −5, 5, −1, 3, 5}, {1, −3, 1, 5, −3, −7}, {1, −3, 1, 5, −3, −5}, {1, −3, 1, 7, −5, −7}, {1, −3, 1, 7, −3, −5}, {1, −3, 1, −7, 7, −1}, {1, −3, 3, 1, 7, −1}, {1, −1, 1, 3, −3, 7}, {1, −1, 1, 5, −3, 7}, {1, −1, 1, 7, −1, −7}, {1, −1, 3, 7, −5, 5}, {1, −1, 3, −7, −3, 5}, {1, −1, 3, −7, −3, 7}, {1, −1, 3, −3, 7, 7}, and {1, −1, 3, −3, −3, 7};

{1, 1, 3, 5, −3, 7}, {1, 1, 3, −7, −1, 7}, {1, 1, 3, −5, 5, −1}, {1, 1, 3, −3, 7, −1}, {1, 1, 5, 7, −5, 5}, {1, 3, 1, −7, 3, −5}, {1, 3, 1, −5, 3, −5}, {1, 3, 1, −5, 5, −3}, {1, 3, 1, −5, 5, −1}, {1, 3, 3, −3, 5, −5}, {1, 3, 3, −3, 7, −1}, {1, 3, 5, 1, −5, 5}, {1, 3, 5, 1, −5, 7}, {1, 3, 5, 7, 3, −3}, {1, 3, 5, −7, −3, 7}, {1, 3, 5, −1, −7, 7}, {1, 3, 5, −1, −7, −3}, {1, 3, 5, −1, −3, 7}, {1, 5, 1, 3, −5, −7}, {1, 5, 1, 5, 5, −3}, {1, 5, 1, 5, −7, 1}, {1, 5, 1, 5, −7, −7}, {1, 5, 1, 5, −3, −3}, {1, 5, 1, 7, 3, −3}, {1, 5, 1, 7, 5, −5}, {1, 5, 1, 7, 5, −3}, {1, 5, 1, −7, 5, −3}, {1, 5, 1, −7, 7, −5}, {1, 5, 1, −3, 3, −3}, {1, 5, 1, −3, 5, −3}, {1, 5, 3, −5, 5, 7}, {1, 5, 3, −3, 7, 7}, {1, 5, 3, −3, 7, −5}, {1, 5, 3, −3, −3, 7}, {1, 5, 3, −1, 7, −5}, {1, 5, 3, −1, −7, −3}, {1, 5, 5, 1, −5, −1}, {1, 7, 1, 3, −7, 7}, {1, 7, 1, 3, −7, −7}, {1, 7, 1, 3, −5, −7}, {1, 7, 1, 3, −3, 3}, {1, 7, 1, 5, −7, 7}, {1, 7, 1, 7, 7, −1}, {1, 7, 1, 7, −7, 1}, {1, 7, 1, −7, −7, −5}, {1, 7, 1, −7, −5, 3}, {1, 7, 1, −5, −7, −3}, {1, 7, 1, −3, 3, 5}, {1, 7, 1, −3, 3, −1}, {1, 7, 1, −1, 3, 7}, {1, 7, 1, −1, 5, 7}, {1, 7, 3, 5, −3, 3}, {1, −7, 1, 1, 5, 7}, {1, −7, 1, 1, 7, 7}, {1, −7, 1, 3, 7, 7}, {1, −7, 1, 3, −7, 7}, {1, −7, 1, 3, −3, −5}, {1, −7, 1, 5, 7, 7}, {1, −7, 1, 7, 5, −1}, {1, −7, 1, −5, −7, −5}, {1, −7, 1, −5, −7, −1}, {1, −7, 1, −5, −5, 1},

{1, −7, 1, −5, −5, −3}, {1, −7, 1, −5, −5, −1}, {1, −7, 1, −5, −3, 1}, {1, −7, 1, −5, −3, 3}, {1, −7, 1, −3, −7, −3}, {1, −7, 1, −1, 5, 7}, {1, −7, 3, 3, −7, −5}, {1, −7, 3, 3, −5, −5}, {1, −7, 3, 5, −5, −5}, {1, −7, 3, 5, −3, 3}, {1, −7, 3, 5, −3, −5}, {1, −7, 3, 5, −3, −1}, {1, −7, 3, 7, 7, −1}, {1, −7, 3, −5, −3, −1}, {1, −7, 3, −1, −5, −3}, {1, −5, 1, 3, 5, 7}, {1, −5, 1, 3, −1, 5}, {1, −5, 1, 5, −7, 7}, {1, −5, 1, 7, −7, −7}, {1, −5, 1, −7, 7, −1}, {1, −5, 1, −7, −7, −1}, {1, −5, 1, −3, −7, −3}, {1, −5, 1, −3, −1, 5}, {1, −5, 1, −1, 7, −7}, {1, −5, 3, 1, 5, −1}, {1, −5, 3, 1, 7, −1}, {1, −5, 3, 5, 7, −1}, {1, −5, 3, 5, −3, −3}, {1, −5, 3, 7, −7, 5}, {1, −5, 3, −7, 7, −1}, {1, −5, 3, −7, −7, 1}, {1, −5, 3, −7, −7, −1}, {1, −5, 3, −7, −5, 1}, {1, −5, 5, 1, 3, 7}, {1, −5, 5, 1, −5, −3}, {1, −5, 5, 7, −5, −3}, {1, −5, 5, −7, −5, 5}, {1, −5, 5, −7, −5, −1}, {1, −5, 5, −1, 3, 5}, {1, −3, 1, 5, −3, −7}, {1, −3, 1, 5, −3, −5}, {1, −3, 1, 7, −5, −7}, {1, −3, 1, 7, −3, −5}, {1, −3, 1, −7, 7, −1}, {1, −3, 3, 1, 7, −1}, {1, −1, 1, 3, −3, 7}, {1, −1, 1, 5, −3, 7}, {1, −1, 1, 7, −1, −7}, {1, −1, 3, 7, −5, 5}, {1, −1, 3, −7, −3, 5}, {1, −1, 3, −7, −3, 7}, {1, −1, 3, −3, 7, 7}, and {1, −1, 3, −3, −3, 7}; or {1, 1, −7, 5, −1, 1}, {1, 1, −7, 7, −3, 1}, {1, 1, −7, −5, 5, 1}, {1, 1, −7, −3, 3, 1}, {1, 1, −7, −3, −5, 1}, {1, 1, −7, −1, −3, 1}, {1, 3, 7, 1, 5, 1}, {1, 3, −5, 3, 5, 1}, {1, 3, −5, 3, 5, −3}, {1, 3, −5, 7, −7, 1}, {1, 3, −5, 7, −5, 5}, {1, 3, −5, 7, −1, 1}, {1, 3, −5, −5, 3, −1}, {1, 3, −5, −3, 5, 1}, {1, 3, −3, 1, −5, −1}, {1, 3, −3, −7, 1, 1}, {1, 3, −1, 7, −7, 1}, {1, 5, 1, −7, −5, −1}, {1, 5, 3, −7, 1, 1}, {1, 5, 7, −1, −5, −1}, {1, 5, −5, −7, 1, 1}, {1, 5, −3, −5, 3, 1}, {1, 5, −1, 3, 5, −3}, {1, 5, −1, 3, −3, −1}, {1, 5, −1, 3, −1, 7}, {1, 7, 5, −7, 1, 1}, {1, 7, 5, −3, −3, 5}, {1, 7, −5, 3, 3, −5}, {1, −7, 1, 3, −5, 7}, {1, −7, 1, 3, −1, 7}, {1, −7, 5, 7, −1, 7}, {1, −7, 5, −7, 3, 7}, {1, −7, 5, −3, −1, 7}, {1, −7, 5, −1, 1, −7}, {1, −7, 7, −3, 1, −7}, {1, −7, 7, −1, 3, −5}, {1, −7, 7, −1, −3, 5}, {1, −7, −7, 1, 3, −3}, {1, −7, −7, 1, 5, −5}, {1, −7, −7, 1, 7, 5}, {1, −7, −7, 1, −3, 7}, {1, −7, −7, 1, −1, 5}, {1, −7, −5, 3, 5, −3}, {1, −7, −5, 3, −5, −3}, {1, −7, −5, 3, −1, 1}, {1, −7, −5, 3, −1, 7}, {1, −7, −5, 5, 1, −7}, {1, −7, −5, 7, −1, 1}, {1, −7, −5, −1, −7, −3}, {1, −7, −3, 3, 1, −7}, {1, −7, −3, 5, 3, −5}, {1, −7, −3, −5, 1, −7}, {1, −7, −1, −3, 1, −7}, {1, −5, 7, −1, −1, 7}, {1, −5, −3, 5, 5, −3}, {1, −5, −3, 7, −5, 5}, {1, −5, −1, −7, −5, 5}, {1, −5, −1, −7, −3, 7}, {1, −5, −1, −5, 3, 5}, {1, −3, 1, −5, −1, 1}, {1, −3, 5, 5, −3, −1}, {1, −3, 5, 7, −1, 1}, {1, −3, 5, 7, −1, 7}, {1, −3, 7, −7, 1, 1}, {1, −3, −1, 7, −1, 1}, {1, −1, 3, −5, −5, 3}, {1, −1, 5, −7, 1, 1}, {1, −1, 5, −3, −3, 5}, {1, −1, 7, 5, −3, 1}, {1, −1, 7, 7, −1, 3}, and {1, −1, 7, −5, 3, 1};

generating a first signal based on the sequence $\{x_n\}$; and sending the first signal.

It should be understood that, after the sequence $\{x_n\}$ is generated, the sequence may further be processed according to some or all of steps S301 to S304 in the foregoing embodiment. The terminal device may alternatively be another network device.

In an embodiment, the set of the sequence $\{s_n\}$ includes at least one of sequences in a second sequence set, and the second sequence set includes some of the sequences in the first sequence set.

In an embodiment, the generating a first signal based on the sequence $\{x_n\}$ includes:

performing discrete Fourier transform on N elements in the sequence $\{x_n\}$ to obtain a sequence $\{f_n\}$ including N elements;

mapping the N elements in the sequence $\{f_n\}$ to N subcarriers respectively, to obtain a frequency-domain signal including the N elements; and generating the first signal based on the frequency-domain signal.

In an embodiment, the N subcarriers are N consecutive subcarriers, or N equi-spaced subcarriers.

In an embodiment, before the performing discrete Fourier transform on N elements in the sequence $\{x_n\}$, the first signal processing method further includes: filtering the sequence $\{x_n\}$; or after the performing discrete Fourier transform on N elements in the sequence $\{x_n\}$, the first signal processing method further includes: filtering the sequence $\{x_n\}$.

In an embodiment, the first signal is a reference signal of a second signal, and a modulation scheme of the second signal is π/2 binary phase shift keying BPSK.

The following describes another embodiment of the present disclosure. The embodiment relates to a sequence-based signal processing apparatus, including:

a determining unit, configured to determine a sequence $\{x_n\}$, where $x_n$ is an element in the sequence $\{x_n\}$, the sequence $\{x_n\}$ is a sequence satisfying a preset condition, and the preset condition is:

the preset condition is $x_n = y_{(n+M) \bmod K}$, where $$y_n = A \cdot e^{\frac{j \times \pi \times s_n}{8}},$$

$M \in \{0, 1, 2, \ldots, 5\}$, K=6, A is a non-zero complex number, $j=\sqrt{-1}$, and a set of sequence $\{s_n\}$ including an element $s_n$ includes at least one of sequences in a first sequence set; and the sequences included in the first sequence set include:

{1, 1, 3, −7, 5, −3}, {1, 1, 5, −7, 3, 5}, {1, 1, 5, −5, −3, 7}, {1, 1, −7, −5, 5, −7}, {1, 1, −7, −3, 7, −7}, {1, 3, 1, 7, −1, −5}, {1, 3, 1, −7, −3, 7}, {1, 3, 1, −7, −1, −5}, {1, 3, 3, 7, −1, −5}, {1, 5, 1, 1, −5, −3}, {1, 5, 1, 3, −5, 5}, {1, 5, 1, 3, −5, −7}, {1, 5, 1, 3, −3, 1}, {1, 5, 1, 3, −1, −7}, {1, 5, 1, 5, 3, −7}, {1, 5, 1, 5, 3, −5}, {1, 5, 1, 5, 7, 7}, {1, 5, 1, 5, −5, 3}, {1, 5, 1, 5, −3, 3}, {1, 5, 1, 5, −1, 3}, {1, 5, 1, 5, −1, −1}, {1, 5, 1, 7, 3, −3}, {1, 5, 1, 7, −5, 5}, {1, 5, 1, −5, 3, 5}, {1, 5, 1, −5, −7, −1}, {1, 5, 1, −5, −5, −3}, {1, 5, 1, −5, −3, 1}, {1, 5, 1, −5, −1, 1}, {1, 5, 1, −5, −1, 5}, {1, 5, 1, −5, −1, −1}, {1, 5, 1, −3, 1, 7}, {1, 5, 1, −3, 1, −5}, {1, 5, 1, −3, 7, −7}, {1, 5, 1, −3, 7, −5}, {1, 5, 1, −3, −5, −1}, {1, 5, 1, −1, 3, −5}, {1, 5, 1, −1, 5, −7}, {1, 5, 1, −1, −7, −3}, {1, 5, 1, −1, −5, −3}, {1, 5, 3, −3, −7, −5}, {1, 5, 3, −3, −7, −1}, {1, 5, 3, −3, −1, −7}, {1, 5, 3, −1, 5, −7}, {1, 5, 3, −1, −5, −3}, {1, 5, 5, 1, 3, −3}, {1, 5, 5, −1, −7, −5}, {1, 7, 1, 1, 1, −5}, {1, 7, 1, 1, −7, −7}, {1, 7, 1, 1, −5, −5}, {1, 7, 1, 3, −7, 7}, {1, 7, 1, 3, −3, 3}, {1, 7, 1, −7, 1, 1}, {1, 7, 1, −7, −7, −7}, {1, 7, 1, −5, 1, 1}, {1, 7, 1, −5, −5, 1}, {1, 7, 1, −5, −3, 1}, {1, 7, 1, −5, −1, 1}, {1, 7, 1, −5, −1, −1}, {1, 7, 1, −1, 5, 7}, {1, 7, 3, 1, 5, −3}, {1, 7, 3, 1, −5, −5}, {1, 7, 3, 5, −5, −7}, {1, 7, 3, −7, 7, −1}, {1, 7, 3, −7, −5, 3}, {1, 7, 3, −5, −7, −1}, {1, 7, 3, −3, −5, 1}, {1, 7, 3, −3, −5, −1}, {1, 7, 3, −3, −3, −3}, {1, 7, 3, −1, −5, −3}, {1, 7, 5, 1, −5, −5}, {1, 7, 5, 1, −5, −3}, {1, 7, 5, −5, 3, −1}, {1, 7, 5, −5, −3, −7}, {1, 7, 5, −3, −7, 1}, {1, 7, 5, −1, −5, −5}, {1, 7, 5, −1, −5, −3}, {1, −7, 1, −5, 1, 1}, {1, −7, 3, 3, −5, −5}, {1, −7, 3, 5, −1, −3}, {1, −7, 3, −5, 1, 1}, {1, −7, 3, −5, −5, 1}, {1, −7, 3, −5, −5, −5}, {1, −7, 5, −3, −5, 1}, {1, −5, 1, 1, 3, 7}, {1, −5, 1, 1, 5, 7}, {1, −5, 1, 1, 7, 7}, {1, −5, 1, 3, 3, 7}, {1, −5, 1, 7, 5, −1}, {1, −5, 1, 7, 7, 1}, {1, −5, 1, −7, −7, 1}, {1, −5, 1, −7, −7, −7}, {1, −5, 3, −7, −7, 1}, {1, −5, 5, 3, −5, −3}, {1, −5, 5, 3, −5, −1}, {1, −5, 5, 5, −5, −3}, {1, −5, 5, 5, −5, −1}, {1, −5, 5, 7, −5, 1}, {1, −5, 5, 7, −5, 3}, {1, −5, 5, −7, −5, 1}, {1, −5, 5, −7, −5, 3}, {1, −5, 7, 3, 5, −3}, {1, −5, −7, 3, 5, −3}, {1, −5, −7, 3, 5, −1}, {1, −5, −7, 3, 7, −1}, {1, −3, 1, 1, 3, 7}, {1, −3, 1, 1, 5, 7}, {1, −3, 1, 1, 5, −1}, {1, −3, 1, 3, 3, 7}, {1, −3, 1, 3, −7, 7}, {1, −3, 1, 5, 7, 1}, {1, −3, 1, 5, 7, 3}, {1, −3, 1, 5, 7, 7}, {1, −3, 1, 5, −7, 3}, {1, −3, 1, 7, −5, 5}, {1, −3, 1, 7, −1, 3}, {1, −3, 1, −7, 3, −1}, {1, −3, 1, −7, 7, −1}, {1, −3, 1, −7, −5, 5}, {1, −3, 1, −7, −3, 3}, {1, −3, 1, −5, 7, −1}, {1, −3, 3, 3, −7, 7}, {1, −3, 3, 5, −5, −7}, {1, −3, 3, 7, 7, 7}, {1, −3, 3, 7, −7, 5}, {1, −3, 3, −7, −7, 3}, {1, −3, 3, −5, −7, −1}, {1, −3, 7, −5, 3, 5}, {1, −1, 1, 7, 3, −7}, {1, −1, 1, 7, 3, −5}, {1, −1, 1, −5, 5, −7}, {1, −1, 3, −7, −5, 7}, {1, −1, 5, −7, −5, 5}, {1, −1, 5, −7, −5, 7}, {1, −1, 5, −5, −5, 5}, and {1, −1, 5, −5, −5, 7};

{1, 1, 5, −7, 3, 7}, {1, 1, 5, −7, 3, −3}, {1, 1, 5, −1, 3, 7}, {1, 1, 5, −1, −7, −3}, {1, 3, 1, 7, −1, −7}, {1, 3, 1, −7, 1, −5}, {1, 3, 1, −7, 3, −5}, {1, 3, 1, −7, −1, −7}, {1, 3, 1, −5, 1, −7}, {1, 3, 1, −5, 3, −7}, {1, 3, 5, −7, 3, 7}, {1, 3, 5, −1, 3, 7}, {1, 3, 5, −1, 3, −3}, {1, 3, 5, −1, −5, 7}, {1, 3, 7, 1, 5, 7}, {1, 3, 7, −7, 3, 7}, {1, 3, 7, −5, 5, 7}, {1, 5, 1, 1, 5, −7}, {1, 5, 1, 1, 5, −3}, {1, 5, 1, 5, 5, −7}, {1, 5, 1, 5, 5, −3}, {1, 5, 1, 5, −7, 1}, {1, 5, 1, 5, −7, −7}, {1, 5, 1, 5, −3, 1}, {1, 5, 1, 5, −3, −3}, {1, 5, 1, 5, −1, 3}, {1, 5, 1, 7, −3, −5}, {1, 5, 1, −7, 1, −3}, {1, 5, 1, −7, −3, 5}, {1, 5, 1, −5, 5, 7}, {1, 5, 1, −5, −3, 7}, {1, 5, 1, −3, 1, −7}, {1, 5, 1, −3, 5, −7}, {1, 5, 1, −3, 7, −7}, {1, 5, 1, −3, 7, −5}, {1, 5, 1, −3, −5, −1}, {1, 5, 3, 1, 5, −7}, {1, 5, 3, 1, 5, −3}, {1, 5, 3, 7, −3, −5}, {1, 5, 3, 7, −1, 3}, {1, 5, 3, −7, −3, 7}, {1, 5, 3, −3, 7, −5}, {1, 5, 3, −1, −5, −3}, {1, 5, 5, −1, 3, 7}, {1, 5, 5, −1, 3, −3}, {1, 5, 7, 1, 3, −3}, {1, 5, −7, −3, 7, 7}, {1, 7, 1, 1, 3, −5}, {1, 7, 1, 1, −7, −5}, {1, 7, 1, 1, −1, −7}, {1, 7, 1, 3, −7, −7}, {1, 7, 1, 3, −5, −7}, {1, 7, 1, 3, −5, −5}, {1, 7, 1, 3, −1, −5}, {1, 7, 1, 5, −1, −3}, {1, 7, 1, 7, −7, −7}, {1, 7, 1, 7, −1, −1}, {1, 7, 1, −7, 1, −1}, {1, 7, 1, −7, −5, −5}, {1, 7, 1, −7, −1, 1}, {1, 7, 1, −7, −1, −1}, {1, 7, 1, −5, −7, 1}, {1, 7, 1, −5, −7, −3}, {1, 7, 1, −5, −5, 3}, {1, 7, 1, −5, −1, 3}, {1, 7, 1, −5, −1, −3}, {1, 7, 1, −3, −7, −5}, {1, 7, 1, −3, −7, −1}, {1, 7, 1, −3, −1, 5}, {1, 7, 1, −1, 1, −7}, {1, 7, 1, −1, 7, −7}, {1, 7, 1, −1, −7, −3}, {1, 7, 3, 1, 7, −5}, {1, 7, 3, 1, 7, −3}, {1, 7, 3, 5, −1, −5}, {1, 7, 3, −7, 7, −3}, {1, 7, 3, −7, −3, 3}, {1, 7, 3, −7, −1, −3}, {1, 7, 3, −3, −7, −5}, {1, 7, 3, −3, −7, −1}, {1, 7, 3, −3, −1, −5}, {1, 7, 3, −1, −7, −5}, {1, 7, 5, −1, 3, −3}, {1, 7, 5, −1, −7, −7}, {1, 7, 5, −1, −7, −3}, {1, −7, 1, 3, −3, 3}, {1, −7, 1, −7, 1, 1}, {1, −7, 3, 1, 7, −1}, {1, −7, 3, 1, −7, −5}, {1, −7, 3, 1, −7, −1}, {1, −7, 3, 3, −3, −5}, {1, −7, 3, 5, −3, −5}, {1, −7, 3, −5, −7, −1}, {1, −7, 3, −5, −3, 3}, {1, −7, 3, −3, −3, 3}, {1, −7, 5, 1, −7, −3}, {1, −5, 1, 1, 3, −7}, {1, −5, 1, 1, −7, 7}, {1, −5, 1, 3, 3, −7}, {1, −5, 1, 3, −7, 5}, {1, −5, 1, 5, 3, 7}, {1, −5, 1, 5, 3, −3}, {1, −5, 1, 5, −7, 3}, {1, −5, 1, 5, −7, 7}, {1, −5, 1, 7, 3, −1}, {1, −5, 1, 7, 5, −1}, {1, −5, 1, 7, 7, −7}, {1, −5, 1, 7, 7, −1}, {1, −5, 1, 7, −7, 1}, {1, −5, 1, 7, −7, 5}, {1, −5, 1, 7, −1, 1}, {1, −5, 1, −7, 3, 1}, {1, −5, 1, −7, 7, −7}, {1, −5, 1, −7, 7, −1}, {1, −5, 1, −7, −7, −1}, {1, −5, 1, −7, −5, 3}, {1, −5, 1, −3, 3, 5}, {1, −5, 1, −1, 3, 7}, {1, −5, 1, −1, 7, 7}, {1, −5, 3, 1, 7, 7}, {1, −5, 3, 5, −5, 3}, {1, −5, 3, 5, −3, 3}, {1, −5, 3, −7, 7, 1}, {1, −5, 3, −7, 7, −1}, {1, −5, 3, −7, −5, 3}, {1, −5, 5, 1, 3, 7}, {1, −5, 5, 1, −5, −3}, {1, −5, 5, 3, −7, 1}, {1, −5, 5, 3, −7, −3}, {1, −5, 5, 7, 3, −3}, {1, −5, 5, −7, −5, 5}, {1, −5, 5, −1, 3, 5}, {1, −5, 7, 1, 3, −3}, {1, −5, 7, 1, 3, −1}, {1, −5, 7, 1, 5, −1}, {1, −5, −7, 3, 3, −3}, {1, −5, −7, 3, 7, 1}, {1, −5, −7, 3, 7, −3}, {1, −3, 1, 5, −3, 1}, {1, −3, 1, 7, 5, −5}, {1, −3, 1, 7, −5, 5}, {1, −3, 1, −7, −5, 5}, {1, −3, 1, −7, −3, 1}, {1, −3, 1, −7, −3, 5}, {1, −3, 1, −5, −3, 7}, {1, −3, 3, 7, −3, 3}, {1, −3, 3, −7, −5, 5}, {1, −3, 3, −7, −5, 7}, {1, −3, 3, −7, −3, 3}, {1, −1, 1, 7, −1, −7}, {1, −1, 1, −7, 3, −5}, {1, −1, 1, −7, −1, 7}, {1, −1, 3, −7, −3, 7}, {1, −1, 3, −3, 7, −5}, and {1, −1, 5, −7, 3, 7};

{1, 1, 5, −5, 3, −3}, {1, 1, 7, −5, 7, −1}, {1, 1, 7, −1, 3, −1}, {1, 1, −5, 3, −1, 3}, {1, 1, −5, 7, −5, 3}, {1, 1, −3, 7, −1, 5}, {1, 3, 7, −5, 3, −3}, {1, 3, −1, −7, 1, 5}, {1, 5, 1, −7, 3, 3}, {1, 5, 1, −5, −5, 1}, {1, 5, 3, −1, −5, 3}, {1, 5, 5, 1, −5, 3}, {1, 5, 7, 3, −3, 5}, {1, 5, −7, 1, −5, 7}, {1, 5, −7, −5, 7, 1}, {1, 5, −5, 3, −3, −7}, {1, 5, −5, 3, −1, −5}, {1, 5, −5, −5, 5, −3}, {1, 5, −3, 3, 3, −3}, {1, 5, −3, 7, 3, 5}, {1, 7, 7, 1, −7, 5}, {1, 7, 7, 1, −3, 1}, {1, 7, −5, 7, −1, −7}, {1, 7, −5, −7, 5, 1}, {1, 7, −5, −5, 7, 1}, {1, 7, −1, 3, −1, −7}, {1, 7, −1, −7, 5, 5}, {1, 7, −1, −5, 7, 5}, {1, −7, 3, 3, −7, −3}, {1, −7, 3, −1, 1, 5}, {1, −7, 5, 1, −1, 3}, {1, −7, 5, −7, −1, −1}, {1, −7, −3, 1, 3, −1}, {1, −7, −3, −7, 3, 3}, {1, −7, −1, 3, 3, −1}, {1, −7, −1, −1, −7, 5}, {1, −5, 3, 7, −5, −3}, {1, −5, 3, −1, 3, −7}, {1, −5, 7, 7, −5, 1}, {1, −5, 7, −7, −3, 1}, {1, −5, 7, −5, 3, −7}, {1, −5, −5, 1, 5, 1}, {1, −5, −5, 1, −7, −3}, {1, −3, 1, 7, 7, 1}, {1, −3, 1, −7, −1, −1}, {1, −3, 5, −5, −1, −3}, {1, −3, 5, −1, −1, 5}, {1, −3, 7, 7, −3, 5}, {1, −3, 7, −1, 3, 7}, {1, −3, 7, −1, 5, −7}, {1, −3, −7, 1, 7, −5}, {1, −3, −7, 7, −5, 1}, {1, −3, −3, 1, 7, −1}, {1, −3, −1, 3, 7, −1}, {1, −1, 3, −7, 1, −3}, and {1, −1, −5, 7, −1, 5};

{1, 3, 7, −5, 1, −3}, {1, 3, −7, 5, 1, 5}, {1, 3, −7, −3, 1, −3}, {1, 3, −1, −5, 1, 5}, {1, 5, 1, −3, 3, 5}, {1, 5, 1, −3, 7, 5}, {1, 5, 1, −3, −5, 5}, {1, 5, 1, −3, −1, 5}, {1, 5, 3, −3, −7, 5}, {1, 5, 7, 3, −1, 5}, {1, 5, 7, −3, −7, 5}, {1, 5, −7, 3, 1, −3}, {1, 5, −7, 5, 1, 7}, {1, 5, −7, 7, 3, −1}, {1, 5, −7, −5, 1, −3}, {1, 5, −7, −1, 1, −3}, {1, 5, −5, 7, 3, 5}, {1, 5, −5, −3, −7, 5}, {1, 5, −1, −5, 7, 5}, {1, 5, −1, −3, −7, 5}, {1, 7, 3, −1, 3, 7}, {1, 7, −7, 5, 1, 5}, {1, 7, −7, −3, 1, −3}, {1, 7, −5, −1, 1, −3}, {1, −5, 7, 3, 1, 5}, {1, −5, −7, 5, 1, 5}, {1, −3, 1, 5, 7, −3}, {1, −3, 1, 5, −5, −3}, {1, −3, 3, 5, −7, −3}, {1, −3, −7, 3, 1, 5}, {1, −3, −7, 7, 1, 5}, {1, −3, −7, −5, 1, 5}, {1, −3, −7, −3, 1, −1}, {1, −3, −7, −1, 1, 5}, {1, −3, −5, 5, −7, −3}, {1, −3, −1, 3, 7, −3}, {1, −3, −1, 5, −7, −3}, {1, −1, 3, 7, 3, −1}, {1, −1, −7, 5, 1, 5}, and {1, −1, −5, 7, 1, 5};

{1, 3, −3, 1, 3, −3}, {1, 3, −3, 1, −5, −1}, {1, 3, −3, −7, 3, 7}, {1, 3, −3, −7, −5, 5}, {1, 3, −3, −1, 3, −3}, {1, 5, −1, −7, 3, 7}, {1, 7, 3, 1, 5, −1}, {1, 7, 3, 1, 7, 5}, {1, 7, 3, 1, −5, −1}, {1, 7, 3, 1, −3, 3}, {1, 7, 3, 5, −7, 3}, {1, 7, 3, 5, −1, 3}, {1, 7, 3, 7, 1, 3}, {1, 7, 3, −7, 3, 7}, {1, 7, 3, −7, 5, −5}, {1, 7, 3, −7, 7, −3}, {1, 7, 3, −7, −3, 7}, {1, 7, 3, −7, −1, −3}, {1, 7, 3, −3, 1, −5}, {1, 7, 3, −3, 7, −5}, {1, 7, 3, −1, −7, −5}, {1, 7, 5, 1, 7, 5}, {1, 7, 5, −7, −1, −3}, {1, 7, 5, −1, −7, −3}, {1, −5, −3, 1, −5, −3}, {1, −5, −3, 7, −5, 5}, {1, −5, −3, −7, 3, 5}, {1, −5, −3, −7, 3, 7}, {1, −5, −3, −1, 3, −3}, {1, −3, 3, 1, 3, −3}, {1, −3, 3, 1, 5, −1}, {1, −3, 3, 1, −5, −1}, {1, −3, 3, 5, −7, 3}, {1, −3, 3, 5, −1, 3}, {1, −3, 3, 7, −3, −5}, {1, −3, 3, −7, 3, 7}, {1, −3, 3, −7, −5, 5}, {1, −3, 3, −7, −3, 7}, {1, −3, 3, −3, 7, −5}, {1, −3, 3, −1, 5, 3}, {1, −1, 5, 1, −1, 5}, {1, −1, 5, −7, 7, −3}, and {1, −1, 5, −7, −3, 7};

{1, 1, 3, 5, −3, 7}, {1, 1, 3, −7, −1, 7}, {1, 1, 3, −5, 5, −1}, {1, 1, 3, −3, 7, −1}, {1, 1, 5, 7, −5, 5}, {1, 3, 1, −7, 3, −5}, {1, 3, 1, −5, 3, −5}, {1, 3, 1, −5, 5, −3}, {1, 3, 1, −5, 5, −1}, {1, 3, 3, −3, 5, −5}, {1, 3, 3, −3, 7, −1}, {1, 3, 5, 1, −5, 5}, {1, 3, 5, 1, −5, 7}, {1, 3, 5, 7, 3, −3}, {1, 3, 5, −7, −3, 7}, {1, 3, 5, −1, −7, 7}, {1, 3, 5, −1, −7, −3}, {1, 3, 5, −1, −3, 7}, {1, 5, 1, 3, −5, −7}, {1, 5, 1, 5, 5, −3}, {1, 5, 1, 5, −7, 1}, {1, 5, 1, 5, −7, −7}, {1, 5, 1, 5, −3, −3}, {1, 5, 1, 7, 3, −3}, {1, 5, 1, 7, 5, −5}, {1, 5, 1, 7, 5, −3}, {1, 5, 1, −7, 5, −3}, {1, 5, 1, −7, 7, −5}, {1, 5, 1, −3, 3, −3}, {1, 5, 1, −3, 5, −3}, {1, 5, 3, −5, 5, 7}, {1, 5, 3, −3, 7, 7}, {1, 5, 3, −3, 7, −5}, {1, 5, 3, −3, −3, 7}, {1, 5, 3, −1, 7, −5}, {1, 5, 3, −1, −7, −3}, {1, 5, 5, 1, −5, −1}, {1, 7, 1, 3, −7, 7}, {1, 7, 1, 3, −7, −7}, {1, 7, 1, 3, −5, −7}, {1, 7, 1, 3, −3, 3}, {1, 7, 1, 5, −7, 7}, {1, 7, 1, 7, 7, −1}, {1, 7, 1, 7, −7, 1}, {1, 7, 1, −7, −7, −5}, {1, 7, 1, −7, −5, 3}, {1, 7, 1, −5, −7, −3}, {1, 7, 1, −3, 3, 5}, {1, 7, 1, −3, 3, −1}, {1, 7, 1, −1, 3, 7}, {1, 7, 1, −1, 5, 7}, {1, 7, 3, 5, −3, 3}, {1, −7, 1, 1, 5, 7}, {1, −7, 1, 1, 7, 7}, {1, −7, 1, 3, 7, 7}, {1, −7, 1, 3, −7, 7}, {1, −7, 1, 3, −3, −5}, {1, −7, 1, 5, 7, 7}, {1, −7, 1, 7, 5, −1}, {1, −7, 1, −5, −7, −5}, {1, −7, 1, −5, −7, −1}, {1, −7, 1, −5, −5, 1},

{1, −7, 1, −5, −5, −3}, {1, −7, 1, −5, −5, −1}, {1, −7, 1, −5, −3, 1}, {1, −7, 1, −5, −3, 3}, {1, −7, 1, −3, −7, −3}, {1, −7, 1, −1, 5, 7}, {1, −7, 3, 3, −7, −5}, {1, −7, 3, 3, −5, −5}, {1, −7, 3, 5, −5, −5}, {1, −7, 3, 5, −3, 3}, {1, −7, 3, 5, −3, −5}, {1, −7, 3, 5, −3, −1}, {1, −7, 3, 7, 7, −1}, {1, −7, 3, −5, −3, −1}, {1, −7, 3, −1, −5, −3}, {1, −5, 1, 3, 5, 7}, {1, −5, 1, 3, −1, 5}, {1, −5, 1, 5, −7, 7}, {1, −5, 1, 7, −7, −7}, {1, −5, 1, −7, 7, −1}, {1, −5, 1, −7, −7, −1}, {1, −5, 1, −3, −7, −3}, {1, −5, 1, −3, −1, 5}, {1, −5, 1, −1, 7, −7}, {1, −5, 3, 1, 5, −1}, {1, −5, 3, 1, 7, −1}, {1, −5, 3, 5, 7, −1}, {1, −5, 3, 5, −3, −3}, {1, −5, 3, 7, −7, 5}, {1, −5, 3, −7, 7, −1}, {1, −5, 3, −7, −7, 1}, {1, −5, 3, −7, −7, −1}, {1, −5, 3, −7, −5, 1}, {1, −5, 5, 1, 3, 7}, {1, −5, 5, 1, −5, −3}, {1, −5, 5, 7, −5, −3}, {1, −5, 5, −7, −5, 5}, {1, −5, 5, −7, −5, −1}, {1, −5, 5, −1, 3, 5}, {1, −3, 1, 5, −3, −7}, {1, −3, 1, 5, −3, −5}, {1, −3, 1, 7, −5, −7}, {1, −3, 1, 7, −3, −5}, {1, −3, 1, −7, 7, −1}, {1, −3, 3, 1, 7, −1}, {1, −1, 1, 3, −3, 7}, {1, −1, 1, 5, −3, 7}, {1, −1, 1, 7, −1, −7}, {1, −1, 3, 7, −5, 5}, {1, −1, 3, −7, −3, 5}, {1, −1, 3, −7, −3, 7}, {1, −1, 3, −3, 7, 7}, and {1, −1, 3, −3, −3, 7};

{1, 1, 3, 5, −3, 7}, {1, 1, 3, −7, −1, 7}, {1, 1, 3, −5, 5, −1}, {1, 1, 3, −3, 7, −1}, {1, 1, 5, 7, −5, 5}, {1, 3, 1, −7, 3, −5}, {1, 3, 1, −5, 3, −5}, {1, 3, 1, −5, 5, −3}, {1, 3, 1, −5, 5, −1}, {1, 3, 3, −3, 5, −5}, {1, 3, 3, −3, 7, −1}, {1, 3, 5, 1, −5, 5}, {1, 3, 5, 1, −5, 7}, {1, 3, 5, 7, 3, −3}, {1, 3, 5, −7, −3, 7}, {1, 3, 5, −1, −7, 7}, {1, 3, 5, −1, −7, −3}, {1, 3, 5, −1, −3, 7}, {1, 5, 1, 3, −5, −7}, {1, 5, 1, 5, 5, −3}, {1, 5, 1, 5, −7, 1}, {1, 5, 1, 5, −7, −7}, {1, 5, 1, 5, −3, −3}, {1, 5, 1, 7, 3, −3}, {1, 5, 1, 7, 5, −5}, {1, 5, 1, 7, 5, −3}, {1, 5, 1, −7, 5, −3}, {1, 5, 1, −7, 7, −5}, {1, 5, 1, −3, 3, −3}, {1, 5, 1, −3, 5, −3}, {1, 5, 3, −5, 5, 7}, {1, 5, 3, −3, 7, 7}, {1, 5, 3, −3, 7, −5}, {1, 5, 3, −3, −3, 7}, {1, 5, 3, −1, 7, −5}, {1, 5, 3, −1, −7, −3}, {1, 5, 5, 1, −5, −1}, {1, 7, 1, 3, −7, 7}, {1, 7, 1, 3, −7, −7}, {1, 7, 1, 3, −5, −7}, {1, 7, 1, 3, −3, 3}, {1, 7, 1, 5, −7, 7}, {1, 7, 1, 7, 7, −1}, {1, 7, 1, 7, −7, 1}, {1, 7, 1, −7, −7, −5}, {1, 7, 1, −7, −5, 3}, {1, 7, 1, −5, −7, −3}, {1, 7, 1, −3, 3, 5}, {1, 7, 1, −3, 3, −1}, {1, 7, 1, −1, 3, 7}, {1, 7, 1, −1, 5, 7}, {1, 7, 3, 5, −3, 3}, {1, −7, 1, 1, 5, 7}, {1, −7, 1, 1, 7, 7}, {1, −7, 1, 3, 7, 7}, {1, −7, 1, 3, −7, 7}, {1, −7, 1, 3, −3, −5}, {1, −7, 1, 5, 7, 7}, {1, −7, 1, 7, 5, −1}, {1, −7, 1, −5, −7, −5}, {1, −7, 1, −5, −7, −1}, {1, −7, 1, −5, −5, 1}, {1, −7, 1, −5, −5, −3}, {1, −7, 1, −5, −5, −1}, {1, −7, 1, −5, −3, 1}, {1, −7, 1, −5, −3, 3}, {1, −7, 1, −3, −7, −3}, {1, −7, 1, −1, 5, 7}, {1, −7, 3, 3, −7, −5}, {1, −7, 3, 3, −5, −5}, {1, −7, 3, 5, −5, −5}, {1, −7, 3, 5, −3, 3}, {1, −7, 3, 5, −3, −5}, {1, −7, 3, 5, −3, −1}, {1, −7, 3, 7, 7, −1}, {1, −7, 3, −5, −3, −1}, {1, −7, 3, −1, −5, −3}, {1, −5, 1, 3, 5, 7}, {1, −5, 1, 3, −1, 5}, {1, −5, 1, 5, −7, 7}, {1, −5, 1, 7, −7, −7}, {1, −5, 1, −7, 7, −1}, {1, −5, 1, −7, −7, −1}, {1, −5, 1, −3, −7, −3}, {1, −5, 1, −3, −1, 5}, {1, −5, 1, −1, 7, −7}, {1, −5, 3, 1, 5, −1}, {1, −5, 3, 1, 7, −1}, {1, −5, 3, 5, 7, −1}, {1, −5, 3, 5, −3, −3}, {1, −5, 3, 7, −7, 5}, {1, −5, 3, −7, 7, −1}, {1, −5, 3, −7, −7, 1}, {1, −5, 3, −7, −7, −1}, {1, −5, 3, −7, −5, 1}, {1, −5, 5, 1, 3, 7}, {1, −5, 5, 1, −5, −3}, {1, −5, 5, 7, −5, −3}, {1, −5, 5, −7, −5, 5}, {1, −5, 5, −7, −5, −1}, {1, −5, 5, −1, 3, 5}, {1, −3, 1, 5, −3, −7}, {1, −3, 1, 5, −3, −5}, {1, −3, 1, 7, −5, −7}, {1, −3, 1, 7, −3, −5}, {1, −3, 1, −7, 7, −1}, {1, −3, 3, 1, 7, −1}, {1, −1, 1, 3, −3, 7}, {1, −1, 1, 5, −3, 7}, {1, −1, 1, 7, −1, −7}, {1, −1, 3, 7, −5, 5}, {1, −1, 3, −7, −3, 5}, {1, −1, 3, −7, −3, 7}, {1, −1, 3, −3, 7, 7}, and {1, −1, 3, −3, −3, 7}; or {1, 1, −7, 5, −1, 1}, {1, 1, −7, 7, −3, 1}, {1, 1, −7, −5, 5, 1}, {1, 1, −7, −3, 3, 1}, {1, 1, −7, −3, −5, 1}, {1, 1, −7, −1, −3, 1}, {1, 3, 7, 1, 5, 1}, {1, 3, −5, 3, 5, 1}, {1, 3, −5, 3, 5, −3}, {1, 3, −5, 7, −7, 1}, {1, 3, −5, 7, −5, 5}, {1, 3, −5, 7, −1, 1}, {1, 3, −5, −5, 3, −1}, {1, 3, −5, −3, 5, 1}, {1, 3, −3, 1, −5, −1}, {1, 3, −3, −7, 1, 1}, {1, 3, −1, 7, −7, 1}, {1, 5, 1, −7, −5, −1}, {1, 5, 3, −7, 1, 1}, {1, 5, 7, −1, −5, −1}, {1, 5, −5, −7, 1, 1}, {1, 5, −3, −5, 3, 1}, {1, 5, −1, 3, 5, −3}, {1, 5, −1, 3, −3, −1}, {1, 5, −1, 3, −1, 7}, {1, 7, 5, −7, 1, 1}, {1, 7, 5, −3, −3, 5}, {1, 7, −5, 3, 3, −5}, {1, −7, 1, 3, −5, 7}, {1, −7, 1, 3, −1, 7}, {1, −7, 5, 7, −1, 7}, {1, −7, 5, −7, 3, 7}, {1, −7, 5, −3, −1, 7}, {1, −7, 5, −1, 1, −7}, {1, −7, 7, −3, 1, −7}, {1, −7, 7, −1, 3, −5}, {1, −7, 7, −1, −3, 5}, {1, −7, −7, 1, 3, −3}, {1, −7, −7, 1, 5, −5}, {1, −7, −7, 1, 7, 5}, {1, −7, −7, 1, −3, 7}, {1, −7, −7, 1, −1, 5}, {1, −7, −5, 3, 5, −3}, {1, −7, −5, 3, −5, −3}, {1, −7, −5, 3, −1, 1}, {1, −7, −5, 3, −1, 7}, {1, −7, −5, 5, 1, −7}, {1, −7, −5, 7, −1, 1}, {1, −7, −5, −1, −7, −3}, {1, −7, −3, 3, 1, −7}, {1, −7, −3, 5, 3, −5}, {1, −7, −3, −5, 1, −7}, {1, −7, −1, −3, 1, −7}, {1, −5, 7, −1, −1, 7}, {1, −5, −3, 5, 5, −3}, {1, −5, −3, 7, −5, 5}, {1, −5, −1, −7, −5, 5}, {1, −5, −1, −7, −3, 7}, {1, −5, −1, −5, 3, 5}, {1, −3, 1, −5, −1, 1}, {1, −3, 5, 5, −3, −1}, {1, −3, 5, 7, −1, 1}, {1, −3, 5, 7, −1, 7}, {1, −3, 7, −7, 1, 1}, {1, −3, −1, 7, −1, 1}, {1, −1, 3, −5, −5, 3}, {1, −1, 5, −7, 1, 1}, {1, −1, 5, −3, −3, 5}, {1, −1, 7, 5, −3, 1}, {1, −1, 7, 7, −1, 3}, and {1, −1, 7, −5, 3, 1};

a generation unit, configured to generate a first signal based on the sequence $\{x_n\}$; and a sending unit, configured to send the first signal.

It should be understood that, the foregoing sequence may further be processed according to some or all of steps S301 to S304 in the foregoing embodiment. S301 to S304 may be implemented by one or more individual processing units or processors. The terminal device may alternatively be another network device.

In an embodiment, the set of the sequence $\{s_n\}$ includes at least one of sequences in a second sequence set, and the second sequence set includes some of the sequences in the first sequence set.

In an implementation of this embodiment, the generation unit is further configured to perform discrete Fourier transform on N elements in the sequence $\{x_n\}$ to obtain a sequence $\{f_n\}$ including N elements;

the generation unit is further configured to map the N elements in the sequence $\{f_n\}$ to N subcarriers respectively to obtain a frequency-domain signal including the N elements; and the generation unit is further configured to generate the first signal based on the frequency-domain signal.

In an implementation of this embodiment, the N subcarriers are N consecutive subcarriers, or N equi-spaced subcarriers.

In an implementation of this embodiment, the signal processing apparatus further includes a filter unit, configured to: filter the sequence $\{x_n\}$ before the discrete Fourier transform is performed on the N elements; or filter the sequence $\{x_n\}$ after the discrete Fourier transform is performed on the N elements.

In an implementation of this embodiment, the first signal is a reference signal of a second signal, and a modulation scheme of the second signal is π/2 binary phase shift keying BPSK.

The foregoing describes in detail the signal processing method according to the embodiments of this application, and the following describes a signal processing apparatus in the embodiments of this application.

Figure 10:
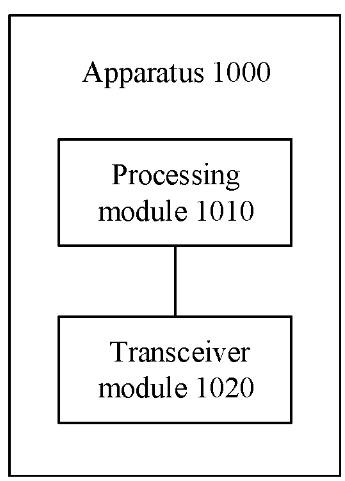
FIG. 10 is a schematic block diagram of a signal processing apparatus according to an embodiment of this application.

FIG. 10 is a schematic block diagram of a signal processing apparatus 1000 according to an embodiment of this application.

It should be understood that, the apparatus 1000 may correspond to the terminal in the embodiment shown in FIG. 4, and may have any function of the terminal in the method. The apparatus 1000 includes a transceiver module 1020 and a processing module 1010.

The processing module 1010 is configured to generate a reference signal of a first signal. The first signal is a signal modulated by using pi/2 BPSK, the reference signal is generated by using a first sequence, and a length of the first sequence is K.

The transceiver module 1020 is configured to send the reference signal on a first frequency-domain resource. The first frequency-domain resource includes K subcarriers each having a subcarrier number of k, k=u+L*n+delta, n=0, 1, . . . , K−1, L is an integer greater than or equal to 2, delta∈{0, 1, . . . , L−1}, u is an integer, and the subcarrier numbers are numbered in ascending or descending order of frequencies.

The processing module 1010 is specifically configured to:

determine the first sequence, where the first sequence varies as a delta value varies. In an embodiment, that the first sequence varies means that a base sequence {s(n)} of the first sequence varies as the delta value vanes.

Optionally, a modulation scheme of the first sequence is neither BPSK modulation nor π/2 BPSK modulation.

Optionally, the first sequence is a sequence modulated by using any one of 8PSK, 16PSK, or 32PSK.

Optionally, the processing module is further configured to determine the first sequence in a first sequence group. The first sequence group is one of a plurality of sequence groups, and the first sequence is determined, based on the delta value, in a plurality of sequences that are in the first sequence group and whose length is K.

Optionally, the processing module is further configured to determine the first sequence group based on a cell identifier or a sequence group identifier.

Optionally, the transceiver module is further configured to receive indication information, and the indication information is used to indicate a sequence that is in each of at least two sequence groups and used to generate the reference signal.

Optionally, when delta=0, the processing module is specifically configured to:

perform discrete Fourier transform on elements in a sequence {z(t)} to obtain a sequence {f(t)} with t=0, . . . , L*K−1, where when t=0, 1, . . . , L*K−1, z(t)=x(t mod K), and x(t) represents the first sequence; and map elements numbered L*p+delta in the sequence {f(t)} to the subcarriers each having the subcarrier number of u+L*p+delta respectively, to generate the reference signal, where p=0, . . . , K−1.

Optionally, when L=2 and delta=1, the processing module is specifically configured to:

perform discrete Fourier transform on elements in a sequence {z(t)} to obtain a sequence {f(t)} with t=0, . . . , L*K−1, where when t=0, . . . , K−1, z(t)=x(t), when t=K, . . . , L*K−1, z(t)=−x(t mod K), and x(t) represents the first sequence; and map elements numbered L*p+delta in the sequence {f(t)} to the subcarriers each having the subcarrier number of u+L*p+delta respectively, to generate the reference signal, where p=0, . . . , K−1.

Optionally, when L=4, the processing module is specifically configured to:

perform discrete Fourier transform on elements in a sequence {z(t)} to obtain a sequence {f(t)} with t=0, . . . , 4K−1, where when t=0, 1, . . . , 4K−1, $$z(t) = w_{delta}\left(\left\lfloor \frac{t}{K} \right\rfloor\right)x(t \bmod K),$$

where $w_0$=(1, 1, 1, 1), $w_1$=(1, −1, 1, −1), $w_2$=(1, 1, −1, −1), $w_3$=(1, −1, −1, 1), ⌊c⌋ represents rounding down of c, and x(t) represents the first sequence, where in another embodiment, $w_0$=(1, 1, 1, 1), $w_1$=(1, j, −1, −j), $w_2$=(1, −1, 1, −1), and $w_3$=(1, −j, −1, j); and map elements numbered 4p+delta in the sequence {f(t)} to the subcarriers each having the subcarrier number of u+L*p+delta respectively to generate the reference signal, where p=0, . . . , K−1.

Optionally, the processing module is specifically configured to:

perform discrete Fourier transform on elements in a sequence {x(t)} to obtain a sequence {f(t)} with t=0, . . . , K−1, where x(t) represents the first sequence; and map elements numbered p in the sequence {f(t)} to the subcarriers each having the subcarrier number of u+L*p+delta respectively to generate the reference signal, where p=0, . . . , K−1.

Optionally, the processing module is specifically configured to:

perform discrete Fourier transform on the sequence {z(t)}; and filter a sequence obtained after the discrete Fourier transform, to generate the sequence {f(t)}.

Figure 11:
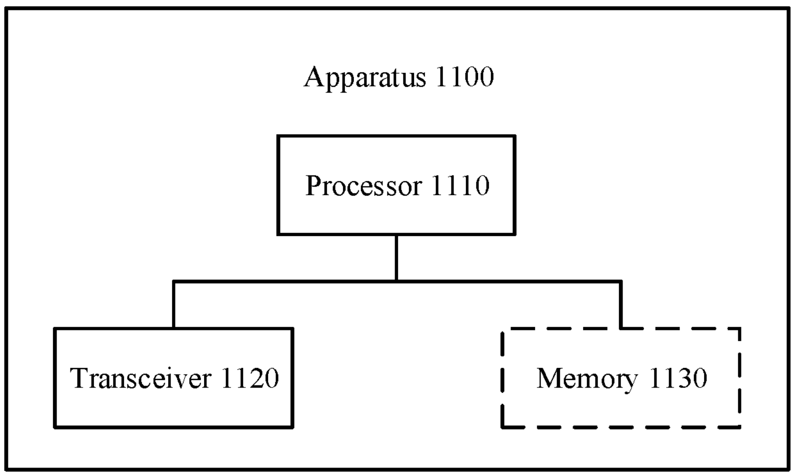
FIG. 11 is a schematic block diagram of a signal processing apparatus according to another embodiment of this application.

FIG. 11 is a schematic block diagram of a signal processing apparatus 1100 according to an embodiment of this application. The apparatus 1100 may be the terminal shown in FIG. 1 and the terminal shown in FIG. 4. The apparatus may use a hardware architecture shown in FIG. 11. The apparatus may include a processor 1110 and a transceiver 1120. Optionally, the apparatus may further include a memory 1130. The processor 1110, the transceiver 1120, and the memory 1130 communicate with each other through an internal connection path. A related function implemented by the processing module 1020 in FIG. 10 may be implemented by the processor 1110, and a related function implemented by the transceiver module 1010 may be implemented by the processor 1110 by controlling the transceiver 1120.

Optionally, the processor 1110 may be a general-purpose central processing unit (CPU), a microprocessor, an application-specific integrated circuit (ASIC), a dedicated processor, or one or more integrated circuits configured to perform the technical solutions in the embodiments of this application. Alternatively, the processor may be one or more devices, circuits, and/or processing cores for processing data (for example, a computer program instruction). For example, the processor may be a baseband processor or a central processing unit. The baseband processor may be configured to process a communication protocol and communication data. The central processing unit may be configured to: control the apparatus (for example, a base station, a terminal, or a chip), execute a software program, and process data of the software program.

Optionally, the processor 1110 may include one or more processors, for example, include one or more central processing units (CPU). When the processor is one CPU, the CPU may be a single-core CPU or a multi-core CPU.

The transceiver 1120 is configured to: send data and/or a signal, and receive data and/or a signal. The transceiver may include a transmitter and a receiver. The transmitter is configured to send data and/or a signal, and the receiver is configured to receive data and/or a signal.

The memory 1130 includes but is not limited to a random access memory (RAM), a read-only memory (ROM), an erasable programmable read-only memory (EPROM), and a compact disc read-only memory (CD-ROM). The memory 1130 is configured to store a related instruction and related data.

The memory 1130 is configured to store program code and data of the terminal, and may be a separate component or integrated into the processor 1110.

Specifically, the processor 1110 is configured to control the transceiver to perform information transmission with a network device. For details, refer to the descriptions in the foregoing method embodiments. Details are not described herein again.

It may be understood that FIG. 11 shows merely a simplified design of the signal processing apparatus. During actual application, the apparatus may further include other necessary elements, including but not limited to any quantity of transceivers, processors, controllers, memories, and the like, and all terminals that can implement this application shall fall within the protection scope of this application.

In a possible design, the apparatus 1100 may be a chip, for example, may be a communications chip that can be used in the terminal, and is configured to implement a related function of the processor 1110 in the terminal. The chip may be a field programmable gate array, dedicated integrated chip, system chip, central processing unit, network processor, digital signal processing circuit, or microcontroller that implements a related function, or may be a programmable controller or another integrated chip. Optionally, the chip may include one or more memories, configured to store program code. When the code is executed, the processor is enabled to implement a corresponding function.

During specific implementation, in an embodiment, the apparatus 1100 may further include an output device and an input device. The output device communicates with the processor 1110, and may display information in a plurality of manners. For example, the output device may be a liquid crystal display (LCD), a light emitting diode (LED) display device, a cathode ray tube (CRT) display device, a projector, or the like. When communicating with the processor 1110, the input device may receive an input of a user in a plurality of manners. For example, the input device may be a mouse, a keyboard, a touchscreen device, or a sensing device.

Figure 12:
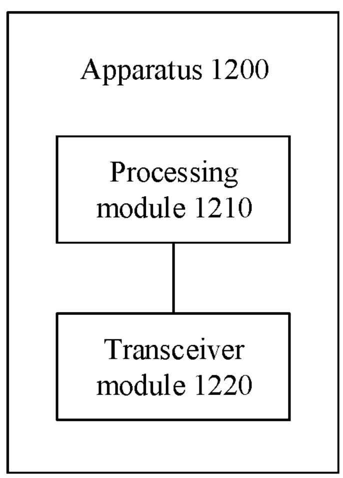
FIG. 12 is a schematic block diagram of a signal processing apparatus according to another embodiment of this application.

FIG. 12 is a schematic block diagram of a signal processing apparatus 1200 according to an embodiment of this application.

It should be understood that the apparatus 1200 may correspond to the network device in the embodiment shown in FIG. 4, and may have any function of the network device in the method. The apparatus 1200 includes a transceiver module 1220 and a processing module 1210.

The processing module 1210 is configured to generate a local sequence. The local sequence is a first sequence or a conjugate transpose of a first sequence, and the local sequence is used to process a first signal. The first signal is a signal modulated by using pi/2 BPSK.

The transceiver module 1220 is configured to receive a reference signal of the first signal on a first frequency-domain resource. The first frequency-domain resource includes K subcarriers each having a subcarrier number of k, $k=u+M*n+delta$, $n=0, 1, \ldots, K-1$, M is an integer greater than or equal to 2, $delta \in \{0, 1, \ldots, M-1\}$, u is an integer, and the subcarrier numbers are numbered in ascending or descending order of frequencies. The reference signal is generated by using the first sequence. The first sequence varies as a delta value varies.

Optionally, the transceiver module is further configured to send indication information. The indication information is used to indicate a sequence that is in each of at least two sequence groups and used to generate the reference signal.

Figure 13:
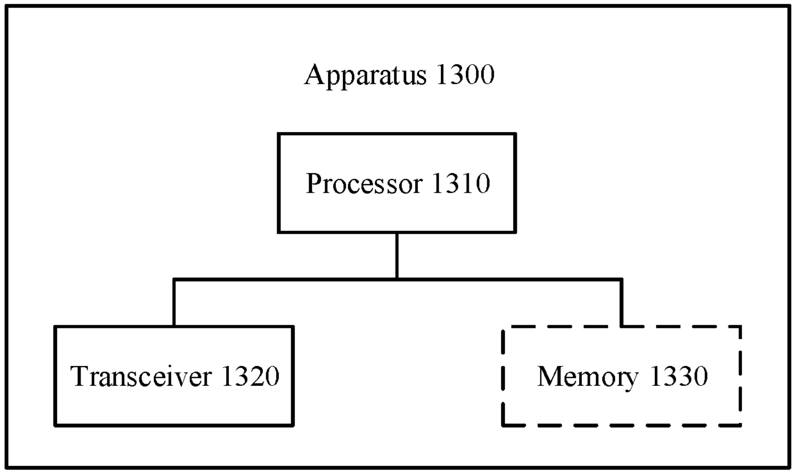
FIG. 13 is a schematic block diagram of a signal processing apparatus according to another embodiment of this application.

FIG. 13 shows a signal processing apparatus 1300 according to an embodiment of this application. The apparatus 1300 may be the network device shown in FIG. 1 and the network device in FIG. 4. The apparatus may use a hardware architecture shown in FIG. 13. The apparatus may include a processor 1310 and a transceiver 1320. Optionally, the apparatus may further include a memory 1330. The processor 1310, the transceiver 1320, and the memory 1330 communicate with each other through an internal connection path. A related function implemented by the processing module 1220 in FIG. 12 may be implemented by the processor 1310, and a related function implemented by the transceiver module 1210 may be implemented by the processor 1310 by controlling the transceiver 1320.

Optionally, the processor 1310 may be a general-purpose central processing unit (CPU), a microprocessor, an application-specific integrated circuit (ASIC), a dedicated processor, or one or more integrated circuits configured to perform the technical solutions in the embodiments of this application. Alternatively, the processor may be one or more devices, circuits, and/or processing cores for processing data (for example, a computer program instruction). For example, the processor may be a baseband processor or a central processing unit. The baseband processor may be configured to process a communication protocol and communication data. The central processing unit may be configured to: control the apparatus (for example, a base station, a terminal, or a chip), execute a software program, and process data of the software program.

Optionally, the processor 1310 may include one or more processors, for example, include one or more central processing units (CPU). When the processor is one CPU, the CPU may be a single-core CPU or a multi-core CPU.

The transceiver 1320 is configured to: send data and/or a signal and receive data and/or a signal. The transceiver may include a transmitter and a receiver. The transmitter is configured to send data and/or a signal, and the receiver is configured to receive data and/or a signal.

The memory 1330 includes but is not limited to a random access memory (RAM), a read-only memory (ROM), an erasable programmable read-only memory (EPROM), and a compact disc read-only memory (CD-ROM). The memory 1330 is configured to store a related instruction and related data.

The memory 1330 is configured to store program code and data of the terminal, and may be a separate component or integrated into the processor 1310.

Specifically, the processor 1310 is configured to control the transceiver to perform information transmission with the terminal. For details, refer to the descriptions in the foregoing method embodiments. Details are not described herein again.

During specific implementation, in an embodiment, the apparatus 1300 may further include an output device and an input device. The output device communicates with the processor 1310, and may display information in a plurality of manners. For example, the output device may be a liquid crystal display (LCD), a light emitting diode (LED) display device, a cathode ray tube (CRT) display device, a projector, or the like. When communicating with the processor 1310, the input device may receive an input of a user in a plurality of manners. For example, the input device may be a mouse, a keyboard, a touchscreen device, or a sensing device.

It may be understood that FIG. 13 shows merely a simplified design of the signal processing apparatus. During actual application, the apparatus may further include other necessary elements, including but not limited to any quantity of transceivers, processors, controllers, memories, and the like, and all terminals that can implement this application shall fall within the protection scope of this application.

In a possible design, the apparatus 1300 may be a chip, for example, may be a communications chip that can be used in the terminal and is configured to implement a related function of the processor 1310 in the terminal. The chip may be a field programmable gate array, dedicated integrated chip, system chip, central processing unit, network processor, digital signal processing circuit, or microcontroller that implements a related function, or may be a programmable controller or another integrated chip. Optionally, the chip may include one or more memories, configured to store program code. When the code is executed, the processor is enabled to implement a corresponding function.

An embodiment of this application further provides an apparatus. The apparatus may be a terminal or a circuit. The apparatus may be configured to perform an action performed by the terminal in the foregoing method embodiments.

Figure 14:
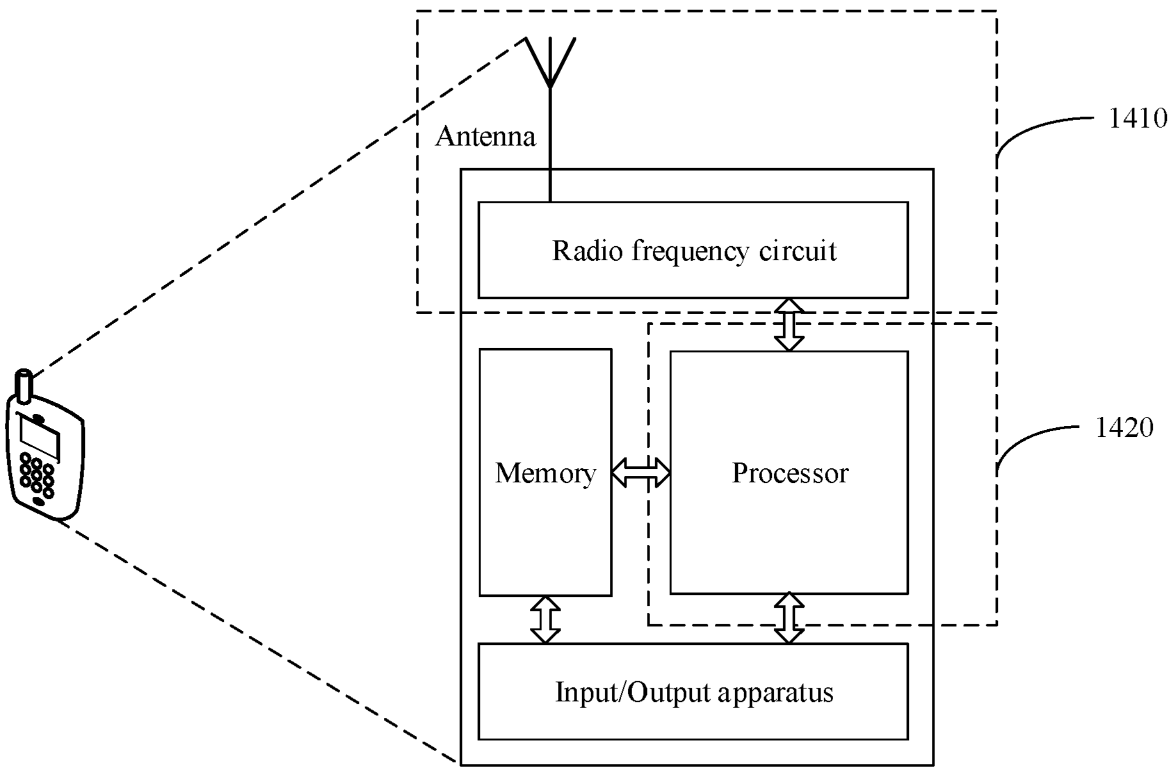
FIG. 14 is a schematic block diagram of a signal processing apparatus according to a specific embodiment of this application.

Optionally, when the apparatus in this embodiment is a terminal, FIG. 14 is a simplified schematic structural diagram of a terminal. For ease of understanding and convenience of figure illustration, an example in which the terminal is a mobile phone is used in FIG. 14. As shown in FIG. 14, the terminal includes a processor, a memory, a radio frequency circuit, an antenna, and an input/output apparatus. The processor is mainly configured to: process a communication protocol and communication data, control the terminal to execute a software program, process data of the software program, and so on. The memory is mainly configured to store the software program and data. The radio frequency circuit is mainly configured to: perform conversion between a baseband signal and a radio frequency signal and process the radio frequency signal. The antenna is mainly configured to send and receive a radio frequency signal in an electromagnetic wave form. The input/output apparatus, such as a touchscreen, a display, or a keyboard, is mainly configured to receive data input by a user and data output to the user. It should be noted that some types of terminals may not have an input/output apparatus.

When data needs to be sent, the processor performs baseband processing on the to-be-sent data, and then outputs a baseband signal to the radio frequency circuit. The radio frequency circuit performs radio frequency processing on the baseband signal, and then sends the radio frequency signal in an electromagnetic wave form via the antenna. When data is sent to the terminal, the radio frequency circuit receives a radio frequency signal via the antenna, converts the radio frequency signal into a baseband signal, and outputs the baseband signal to the processor. The processor converts the baseband signal into data and processes the data. For ease of description, FIG. 14 shows only one memory and one processor. In an actual terminal product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, an antenna and a radio frequency circuit that have receiving and sending functions may be considered as a transceiver unit of the terminal, and a processor that has a processing function may be considered as a processing unit of the terminal. As shown in FIG. 14, the terminal includes a transceiver unit 1410 and a processing unit 1420. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1410 and that is configured to implement a receiving function may be considered as a receiving unit, and a component that is in the transceiver unit 1410 and that is configured to implement a sending function may be considered as a sending unit. In other words, the transceiver unit 1410 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiving circuit, or the like. The sending unit sometimes may also be referred to as a transmitter machine, a transmitter, a transmitter circuit, or the like.

It should be understood that the transceiver unit 1410 is configured to perform a sending operation and a receiving operation on the terminal side in the foregoing method embodiments, and the processing unit 1420 is configured to perform another operation other than the sending and receiving operations of the terminal in the foregoing method embodiments.

For example, in an implementation, the processing unit 1420 is configured to perform an operation in step 403 in FIG. 4, and/or the processing unit 1420 is further configured to perform another processing step on the terminal side in the embodiments of this application. The transceiver unit 1410 is configured to perform sending and receiving operations in step 401, step 402, and/or step 404 in FIG. 4, and/or the transceiver unit 1410 is further configured to perform other sending and receiving steps on the terminal side in the embodiments of this application.

When the communications apparatus is a chip, the chip includes a transceiver unit and a processing unit. The transceiver unit may be an input/output circuit or a communications interface. The processing unit is a processor, a microprocessor, or an integrated circuit, integrated on the chip.

Figure 15:
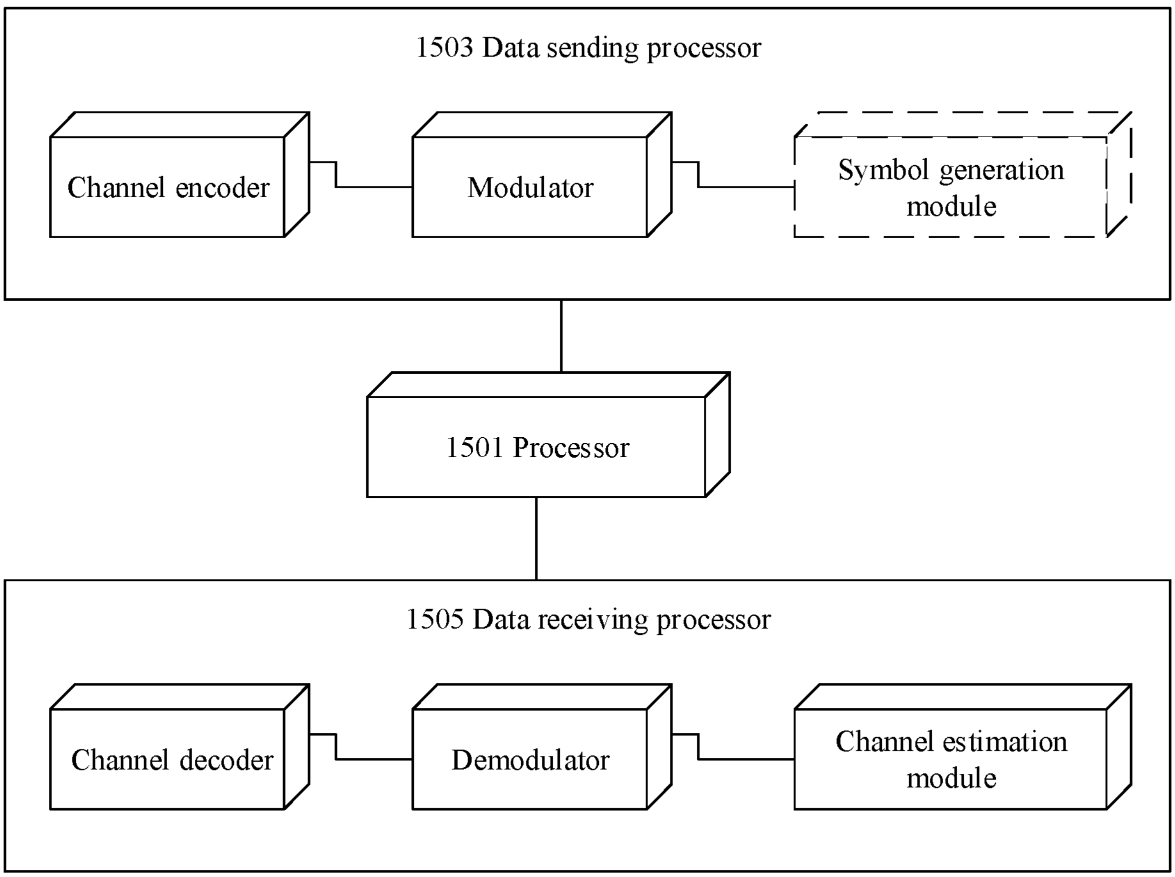
FIG. 15 is a schematic block diagram of a signal processing apparatus according to another specific embodiment of this application.

Optionally, when the apparatus is a terminal, reference may be further made to a device shown in FIG. 15. In an example, the device may implement a function similar to that of the processor 1410 in FIG. 14. In FIG. 15, the device includes a processor 1501, a data sending processor 1503, and a data receiving processor 1505. The processing module 1010 and the processing module 1210 in the foregoing embodiments each may be the processor 1501 in FIG. 15, and complete a corresponding function. The transceiver module 1020 and the transceiver module 1220 in the foregoing embodiments may be the data sending processor 1503 and the data receiving processor 1505 in FIG. 15. Although a channel encoder and a channel decoder are shown in the FIG. 15, it may be understood that the modules are merely an example and do not constitute a limitation on this embodiment.

Figure 16:
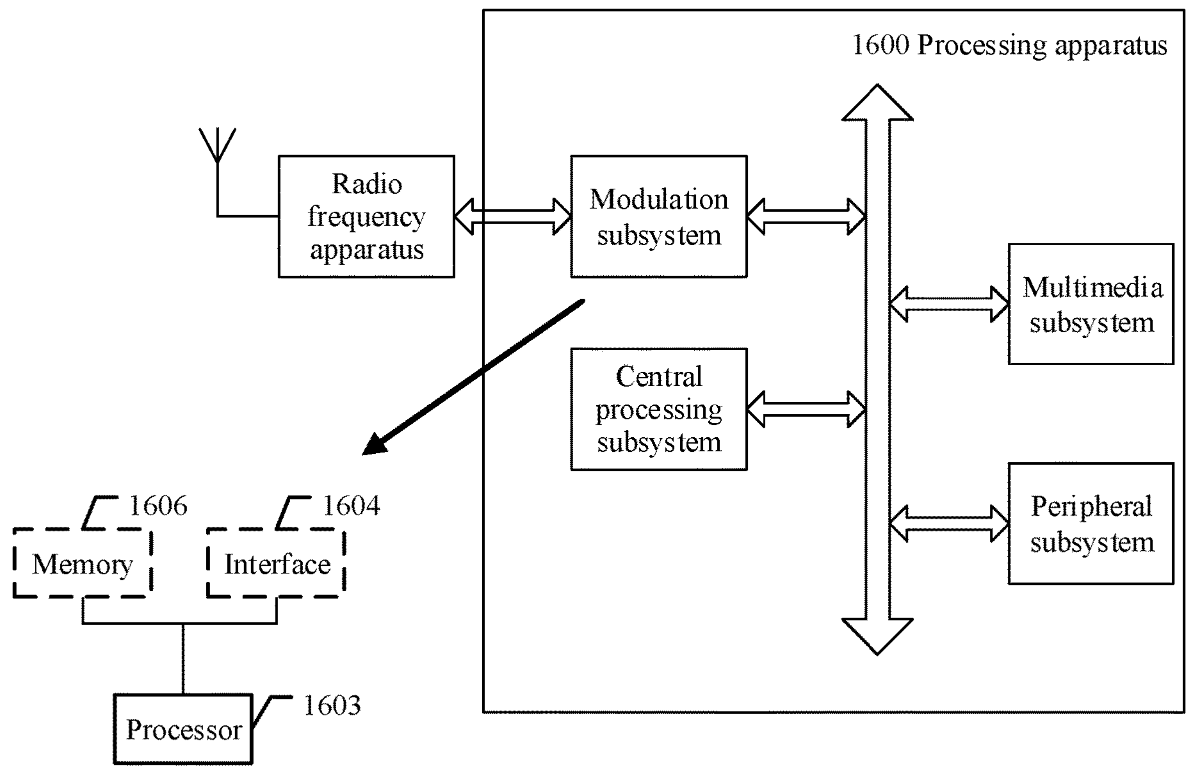
FIG. 16 is a schematic block diagram of a signal processing apparatus according to another specific embodiment of this application.

FIG. 16 shows another form of this embodiment. A processing apparatus 1600 includes modules such as a modulation subsystem, a central processing subsystem, and a peripheral subsystem. A communications device in this embodiment may be used as the modulation subsystem in the processing apparatus 1600. Specifically, the modulation subsystem may include a processor 1603 and an interface 1604. The processor 1603 implements a function of the processing module 1010, and the interface 1604 implements a function of the transceiver module 1020. In another variant, the modulation subsystem includes a memory 1606, a processor 1603, and a program that is stored in the memory 1603 and that can be run by the processor. When executing the program, the processor implements the method according to any one of the foregoing embodiments. It should be noted that the memory 1606 may be nonvolatile or volatile. The memory 1606 may be located in the modulation subsystem, or may be located in the processing apparatus 1600, as long as the memory 1606 can be connected to the processor 1603.

Figure 17:
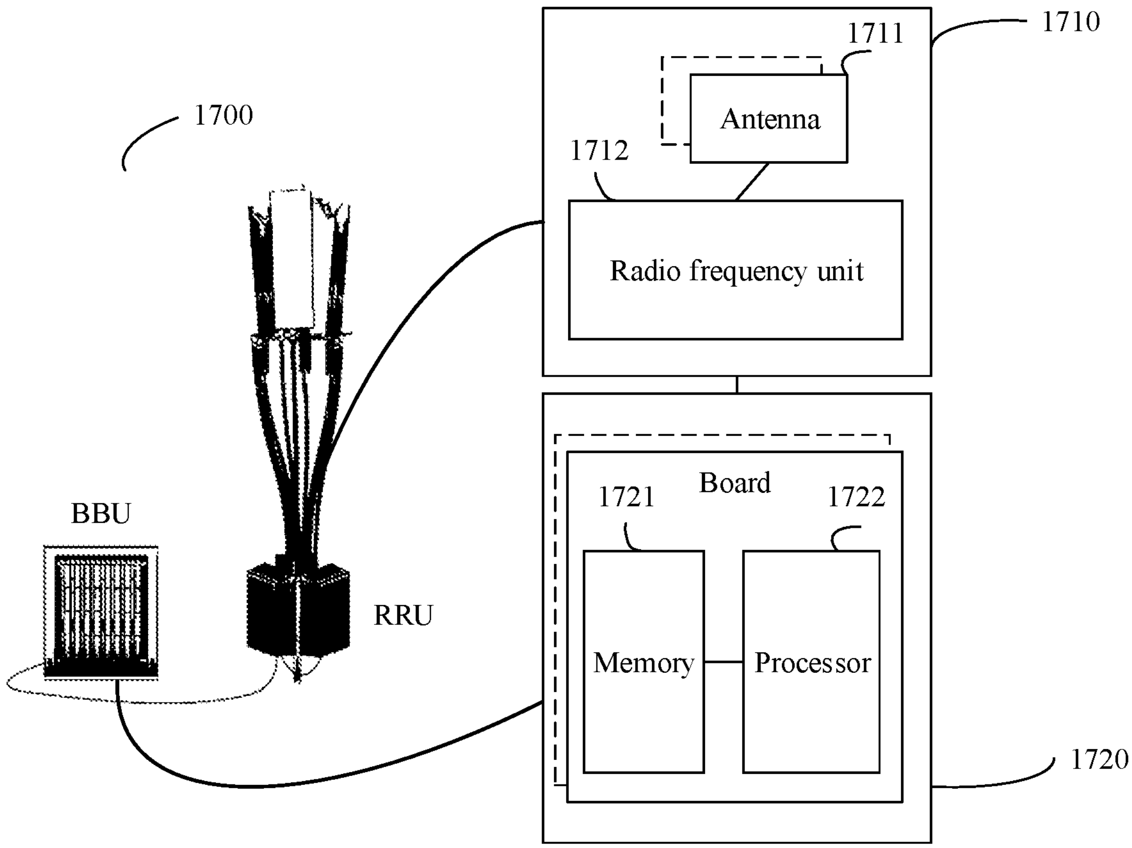
FIG. 17 is a schematic block diagram of a signal processing apparatus according to another specific embodiment of this application.

When the apparatus in this embodiment is a network device, the network device may be shown in FIG. 17. An apparatus 1700 includes one or more radio frequency units, such as a remote radio unit (RRU) 1710, and one or more baseband units (BBU) (which may also be referred to as a digital unit, DU) 1720. The RRU 1710 may be referred to as a transceiver module and corresponds to the transceiver unit 1220 in FIG. 12. Optionally, the transceiver module may also be referred to as a transceiver machine, a transceiver circuit, a transceiver, or the like and may include at least one antenna 1715 and a radio frequency unit 1716. The RRU 1710 is mainly configured to: receive and send a radio frequency signal, and perform conversion between a radio frequency signal and a baseband signal, for example, configured to send indication information to a terminal device. The BBU 1710 is mainly configured to: perform baseband processing, control a base station, and so on. The RRU 1710 and the BBU 1720 may be physically disposed together, or may be physically separated, namely, a distributed base station.

The BBU 1720 is a control center of the base station, and may also be referred to as a processing module. The BBU 1720 may correspond to the processing unit 1210 in FIG. 12, and is mainly configured to implement a baseband processing function, for example, channel coding, multiplexing, modulation, or spreading. For example, the BBU (processing module) may be configured to control the base station to execute an operation procedure related to the network device in the foregoing method embodiments, for example, to generate the indication information.

In an example, the BBU 1720 may include one or more boards, and a plurality of boards may jointly support a radio access network (such as an LTE network) having a single access standard, or may separately support radio access networks (for example, an LTE network, a 5G network, or another network) having different access standards. The BBU 1720 further includes a memory 1721 and a processor 1722. The memory 1721 is configured to store a necessary instruction and necessary data. The processor 1722 is configured to control the base station to perform a necessary action, for example, configured to control the base station to perform an operation procedure related to the network device in the foregoing method embodiments. The memory 1721 and the processor 1722 may serve one or more boards. In other words, a memory and a processor may be independently disposed on each board. Alternatively, a plurality of boards may share a same memory and a same processor. In addition, a necessary circuit may further be disposed on each board.

In another form of this embodiment, a computer-readable storage medium is provided. The computer-readable storage medium stores an instruction. When the instruction is executed, a method in the foregoing method embodiments is performed.

In another form of this embodiment, a computer program product including an instruction is provided. When the instruction is executed, a method in the foregoing method embodiments is performed.

All or some of the foregoing embodiments may be implemented by using software, hardware, firmware, or any combination thereof. When being implemented by using the software, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high density digital video disc (DVD)), a semiconductor medium (for example, a solid-state drive (SSD)), or the like.

It should be understood that, the processor may be an integrated circuit chip, and has a signal processing capability. In an implementation process, the steps in the foregoing method embodiments may be completed by using a hardware integrated logical circuit in the processor or an instruction in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The methods, the steps, and logical block diagrams that are disclosed in the embodiments of this application may be implemented or performed. The general-purpose processor may be a microprocessor, or the processor may be any conventional processor or the like. The steps of the methods disclosed with reference to the embodiments of this application may be directly executed and completed by using a hardware decoding processor, or may be executed and completed by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and the processor reads information in the memory and completes the steps in the foregoing methods in combination with hardware of the processor.

It may be understood that the memory in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through examples but not limitative descriptions, RAMs in many forms are used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM).

In this application, "at least one" means one or more, and "a plurality of" means two or more. The term "and/or" describes an association relationship between associated objects and may indicate three relationships. For example, A and/or B may indicate the following cases: Only A exists, both A and B exist, and only B exists, where A and B may be singular or plural. The character "/" generally indicates an "or" relationship between the associated objects. "At least one item (piece) of the following" or a similar expression thereof means any combination of these items, including any combination of singular items (pieces) or plural items (pieces). For example, at least one (piece) of a, b, or c may indicate: a, b, c, a-b, a-c, b-c, or a-b-c, where a, b, and c may be singular or plural.

It should be understood that "one embodiment" or "an embodiment" mentioned in the whole specification means that particular features, structures, or characteristics related to the embodiment are included in at least one embodiment of the present disclosure. Therefore, "in one embodiment" or "in an embodiment" appearing throughout the entire specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments of the present disclosure. The execution sequences of the processes should be determined based on functions and internal logic of the processes and should not be construed as any limitation on the implementation processes of the embodiments of the present disclosure.

Terms such as "part", "module", and "system" used in this specification are used to indicate computer-related entities, hardware, firmware, combinations of hardware and software, software, or software being executed. For example, a part may be, but is not limited to, a process, processor, object, executable file, thread of execution, program, and/or computer that runs on a processor. As shown in figures, both a computing device and an application running on a computing device may be parts. One or more parts may reside within a process and/or a thread of execution, and the part may be located on one computer and/or distributed between two or more computers. In addition, these parts may be executed from various computer-readable media that store various data structures. For example, the parts may communicate by using a local and/or remote process and based on, for example, a signal having one or more data packets (for example, data from two parts interacting with another part in a local system, a distributed system, and/or across a network such as the internet interacting with other systems by using the signal).

It should be understood that, first, second, and various numerical symbols are for distinguishing only for ease of description, and are not used to limit a scope of the embodiments of this application.

It should be understood that the term "and/or" in this specification describes only an association relationship for describing associated objects and represents that three relationships may exist. For example, A and/or B may represent the following three cases: Only A exists, both A and B exist, and only B exists. A or B exists separately, and a quantity of A or B is not limited. In an example in which only A exists, it may be understood that there is one or more As.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by the person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the apparatus embodiments described above are merely examples. For example, division into the units is merely logical function division, and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed to a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium and includes several instructions for instructing a computer device (which may be a personal computer, a server, or a network device) to perform all or some of the steps of the method described in the embodiments of this application.

The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by the person skilled in the art within the technical scope disclosed in this application shall fall within the protection scope of this application. Therefore, the protection scope of this application shall be subject to the protection scope of the claims.

What is claimed is:

1. A signal processing method, comprising:

determining a first sequence {x(n)} based on a preset condition and a sequence {s(n)}, wherein the preset condition is $x_n = y_{(n+M) mod K}$, wherein $$y_n = A \cdot e^{\frac{j \times \pi \times s_n}{8}},$$

$M \in \{0, 1, 2, \ldots, 5\}$, a length of the first sequence is K=6, n=0, 1, . . . , K−1, A is a non-zero complex number, and $j=\sqrt{-1}$; and wherein the sequence {s(n)} comprises at least one of the following sequences:

{1, −3, 1, 5, −1, 3}, {1, −3, 1, −7, 7, −5}, {1, 5, 1, −5, −1, −3}, {1, 5, 1, −3, 1, 5}, {1, 7, 1, −5, −7, −1}, {1, 5, 1, 5, −5, 5}, {1, 5, 1, −1, 3, 7}, {1, −3, 1, −5, −1, 3}, {1, −3, 1, 5, 3, 7}, {1, 5, 3, 7, −1, −5};

generating a reference signal of a first signal, wherein the first signal is a signal modulated by using π/2 binary phase shift keying (BPSK), and the reference signal is generated by using the first sequence; and sending the reference signal on a first frequency-domain resource, wherein the first frequency-domain resource comprises K subcarriers each having a subcarrier number of k, k=u+L*n+delta, L is an integer greater than or equal to 2, delta∈{0, 1, . . . , L−1}, u is an integer, and subcarrier numbers of the K subcarriers are numbered in ascending or descending order of frequencies.

2. The method according to claim 1, wherein a modulation scheme of the first sequence is neither BPSK modulation nor π/2 BPSK modulation.

3. The method according to claim 1, wherein the first sequence is a sequence modulated by using any one of 8PSK, 16PSK, or 32PSK.

4. The method according to claim 1, wherein the method further comprises:

determining the first sequence in a first sequence group, wherein the first sequence group is one of a plurality of sequence groups, and wherein the first sequence is determined, based on a value of the delta, in a plurality of sequences that are in the first sequence group and whose length is K.

5. The method according to claim 4, wherein the method further comprises:

determining the first sequence group based on a cell identifier or a sequence group identifier.

6. The method according to claim 4, wherein the method further comprises:

receiving indication information, wherein the indication information is used to indicate a sequence that is in each sequence group of at least two sequence groups and is used to generate the reference signal.

7. The method according to claim 1, wherein when the value of the delta is 0, the generating a reference signal of a first signal comprises:

performing discrete Fourier transform on elements in a sequence {z(t)} to obtain a sequence {f(t)} with t=0, . . . , L*K−1, wherein when t=0, 1, . . . , L*K−1, z(t)=x(t mod K), and x(t) represents the first sequence; and mapping elements numbered L*p+delta in the sequence {f(t)} to subcarriers each having the subcarrier number of u+L*p+delta, respectively, to generate the reference signal, wherein p=0, . . . , K−1.

8. The method according to claim 7, wherein the performing discrete Fourier transform on elements in a sequence {z(t)} to obtain a sequence {f(t)} comprises:

performing the discrete Fourier transform on the sequence {z(t)}; and filtering a sequence obtained after the discrete Fourier transform to generate the sequence {f(t)}.

9. The method according to claim 1, wherein when the value of the delta is 1, the generating a reference signal of a first signal comprises:

performing discrete Fourier transform on elements in a sequence {z(t)} to obtain a sequence {f(t)} with t=0, . . . , L*K−1, wherein when t=0, . . . , K−1, z(t)=x(t), and wherein when t=K, . . . , L*K−1, z(t)=−x(t mod K), and x(t) represents the first sequence; and mapping elements numbered L*p+delta in the sequence {f(t)} to subcarriers each having the subcarrier number of u+L*p+delta, respectively, to generate the reference signal, wherein p=0, . . . , K−1.

10. The method according to claim 1, wherein when L=4, the generating a reference signal of a first signal comprises:

performing discrete Fourier transform on elements in a sequence {z(t)} to obtain a sequence {f(t)} with t=0, . . . , 4K−1, wherein when t=0, 1, . . . , 4K−1, $$z(t) = w_{delta}\left(\left\lfloor \frac{t}{K} \right\rfloor\right) x(t \bmod K),$$

and wherein $w_0=(1, 1, 1, 1)$, $w_1=(1, j, -1, -j)$, $w_2=(1, -1, 1, -1)$, $w_3=(1, -j, -1, j)$, $\lfloor c \rfloor$ represents rounding down of c, and x(t) represents the first sequence; and mapping elements numbered 4p+delta in the sequence {f(t)} to subcarriers each having the subcarrier number of u+L*p+delta, respectively, to generate the reference signal, wherein p=0, . . . , K−1.

11. The method according to claim 1, wherein the generating a reference signal of a first signal comprises:

performing discrete Fourier transform on elements in a sequence {x(t)} to obtain a sequence {f(t)} with t=0, . . . , K−1, wherein x(t) represents the first sequence; and mapping elements numbered p in the sequence {f(t)} to subcarriers each having the subcarrier number of u+L*p+delta, respectively, to generate the reference signal, wherein p=0, . . . , K−1.

12. A signal processing apparatus, comprising:

at least one processor;

one or more memories coupled to the at least one processor and storing programming instructions for execution by the at least one processor to:

determine a first sequence {x(n)} based on a preset condition and a sequence {s(n)}, wherein the preset condition is $x_n = y_{(n+M) mod K}$, wherein $$y_n = A \cdot e^{\frac{j \times \pi \times s_n}{8}},$$

$M \in \{0, 1, 2, \ldots, 5\}$, a length of the first sequence is K=6, n=0, 1, . . . , K−1, A is a non-zero complex number, and $j=\sqrt{-1}$; and wherein the sequence {s(n)} comprises at least one of the following sequences:

{1, −3, 1, 5, −1, 3}, {1, −3, 1, −7, 7, −5}, {1, 5, 1, −5, −1, −3}, {1, 5, 1, −3, 1, 5}, {1, 7, 1, −5, −7, −1}, {1, 5, 1, 5, −5, 5}, {1, 5, 1, −1, 3, 7}, {1, −3, 1, −5, −1, 3}, {1, −3, 1, 5, 3, 7}, {1, 5, 3, 7, −1, −5}; and generate a reference signal of a first signal, wherein the first signal is a signal modulated by using π/2 (BPSK), and the reference signal is generated by using the first sequence; and a transceiver, the transceiver configured to send the reference signal on a first frequency-domain resource, wherein the first frequency-domain resource comprises K subcarriers each having a subcarrier number of k, k=u+L*n+delta, L is an integer greater than or equal to 2, delta∈{0, 1, . . . , L−1}, u is an integer, and subcarrier numbers of the K subcarriers are numbered in ascending or descending order of frequencies.

13. The apparatus according to claim 12, wherein a modulation scheme of the first sequence is neither BPSK modulation nor π/2 BPSK modulation.

14. The apparatus according to claim 12, wherein the first sequence is a sequence modulated by using any one of 8PSK, 16PSK, or 32PSK.

15. The apparatus according to claim 12, wherein the programming instructions are for execution by the at least one processor to determine the first sequence in a first sequence group, wherein the first sequence group is one of a plurality of sequence groups, and wherein the first sequence is determined, based on a value of the delta, in a plurality of sequences that are in the first sequence group and whose length is K.

16. The apparatus according to claim 15, wherein the programming instructions are for execution by the at least one processor to determine the first sequence group based on a cell identifier or a sequence group identifier.

17. The apparatus according to claim 15, wherein the transceiver is further configured to receive indication information, and wherein the indication information is used to indicate a sequence that is in each sequence group of at least two sequence groups and is used to generate the reference signal.

18. The apparatus according to claim 12, wherein when the value of the delta is 0, the programming instructions are for execution by the at least one processor to:

perform discrete Fourier transform on elements in a sequence {z(t)} to obtain a sequence {f(t)} with t=0, . . . , L*K−1, wherein when t=0, 1, . . . , L*K−1, z(t)=x(t mod K), and x(t) represents the first sequence; and map elements numbered L*p+delta in the sequence {f(t)} to subcarriers each having the subcarrier number of u+L*p+delta, respectively, to generate the reference signal, wherein p=0, . . . , K−1.

19. The apparatus according to claim 18, wherein the performing discrete Fourier transform on elements in a sequence {z(t)} to obtain a sequence {f(t)} comprises:

performing the discrete Fourier transform on the sequence {z(t)}; and filtering a sequence obtained after the discrete Fourier transform to generate the sequence {f(t)}.

20. The apparatus according to claim 12, wherein when the value of the delta is 1, the programming instructions are for execution by the at least one processor to:

perform discrete Fourier transform on elements in a sequence {z(t)} to obtain a sequence {f(t)} with t=0, . . . , L*K−1, wherein when t=0, . . . , K−1, z(t)=x(t), and wherein when t=K, . . . , L*K−1, z(t)=−x(t mod K), and x(t) represents the first sequence; and map elements numbered L*p+delta in the sequence {f(t)} to subcarriers each having the subcarrier number of u+L*p+delta, respectively, to generate the reference signal, wherein p=0, . . . , K−1.

21. The apparatus according to claim 12, wherein when L=4, the programming instructions are for execution by the at least one processor to:

perform discrete Fourier transform on elements in a sequence {z(t)} to obtain a sequence {f(t)} with t=0, . . . , 4K−1, wherein when t=0, 1, . . . , 4K−1, $$z(t) = w_{delta}\left(\left\lfloor \frac{t}{K} \right\rfloor\right) x(t \bmod K),$$

and wherein $w_0=(1, 1, 1, 1)$, $w_1=(1, j, -1, -j)$, $w_2=(1, -1, 1, -1)$, $w_3=(1, -j, -1, j)$, $\lfloor c \rfloor$ represents rounding down of c, and x(t) represents the first sequence; and map elements numbered 4p+delta in the sequence {f(t)} to subcarriers each having the subcarrier number of u+L*p+delta, respectively, to generate the reference signal, wherein p=0, . . . , K−1.

22. The apparatus according to claim 12, wherein the programming instructions are for execution by the at least one processor to:

perform discrete Fourier transform on elements in a sequence {x(t)} to obtain a sequence {f(t)} with t=0, . . . , K−1, wherein x(t) represents the first sequence; and map elements numbered p in the sequence {f(t)} to subcarriers each having the subcarrier number of u+L*p+delta, respectively, to generate the reference signal, wherein p=0, . . . , K−1.

23. A non-transitory computer-readable storage medium having instructions recorded thereon which, when executed by at least one processor, cause the at least one processor to perform operations comprising:

determining a first sequence {x(n)} based on a preset condition and a sequence {s(n)}, wherein the preset condition is $x_n=y_{(n+M) \bmod K}$, wherein $$y_n = A \cdot e^{\frac{j \times \pi \times s_n}{8}},$$

$M \in \{0, 1, 2, \ldots, 5\}$, a length of the first sequence is K=6, n=0, 1, . . . , K−1, A is a non-zero complex number, and $j=\sqrt{-1}$; and wherein the sequence {s(n)} comprises at least one of the following sequences:

{1, −3, 1, 5, −1, 3}, {1, −3, 1, −7, 7, −5}, {1, 5, 1, −5, −1, −3}, {1, 5, 1, −3, 1, 5}, {1, 7, 1, −5, −7, −1}, {1, 5, 1, 5, −5, 5}, {1, 5, 1, −1, 3, 7}, {1, −3, 1, −5, −1, 3}, {1, −3, 1, 5, 3, 7}, {1, 5, 3, 7, −1, −5};

generating a reference signal of a first signal, wherein the first signal is a signal modulated by using π/2 binary phase shift keying (BPSK), and the reference signal is generated by using the first sequence; and sending the reference signal on a first frequency-domain resource, wherein the first frequency-domain resource comprises K subcarriers each having a subcarrier number of k, k=u+L*n+delta, L is an integer greater than or equal to 2, delta∈{0, 1, . . . , L−1}, u is an integer, and subcarrier numbers of the K subcarriers are numbered in ascending or descending order of frequencies.

24. The non-transitory computer-readable storage medium according to claim 23, wherein a modulation scheme of the first sequence is neither BPSK modulation nor π/2 BPSK modulation.

25. The non-transitory computer-readable storage medium according to claim 23, wherein the first sequence is a sequence modulated by using any one of 8PSK, 16PSK, or 32PSK.

26. The non-transitory computer-readable storage medium according to claim 23, wherein the generating a reference signal of a first signal comprises:

performing discrete Fourier transform on elements in a sequence {x(t)} to obtain a sequence {f(t)} with t=0, . . . , K−1, wherein x(t) represents the first sequence; and mapping elements numbered p in the sequence {f(t)} to subcarriers each having the subcarrier number of u+L*p+delta, respectively, to generate the reference signal, wherein p=0, . . . , K−1.

* * * * *